US012695512B2

(12) United States Patent　　　　(10) Patent No.:　US 12,695,512 B2
Nazarathy　　　　　　　　　　　(45) Date of Patent:　　　Jul. 28, 2026

(54) MULTI-PARALLEL AND SERIAL OPTICAL DIGITAL TO ANALOG CONVERSION

(71) Applicant: Technion Research & Development Foundation Limited, Haifa (IL)

(72) Inventor: Moshe Nazarathy, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 154 days.

(21) Appl. No.: 18/320,477

(22) Filed: May 19, 2023

(65) Prior Publication Data

US 2023/0412274 A1　　Dec. 21, 2023

Related U.S. Application Data

(63) Continuation-in-part of application No. PCT/IB2021/060857, filed on Nov. 23, 2021.

(60) Provisional application No. 63/477,557, filed on Dec. 28, 2022, provisional application No. 63/198,936, filed on Nov. 23, 2020.

(51) Int. Cl.
| | |
|---|---|
| *H03M 1/00* | (2006.01) |
| *G02F 1/21* | (2006.01) |
| *G02F 7/00* | (2006.01) |
| *H04B 10/50* | (2013.01) |
| *H04B 10/516* | (2013.01) |

(52) U.S. Cl.
CPC ......... *H04B 10/5053* (2013.01); *G02F 1/212* (2021.01); *G02F 7/00* (2013.01); *H04B 10/516* (2013.01)

(58) Field of Classification Search
CPC .............. H04B 10/5053; H04B 10/516; H04B 10/501; G02F 1/212; G02F 7/00
See application file for complete search history.

(56) References Cited

U.S. PATENT DOCUMENTS

| | | | | |
|---|---|---|---|---|
| 5,039,988 | A * | 8/1991 | Hong | H03M 1/74 |
| | | | | 341/137 |
| 7,061,414 | B2 * | 6/2006 | Chen | G02F 7/00 |
| | | | | 250/214 R |
| 11,940,571 | B2 * | 3/2024 | Oza | G01S 17/34 |
| 2007/0116461 | A1 | 5/2007 | Chen et al. | |
| 2016/0261439 | A1 | 9/2016 | Menezo et al. | |

(Continued)

FOREIGN PATENT DOCUMENTS

EP　　　　2493100 A1　　8/2012

*Primary Examiner* — Jean B Jeanglaude
(74) *Attorney, Agent, or Firm* — Reches Patents

(57)　　　　ABSTRACT

An optical digital to analog converter (oDAC) that may include (a) multiple optical paths that are parallel to each other; (b) a combiner, (c) a splitter that is configured to receive an optical signal at a splitter input and split the optical signal between multiple splitter outputs to provide multiple path input signals to the multiple optical paths. The multiple optical paths are configured to optically process, in parallel, path input signals to provide path output signals. Each optical path is configured to apply an optical process that comprises applying optical modulation, by an optical gate of the optical path and under a control of an electrical modulator, to provide an optical signal having a value selected out of multiple constellation levels. The combiner is configured to add the multiple path output signals to provide an oDAC output signal having a value selected from values of a single quadrature constellation.

28 Claims, 43 Drawing Sheets

(a): SEMZM-based Thermometer Weighted 3bit-ODAC

Splitter (SP)　　　　　Optical path (OP)
Phase modulator segment (MPS)
Waveguide (WG)
Phase shifter (PS)　　　Optical path (OP)

(b): MPMZM 3bit-ODAC (3-way MPoDAC)
SP　PS　PM　CM
1:3 Splitter　PM　3:1 Combiner　PM　PM Combiner (CB)

(56) References Cited

U.S. PATENT DOCUMENTS

2022/0229340 A1 * 7/2022 Hashemi Talkhooncheh ..............
G02F 1/225
2023/0014905 A1 * 1/2023 Takeuchi ............... H10D 84/01

* cited by examiner

13

41

42

51

DD PAM4 power constellations of BiWgt 3-bit SEMZMs

- optimized DD BiWgt 3SE
- naive 4:2:1 segment lengths (DD)
- ideal equi-spaced constellation
- max-full-scale [0,1] range COH PAM4 field constellations of BiWgt 3-bit SEMZM

- optimized COH BiWgt 3SE
- naive 4:2:1 segment lengths (COH)
- ideal equi-spaced constellation
- max-full-scale [-1,1] range

71

MPoDAC based 3way-ODAC (of the MPMZM type)

72

2-way MPoDAC (of the MPMZM type)

73

2-bit BiWgt PAM4 COH MPoDAC

81

MPMZM based 2bit-ODAC

82

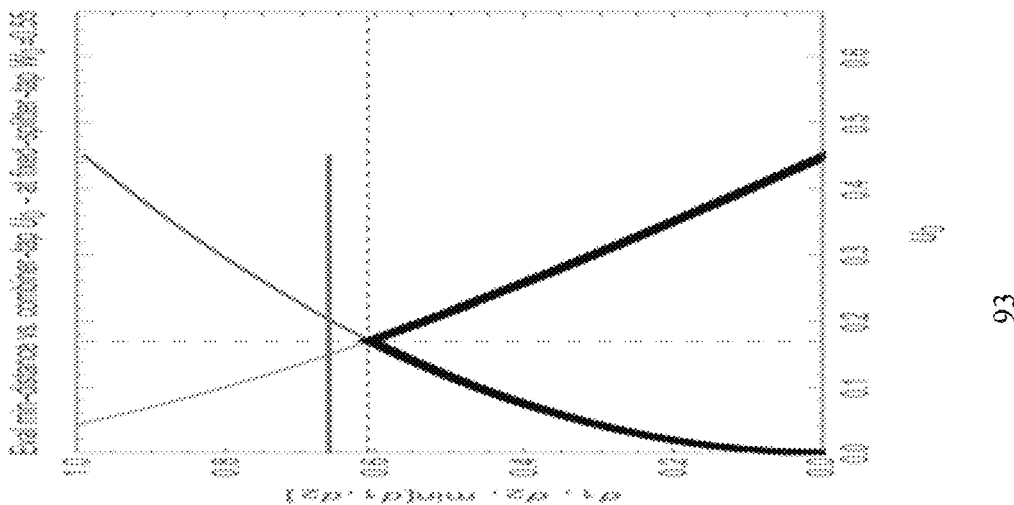
93
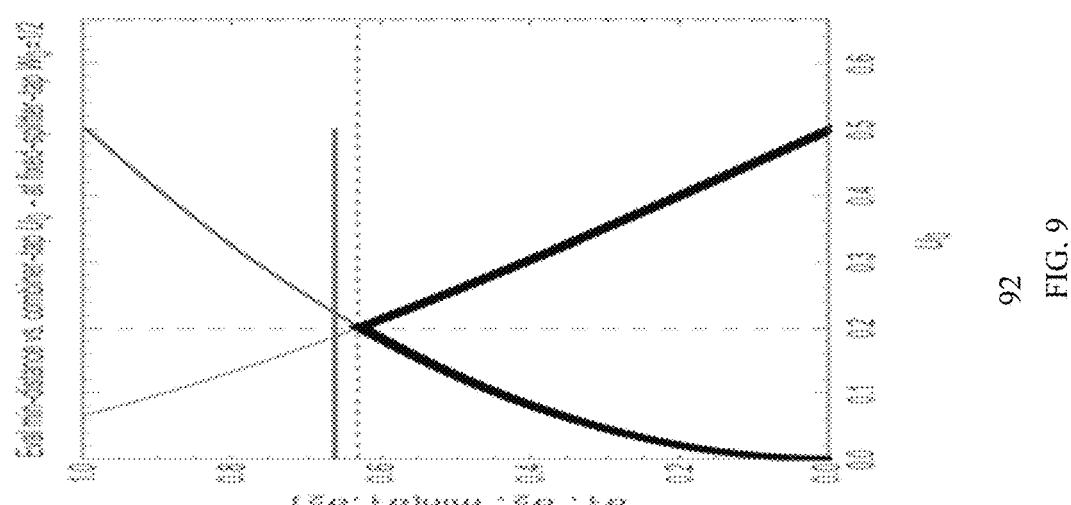
92
FIG. 9
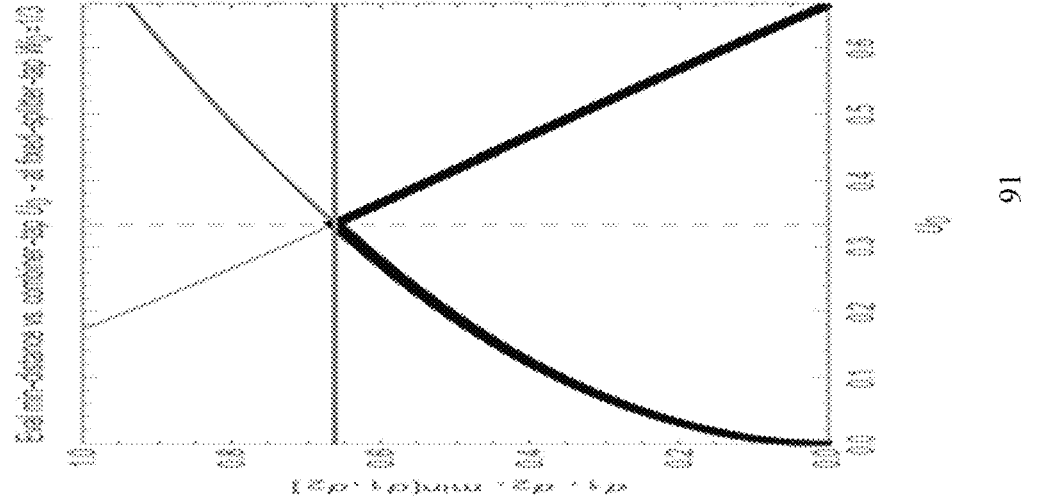
91

101

111

121

131

141

151

161

171

181

191

201

202

221

231

241

251

261

271

272

281

291

* our pref constellation (chirp-free)
* our 50:50 constellation (chirp-free)
* our equi constellation (chirp-free)
* [V] prior art constellation (with-chirp)
* ideal equi-spaced constellation
— max-full-scale range

231

231

321

331

3-bit BiWgt PAM4 3-MP embedded oDAC

341

DD-PAM4-3MP-embedded oDAC – preferred embodiment

342

- our embedded PAM4~DD~3MP
- our pref constellation (chirp~free)
- our 50:50 constellation (chirp~free)
- our equi constellation (chirp~free)
- [V] prior art constellation (with~chirp)
- ideal equi~spaced constellation
— max~full~scale range

351

361

371

S-way MPoDAC (DD or COH)

381

3bit-ODAC module (bipolar/unipolar PAM8/PAM4/BPSK/OOK programmable modulator)

382

391

401

402

403

404

411

412

431

Fig 4C    3-way PAM2|4-driven MPoDAC
(realized as 2-way MPoDAC: compound OG || simple OG)

441

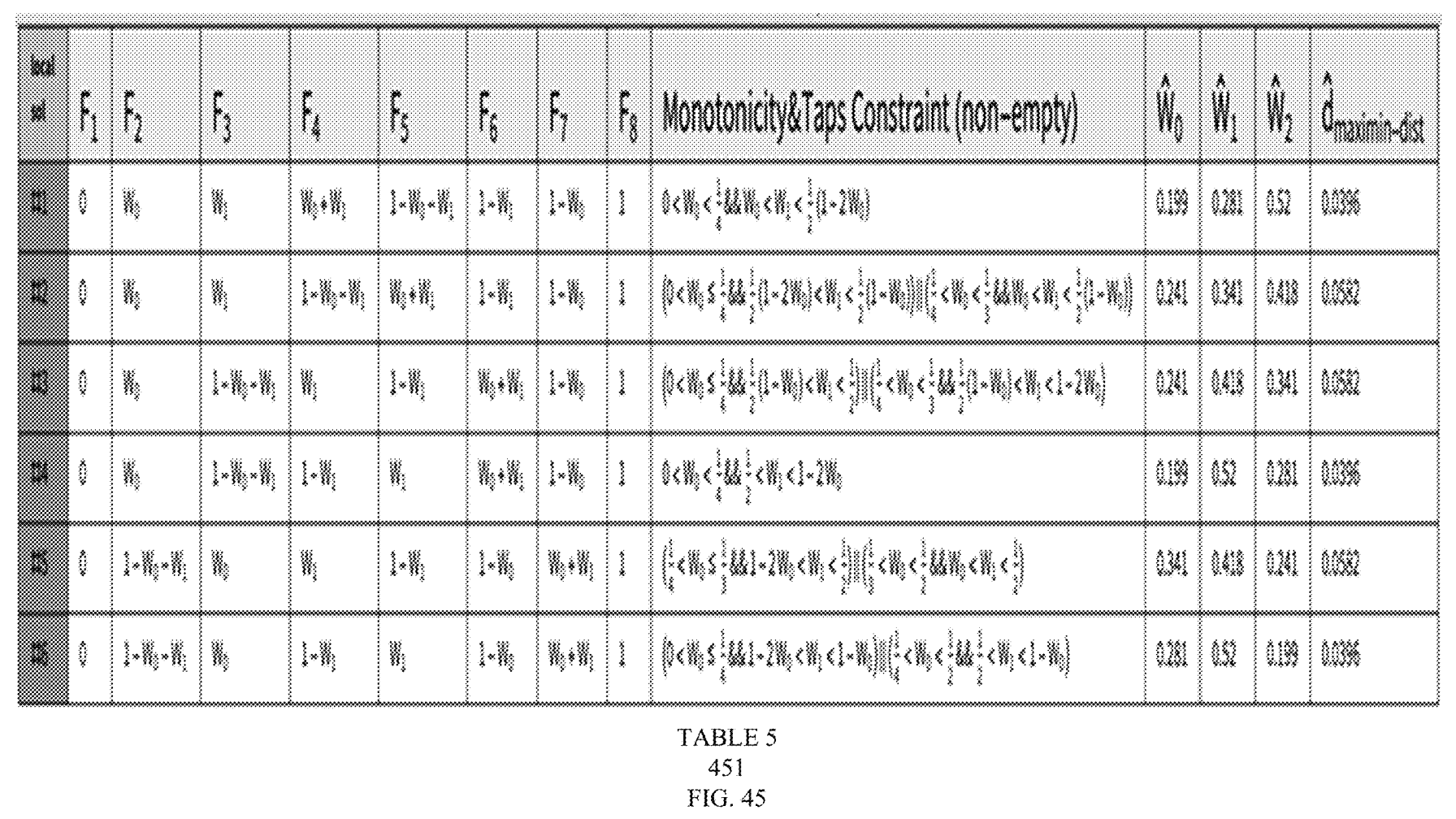

TABLE 5
451
FIG. 45

Figure 46:
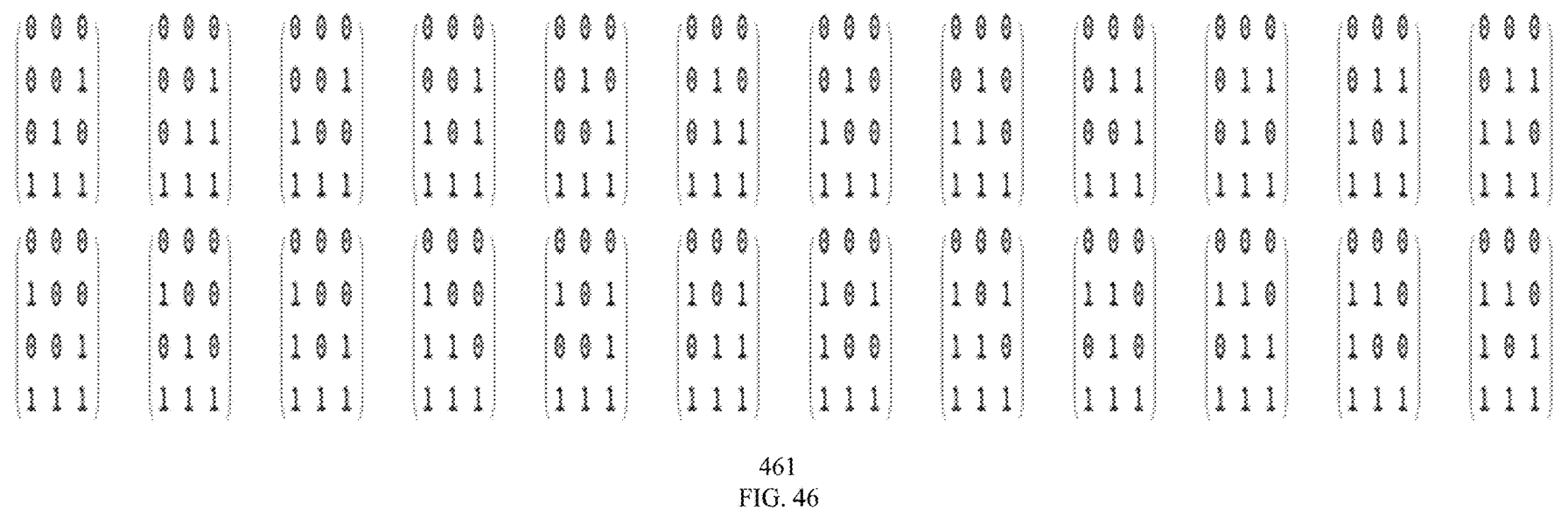

MULTI-PARALLEL AND SERIAL OPTICAL DIGITAL TO ANALOG CONVERSION

CROSS REFERENCE

This application is a CONTINUATION IN PART of PCT patent application PCT/IB2021/060857 International filing date Nov. 23, 2021 which claims priority from U.S. provisional patent Ser. No. 63/198,936 filing date Nov. 23, 2020—both the PCT patent application and the US provisional are incorporated herein in their entirety. This application claims priority from U.S. provisional patent Ser. No. 63/477,557 filing date Dec. 28, 2022 which is incorporated herein in its entirety.

BACKGROUND

Electronic Digital to Analog Converters (DAC), abbreviated here as oDAC, are key interfaces from the digital to the analog domains. In high-speed Digital Optical transmission applications, the Digital to Optical (D/O) translation occurring in the optical transmitter typically entails D/A, i.e., electronic DAC (eDAC) conversion, followed by Analog-to-Optical (A/O) modulation. Thus, the state-of-the-art widespread solution is to realize D/O as an eDAC→Optical-Modulator cascade.

It would be advantageous, from the viewpoints of performance, energy efficiency, complexity and cost reduction, to consider direct conversion from the Digital to the Optical domain (D/O), eliminating or at least minimizing the eDACs intermediary, especially in ultra-high-speed applications where eDAC technology is hard to scale up in speed, in terms, of power consumption and performance.

BRIEF DESCRIPTION OF THE DRAWINGS

The embodiments of the disclosure will be understood and appreciated more fully from the following detailed description, taken in conjunction with the drawings in which:

FIG. 9 illustrates an example of a min distance function;

FIG. 45 includes an example of a table;

FIG. 46 includes an example of matrices;

DETAILED DESCRIPTION

Figure 1:
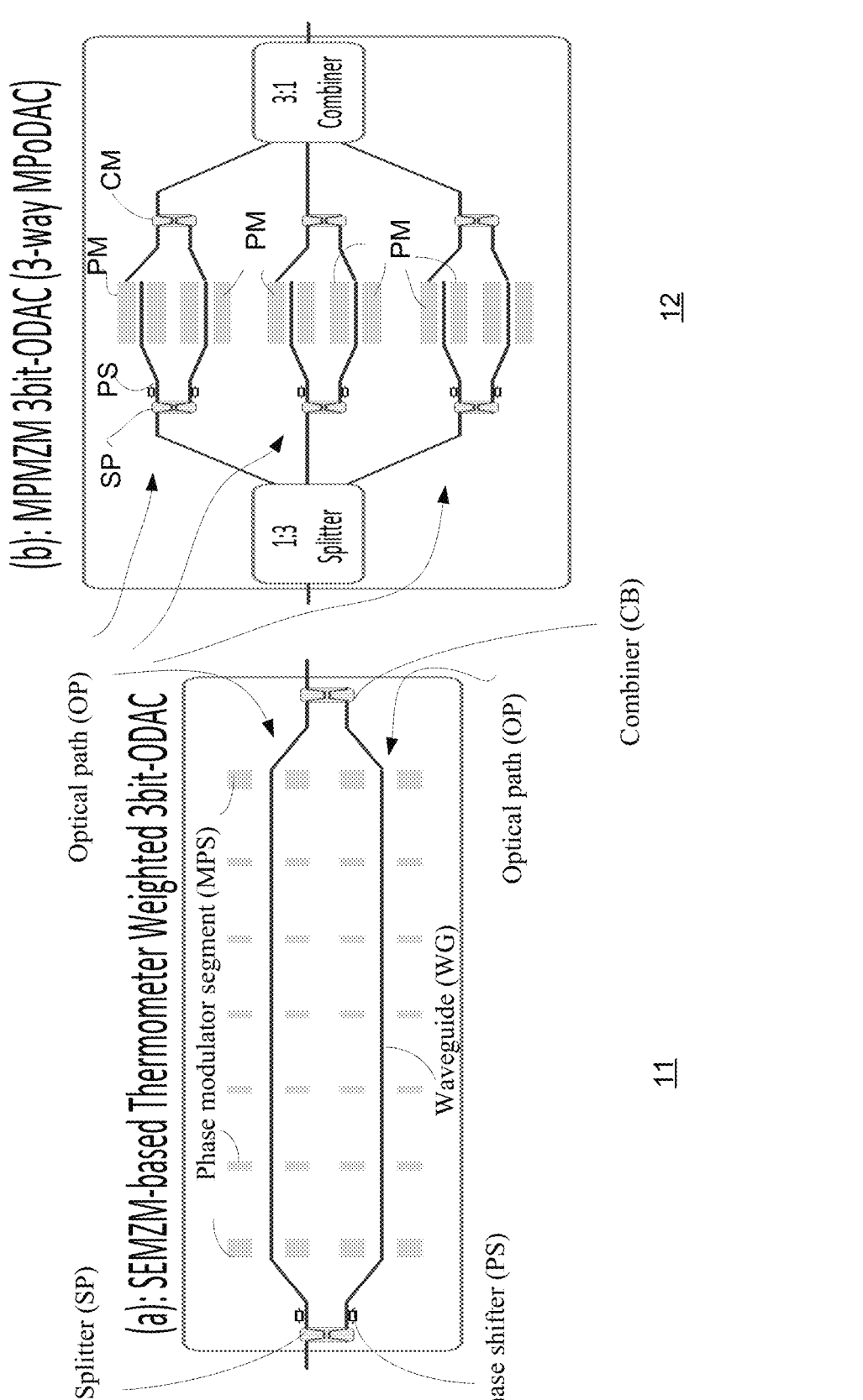
FIG. 1 illustrates an example of a SEMZM based SEMZM and an example of a MPMZM 3 bit ODAC.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Electronic domain processors may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It should be noted that for simplicity of explanation electrical domain drivers of various components are not shown for simplicity of explanation.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided an optical digital to analog converter (oDAC), may include multiple optical paths that may be parallel to each other; a combiner that may include multiple combiner inputs and a combiner output; a splitter that may be configured to receive an optical signal at a splitter input and split the optical signal between multiple splitter outputs to provide multiple path input signals to the multiple optical paths; wherein the multiple optical paths may be formed between the multiple splitter outputs and the multiple combiner inputs; wherein the multiple optical paths may be configured to optically process, in parallel, path input signals to provide path output signals; wherein each optical path may be configured to apply an optical process that may include applying optical modulation, by an optical gate of the optical path and under a control of an electrical modulator, to provide an optical signal having a value selected out of multiple constellation levels; wherein the multiple optical paths may be configured to output multiple path output signals to the multiple combiner inputs; and wherein at least the combiner may be configured to add the multiple path output signals to provide an oDAC output signal having a value selected out of values of a single quadrature constellation.

The optical process applied by each optical path may be a single quadrature optical process.

The optical modulation may be an optical pulse amplitude modulation (PAM).

The optical gates may be 1-bit modulated by the electrical modulators.

The optical gates may be multi-bit modulated by the electrical modulators.

The optical gates may be Mach-Zehnder-Modulators.

The multiple optical paths may be configured to introduce either (a) a zero phase difference or (b) one hundred eighty degree phase difference between pairs of output path output signals.

The multiple optical paths may be configured to introduce a zero phase difference between the optical path output signals.

The optical gates may be followed by phase shifters, wherein the modulation rates of the phase shifters may be a fraction of a modulation rate of the optical gates.

The optical gates may be followed by slow phase modulators, wherein the modulation rates of the slow phase modulators may be a fraction of a modulation rate of the optical gates.

At least one of the optical paths may include an optical amplifier.

The optical gates may be phase gates.

Multiple constellation levels may belong to a coherent constellation.

Multiple constellation levels may be equally spaced apart from each other.

Multiple optical paths may be multiple (S) optical paths, and wherein the multiple constellation levels, normalized to unity maximum level, equal s/(S−1), wherein s may range from zero to S−1.

The optical gates may be intensity gates.

Multiple constellation levels may belong to a direct detection constellation.

Multiple constellation levels may be proportional to square roots of values that may be evenly spaced apart from each other.

Multiple optical paths may be multiple (S) optical paths, and wherein the multiple constellation levels equal square roots of s/(S−1), whereas s may range from zero to S−1.

The optical gates may be configurable gates that may be configured to operate while driven by electrical modulators as either phase gates or as intensity gates.

The optical gates may be Mach-Zehnder-Modulators that comprise variable optical attenuators in multiple branches.

The optical gates may include phase shifters in the multiple branches.

The splitter may exhibit optical power split ratios that equal corresponding optical power combing ratios of the combiner.

The splitter may exhibit optical power split ratios that equal each other.

The splitter may exhibit optical power split ratios, wherein at least one optical power split ratio differs from at least one other power split ratio.

The splitter may exhibit optical power split ratios, at least one of the optical split ratios differs from at least one of corresponding optical power combing ratios of the combiner.

Two optical paths of the multiple optical paths apply different optical modulations.

The oDAC may include an additional optical path formed between an additional splitter output and an additional combiner input, wherein the additional optical path may be without an optical gate.

All of the multiple constellation levels may be of a same polarity.

At least one of the multiple constellation levels may be positive and at least another one of the multiple constellation levels may be negative.

At least two of the multiple optical gates may be controlled by at least two electrical modulators.

There may be provided multiple optical paths that include a first optical path and a second optical path; wherein the multiple path input signals includes a first path input signal and a second path input signal; wherein an input power ratio between a power of the first path input signal and a power of the second path input signal differs from one. The first optical path may include a first modulator that may be driven by a first driver that may include a first trans-impedance amplifier that has a first trans-impedance value. The second optical path may include a second modulator that may be driven by a second driver that has a second trans-impedance amplifier that has a second trans-impedance value. A trans-impedance ratio between the first trans-impedance value and the second trans-impedance value may be configured to compensate for at least the input power ratio.

The first optical path may be configured to output a first path output signal, wherein the second optical path may be configured to output a second path output signal, wherein the combiner may be configured to optically combine (i) a first product of a multiplication between the first path output signal and a first combiner weight, and (ii) a second product of a multiplication between the second path output signal and a second combiner weight; wherein a power combining ratio between the first combiner weight and the second combiner weight differs from one.

The trans-impedance ratio may be configured to compensate for the power combining ratio and the input power ratio.

The input power ratio may range between 2 and 20.

The input power ratio may range between 4 and 6.

The first driver also may include first current sources that precede the first trans-impedance amplifier, wherein a product of (i) a mean input current inputted to the first trans-impedance amplifier, multiplied by (ii) the first trans-impedance value, may be constant.

The second driver also may include second current sources that precede the second trans-impedance amplifier, wherein a product of (i) a mean input current inputted to the second trans-impedance amplifier, multiplied by (ii) the second trans-impedance value, may be constant.

The first modulator may be a first Mach-Zehnder-Modulator (MZM) and wherein the second modulator may be a second MZM.

The oDAC wherein each one of the first MZM modulator and the second MZM modulator may be a non-segmented MZM modulator.

The oDAC wherein each one of the first MZM modulator and the second MZM modulator may be a segmented MZM modulator.

The oDAC wherein each one of the first MZM modulator and the second MZM modulator may be a segmented MZM modulator that consists essentially of a sequence of a first segment and a second segment.

The oDAC wherein each segment may be fed by a Non-Return-to-Zero (NRZ) driver.

The phase shift ratio between a phase shift introduced by the first segment and a phase shift introduced the second segment of a MZM modulator of the first and second MZM modulators may range between 1.1 and 1.95.

The first segment of the first MZM modulator may be fed by the first trans-impedance amplifier, wherein the second segment of the first MZM modulator may be fed by a third trans-impedance amplifier, wherein a ratio between (i) a first product of a multiplication of a first segment length by a mean output voltage of the first trans-impedance amplifier, and (ii) a second product of a multiplication of a second segment length by a mean output voltage of the third trans-impedance amplifier substantially equals 1.552.

The segment length ratio between a length of the first segment and a length of the second segment may range between 1.1 and 1.95.

The segment length ratio substantially equals 1.552.

The multiple optical paths may be only the first optical path and the second optical path; and wherein the oDAC may be configured to output signals that may be selected out of 2-level pulse amplitude modulation (PAM) signals, 4-level PAM signals, 8-level PAM signals and 16-level PAM signals.

The multiple optical paths comprise a first optical path and a second optical path; wherein the multiple path input signals comprise a first path input signal and a second path input signal; wherein an input power ratio between a power of the first path input signal and a power of the second path input signal differs from one; wherein the first optical path may include a first modulator and a second modulator, the first modulator may include a first segment that may be followed by a second segment, the second modulator may include a third segment that may be followed by a fourth segment; wherein the first segment may be driven by a first driver that may include a first trans-impedance amplifier; wherein the second segment may be driven by a second driver that may include a second trans-impedance amplifier; wherein the third segment may be driven by a third driver that may include a third trans-impedance amplifier; wherein the fourth segment may be driven by a fourth driver that may include a fourth trans-impedance amplifier; wherein a first modulator phase shift ratio between a phase shift introduced by the first segment to a phase shift introduced by the second segment may range between 1.1 and 1.95; and wherein a second modulator phase shift ratio between a phase shift introduced by the third segment to a phase shift introduced by the fourth segment may range between 1.1 and 1.95.

The first modulator phase shift ratio substantially equals 1.552:

One or more trans-impedance ratios between two or more trans-impedance values of two or more trans-impedance amplifiers of the first, second, third and fourth trans-impedance amplifiers at least partially compensate for the input power ratio.

There may be provide a method for optical digital to analog conversion, the method may include splitting, by a combiner, an input optical signal to multiple path input signals; optically processing, the multiple path input signals, by the multiple optical paths, in parallel to provide path output signals; wherein the optically processing may include applying optical modulation by optical gates of the multiple optical paths and while driven by multiple electrical modulators, to provide optical signals; and combining, by a combiner, multiple path output signals that may be outputted from the multiple optical paths to provide an oDAC output signal having a value selected out of values of a single quadrature constellation.

The method may include 1-bit modulating the optical gates by the electrical modulators.

The method may include multi-bit modulating the optical gates by the electrical modulators.

The method may include introducing, by means of the multiple optical paths, either (a) a zero phase difference or (b) one hundred eighty degree phase difference between pairs of output path output signals.

The method may include introducing, by the multiple optical paths, a zero phase difference between the output path output signals.

The method may include phase modulating the optical signals having the values selected out of multiple constellation levels.

The method may include slow phase modulating the optical signals having the value selected out of multiple constellation levels, wherein a modulation rate of a slow phase modulator may be a fraction of a modulation rate of the optical gates.

The optical gates may be phase gates.

The multiple constellation levels may belong to a coherent constellation.

The multiple constellation levels may be equally spaced apart from each other.

The multiple optical paths may be S optical paths, and wherein the multiple constellation levels, normalized to unity maximum level, equal $s/(S-1)$, wherein s may range from zero to S.

The optical gates may be intensity gates.

The multiple constellation levels may belong to a direct detection constellation.

The multiple constellation levels may be proportional to square roots of values that may be evenly spaced apart from each other.

The multiple optical paths may be S optical paths, and wherein the multiple constellation levels equal a square root of $s/(S-1)$, whereas s may range from zero to S-1.

The method may include configuring the optical gates to operate while driven by electrical modulators as phase gates or as intensity gates.

The splitter may be a configurable splitter.

The combiner may be a configurable combiner.

The optical gates may be Mach-Zehnder-Modulators that comprise variable optical attenuators in multiple branches.

The optical gates further comprise phase shifters in the multiple branches.

The splitter may exhibit optical power split ratios that equal the corresponding optical power combing ratios of the combiner.

The splitter may exhibit optical power split ratios that equal each other.

The splitter may exhibit optical power split ratios, wherein at least one optical power split ratio differs from at least one other power split ratio.

The splitter may exhibit optical power split ratios that differs from corresponding optical power combing ratios of the combiner.

The two optical paths of the multiple optical paths apply different optical modulations.

The method may include passing an additional path input signal over an additional optical path to provide an additional path output signal.

The all of the multiple constellation levels may be of a same polarity.

The at least one of the multiple constellation levels may be positive and at least another one of the multiple constellation levels may be negative.

The at least two electrical modulators may be mutually independent.

The method may include measuring, by a measurement circuit, different signals within an optical digital to analog converter that may include the multiple optical paths.

The method may include tuning, by a tuning circuit, phase differences between different optical paths.

The method may include tuning, by a tuning circuit, the splitter and the combiner.

The method may include compensating for temperature induced drifts and for compensating for acoustically induced disturbances.

The method may include compensating for temperature induced drifts at a first compensation frequency and compensating for acoustically induced disturbances at a second compensation frequency that may be at least one hundred time bigger than the first compensation frequency.

The an optical processing applied by at least one of the optical paths may include optical amplification.

The combiner may exhibit optical power combining ratios that equal each other.

The combiner may exhibit optical power combining ratios, wherein at least one power combining ratio differs from another power combining ratio.

The optical processing applied by each optical path may be a single quadrature optical process.

An optical unit that may include a variable optical modulator, the variable optical modulator comprises: an input splitter, a first optical path, a second optical path and a combiner; wherein the first optical path may be formed between a first output of the input splitter and a first input of the combiner; wherein the second optical path may be formed between a second output of the input splitter and a second input of the combiner; wherein the first optical path may include a first variable optical attenuator, a first phase modulator and a first phase shifter; wherein the second optical path may include a second variable optical attenuator, a second phase modulator and a second phase shifter.

An optically amplified recirculating (OAR) phase gate, may include a first Mach-Zehnder-Modulator (MZM), a second MZM and a feedback amplifier; wherein an output of the first MZM may be coupled to an input of the second MZM, wherein the feedback optical amplifier may be coupled between an output of the second MZM and an input of the first MZM; wherein the second MZM may include a phase modulator.

An optical processor that may include a sequence of units that may include an input unit, one or more intermediate units and an output unit; wherein the input unit and each intermediate unit may include a first variable optical attenuator followed by a first phase modulator and a second variable attenuator followed by a second phase modulator; wherein each intermediate unit may include an input splitter that precedes the first variable optical attenuator and the second variable optical attenuator; wherein the output unit may include a combiner that may be followed by a pair of phase modulators.

A segmented first Mach-Zehnder-Modulator (MZM), may include a splitter, a combiner, and two optical paths formed between the splitter and the combiner; wherein each optical path may include a first phase modulator and a second phase modulator; wherein the phases ratio between the phase induced by the first phase modulator and the phase induced by a second phase modulator may range between 1.4 and 1.8.

The phases ratio may range between 1.5 and 1.6.

The phases ratio equals 1.55.

The lengths ratio between the length of the first phase modulator and the second phase modulator equals the phase ratio.

The first phase modulator and the second phase modulators may be independently driven by on-off keying signals.

Figure 2:
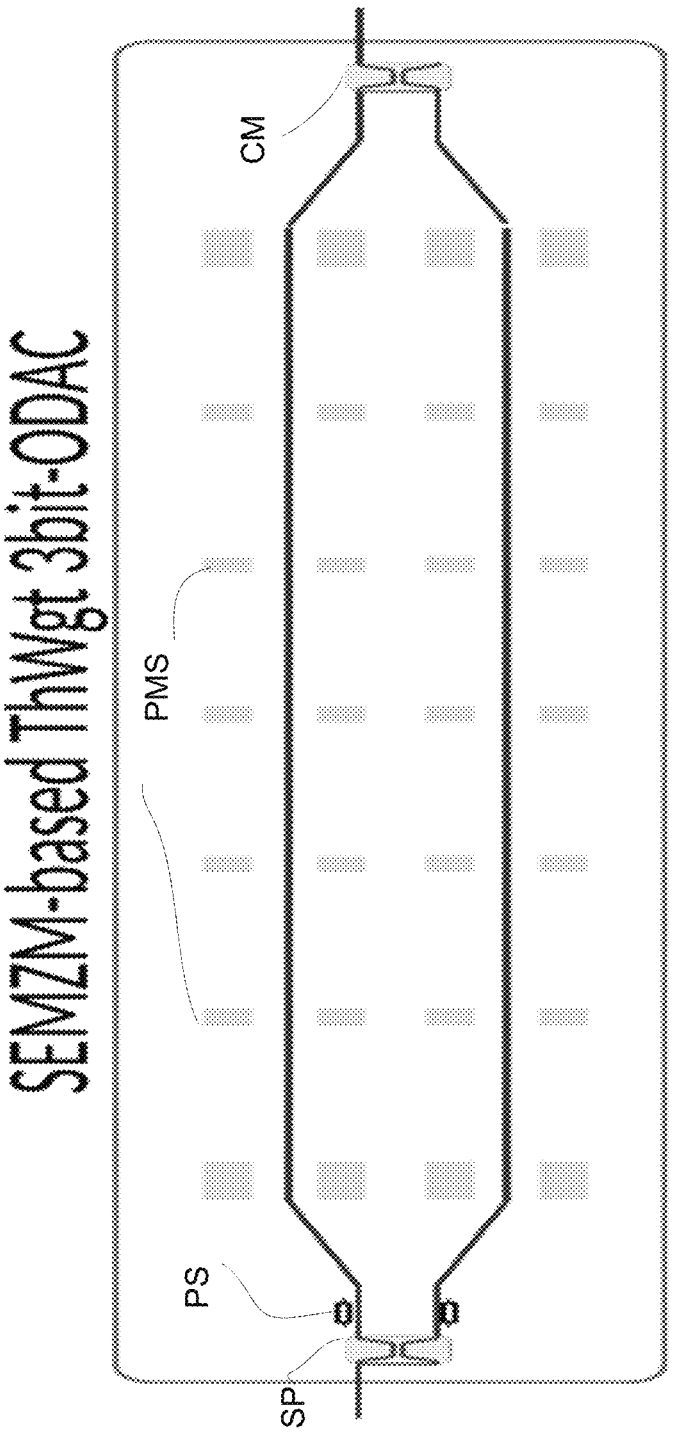
FIG. 2 illustrates an example of a SEMZM based ODAC.
Figure 3A:
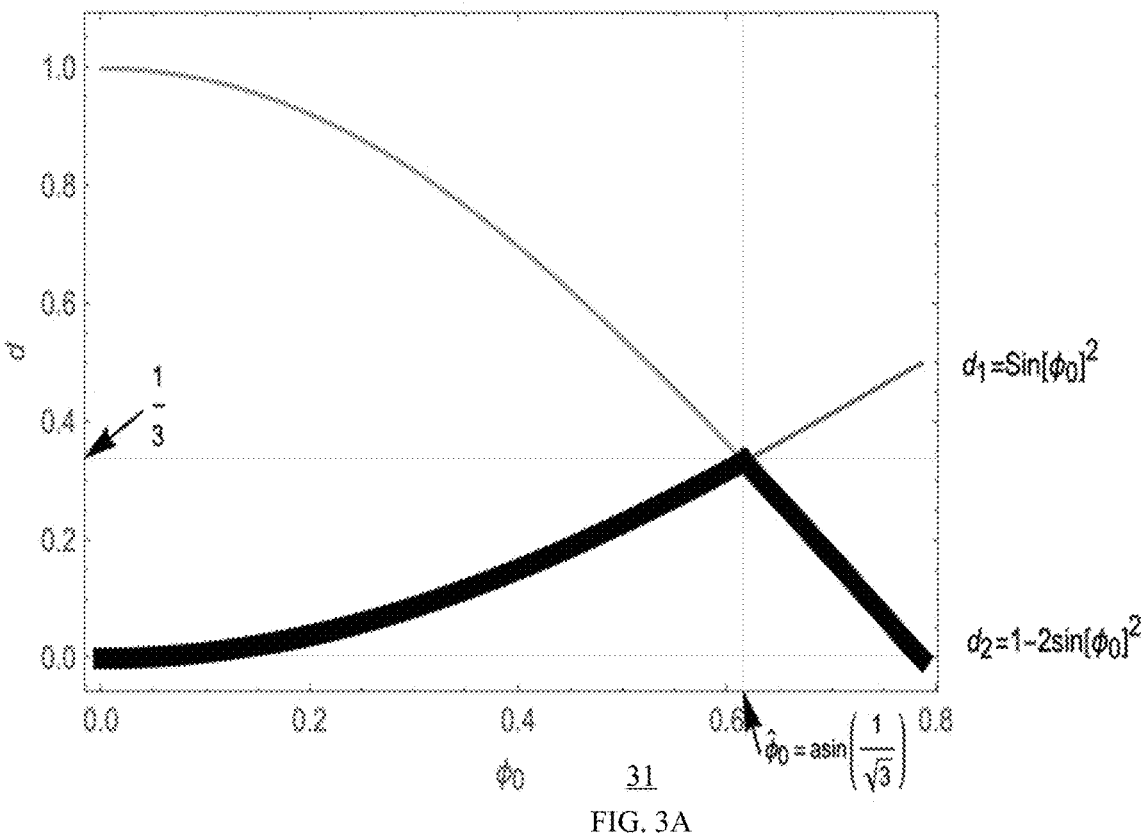
FIG. 3A illustrates an example of optical power distances.
Figure 3B:
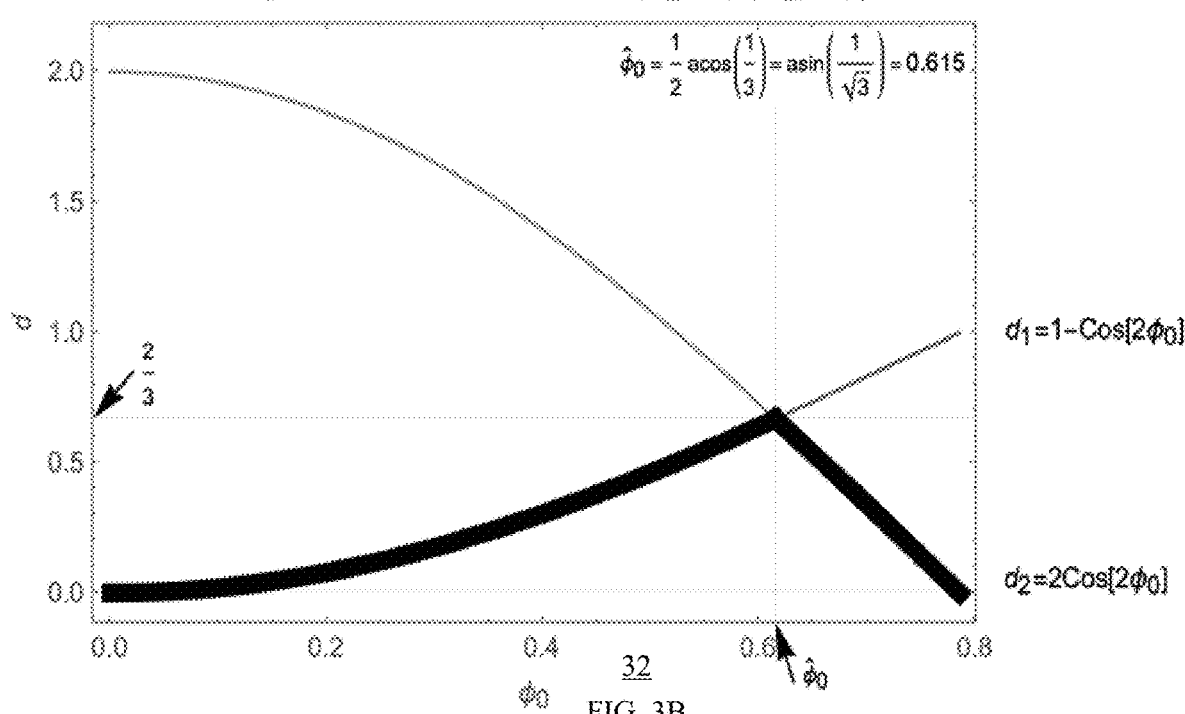
FIG. 3B illustrates an example of optical field distances.
Figure 4A:
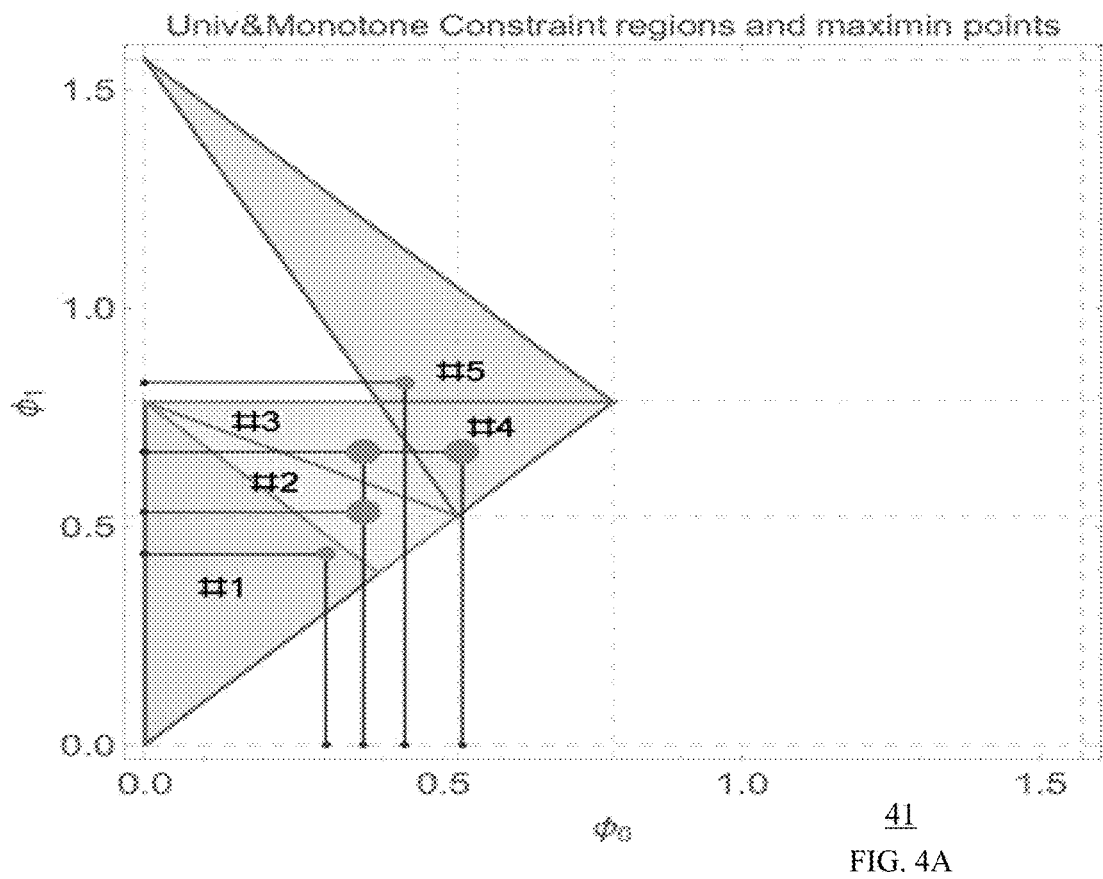
FIG. 4A illustrates an example of an angular constraint regions and maximin points.
Figure 4B:
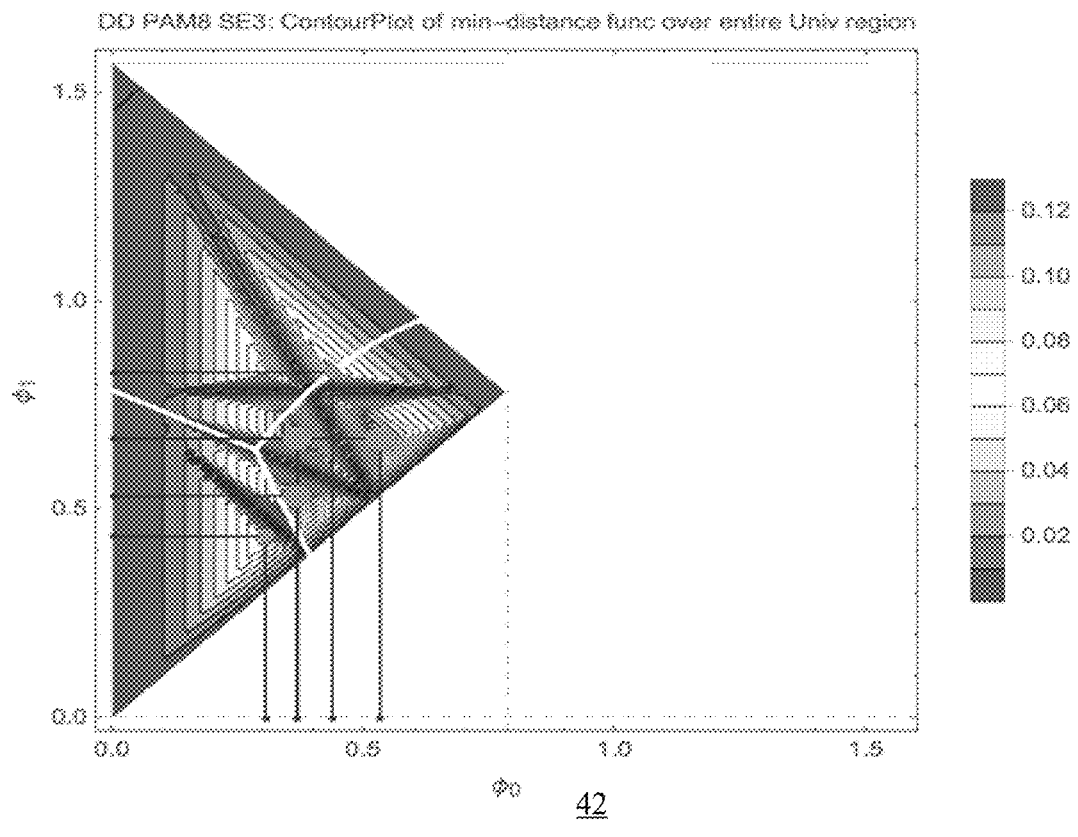
FIG. 4B illustrates an example of a min distance function.

FIG. 1 illustrates an example of a SEMZM based thermometer 11 and an example of a MPMZM 3 bit ODAC 12. FIG. 2 illustrates an example of a SEMZM based thermometer 13. FIG. 3A illustrates an example of a graph 31 of optical power distances. FIG. 3B illustrates an example of a graph 32 of optical field distances. FIGS. 3A and 3B illustrate peaks of a constellation min-distance function, $min[d_1, d_2]$. It is noted that it may be beneficial to set the DD and COH PAM4 generating devices happen to occur at the same phase parameter optimizer value, $\phi=0.615$ rad, for both the DD and the COH designs. FIG. 4A illustrates an example of a graph 43 of an angular constraint regions and maximin points. FIG. 4B illustrates an example of a graph 42 of a min distance function.

Figure 5A:
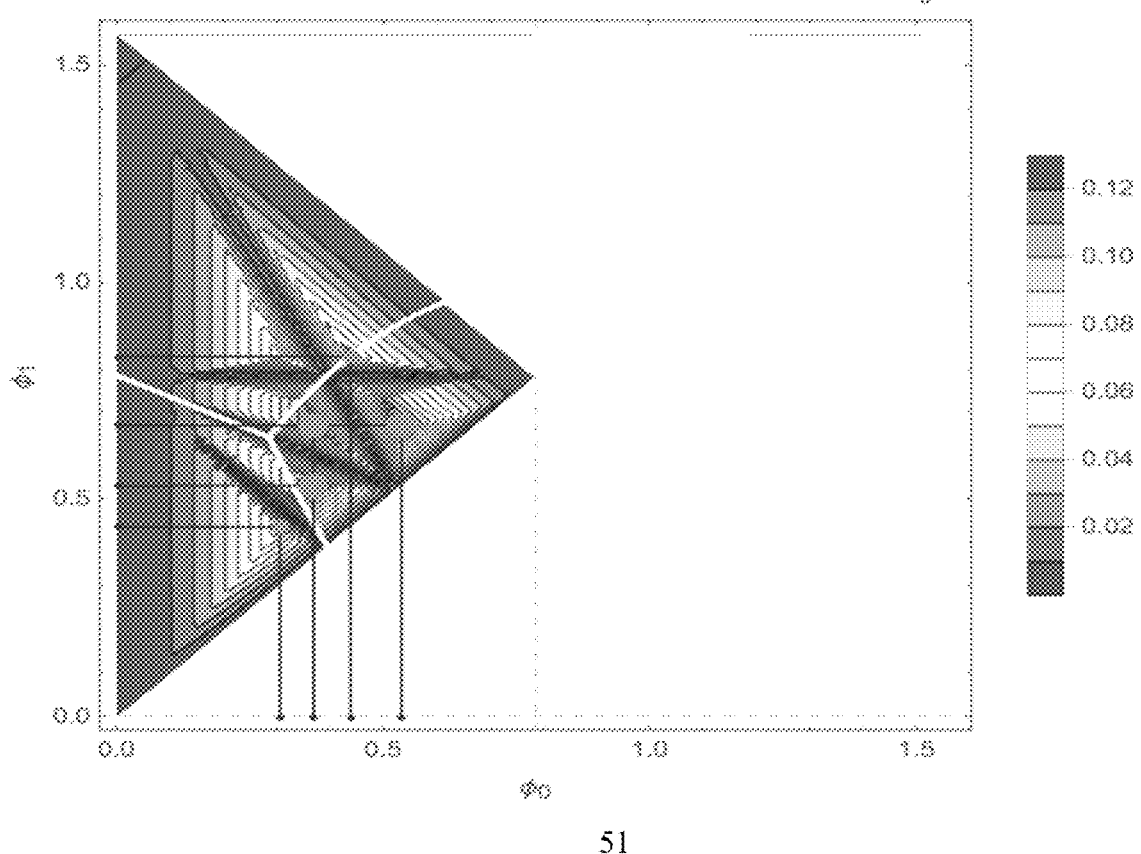
FIG. 5A illustrates an example of a min distance function.
Figure 5B:
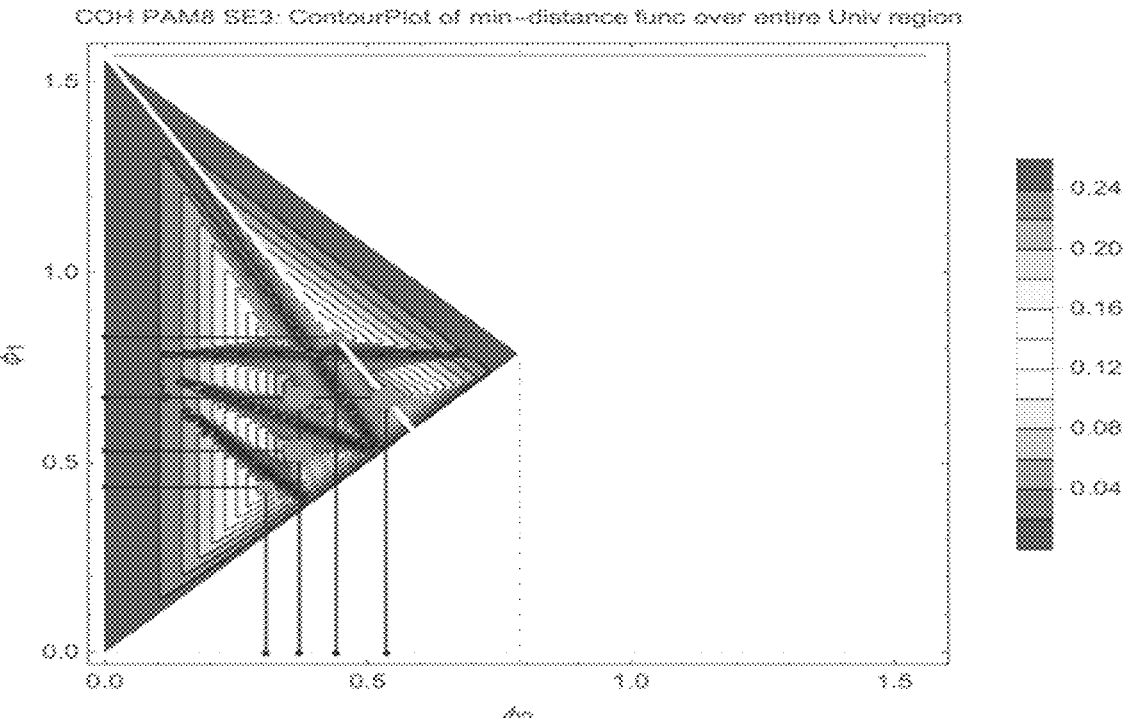
FIG. 5B illustrates an example of a min distance function.
Figure 6:
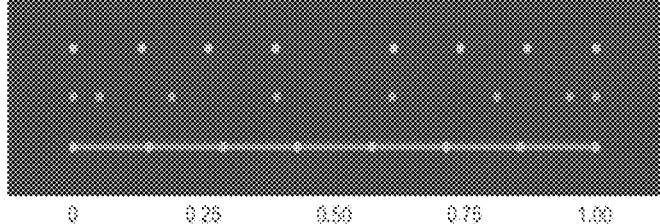
FIG. 6 illustrates an example of constellations.
Figure 6:
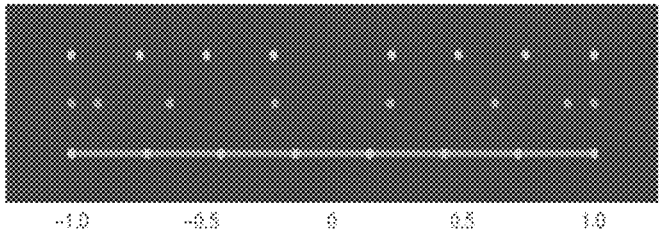
Figure 7A:
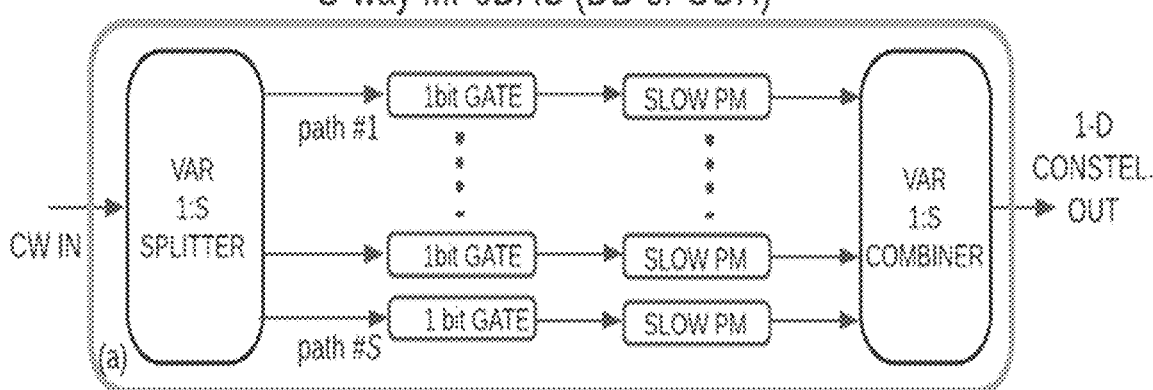
FIG. 7A illustrates an example of a S-way MPoDAC.
Figure 7B:
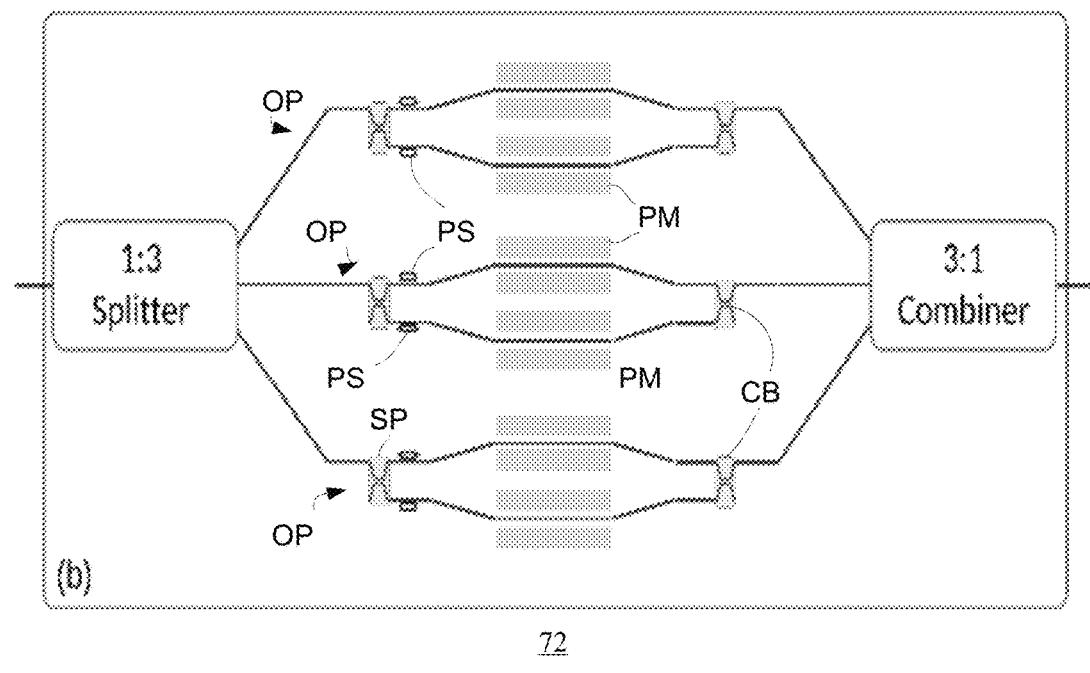
FIG. 7B illustrates an example of a MPoDAC based 3-way ODAC.
Figure 7C:
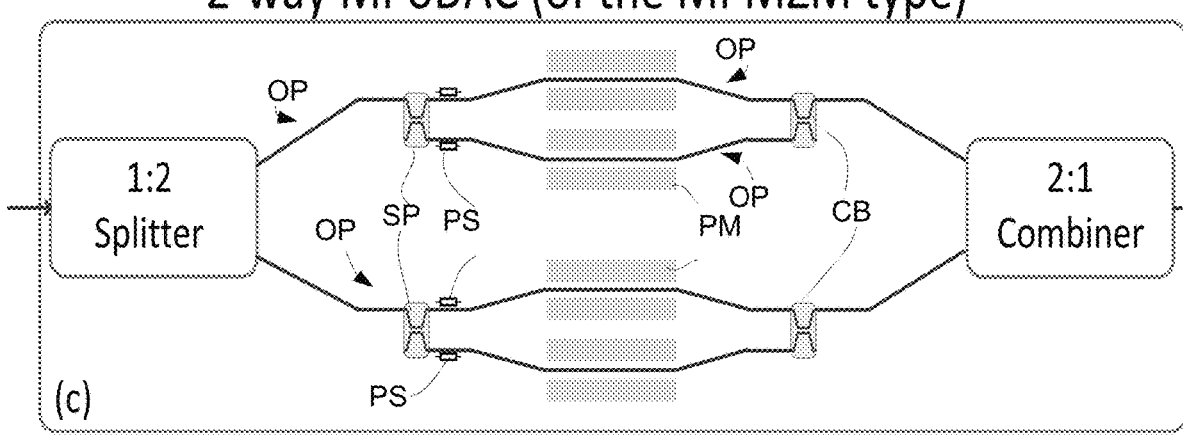
FIG. 7C illustrates an example of a 2-way MPoDAC.
Figure 8A:
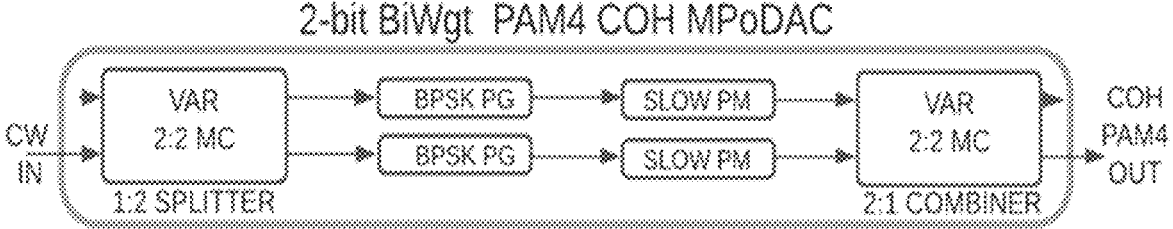
FIG. 8A illustrates an example of a 2-bit BiWgt PAM4 COH MPoDAC.
Figure 8B:
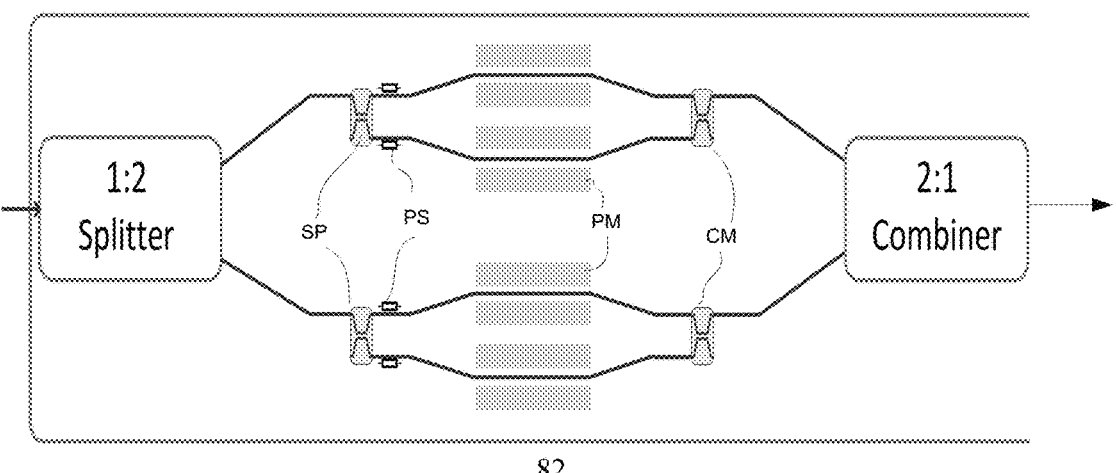
FIG. 8B illustrates an example of MPMZM based 2 bit ODAC.
Figure 10:
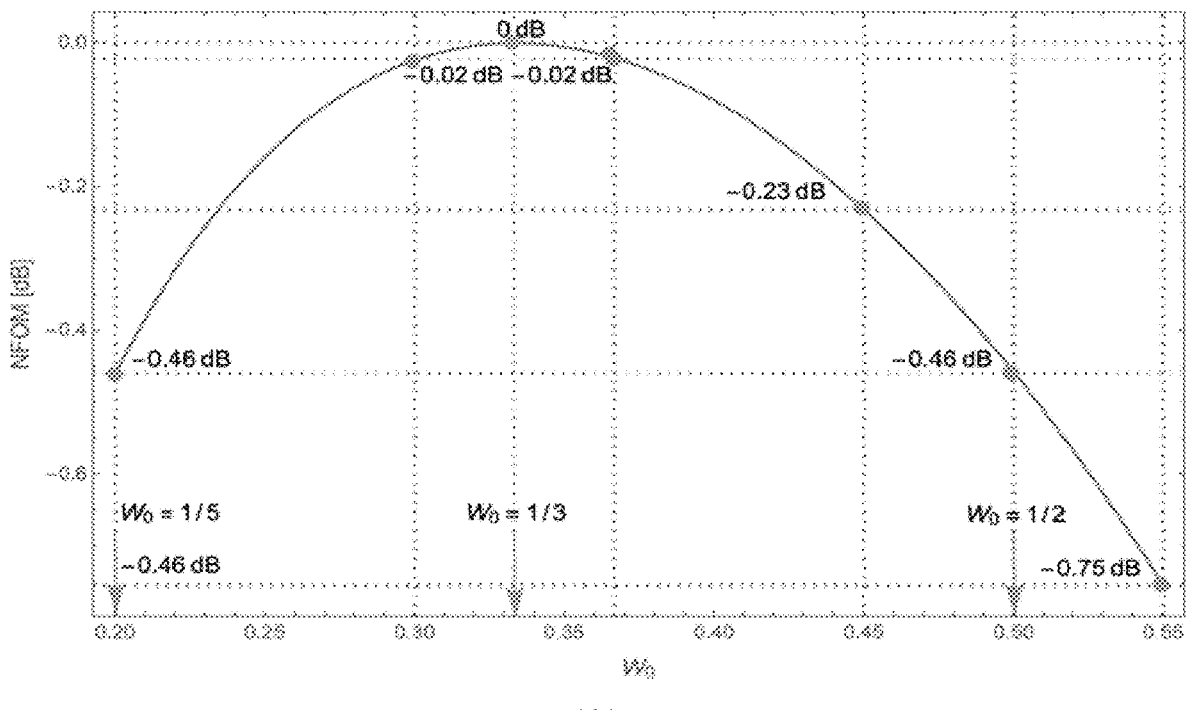
FIG. 10 illustrates an example of normalized collision distances.
Figure 11:
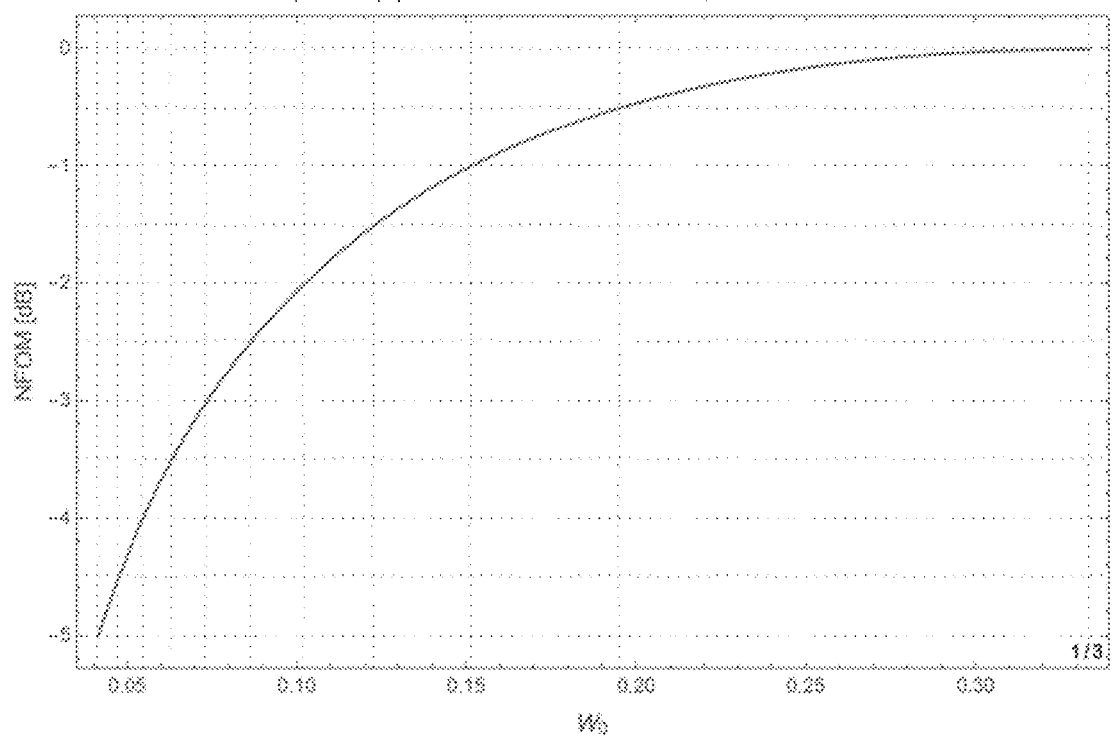
FIG. 11 illustrates an example of normalized collision distances.
Figure 12:
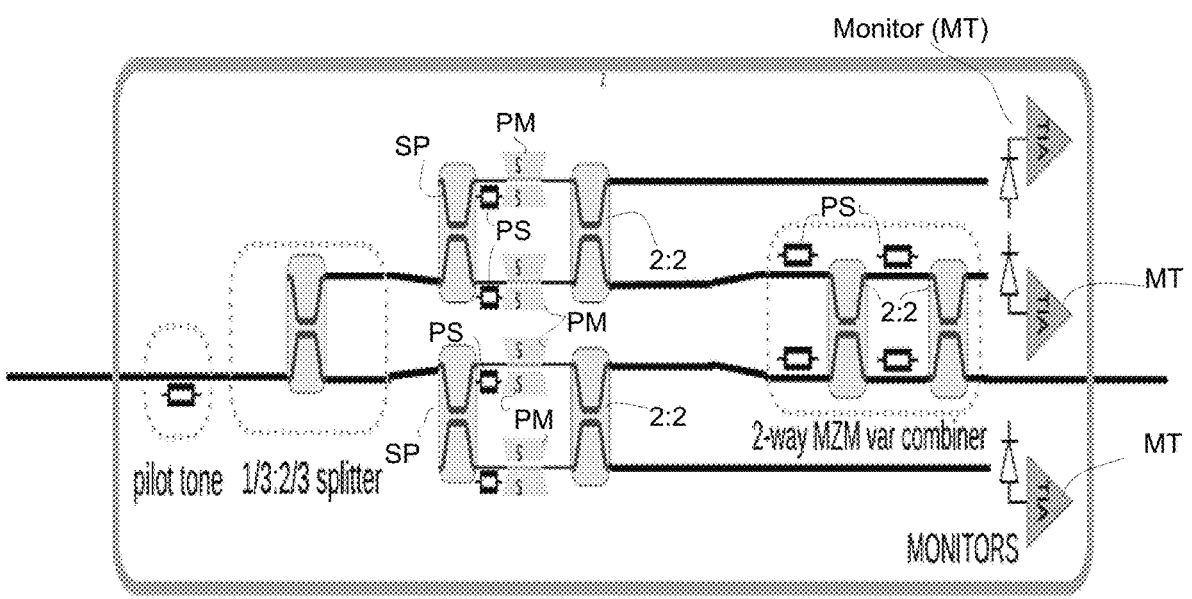
FIG. 12 illustrates an example of a dual-parallel ODAC.
Figure 13:
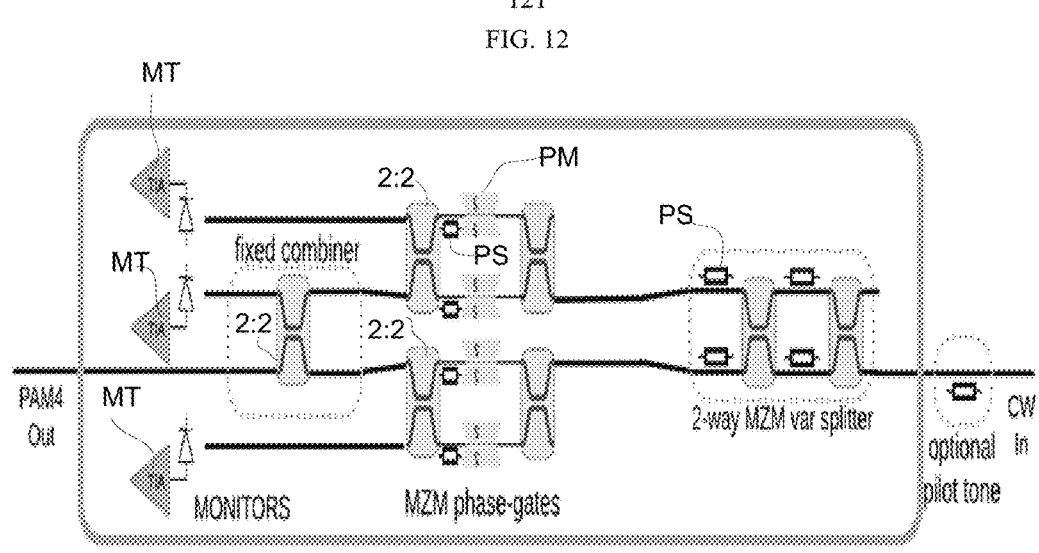
FIG. 13 illustrates an example of a 2-bit COH PAM4 MPMZM oDAC.
Figure 14:
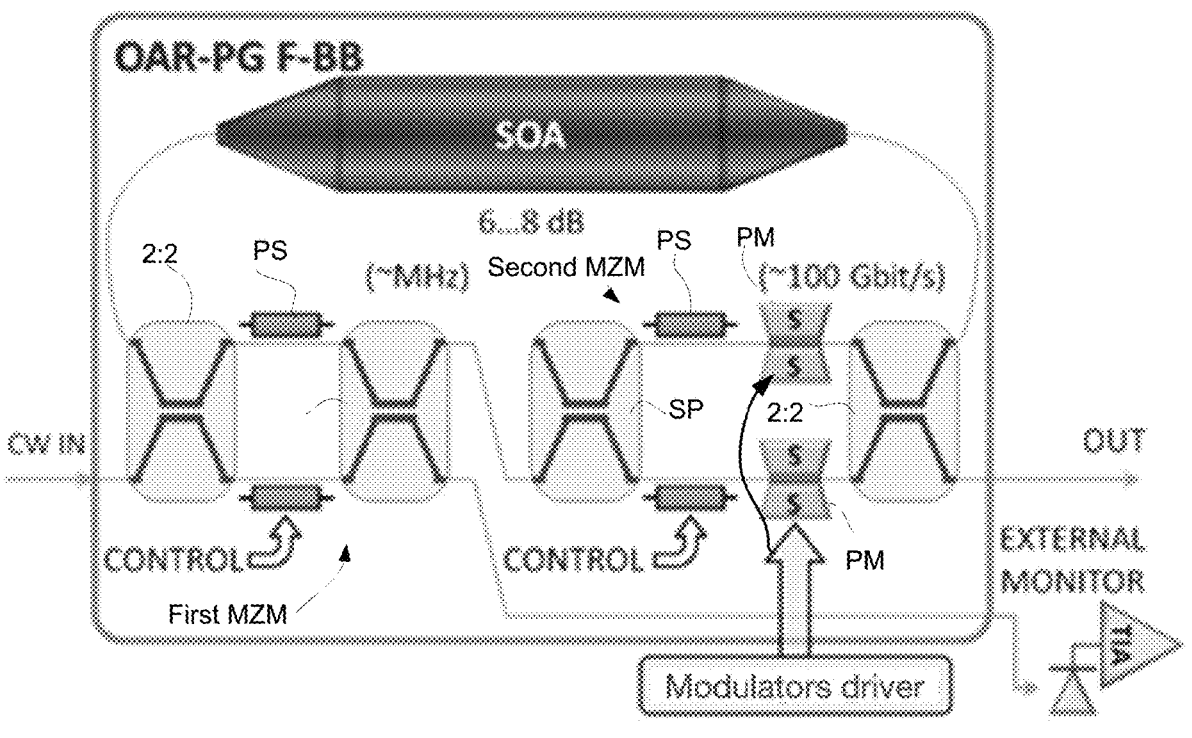
FIG. 14 illustrates an example of an Optically Amplified Recirculating Phase-Gate.
Figure 15:
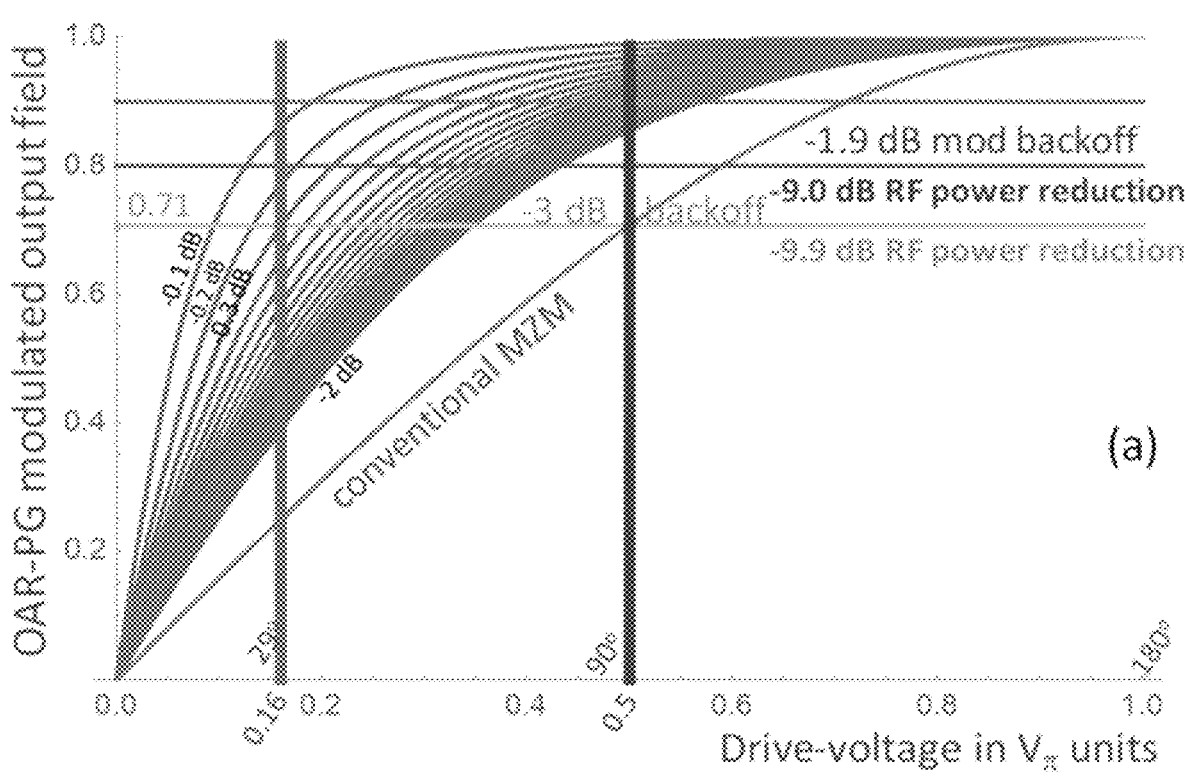
FIG. 15 illustrates an example of a phase gate modulation.
Figure 16:
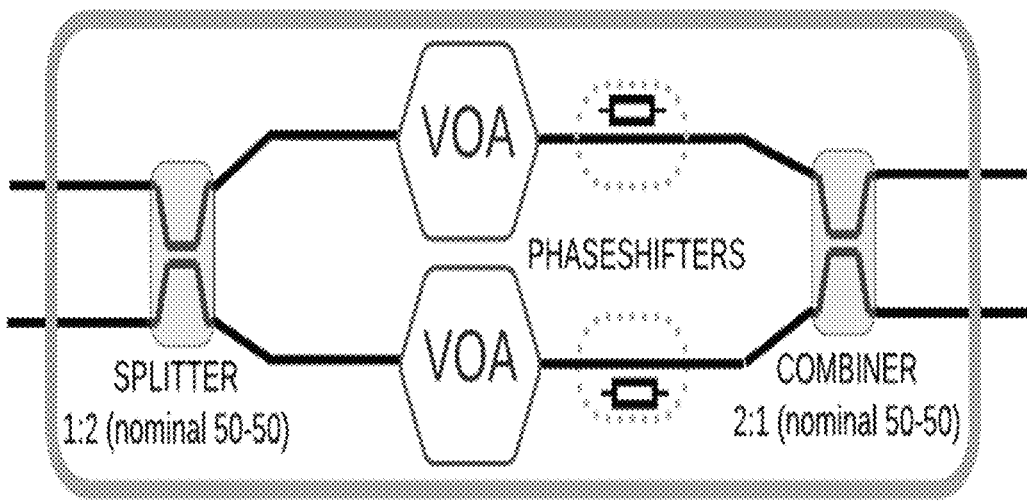
FIG. 16 illustrates an example of a VOA-MZM.
Figure 17:
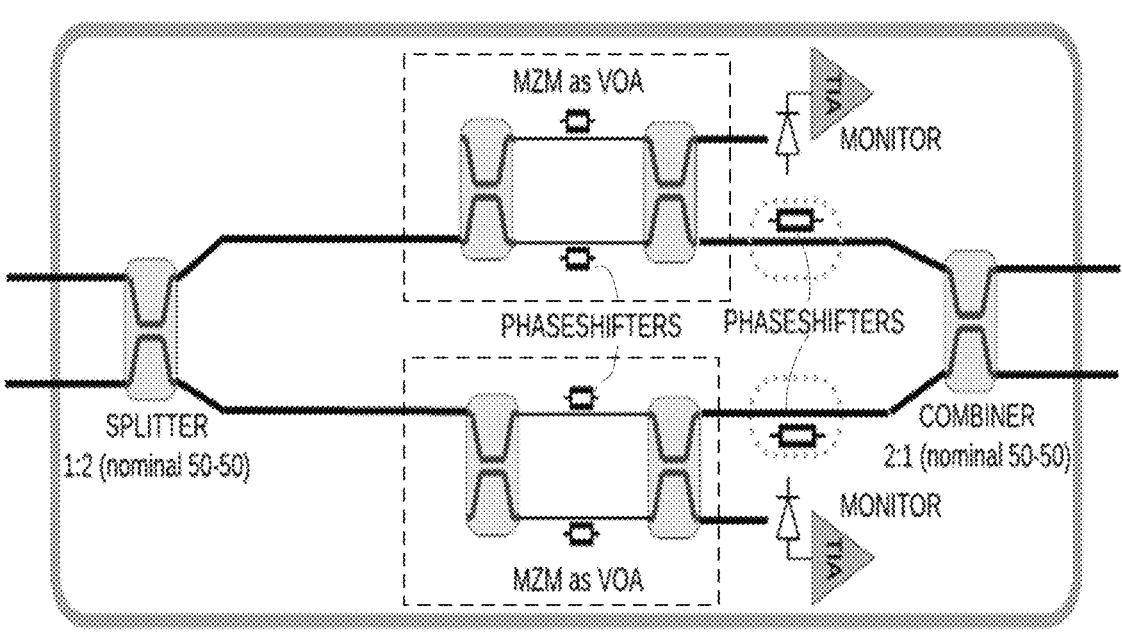
FIG. 17 illustrates an example of a MZM-with-VOA-MZMs.
Figure 18:
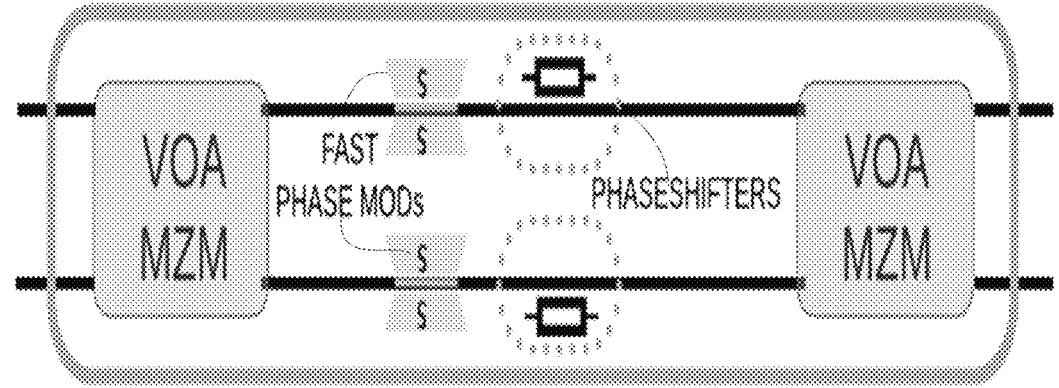
FIG. 18 illustrates an example of a VOA-MZM-based Phase-Gate or intensity gate.
Figure 19:
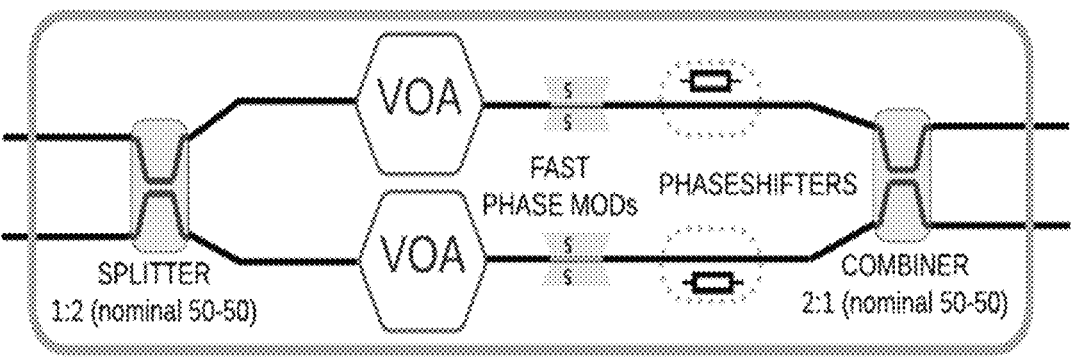
FIG. 19 illustrates an example of a VOA-MZM-based Phase-Gate or intensity gate.
Figure 20A:
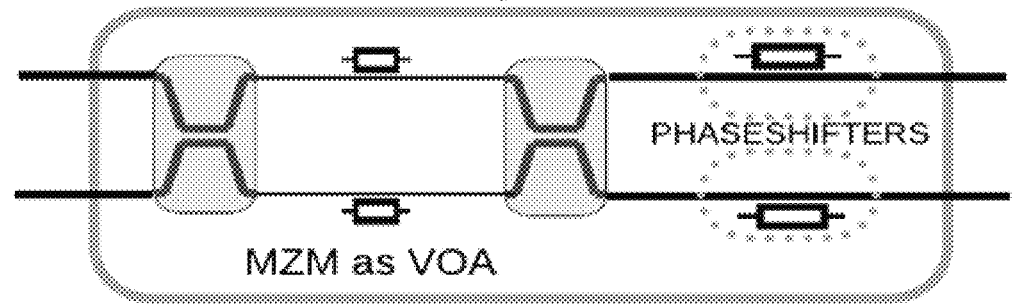
FIG. 20A illustrates an example of a prior art variable 2×2 optical MIMO matrix.
Figure 20B:
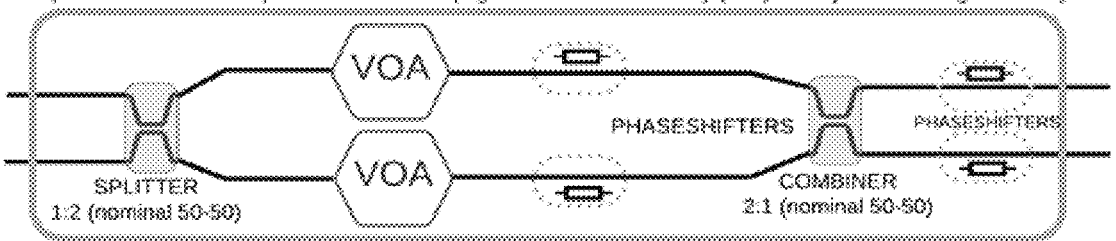
FIG. 20B illustrates an example of an improved variable 2×2 optical MIMO matrix.
Figure 21:
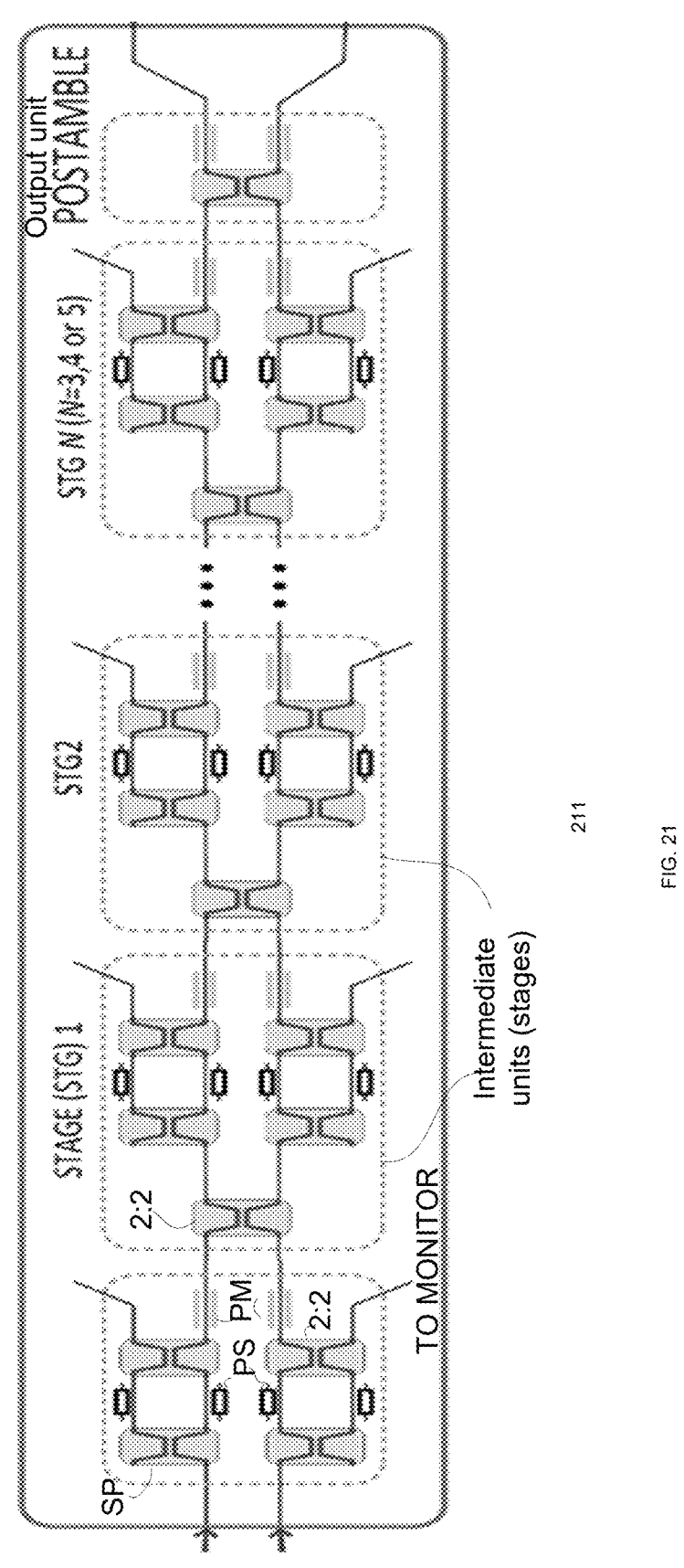
FIG. 21 illustrates an example of an Optical Signal Processor.
Figure 22:
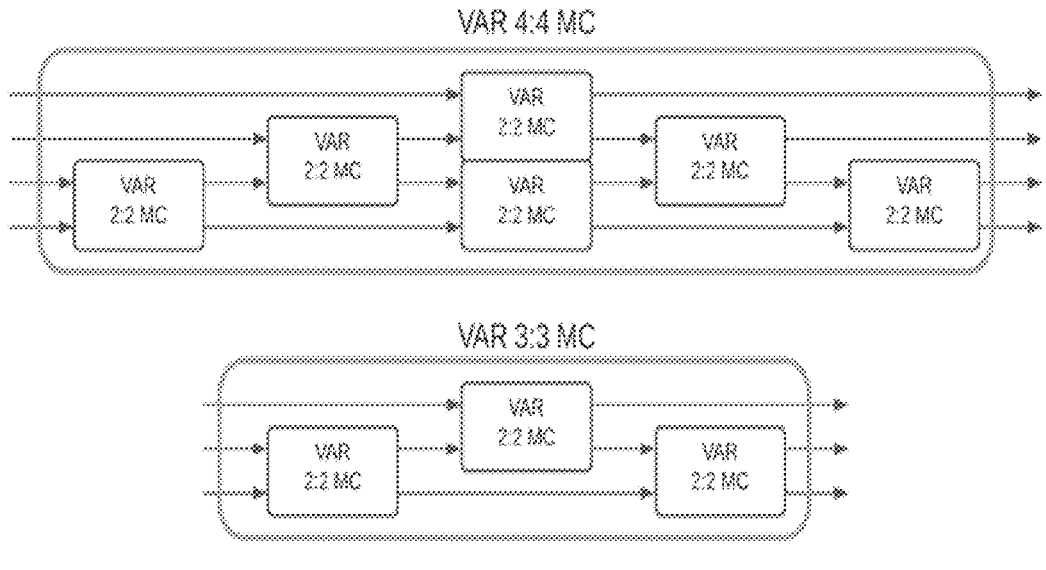
FIG. 22 illustrates an example of 3:3 and 4:4 Mode Converters.
Figure 23:
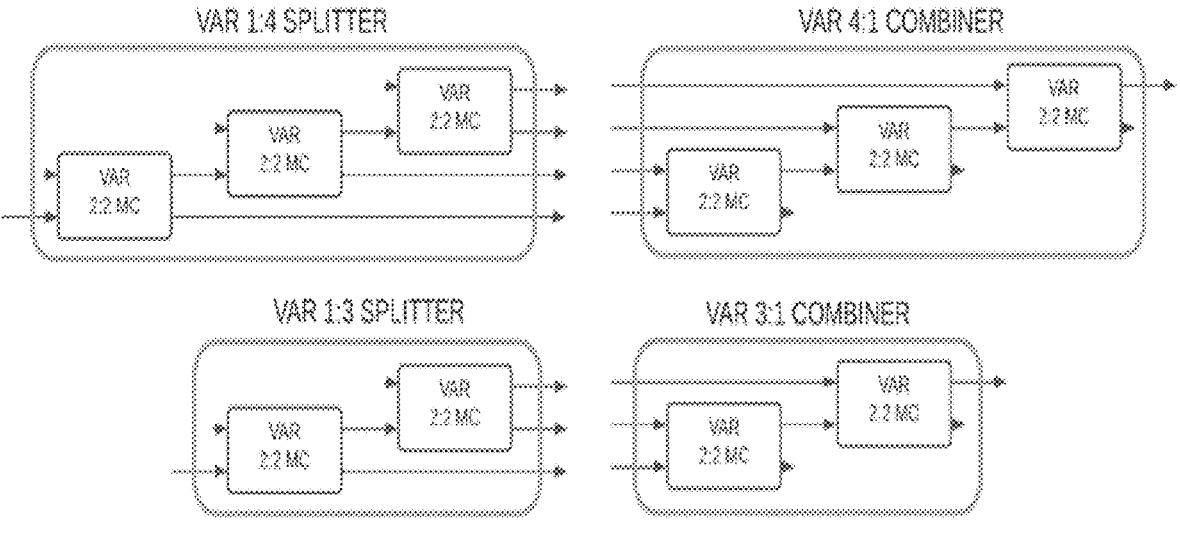
FIG. 23 illustrates an example of variable 1:S splitters and S:1 combiners, for S=4 and S=3.
Figure 24:
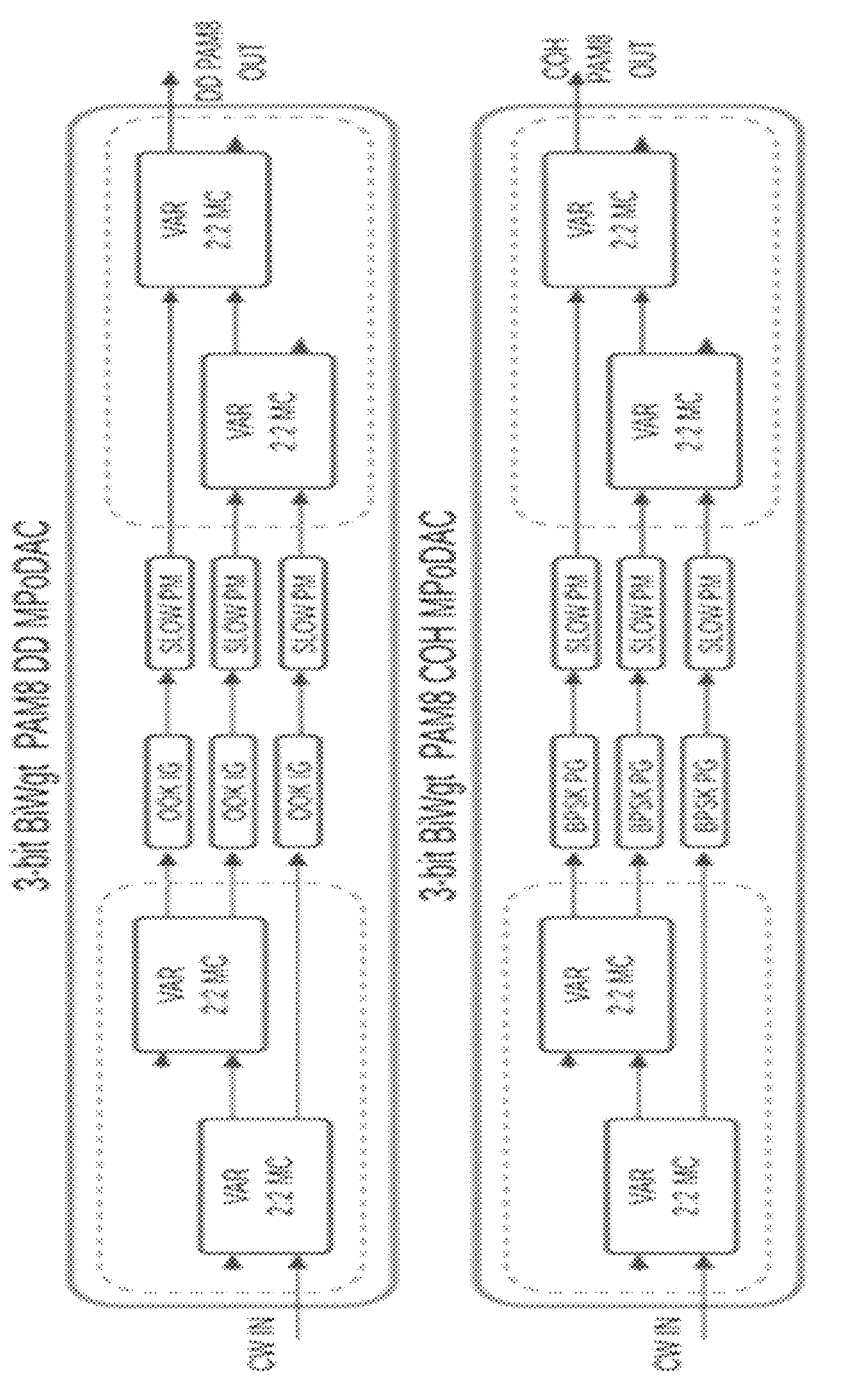
FIG. 24 illustrates an example of 3-bit BiWgt MPoDACs.
Figures 25, 26:
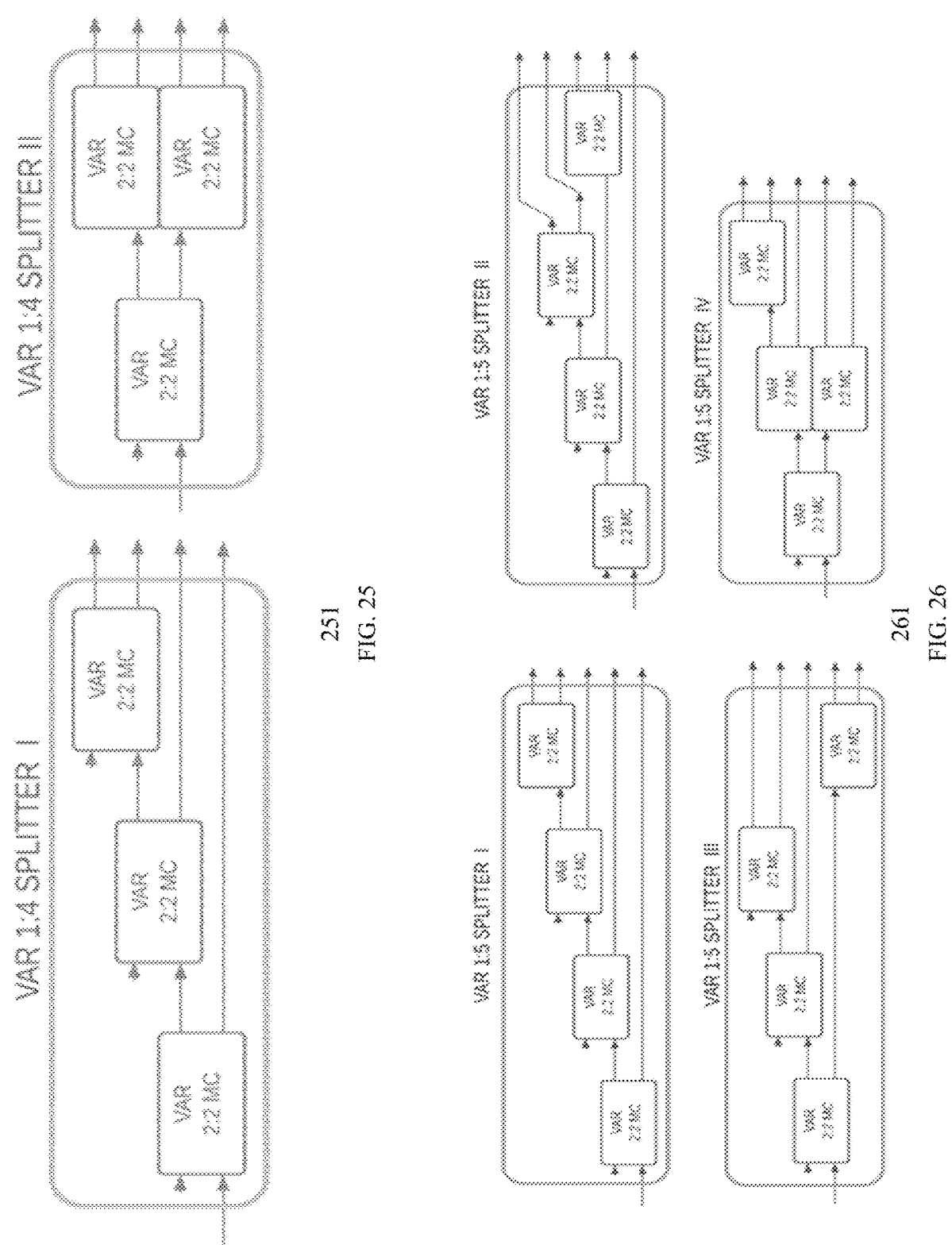
FIG. 25 illustrates an example of VAR 1:4 splitters.
FIG. 26 illustrates an example of VAR 1:5 splitters.
Figures 27A, 27B:
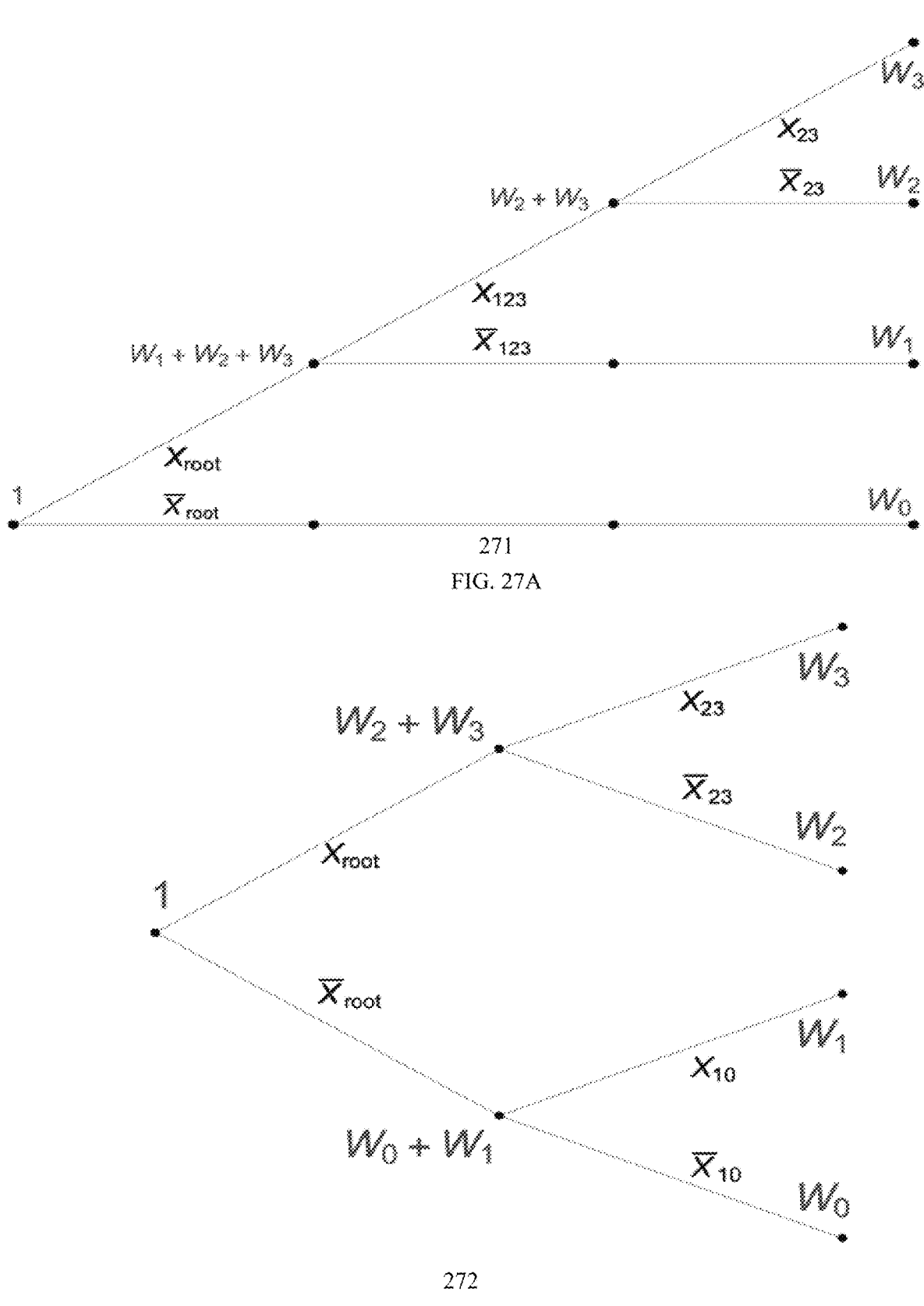
FIGS. 27A and 27B illustrate examples of tree block diagrams of 1:4 splitter embodiments of FIG. 26.
Figure 28:
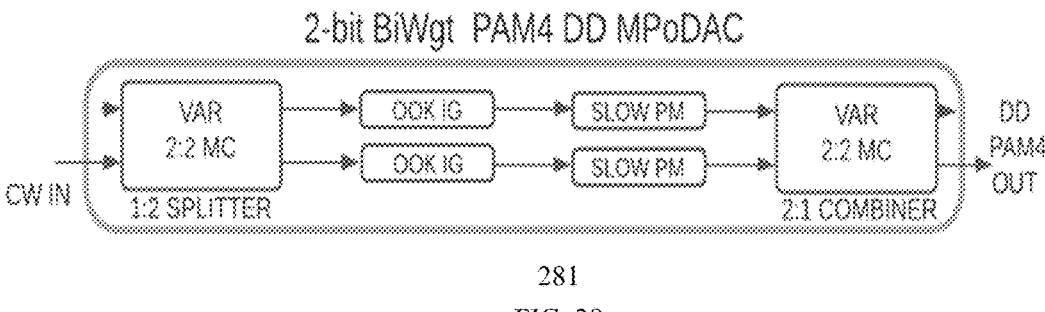
FIG. 28 illustrates an example of a Direct-Detection PAM4 constellation generator.
Figure 29:
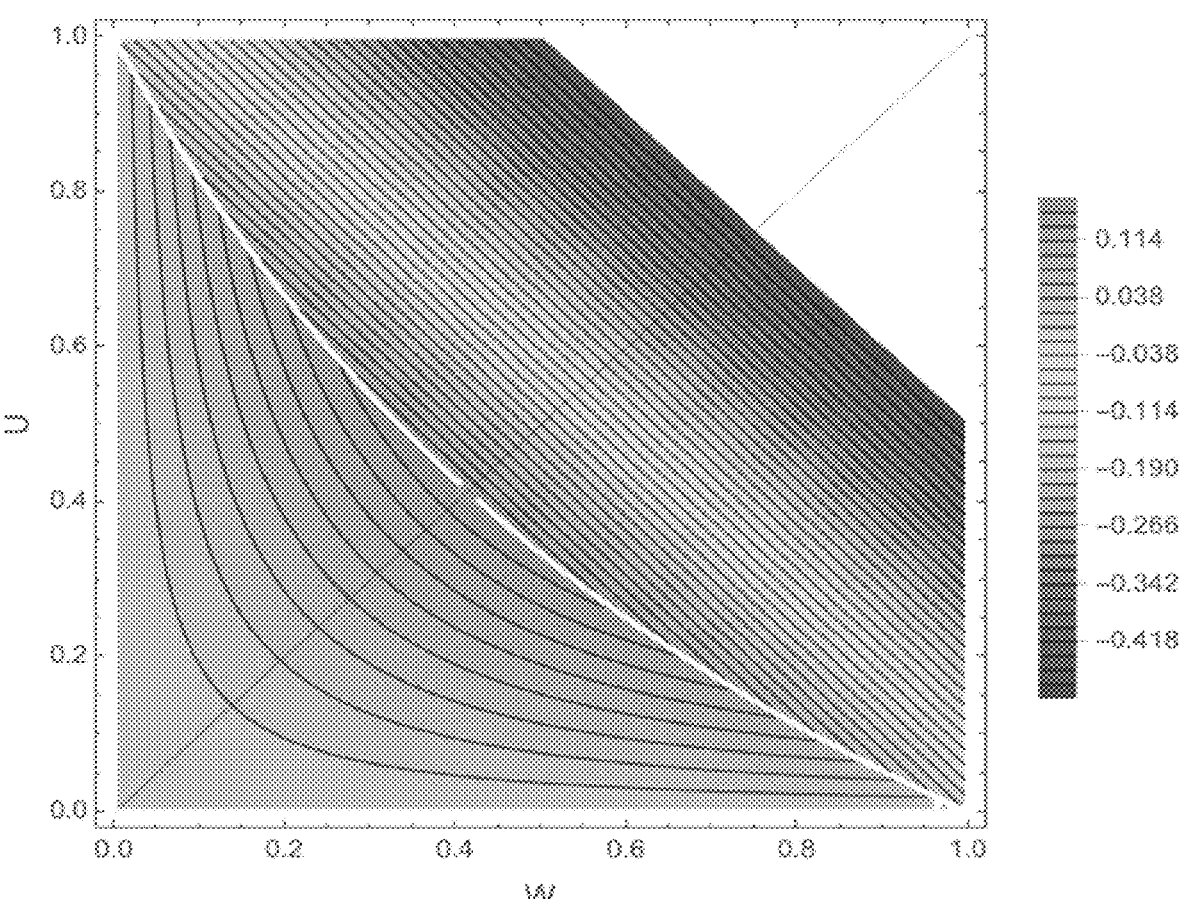
FIG. 29 illustrates an example of a min-distance function.
Figure 30:
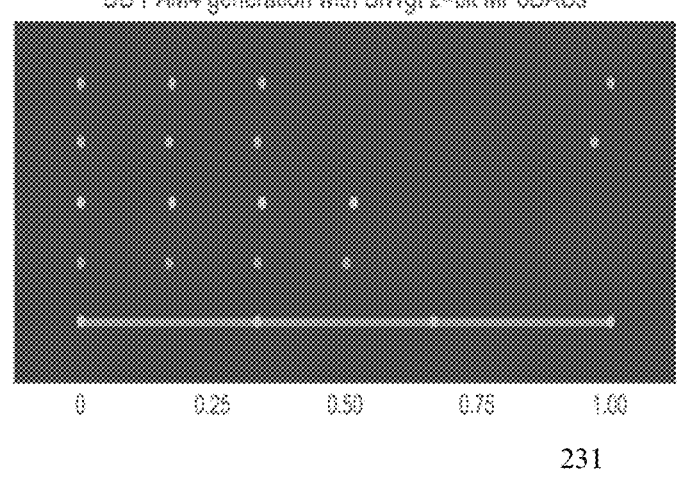
FIG. 30 illustrates an example of BiWgt 2MP PAM4 DD constellations.
Figure 31:
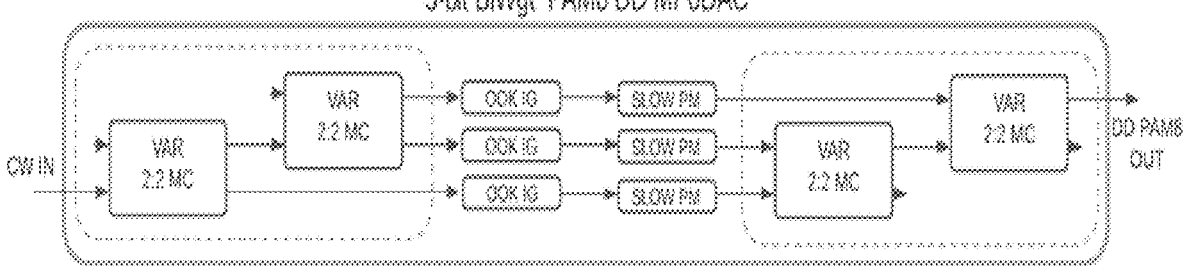
FIG. 31 illustrates an example of a 3-bit BiWgt PAM8 DD MPODAC.

Five local optimizer points $$\left(\hat{\phi}_0^{\#i}, \hat{\phi}_1^{\#i}\right)$$

corresponding to each of five regions (denoted #1, #2, . . . , #5) symbolic-symmetric bubble-sort algorithm iterations which happen to yield non-zero constraint regions, $C_{\#1}, C_{\#2}, C_{\#3}, C_{\#4}, C_{\#4}, C_{\#5s}$ are shown along with the partitioning into regions for 3SE DD SEMZM, in FIGS. 4A and 4B. FIG. 5A illustrates an example of a graph 51 of a min distance function. FIG. 5B illustrates an example of a graph 52 of min distance function. FIGS. 5A and 5b illustrates 3SE DD SEMZM maximin distance solutions.(left): 3SE DD SEMZM maximin distance solutions (a recap of FIGS. 4A and 4B, for comparison). FIG. 5A—3SE COH SEMZM Maximin solutions are seen to occur at the same phases. However, inspection of the two scales of the contour plot levels indicate that the local maximins distances (and the global maximin) of the COH case are double those of the DD case. FIG. 6 illustrates PAM8 DD and COH constellations—comparison of design options. The excessive non-uniform crowding of the naïve 4:2:1 segment designs is apparent. Note the geometrical similarity of the DD and COH designs which are on different full-scales. FIG. 6 includes a graph 61 of said constellations. FIG. 7A illustrates an example of a S-way MPoDAC 71. FIG. 7B illustrates an example of a MPoDAC based 3-way ODAC 72. FIG. 7C illustrates an example of a 2-way MPoDAC 73. FIG. 8A illustrates an example of a 2-bit BiWgt PAM4 COH MPo-DAC 81. FIG. 8B illustrates an example of MPMZM based 2 bit ODAC 82. FIG. 9 illustrates examples of graphs 91, 92 and 93 of a min distance function. FIG. 10 illustrates an example of a graph 101 of normalized constellation distances. FIG. 11 illustrates an example of a graph 111 of normalized constellation distances. FIG. 12 illustrates an example of a dual-parallel ODAC 121. FIG. 13 illustrates an example of a 2-bit COH PAM4 MPMZM oDAC 131. FIG. 14 illustrates an example of an Optically Amplified Recirculating Phase-Gate 143. FIG. 15 illustrates an example of Phase gate modulation operating characteristics 151. FIG. 15 illustrates phase gate modulation operating characteristics of conventional MZM vs. OAR-PG (family of curves). When both types of PG modulators are set to −3 dB modulation backoff mode, the RF drive power is reduced by 9.9 dB and our OAR-PG has its drive voltage reduced by a factor of ~3 (from 0.5 down to 0.16 voltage normalized units). FIG. 16 illustrates an example of a VOA-MZM 161. FIG. 17 illustrates an example of a MZM-with-VOA-MZMs 162. FIG. 18 illustrates an example of a VOA-MZM-based Phase-Gate or intensity gate 181. FIG. 19 illustrates an example of a VOA-MZM-based Phase-Gate or intensity gate 191. FIG. 20A illustrates an example of a prior art variable 2×2 optical MIMO matrix 201. FIG. 20B illustrates an example of an improved variable 2×2 optical MIMO matrix 202. FIG. 21 illustrates an example of an Optical Signal Processor 221. FIG. 22 illustrates an example of 3:3 and 4:4 Mode Converters collectively denoted 221. FIG. 23 illustrates an example of variable 1:S splitters and S:1 combiners, for S=4 and S=3 collectively denoted 231. FIG. 24 illustrates an example of 3-bit BiWgt MPoDACs collectively denoted 243. FIG. 25 illustrates an example of VAR 1:4 splitters collectively denoted 251. FIG. 26 illustrates an example of VAR 1:5 splitters collectively denoted 261. FIGS. 27A and 27B illustrate examples of tree block diagrams 271 and 272 of 1:4 splitter embodiments of FIG. 26. FIG. 28 illustrates an example of a Direct-Detection PAM4 constellation generator 281. FIG. 29 illustrates an example of a graph 291 of min-distance function—it shows a W-U plane plot of the min-distance function. Following the contour lines, the min-distance is maximized at the bright point marked on the 45° diagonal. This indicates that the optimum realizing Wand U parameters, must be equal, i.e., it is the 'matched-splitter-combiner' taps that is optimal. FIG. 30 illustrates an example of a graph 301 of BiWgt 2MP PAM4 DD constellations. FIG. 31 illustrates an example of a 3-bit BiWgt PAM8 DD MPODAC 311.

Figure 32:
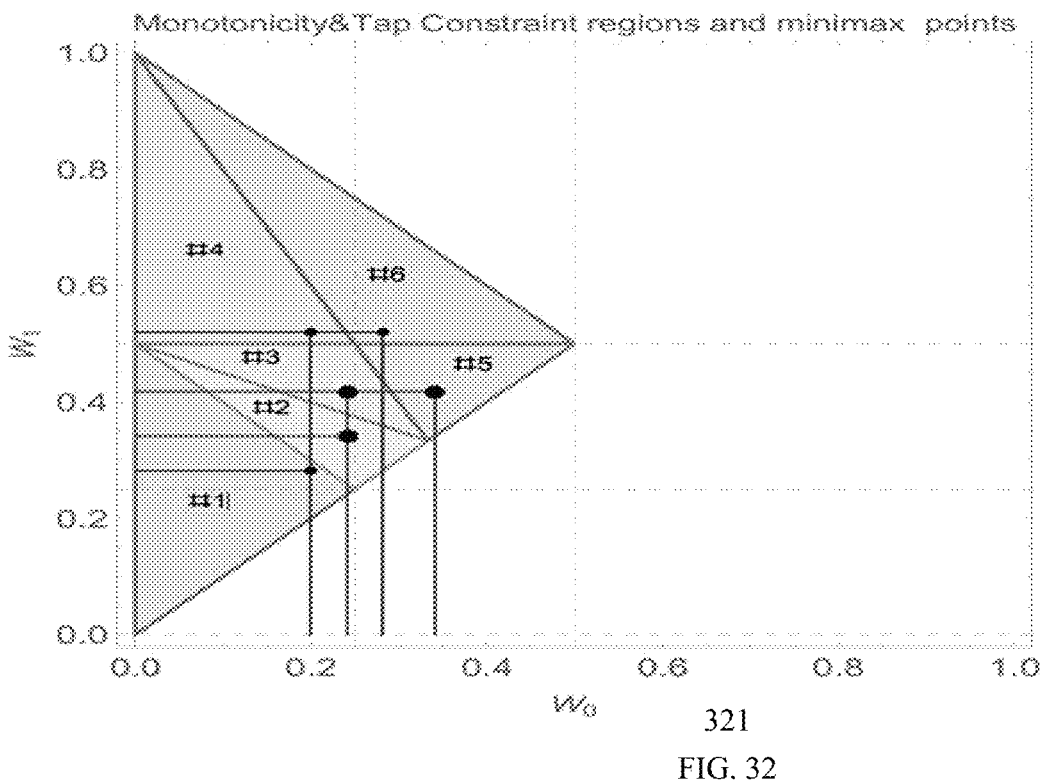
FIG. 32 illustrates an example of an angular constraint regions and maximin points.

FIG. 32 illustrates an example of a graph 321 of angular constraint regions and maximin points—especially 3SE DD local solutions and the global one. The six (triangular) constraint regions, each with a locally-optimal solution point therein. Note that the values of the per-region local at the 6 locally-optimal points are all either h in regions #1, #4, #6 or H in regions #2, #3, #5. (right): Contour plot of the value of the min-distance of the constellation (prior to applying the outer Max[ ]), as a function of W0, W1 over regions #1, #2. The contour plot verifies the validity of the locally-optimal solutions in regions #1, #2. Similar plots may be made for the other regions.

Figure 33:
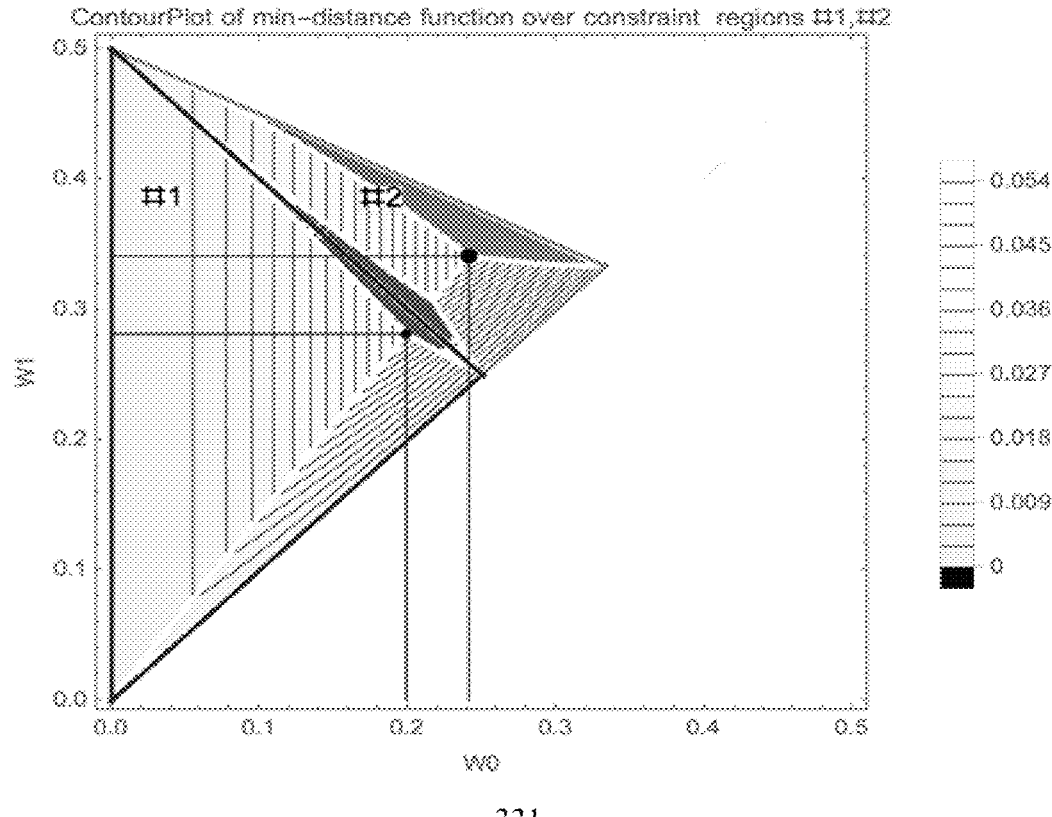
FIG. 33 illustrates an example of an angular constraint regions and maximin points.
Figure 34A:
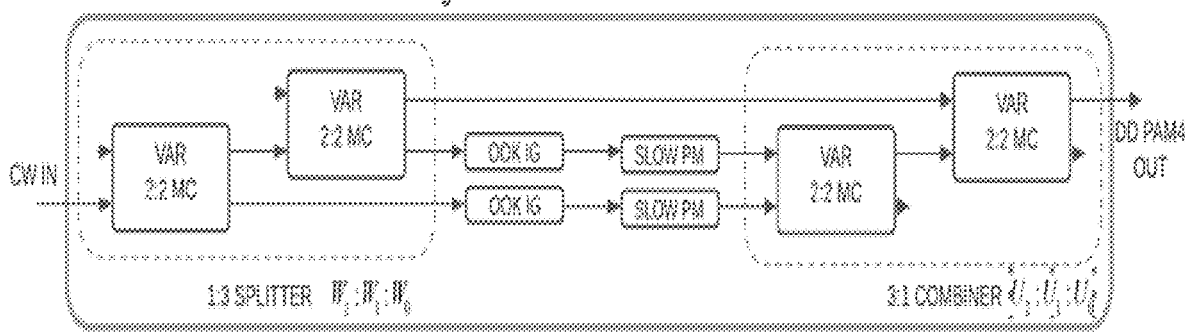
FIG. 34A illustrates an example of a DD-PAM4-3MP-embedded ODAC.
Figure 34B:
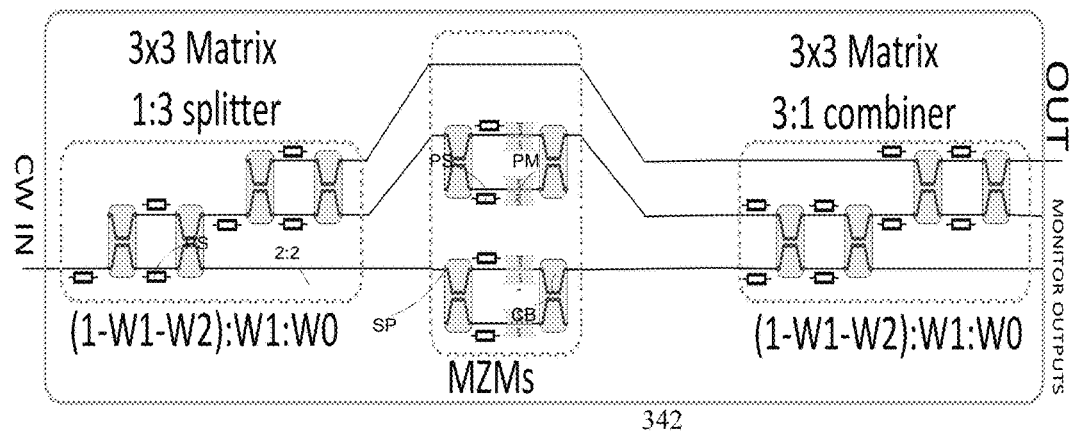
FIG. 34B illustrates an example of a DD-PAM4-3MP-embedded ODAC.
Figure 35:
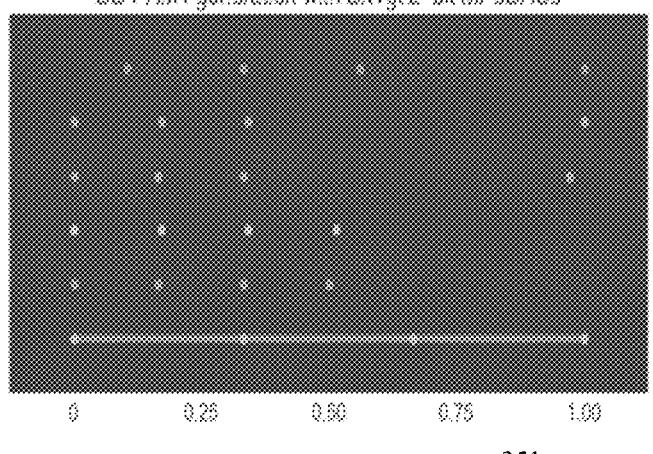
FIG. 35 illustrates an example of BiWgt 2MP PAM4 DD constellations.
Figures 36, 37:
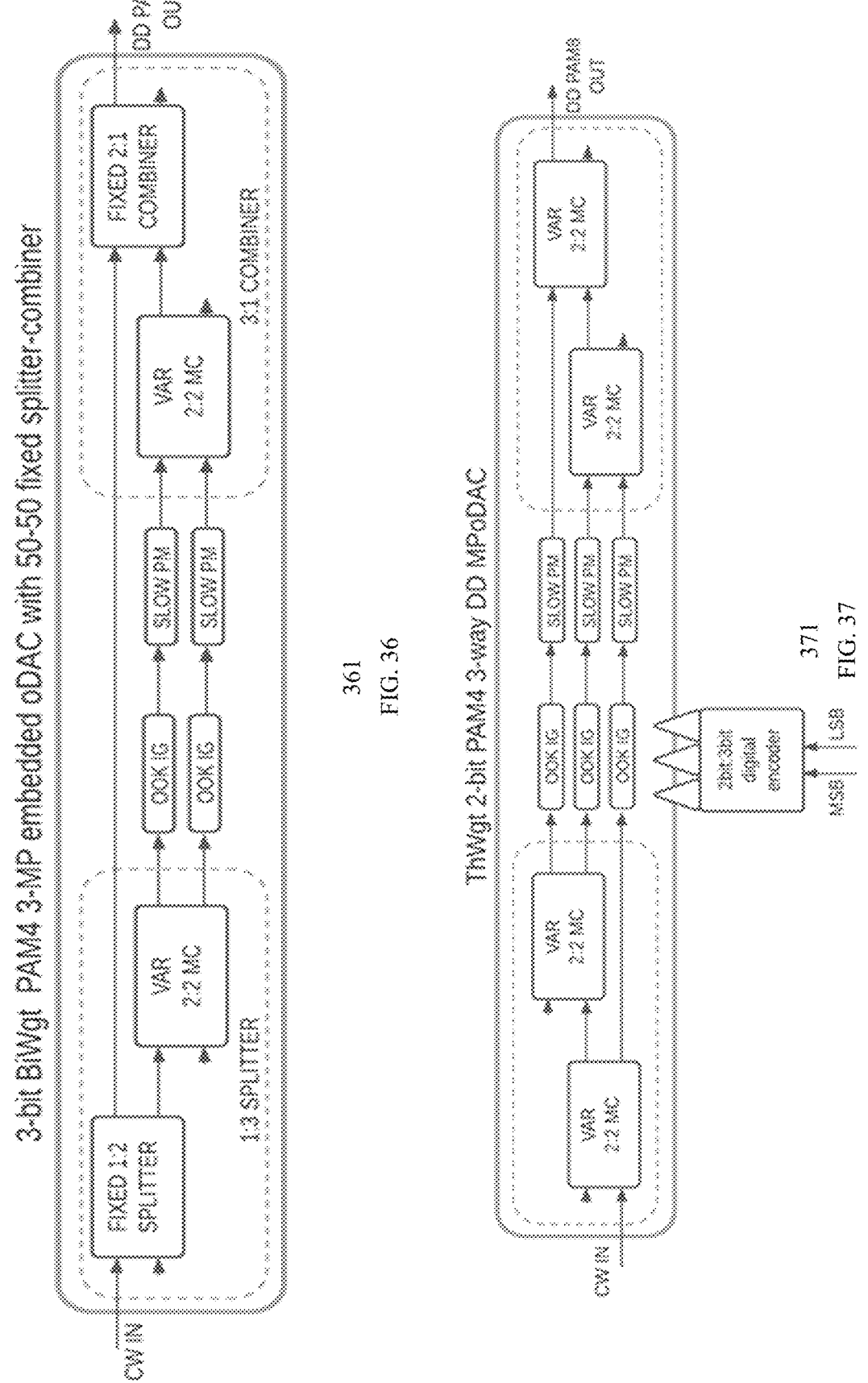
FIG. 36 illustrates an example of a PAM4-DD 3MP.
FIG. 37 illustrates an example of a ThWgt 2-bit PAM4 DD 3-way MPoDAC.
Figure 38A:
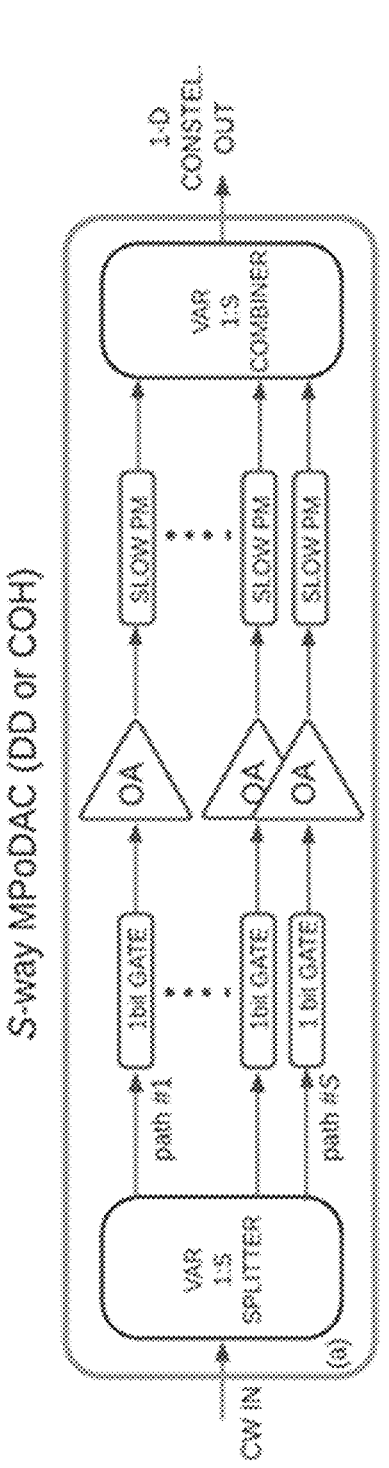
FIG. 38A illustrates an example of a S-way Multi-Parallel-MPoDAC.
Figure 38B:
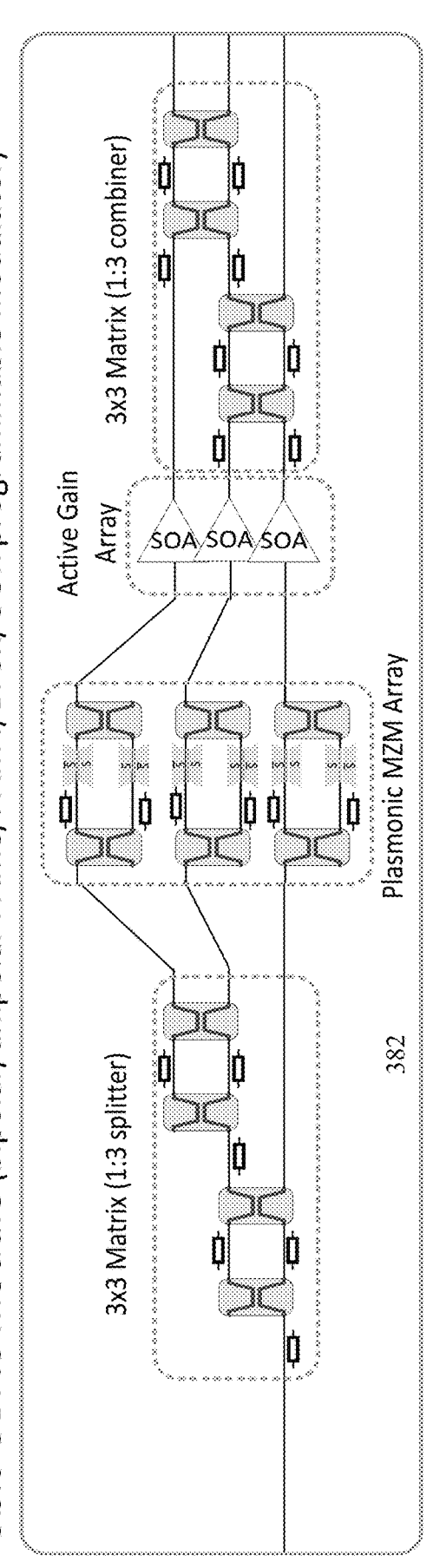
FIG. 38B illustrates an example of a 3-bit ODAC module.
Figure 39:
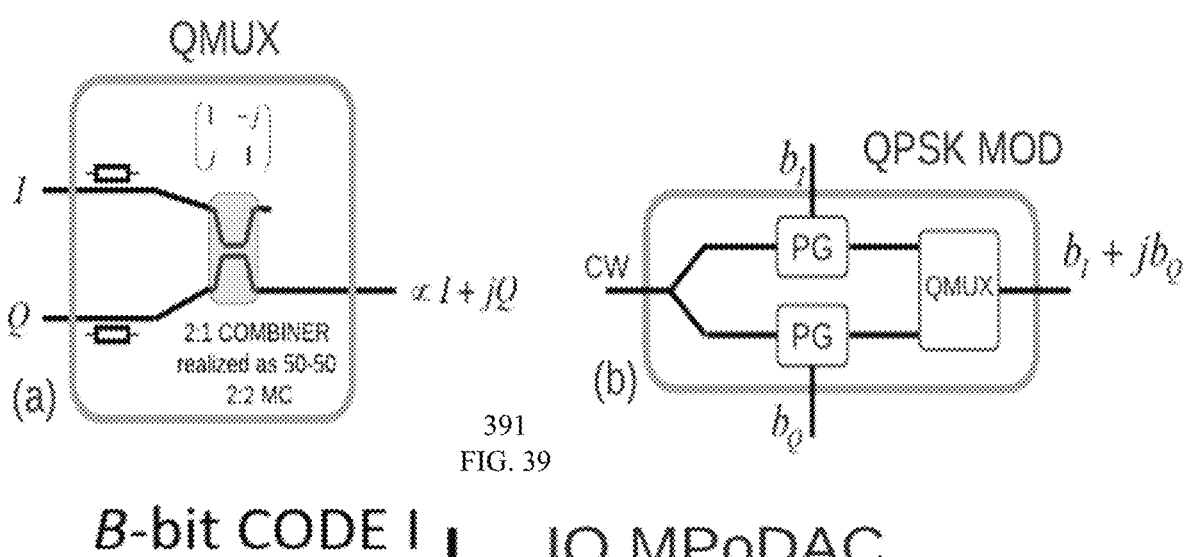
FIG. 39 illustrates examples of Quadrature Multiplexers.
Figure 40A:
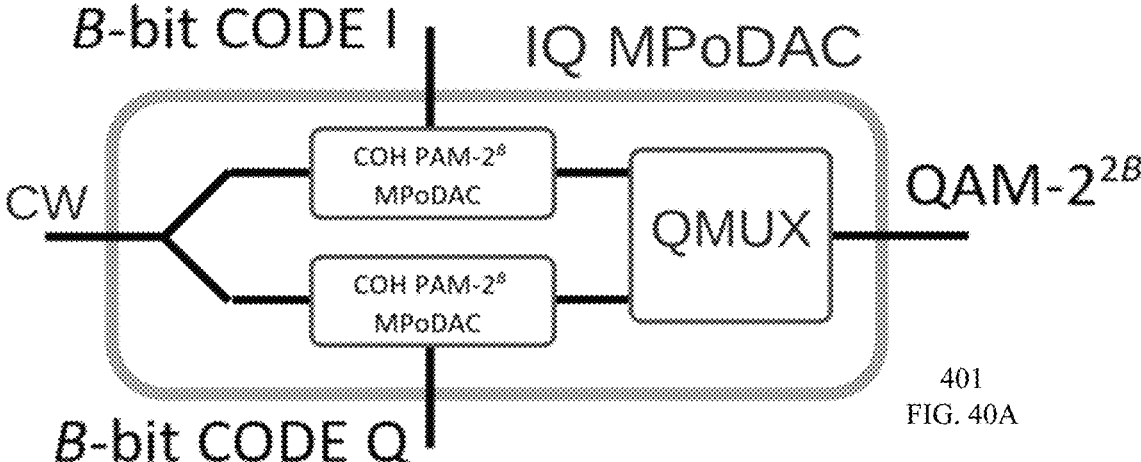
FIG. 40A illustrates an example of a IQ-MPoDAC QAM-$2^{2B}$ generator.
Figure 40B:
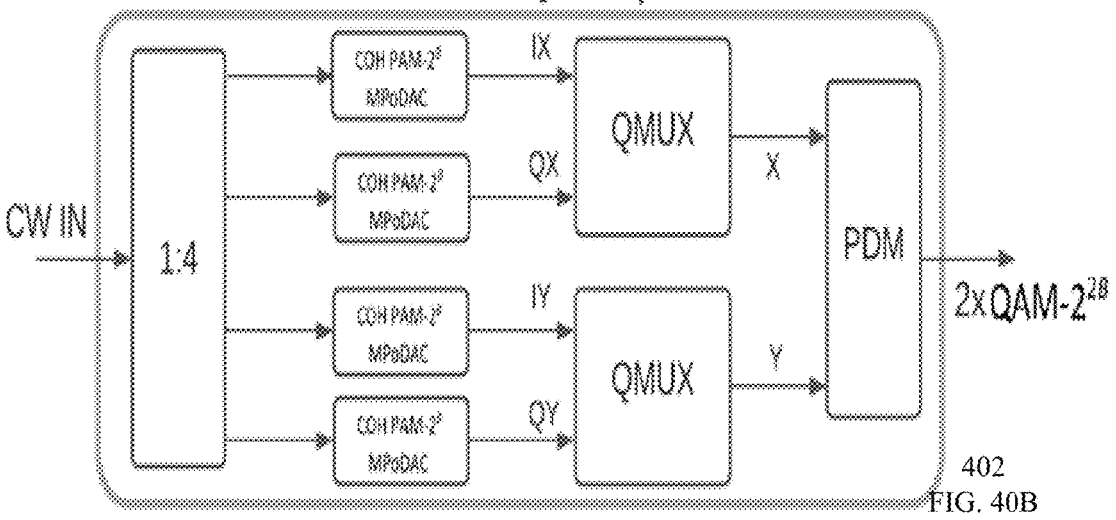
FIG. 40B illustrates an example of a PDM 2×QAM-$2^{2B}$ optical transmitter.
Figure 40C:
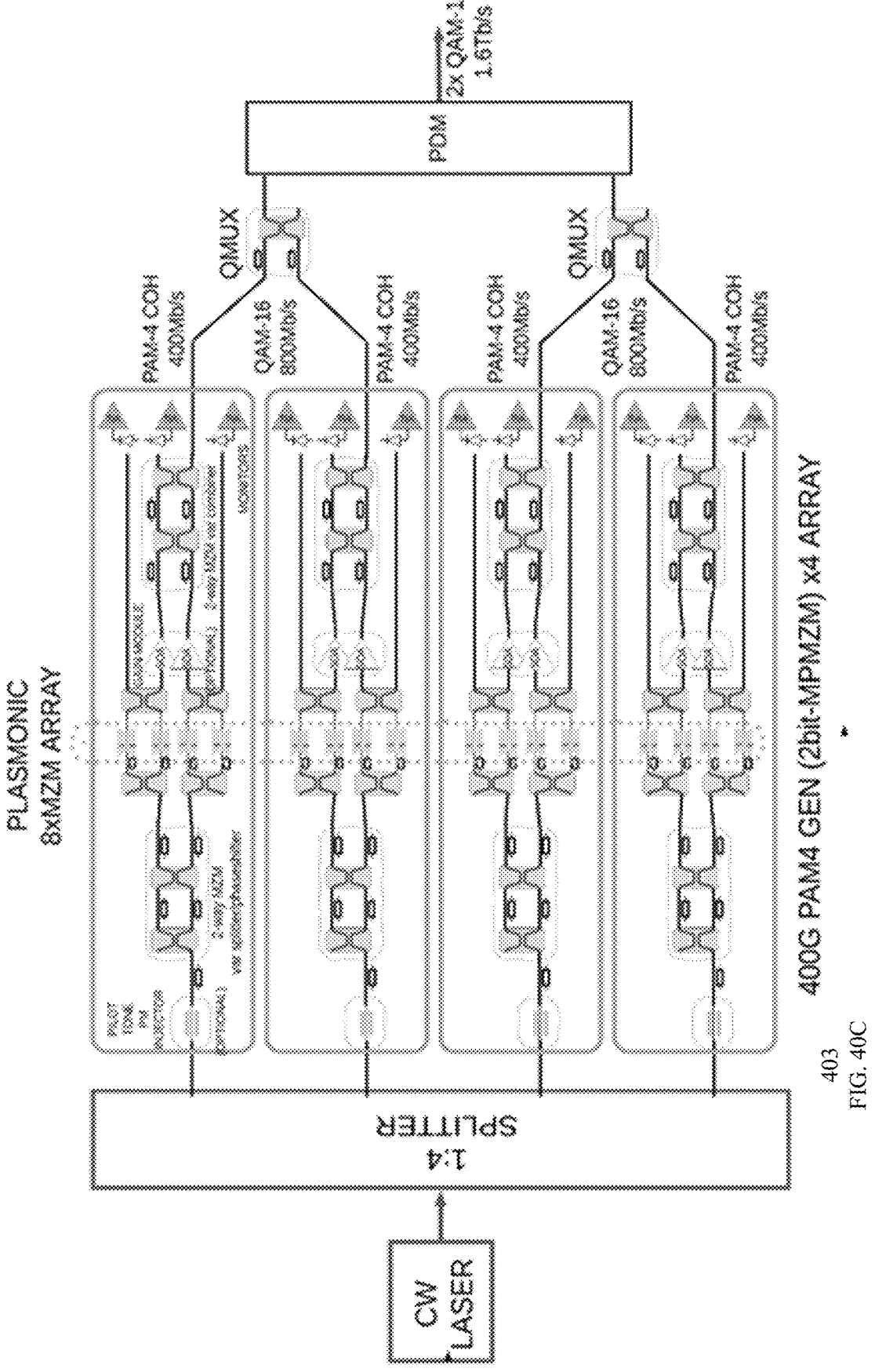
FIG. 40C illustrates an example of a PDM 2×QAM-$2^{2B}$ optical transmitter.
Figure 40D:
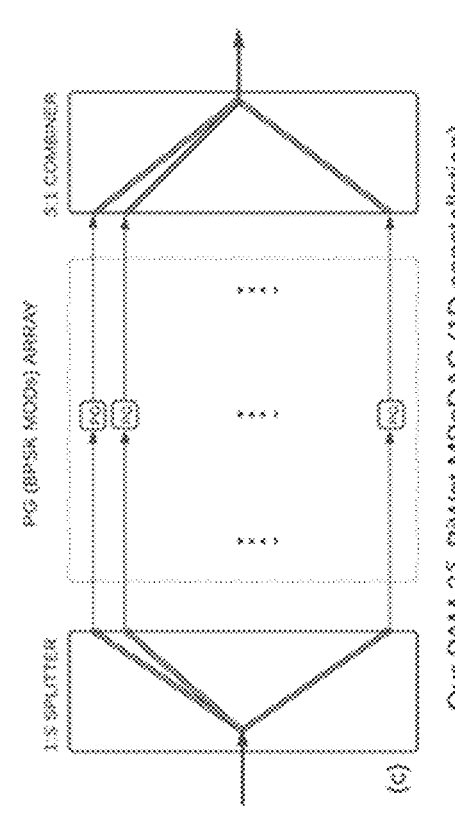
FIG. 40D illustrates an example of modulators.
Figure 41:
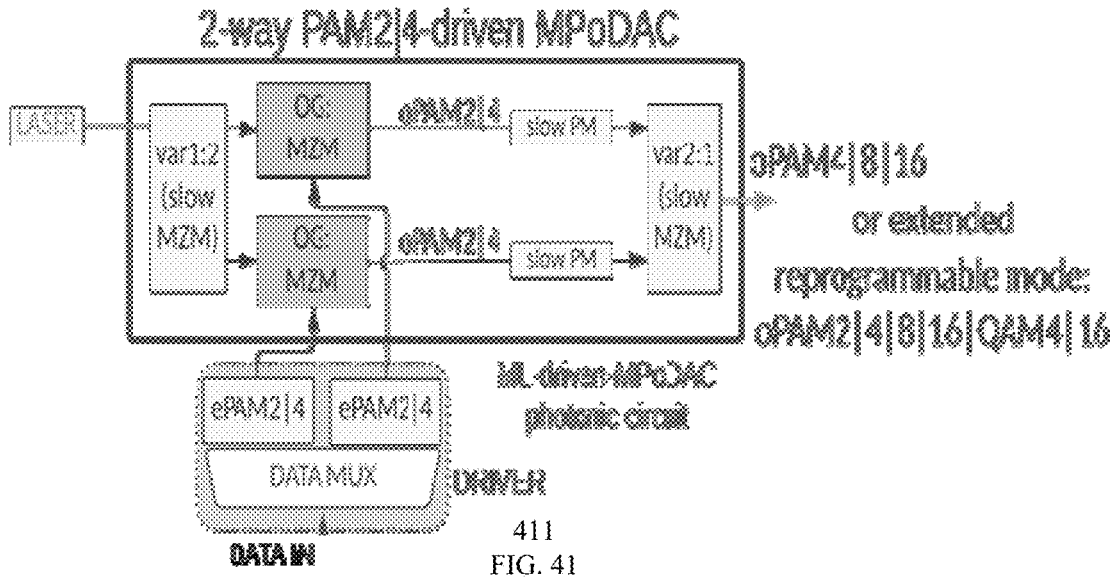
FIG. 41 illustrates an example of a two-wat PAM2|4ML driven reprogrammable MPoDAC.
Figure 42:
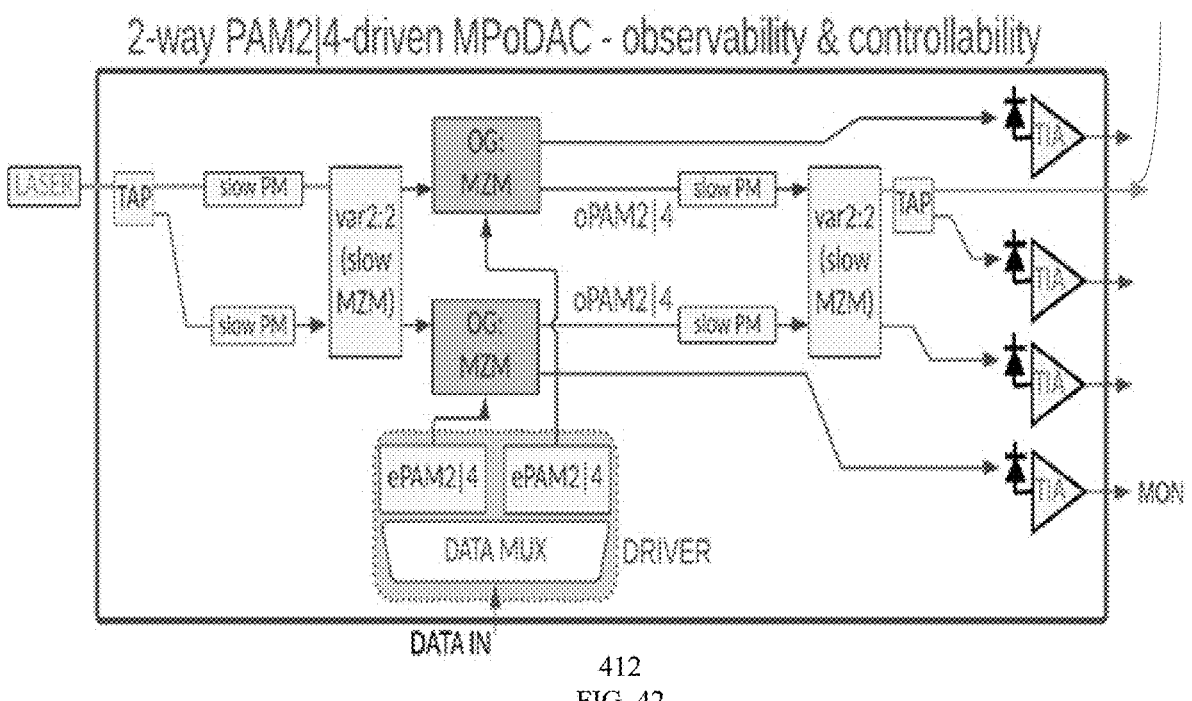
FIG. 42 illustrates an example of Optical monitors and slow phase actuators for the control plane of the MPoDAC of FIG. 43.
Figure 43:
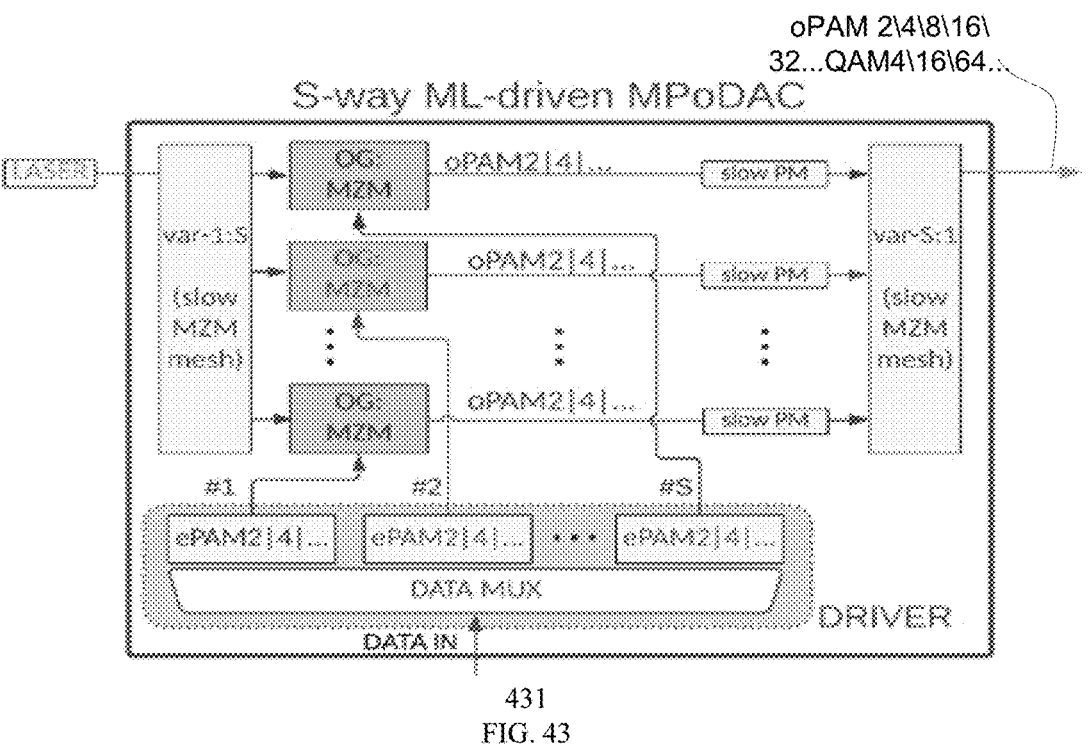
FIG. 43 illustrates an example of a Generic S-way reprogrammable ML-driven MPoDAC.
Figure 44:
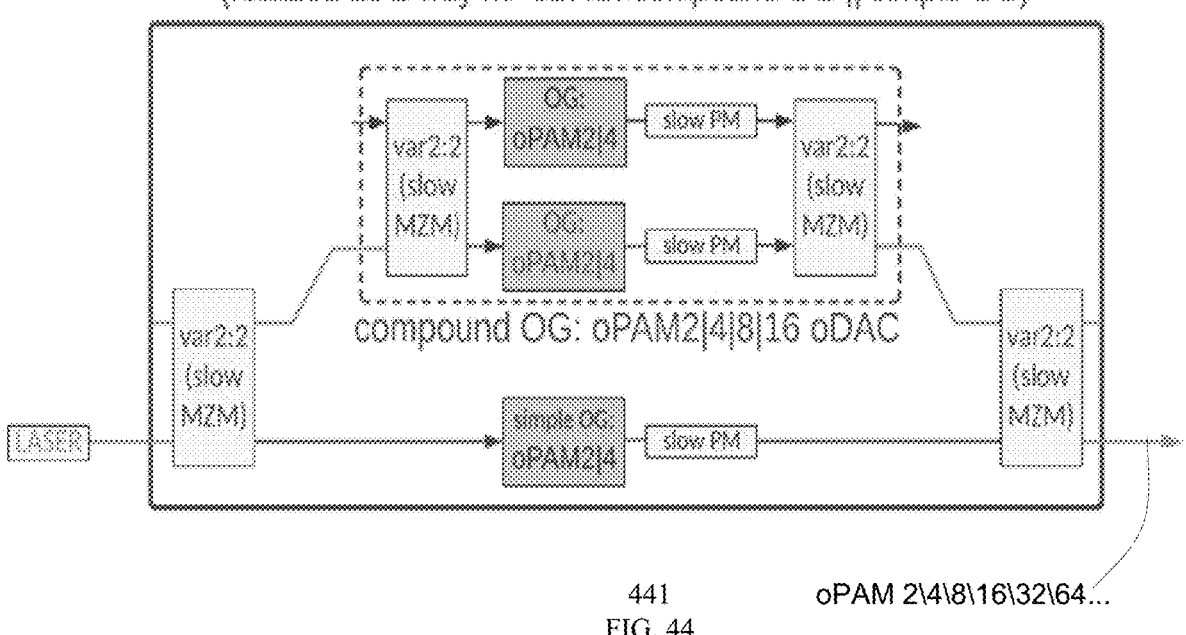
FIG. 44 illustrates an example of a 3-way realization of FIG. 43.
Figure 47:
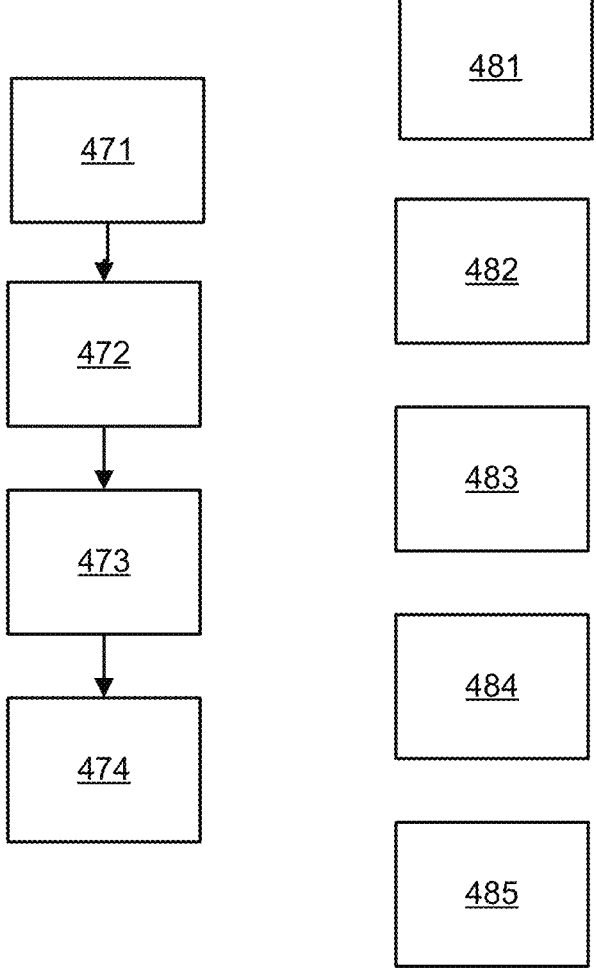
FIG. 47 illustrates an example of a method.

FIG. 33 illustrates an example of a graph 331 of angular constraint regions and maximin points. FIG. 34A illustrates an example of a DD-PAM4-3MP-embedded ODAC 343. FIG. 34B illustrates an example of a DD-PAM4-3MP-embedded ODAC 342. FIG. 35 illustrates an example of a graph 351 of BiWgt 2MP PAM4 DD constellations. FIG. 36 illustrates an example of a PAM4-DD 3MP 361. FIG. 37 illustrates an example of a ThWgt 2-bit PAM4 DD 3-way MPoDAC 371. FIG. 38A illustrates an example of a S-way Multi-Parallel-MPoDAC 381. FIG. 38B illustrates an example of a 3-bit ODAC module 382. FIG. 39 illustrates examples of Quadrature Multiplexers collectively denoted 391. FIG. 40A illustrates an example of a IQ-MPoDAC QAM-$2^{2B}$ generator 401. FIG. 40B illustrates an example of a PDM 2×QAM-$2^{2B}$ optical transmitter 402. FIG. 40C illustrates an example of a PDM 2×QAM-$2^{2B}$ optical transmitter 403. FIG. 40D illustrates an example of modulators 404. FIG. 43 illustrates an example of a 2-way PAM2|4 ML-driven reprogrammable MPoDAC 431. FIG. 42 illustrates an example of a Optical monitors 421 and slow phase actuators for the control plane of the MPoDAC of FIG. 43. FIG. 43 illustrates an example of a Generic S-way reprogrammable ML-driven MPoDAC 431. FIG. 44 illustrates an example of a 3-way realization 443 of FIG. 43. FIG. 45 includes an example of a table 451. FIG. 46 includes an example of matrices 461. FIG. 47 illustrates an example of a method 470.

Figure 48:
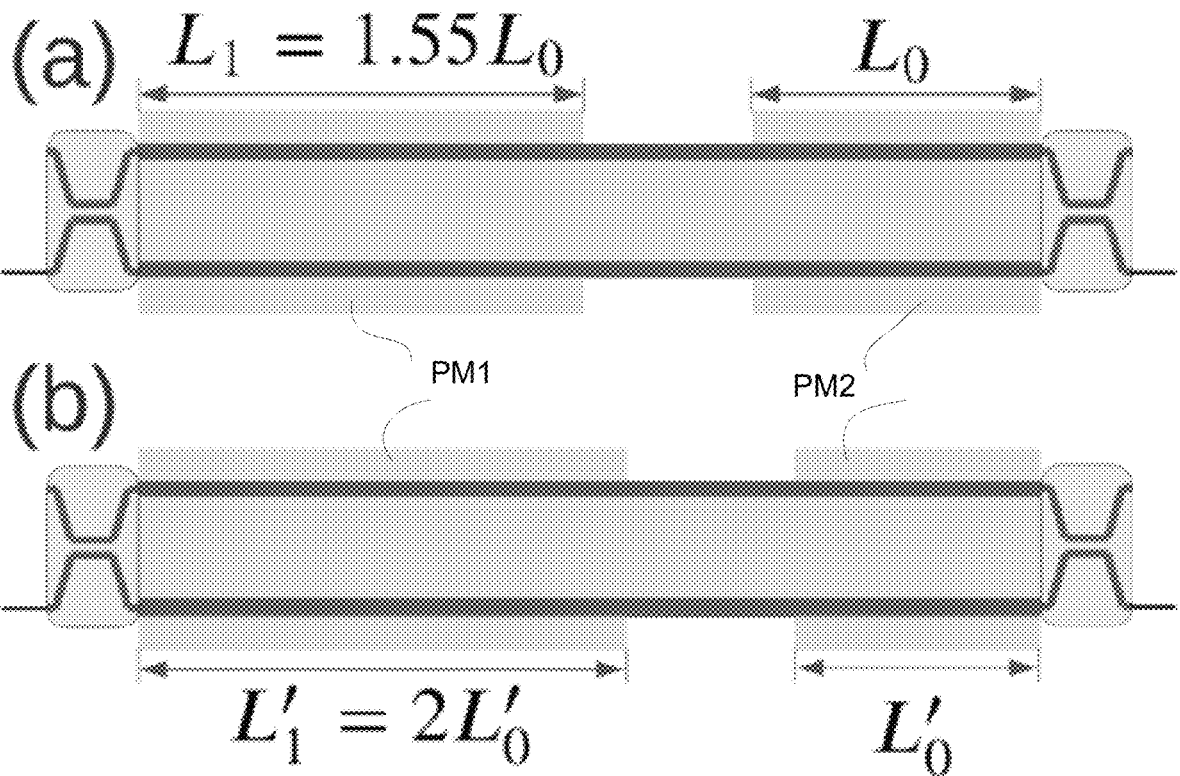
FIG. 48 illustrates an example of a ODAC.
Figure 49:
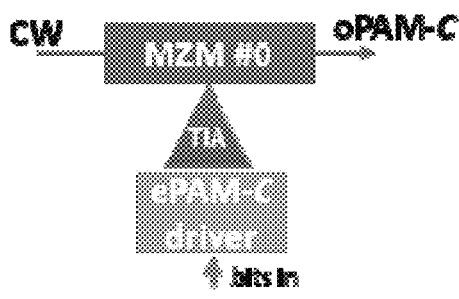
FIG. 49 illustrates an example of an optical transmitter.

FIG. 48 illustrates an example of a ODAC 481.

There may be provided an optical unit that may include a variable optical modulator, the variable optical modulator may include an input splitter, a first optical path, a second optical path (there may be more than two optical paths and a combiner. The first optical path is formed between a first output of the input splitter and a first input of the combiner. The second optical path is formed between a second output of the input splitter and a second input of the combiner.

The first optical path may include a first variable optical attenuator (VOA of FIGS. 16-20B), a first phase modulator and a first phase shifter; wherein the second optical path may include a second variable optical attenuator, a second phase modulator and a second phase shifter.

The rate of modulation of the first and second phase modulators exceeds a phase shift rate of the first and second phase shifters. Each of the first and second variable optical attenuators may be a Mach-Zehnder-Modulator.

Each Mach-Zehnder-Modulator may be an auxiliary output for providing an optical sample to a monitor.

The optical unit may include a controller that is configured to determine, based on monitoring results related to the first and second variable optical attenuators, an attenuation of at least one of the first and second variable optical attenuators.

The optical unit may be thevariable optical modulator, a variable phase gate, may include multiple variable optical modulators, and the like.

FIG. 14 illustrates an optically amplified recirculating (OAR) phase gate, comprising: a first Mach-Zehnder-Modulator (MZM), a second MZM and a feedback amplifier; wherein an output of the first MZM is coupled to an input of the second MZM, wherein the feedback amplifier is coupled between an output of the second MZM and an input of the first MZM; wherein the second MZM comprises a phase modulator.

The first MZM may include an additional input for receiving an input signal; wherein the second MZM comprises another output for outputting an output signal of the OAR.

The feedback amplifier may be a semiconductor optical amplifier (SOA) that has an input coupled to the output of the second MZM and an output coupled to the input of the first MZM.

Each one of the first MZM and the second MZM may include a phase shifter.

The first MZM may include an additional output for providing an optical sample to a monitor.

FIG. 14 may include an optical processor that may include a sequence of units that comprises an input unit, one or more intermediate units and an output unit; wherein the input unit and each intermediate unit comprises a first variable optical attenuator followed by a first phase modulator and a second variable attenuator followed by a second phase modulator; wherein each intermediate unit comprises an input splitter that precedes the first variable optical attenuator and the second variable optical attenuator; wherein the output unit comprises a combiner that is followed by a pair of phase modulators.

The optical processor may be configured to perform endless phase shifting without reset.

At least some of the units may include one or more additional outputs for providing one or more optical samples to one or more monitors.

There may be provided an optical digital to analog converter (oDAC) that may include multiple optical paths that are parallel to each other a combiner that may include multiple combiner inputs and a combiner output; and a splitter that is configured to receive an optical signal at a splitter input and split the optical signal between multiple splitter outputs to provide multiple path input signals to the multiple optical paths; wherein the multiple optical paths are formed between the multiple splitter outputs and the multiple combiner inputs.

The multiple optical paths are configured to optically process, in parallel, path input signals to provide path output signals; wherein each optical path is configured to apply an optical process that comprises applying optical modulation, by an optical gate of the optical path and under a control of an electrical modulator, to provide an optical signal having a value selected out of multiple constellation levels.

The multiple optical paths may be configured to output multiple path output signals to the multiple combiner inputs.

The combiner may be configured to add the multiple path output signals to provide an oDAC output signal having a value selected out of values of a single quadrature constellation.

The optical process applied by each optical path may be a single quadrature optical process.

Electronic Digital to Analog Converters (eDAC), are key interfaces from the digital to the analog domains. In optical transmitters generating multilevel constellations an optical modulator is preceded by an eDAC. It is advantageous to use Optical Digital to Analog Converters, which do not require eDACs in order to convert a digital bitstream into a multilevel optical signal, e.g. PAM or QAM. The prevalent state-of-the-art oDAC for optical PAM-$2^B$ generation is essentially a Segmented Mach Zehnder Modulator (SEMZM), wherein multiple modulation segments are strung together alongside a pair of optical waveguides.

A different prior art structure brings together two modulated parallel 1-bit modulators for PAM4 generation for direct-detection. Here we optimize certain low order SEMZM structures showing that improved performance may be extracted out of them. We then proceed to generalize the aforementioned oDAC structure with two parallel modulated paths, in terms of allowing for an arbitrary number of paths for constellations of higher-order than PAM4, allowing for coherent-detection, and operating the disclosed Multi-Parallel oDACs (MPoDAC) as chirp-free.

There is provided opto-electronic devices (as well as perfecting state-of-the-art devices), directly driven by digital bitstreams structured as binary codewords, to be directly mapped onto discrete levels of optical power or complex optical field. Such devices, referred to here as optical Digital-to-Analog Converters (oDAC), would amount to optical constellation generators. Driven by binary codewords, with their constituent bits mapped into two-level voltage waveforms, an oDAC directly generates a multi-level optical signal, assuming values in a set of discrete powers (for optical direct detection) or optical complex amplitudes (for optical coherent detection).

An optical constellation generator may eliminate the intermediary eDACs altogether—and according to one embodiment—directly use digital binary driver arrays, preferably implemented as state-of-the-art CMOS low voltage swings. We also aim to eliminate or at least minimize, inside the oDAC, additional power-intensive high-speed digital hardware mappers or encoders. It is would be most advantageous to be able to apply the individual bits of the incoming codewords directly to an array of elementary 1-bit modulators comprised in the oDAC—a trait referred to here as Direct Binary Drive. According to another embodiment the digital binary driver arrays are replaced by multi-bit driver arrays.

FIG. 1 illustrates oDAC alternatives for PAM8 generation (for either direct-detection or coherent-detection: (a): Prior-art Segmented Modulator (SEMZM) with 8 segments 11. (b): MPMZM oDAC 12 as disclosed in this work.

Optical Digital to Analog Converter (oDAC)—Constellation Generator

Henceforth in this work the term 'constellation' means an optical one-dimensional (1D) constellation, i.e. a collection of points along the real-axis, corresponding to real-time values referred to as 'constellation levels', specified either in the optical field domain or in the optical power domain (the square of the field amplitude, thus the power constellations are non-negative, while the field constellations are typically bipolar—have both signs—when used for coherent-detection).

There may be provided three main oDAC architecture types:

(i) Serial (SE) structure: combining two or more gates in tandem, typically using phase gates in order to additively superpose their phase contributions along the serial optical path). The linear superposition optical phase DOFs is usually translated by means of optical interference to optical amplitude. The SEMZM may belong to this class of structures.

(ii) Multi-Parallel (MP) structure: combining the outputs of two or more optical gates in parallel, with their output terminated in a passive optical combiner device to optically interfere (superpose) the output fields of the individual gates. The MPoDAC structures disclosed in this work are of this type. The optical binary DOFs being combined here are the optical fields (even when the MPoDAC is intended for DD), and the additive combination is linear superposition of fields (we avoid very high optical power and special optical materials which may elicit nonlinearity).

(iii) Combinations thereof, e.g. MP combinations of SE structures; or compound recursive structures in which MP structures are again MP combined; or MP combinations of MP combinations of SE structures.

Different examples provide constellations of different parameters—for example constellations of different order or size of the constellation (be it 1D or 2D, DD or COH) is defined as the number of constellation output levels, C, which is also the size (code length) of the 'oDAC code', defined as the collection of binary codewords used to drive the individual single-bit DOFs—the optical gates. Another key parameter is the number S of single-bit DOFs (optical gates). Thus each codeword comprises S bits (one drive bit per-gate). These two numbers, C and S, are related as described below.

In this work we are interested in dyadic-sized oDAC constellations ('dyadic' meaning integer powers of two): $C=2^B=4, 8, 16, \ldots$. Then $B \equiv \log_2 C=2, 3, 4, \ldots$ is an integer denoting the intrinsic number of bits needed to specify the code size, C in binary notation. Note: B=1 is not interesting oDAC in itself, that is a single-bit modulator. The B-count starts from 2 i.e. 4-level, 8-level, etc. Equivalently, B is the size in bits of a digital pointer (a B-bits bitstring) specifying the address of each of the C codewords in the code table. Here the 'code table' is defined as the set of the C codewords driving the oDAC 1-bit modulator array. Each codeword is of size S bits, i.e. we have S 1-bit gates (each of the S bits of the codeword drives one of these S gates), but the codeword address requires B bits to specify (as there $C=2^B$ distinct codewords, each of length S bits). In fact, the code table may be viewed as an $C \times S=2^B \times S$ matrix, B, having Boolean values ('bits') as elements. The row index c=1, 2, \ldots, C−1, selects a codeword, while the column index, s=1, 2, \ldots, S selects a bit within the codeword, driving the s-th 1-bit gate. The 'bits' of the code, table or code matrix, are either $\{0,1\}$ for DD oDACs or $\{\pm1\}$ for COH oDACs.

The digital electrical input of the oDAC consists of B digital lines each carrying a single bit, to form a length-B bitstring forming the integer index, c, an address pointing to one of the $C=2^B$ digital codewords which are stored in the code table, each of length S-bits. The number of bits in each codeword, S, is equal to or larger than the number of bits in the address of the codeword, i.e. we always have B≤S. Evidently, we also have $C=2^B>S$ i.e., the code matrix, B is either square or 'tall'.

The digital circuit in the oDAC electrical front-end, digitally generating the code (storing the code table or synthesizing it in digital logic), is referred to here B:S encoder or as B-bits:S-bits mapper.

Actually, an oDAC may operate without a B:S encoder, provided that S=B. In this special case, conceptually, the address of the codeword is actually written in the bits of the codeword. The code table consists of the bits of the binary representations of each of the successive $2^B$ numerals, $c \in \{0, 1, 2, \ldots, C-1\}=\{0, 1, 2, \ldots, 2^B-1\}$, labeling the codewords and the oDAC levels, as each codeword applied to the 1-bit gates array elicits a particular level of the C-levels constellation. The condition S=B, implies that the number S of 1-bit modulating gates, each corresponding to the number additive DOFs of the oDAC, equals the number of input bits, $B \equiv \log_2 C$, presented in parallel at the oDAC input. Hardware-wise, each incoming B-bit input word packet presented on the B input digital lines is just routed to drive the respective S=B 1-bits gates of the oDAC structure. There is no need for addition HW (the B:S encoder) as now we just drive the 1-bit gates by the input binary lines.

This leads us to yet another classification of oDACs in terms of the relation between the number of input bits, B (equal to $\log_2$ of the constellation size or of the code size), vs the number of bits S driving the oDAC additive DOFs (via S gates):

(A) An oDAC with B=S just described, not requiring a B:S encoder, as the B input bits are directly applied to drive the same number of 1-bit optical gates, will be henceforth referred to as "Binary Weighted" (BiWgt) oDAC. This type of drive referred to here as "direct binary drive" (or "direct digital driving" in the terminology used in [17][18]). Its advantage is that that the opto-electronics is least complex, as the number of parallel paths is the least. Its disadvantage is that the oDAC linearity may be impaired—the constellation gets are crowded and distorted when fewer bits are available.

(B) An oDAC with S>B requires a B:S encoder, which turns out to be a non-negligible source of energy consumption and is better avoided. Nevertheless, adding additive DOFs redundancy, i.e. increasing the number S of additive DOFs, beyond the minimal number B required to specify the distinct codewords in the code table, has the general effect of improving oDAC linearity, i.e., getting a higher-quality constellation. Thus, a tradeoff is set up between constellation quality (attained higher S), at the expense of accompanying increased complexity and power consumption increase, stemming from having more 1-bit gates and requiring the B:S encoder, which is power-hungry at high-speed (in fact, already as soon as S=B+1, a digital encoder is needed).

It is then seen that $B = \log_2 C$ is a lower bound for S (one cannot uniquely specify any codeword out of the size $C = 2^B$ code without having at least B bits in the codeword pointer. But redundant bits are allowed and will be seen to be beneficial in reducing nonlinear distortion (enabling the constellation to be closer to equi-spaced). The question is whether there is an upper limit to be imposed on S. It may be proven that it is senseless to use more than $S = C-1 = 2^B-1$ 1-bit gates. This indicates yet another member of the oDACs classification above, based on the relation between oDAC input bits and oDAC gate-bits:

(C) The extreme case $S = 2^B-1$ still requiring a B:S encoder, but enjoying best performance and most flexibility, will be referred to as "Thermometer-Weighted" (ThWgt) oDAC. This case will be shown to lead to complete removal of intrinsic constellation nonlinear distortion, be intrinsically loss-free (i.e. stretch its constellation over the max-full-scale) and enable synthezing an arbitrarily specified target field-domain or power-domain constellation, in particular an equi-spaced max-full-scale one (but any desired non-equi-spaced constellation is also also synthesizable). The cost to be incurred in exchange of these benefits of the ThWgt design is that for larger sized oDACs the large size of S (as S now depends nearly exponentially on the number of bits, B) require a sharp increase (approximately exponential in B, especially for larger B) in opto-electronic complexity and footprint, excess power consumption in the B:S encoder and in the oDAC photonic circuit with its high number of 1-bit drivers for the gates, cross-talk between the multiple RF lines, timing skews, and additional impairments. Therefore, we deem the ThWgt option as undesirable with the exception of the lowest constellation size, C=4, B=2, i.e. PAM4.

SEMZM—Segmented Mach-Zehnder Modulators (SEMZM)

To reduce and ultimately avoid loss of performance due to non-linear distortion and intrinsic loss, there may be provided a SEMZM with more that the common number of segments—we need to add in more segments, resort to non-BiWgt SEMZMs with S>B, but then we require a digital B:S encoder which at ultra-high-speed is power hungry, the more so the higher S is. But the higher S is, the lower the nonlinear distortion. At the other extreme, when S is increased up to $2^B-1$, we may design the SEMZM as a ThWgt oDAC (akin to a thermometer-coded eDAC), providing ideally distortion-free performance.

It was found that a ThWgt segmented MZM should not be possibly run "all-optically", since a power-hungry Bbits: Sbits encoder (mapper) digital circuit at ultra-high bitrate must necessarily be included to match the input B-bit binary word to S binary signals to drive the electrode segments (we note that in an electronic DAC the mapper accounts for about half the power consumption). Ideally, a segmented electrode Mach-Zehnder Modulator (SEMZM) should paired up with a dedicated driver IC to generate multi-level optical signals from multiple binary electrical drive signals, using only binary signals from the driver array, a feature we referred to as Direct Binary Drive, but this throws us back to the other extreme, the BiWgt oDAC, which was seen to feature intrinsic loss and high nonlinearity.

In addition—it should be beneficial to have chirp-free SEMZMs, i.e. the transmission phase does not vary from one transmitted constellation symbol to the next, as this would cause excessive Inter-Symbol-Interference.

FIG. 2 depicts an exemplary S=8 segment ThWg SEMZM optical structure 13, aiming to implement oDAC functionality. The contiguous MZM electrodes are partitioned into S segments. Each segment acts a "partial MZM" with push-pull drive, having its upper and lower electrodes driven by a pair of (variable) voltages preferably antipodal voltages (as shown below). When all the segments are modulated in unison, driven by properly synchronized binary signals, the total differential phase along the device may assume multiple values, inducing by interference in the output coupler multiple optical levels at the device output. Each level is determined by the combination of polarities of voltages applied to the various segments, as detailed below.

FIG. 2 illustrates a segmented MZM (SEMZM) with seven segments oDAC architecture—optimized Thermometer-Weighted (ThWgt) DAC structure—the seven electrode segment lengths are shown to scale for ThWgt SEMZM operation—the guard spaces between segments not shown to scale.

Multi-Parallel MZM (MP-MZM) Based oDAC—Structure and Operation

It has been found that in order to construct an oDAC as eDAC direct analogue, linear superposition of weighted bits in oDAC ought to inherently occur in the optical field domain.

Based on this insight, we propose a new Multi-Parallel-oDAC (MPoDAC) structure, capable of all-optically synthesizing a $2^S$-PAM constellation based on a parallel array of S MZMs or more generally of S 1-bit optical gates (to be defined further below). In this proposed structure, the inherent sine nonlinearity of the MZM is bypassed by superposing binary weighted bits linearly (and in phase) in the optical field domain, using each MZM as the source of a single "optical bit". The proposed field domain superposition paradigm holds for two types of variants we propose, namely Coherent (COH) MPoDAC (i.e., constellation generator for coherent detection), and Direct-Detection (DD) MPoDAC (i.e., constellation generator for direct-detection). In both cases we focus for design purposes of the target constellation formulated in the field domain, and evidently the COH and DD field-domain constellations differ even for a specified number of constellation levels (the DD field constellation, upon having its levels squared should yield the target power-domain DD constellation).

Our most general disclosed S-way Multi-Parallel optical DAC (MPoDAC) structure (for the generation of both DD and COH constellations) comprises S parallel paths (S≥2) each containing a 1-bit gate (see FIG. 7A). The S parallel paths are sandwiched between a 1:S optical splitter and an S:1 optical combiner. Light is split by the 1:S to feed the S parallel paths, each of which are 1-bit modulated and then coherently (in phase) superposed in the optical combiner to generate a single useful output beam (excess light may emerge and be terminated at other ports of the combiner). In addition to the 1-bit gates which are inserted in all S paths, at least S−1 of the paths also contain slow phase modulation means to bring and maintain all optical fields in-phase at the internal point of superposition in the optical combiner. Moreover, means are to be provided to tune (optimize) the paths phase shifts to achieve coherent in-phase superposition of the 1-bit-gated paths (as it occurs in the output optical combiner). In addition, the 1:S splitting ratio and S:1 combining ratio, referred to as 'taps', should be accurately set (if the splitter or combiner is fixed) or be actuated to be stabilized, maintained at target values (if the splitter or combiner has adjustable, tunable taps). The target output constellation uniquely determines the tap values to be instilled in the devices. For example, for the generation of a PAM8 COH constellation, the taps should be in ratios 4:2:1).

Fortunately, the environmental disturbances affecting the stability of the taps are slow (sub-Hz to KHz order of magnitude) thus, the stabilization may be performed by low-bandwidth electronics and control algorithms.

The 1-bit gates shown in FIG. 7A are implemented in our preferred embodiments as 1-bit BPSK modulators (referred to here as Phase-Gates (PG)) in COH MPoDACs, or as 1-bit OOK modulators (referred to here as Intensity-Gates (IG)) in DD MPoDACs. As elaborated in 5.1, both PGs and IGs may be implemented as MZMs (with different voltage drives in the two cases). When the 1-bit gates in FIG. 7A are realized as MZMs, the MPoDAC is referred to as Multi-Parallel MZM (MPMZM). Two embodiments of MPMZMs are shown in FIG. 7A and FIG. 7B for S=3 parallel paths and S=2 paths, parallel respectively. Each parallel path now comprises an MZM to be used as PG or IG (for COH or DD).

These exemplary cases of S=3 and S=2 shown in FIG. 7(b,c), illustrates the features of the most general structure with S paths, except that in these special case there are three and two parallel paths, respectively. In FIG. 7B the optical fan-out is performed by a 1:3 (1:2) splitter while the optical fan-in is performed by a 3:1 (2:1) combiner, respectively. The slow PMs (also referred to as phase shifters) for tuning the phase of each paths are not explicitly shown. Note: It is also possible to apply a common mode voltage inside each MZM, to effect the slow PM functionality. In addition to tuning the slow phases of the parallel paths, the coherent fan-out/fan-in technology for slow (typically ~kHz rate) precise tuning of split/combine ratios and phase alignments and appropriate control are evidently essential enablers for this multi-parallel oDAC architecture. The 1:S and S:1 may be realized on a SiP platform as meshes of slow thermo-optic (TO) MZMs and PMs, as elaborated in 5.4.2.3. In such splitter/combiner structures, the taps tuning is implemented by the tuning of the control phases of the constituent MZMs and PMs forming the splitter and combiner (the internals of the 1:S and S:1 are not shown in the figure).

Our MPoDAC structure, as disclosed above, functioning as constellation generator in the optical transmitter, may be parameterized to achieve two types of reception functionality: coherent detection (COH) for direct detection (DD). As already mentioned, these two classes may require similar photonic structures, differing just in the nature of their parallelized 1-bit gates building blocks (BB) and also differing in their split and combine parameter settings and their ancillary electronics: the type of binary voltage drives for the respective 1-bit gates. There may also be differences in the implementation of the control and calibration systems, but in both cases the general objective is to stabilize the relative phases of the paths for in-phase coherent combination in the S:1 combiner, and to accurately set the splitter and combiner taps to their target values (which values may be differ in the DD and COH cases). In terms of the 1-bit gates, the COH MPoDAC uses Phase-Gates (PG), whereas the DD MPoDAC uses Intensity-Gates (IG). The two types of gates are elaborated below, but we show that our gate embodiment is based on a simple MZM for both the PG and the IG (albeit with different voltage drives in the two cases). An MPoDAC (be it DD or COH), wherein the 1-bit gates are implemented as simple MZM is henceforth referred to as Multi-Parallel MZM (MPMZM)—this is our novel counterpart to the prior art SEMZM, adopting the multi-parallel structure rather than the prior serial structure.

Having specified the optical architecture just above, we must recall that the MPoDACs are integrated electro-optical devices, not just photonic ones. We reiterate the ancillary electrical subsystems which are further required: the electronic drives for the fast (1-bit gates), the slow electro-optical controls (including sensing means such as monitor photodiodes and TIAs) for the phase shifters and the slow internal modulation constituents of the tunable splitters and/or combiners, as well as control and calibration analog and digital subsystems for all slow modulations just mentioned.

The splitting and/or the combining ratios may be either tunable or fixed (tunable splitter/combiner embodiments may be more optimally set and stabilized, fixed embodiments are easier to fabricated but may be less accurately set and maintained over environmental disturbances). Some preferred embodiments will use a fixed splitter (or combiner) and a tunable combiner (or splitter), respective. The S-way MPoDAC parameters design aims for the determination of the optimal splitting and combining ratios to achieve a given target constellation; The novel methodology for such parameter designs, their optimization and multiple embodiments of MPoDACs based on the optimized parameters is an important enabling disclosure, elaborated in the sequel.

In the primary MPoDAC architecture disclosed above, the number of parallel paths each comprising a 1-bit gate, equals the number of paths, S. Yet another variant of MPoDAC, which we disclose for DD applications removes the 1-bit gate(s) from at least one of the paths (but evidently not from all the paths; at least two paths must retain their 1-bit gates, else the light would not be modulated at all or would not be multilevel-modulated). This modification is called "constellation embedding" for reasons that will become apparent once we disclose embodiments of DD MPoDACs of this type. Thus, an S-way MPoDAC with embedding operates with S−1 gating degrees of freedom (but at least a pair of 1-bit modulation degrees of freedom is retained).

1-bit Gates building blocks specified: Phase Gates (PG) and Intensity Gates (IG) The 1-bit gates are taken as Phase-Gate (PG) BBs, may be defined as chirp-free Binary-Phase-Shift Keying (BPSK) modulators. In the DD case, the 1-bit gates may be Intensity-Gate (IG) BBs, defined either as On-Off-Keying (OOK) or Amplitude Shift Keying (ASK) modulator structures, which should also be chirp-free, as elaborated below.

For COH MPoDACs the generic 1-bit gates are taken as phase-gates. These are the MP-oDAC broadband phase-switching elements, needed in each of the S parallel paths. A Phase-Gate (PG) is defined here as a 'bi-phase' optical modulator, emitting optical field $\pm E_0(0°/180°$ phase transitions, maintaining constant envelope, ideally, when driven by a bipolar $\pm V_0$-valued NRZ input waveform (which in practice does not switch instantaneously between the two bipolar levels but experiences amplitude transition 'notches' around the instants of NRZ polarity switching). In the jargon of coherent optical communication, the PG amounts to a Binary Phase Shift Keying (BPSK) modulator—known as a 'workhorse' of coherent transmission.

An intensity gate is essentially an OOK modulator. When intensity gates are provided in the MPoDAC parallel paths, the light is either let through or blocked. Two main technology candidates for realizing OOK switching are Electro-Absorption Modulation (EAM) and MZM.

Chirp-Free MPoDAC is Based on Chirp-Free 1-Bit Phase and Intensity Gates

A Phase-Gate (PG) may be a bi-phase (BPSK) modulator, switching the phase of the optical field between two levels in the phase-domain, which are $\pi$ radians apart (e.g., between 0 phase, i.e. positive field, $E_0 > 0$ and 1800 (or −180° which is the same) phase, i.e. negative antipodal field $−E_0 < 0$. We impose on our PGs (to be used as BBs in our MPoDACs) the chirp-free requirement that biphase generation be chirp-free, i.e. ideally not be accompanied by time-varying phase modulation (apart from abrupt, discontinuous phase jumps of 180° stemming from the sign change of the optical field undergoing a zero-crossings, which is inherent to field sign switching). The alternative realizations of the PG may include:

(i) A Mach-Zehnder Modulator (driven to switch between two states on both sides of its null output point).

(ii) Optically Amplified Recirculating Phase Gate (OAR-PG)—disclosed embodiment (see 5.4.1).

Electro-Optic Driver Implementation Options for the MZM-Based Chirp-Free Phase-Gates As each of the two capacitors around the top and bottom phase-modulation waveguides of the MZM has two electrodes or 'plates' (on either side of each waveguide) thus a full-specification of the voltage driving sub-system should list all four plate potentials (first pair of plates for top, $2^{nd}$ pair of electrodes for bottom).

We may electrically short out the lower-top and upper-bottom plates, having them form a common inner 'mid-electrode' in between the two waveguides, so there are three electrodes, effectively. In the GSGdesign, the outer electrodes are always grounded (G), whereas the mid electrode is active (S). In the $\overline{SSS}$design, the outer electrodes S are at any instance antipodal (opposite in sign) to the inner electrode, S.

In the GSG design the inner mid-electrode is driven by the $−V_A(t)$ signal, $V_{top-}(t)=V_{bot+}(t)=−V_A(t)$, (denoted "S")

whereas outer top-upper plate and the bottom-lower plates are at ground (null) potential, $V_{top-}(t)=V_{bot+}(t)=0$ (denoted "G").

In the $\overline{SSS}$design, the "outer" top-upper plate and and the bottom-lower plates are driven by $$\frac{1}{2}V_\Delta(t)$$

(denoted S), $$V_{top+}(t) = V_{bot-}(t) = \frac{1}{2}V_\Delta(t)$$

whereas the inner mid-electrode is driven by the $$-\frac{1}{2}V_\Delta(t)$$

signal (denoted$\overline{S}$):

$$V_{top-}(t) = V_{bot+}(t) = -\frac{1}{2}V_\Delta(t).$$

A variant of the GSGdesign is the SGSdesign whereby the driven electrodes are now the outer ones (both driven by the "S" signal) whereas the inner common electrode is grounded now:

unipolar sub-embodiment of PG drives 'SGS': [$V_{top+}(t)$, $V_{top-}(t)$, $V_{bot+}(t)$, $V_{bot-}(t)$]=[$V_A(t)$, 0, 0, $V_A(t)$]

Thus, for multiple PGs inserted in the paths of our disclosed COH MPoDACs, we may then use either one of the alternative drives GSG, $\overline{SSS}$ with a preference to $\overline{SSS}$ when high peak high speed electrical potentials are hard to generate MPoDAC Parameters Let the S:1 splitter have field splitting coefficients (referred to as taps)

$$w \equiv \{w_s\}_{s=1}^S$$

assumed real (as their phases area lumped with the path phase factors), and accordingly power splitting taps (splitter power ratios)

$$W \equiv \{W_s\}_{s=1}^S$$

with $$W_s = w_s^2.$$

The combiner respective real-valued field combining and power combining taps (combiner power ratios) are denoted $$u \equiv \{u_s\}_{s=1}^S, U \equiv \{U_s\}_{s=1}^S, U_s = u_s^2.$$

We assume that the following 'unitarity constraints' hold i.e. the splitter and combiner are effectively lossless.

$$\sum_{s=1}^{S} W_s = 1 = \sum_{s=1}^{S} U_s \Leftrightarrow \sum_{s=1}^{S} w_s^2 = 1 = \sum_{s=1}^{S} u_s^2,$$

It should be noted that the multilevel generation action of the MPoDAC is based on applying various suitable bitstrings to the array of S 1-bit gates, one bitstring for each output level. These bitstring are called the 'codewords', and their collection is referred to as the oDAC 'code'. To distinguish the C codewords (C being the code size or code order), let us label them by an index, c=1, 2, . . . , C, such that the c-th codeword (when represented as row vector) is denoted as follows $$b^T[c] \equiv (b_{S-1}[c], \ldots, b_1[c], b_0[c]), c = 1, 2, \ldots,$$

$$C, b_i[c] \in \{-1, 1\} \text{ for } COH, b_i[c] \in \{0, 1\} \text{ for } DD$$

with the S individual bits also labelled by the codeword index, c (note that the bits are labeled from right to left with the LSB bit on the extreme right and the MSB bit on the extreme left). Thus, the codewords are S-bit strings and there are C of them.

The DD codewords are then {0,1}-bitstrings of length S, while the COH codewords are {−1,+1}-bitstrings of length S.

The codeword index, c, also labels the field level, $$F_c^{S-MP}$$

generated when the c-th codeword is applied, now written:

$$F_c^{S-MP} = \sum_{s=0}^{S-1} b_s[c] w_s u_s = \sum_{s=0}^{S-1} b_s[c] \sqrt{W_s U_s}$$

where in the last equality we expressed the field split and combine taps in terms of the corresponding power taps:

$$w_s = \sqrt{W_s U_s} \Leftrightarrow W_s = w_s^2, u_s = \sqrt{U_s} \Leftrightarrow U_s = u_s^2$$

Lets assume that the splitter taps respectively equal the combiner taps. This is called "matched" design (in the sense that the combiner is matched to the splitter like a matched filter in MIMO theory):

matched taps design: $u_s =$ $$w_s \Leftrightarrow U_s = W_s \Rightarrow w_s u_s = w_s w_s = w_s^2 = W_s$$

or $$\sqrt{W_s U_s} = \sqrt{W_s W_s} = W_s$$

The c-th field level now assumes the simple form of an inner product $$F_c^{S-MP-matched} = \sum_{s=0}^{S-1} b_s[c] w_s^2 = \sum_{s=0}^{S-1} b_s[c] W_s = b[c] \cdot W$$

of the c-th codeword, b[c], with the taps vector, W, $$b^T[c] \equiv (b_{S-1}[c], \ldots, b_1[c], b_0[c]), W \equiv [W_{S-1}, W_{S-2}, \ldots, W_1, W_0]^T$$

In the elements of these vectors we reversed of the order of increasing indexes, in order to have the elements correspond to the ordering of the bits from LSB (rightmost) to MSB (leftmost) in the codewords.

The field levels may be a linear functional the power splitting (power combining ratios) taps, and may be compactly represented as a linear transformation of the power taps vector W into an optical field levels vector $$F^{S-MP} \equiv \left[ F_1^{S-MP}, F_2^{S-MP}, \ldots, F_C^{S-MP} \right]^T$$

(alternatively called the constellation vector), where we dropped the 'matched' label for brevity. This linear transformation may be written as a matrix-vector multiplication, using a [C×S]' code matrix', B, collecting the codewords in its rows, i.e. the c-th row of B is $b^T[c]$, namely the c-th codeword—a binary string of S bits: F=BW The three integer parameters characterising any novel MPoDAC design are C,B,S.

C was defined as the code length, i.e. the number of digital codewords and also the number of output optical levels (assumed dyadic—an integer power-of-two, $C=2^B$). C is also the vertical dimension of the B matrix, having the codewords as rows.

B is defined as $B \equiv \log_2 C$, i.e., the minimum number of bits required to uniquely label all codewords in the code by binary-valued B-tuples. Thus, evidently, $B < C = 2^B$, B=1, 2, 3, . . . , C=2, 4, 8, . . . .

S is defined as the number of binary-modulated Optical Degrees of Freedom (DOF) participating in generating the oDAC code, be it the number of serial MZM segments in the SEMZM oDAC (equal to the length of segment phases vector, Φ), or the number of parallel paths in the MPoDAC. In particular, for MPoDACs, S is also the length of the matched split/combine taps vector, W. S is also the number of bits (each associated with a binary-modulated optical DOF) participating in each codeword, i.e. the length of each codeword (also equal to the horizontal dimension of the B matrix).

The three parameters, B, S, C may satisfy the following order relations:

$$B \leq S \leq C - 1 < C = 2^B,$$

$$B = 1, 2, 3, \ldots,$$

$$C = 2, 4, 8, \ldots,$$

$$S = B, B + 1, \ldots, C - 1$$

Note: In an eDAC, S would equivalently represent the number of electrical additive binary DOFs (corresponding to switch current or voltage sources or switched resistances) to be internally added up upon forming the DAC analog output.

Here the electrical additive DOFs are replaced by optical additive DOFs, be they optical phases for the SEMZM or optical fields for the MPMZM.

We shall see that a tradeoff exists between complexity and energy-efficiency, favoring lower S, on one hand, vs. oDAC linearity, i.e., lower-nonlinear distortion as well as optical insertion loss favoring higher S, on the other hand. In particular, the following two extremes of the range of feasible S values are of special interest.

At the lowest-S extreme, S=B attains the least electro-optic complexity and lowest electrical power dissipation, often at the expense of nonlinear distortion and higher optical power loss. This design is referred to as Binary Weighted (BiWgt). The BiWg is the simplest to realize. To see this note that the "user" input into any DAC (be it eDAC or oDAC) is to be presented as a B-bit binary word, one of $C=2^B$ B-bit binary strings, uniquely inducing generation of one of $C=2^B$ analog levels at the DAC output.

However, when S>B, the oDAC (or eDAC) must internally comprise an electronic B-bits:S-bits digital encoder, one-to-one mapping the $C=2^B$ user-input labels (each consisting of B-bit strings), into $C=2^B$ codewords (each consisting of S-bit strings (with S≥B) to be applied to the S optical binary additive DOFs internally used in the oDAC (be they serial segments or parallel paths) in order to generate one of $C=2^B$ codewords, each of length S>B, which are seen to form a subset of the full set of $2^S$ S-bit-strings (as we have $2^B < 2^S$ whenever B<S). It is this judiciously selected subset of codewords, out of all possible ones, that constitutes the oDAC code. One design decision is to select the oDAC code, which is non-trivial. But or a BiWgt oDAC we have S=B, thus, the BiWgt code consists of all possible $2^B$ B-bit strings.

At the highest-S extreme, S=C−1 it is in principle possible to have the oDAC operate intrinsically distortion-free and optical modulation-loss-free operation. This may be achieved by means of the so-called Thermometer-Weighted (ThWgt) design, which is well known for eDACs. Here we shall propose the counterpart of that design, albeit for MPoDACs. The problem with the ThWgt (especially for designs featuring oDAC code orders or number of bits, B), be it for segmented or multi-parallel oDACs, is that its nice distortion-free and optical-loss-free desirable intrinsic qualities are attained at the expense of highest complexity and highest energy-inefficiency (and the complexity brings along with it additional performance impairments), the more so the higher the number of bits (or levels) of the DAC (be it eDAC or oDAC of the SEMZM or MPoDAC type).

In between the two extreme cases, i.e. when we have B<S<C−1, we may tune S up or down to have a variable tradeoff between low complexity and low power on one hand vs. low-nonlinearity and low-optical loss on the other hand. Besides having more segments (for SEMZM) or more parallel paths (for MPoDAC), which increases power consumption of the electrical drivers proportionally to S, an additional effect is that for S exceeding B (even by one unit, i.e. for S satisfying B+1≤S≤C−2) a digital encoder is needed (only the extreme case S=B, i.e. the BiWgt design is digital encoder free, a quality we referred to as "Direct Binary Drive" (DBD) quality, as the individual S=B segments may be driven (almost) directly from the B binary signals entering the oDAC input (we say 'almost' since unipolar to bipolar voltage mapping and electrical analog amplification might be optionally needed. However, for low-$V_\pi$ modulation segments (in the SEMZM case) or phase-gates (in the MPoDAC case), we might be able to drive the single-bit optical DOFs directly from CMOS logic levels. As for the digital B:S encoder (B bits to S bits encoder, needed whenever B+1≤S), its power consumption rapidly increases with increasing S (since as B is increased, S increases almost exponentially starting from B up to $2^B$−1. The complexity and power consumption roughly increase at least by this factor.

Direct-Detection (DD) Vs Coherent (COH) S-Way MPo-DACs—Linear Models

The MPoDAC design parameters are the oDAC code-words and the split tap vectors:

$$b^T[c] \equiv (b_{S-1}[c], \ldots, b_1[c], b_0[c]),$$

$$c = 1, 2, \ldots, C,$$

$$W = [W_{S-1}, \ldots, W_1, W_0],$$

$$U = [U_{S-1}, \ldots, U_1, U_0]$$

Let us recap the linear equations derived above for generally unmatched taps (U≠W), and for matched taps (U=W):

$$\text{unmatched: } F_c^{S-MP}\big|_{c=1,2,\ldots,C} = \sum_{s=0}^{S-1} b_s[c]\sqrt{W_s U_s} = b^T[c]V \Leftrightarrow F = BV,$$

$$V \equiv \sqrt{U \odot W} = [V_{S-1}, \ldots, V_1 V_0],$$

$$V_s \equiv W_s U_s$$

$$\text{matched: } F_c^{S-MP} = \sum_{s=0}^{S-1} b_s[c]W_s = b^T[c]W,$$

$$c = 1, 2, \ldots, C \Leftrightarrow F = BW,$$

with Ba C×S matrix the rows of which are $b^T[c]$, c=1, 2, . . . C.

These linear models actually apply to both DD as well as COH MPoDACs. However, a key distinction between the DD and COH cases is in the domain of definition of the 1D target constellation. COH constellations are stated in the optical field domain, whereas DD constellations are stated in the optical power domain (the square of the field). Thus, a COH constellation is denoted by the field constellation vector $$F^{COH} = \left[F_1^{COH}, F_2^{COH}, \ldots, F_C^{COH}\right]$$

with its elements being the optical field levels, whereas a DD constellation is denoted by the power constellation vector $$P^{DD} = \left[P_1^{DD}, P_2^{DD}, \ldots, P_C^{DD}\right]$$

with its elements being the optical power levels. The DD MPoDACs we disclose here are still coherent optical devices, and considering the optical fields underlying target optical power levels is essential for the design. Associated with the DD power constellation vector there is a DD field vector, $$F^{DD} = \left[F_1^{DD}, F_2^{DD}, \ldots, F_C^{DD}\right],$$

with the two DD power and DD field constellations in a quadratic relation:

$$P^{DD} = \left[P_1^{DD}, P_2^{DD}, \dots, P_C^{DD}\right] = \left[(F_1^{DD})^2, (F_2^{DD})^2, \dots, (F_C^{DD})^2\right] = (F^{DD})^2 \quad 5$$

Thus, for the purpose of DD design, the specified target power-domain constellation, $\mathbf{P}^{DD}$, should be mapped back to the optical field domain, as the MPoDAC intrinsically functions coherently, interfering parallel optical paths linearly in optical field.

Thus, designing for a DD power constellation $\mathbf{P}^{DD}$ amounts to using for an effective field constellation $\mathbf{F}^{DD} \equiv \sqrt{\mathbf{P}^{DD}}$ For a target DD constellation (in the power domain) $\mathbf{P}^{DD}$, using the "unipolar" ({0,1} valued) DD code, $$b_{DD}^T[c] \equiv \left(b_{S-1}^{DD}[c], \dots, b_2^{DD}[c], b_1^{DD}[c]\right),$$

$$c = 1, 2, \dots, C, b_s^{DD} \in \{0, 1\}, s = 1, 2, \dots S$$

the following linear equations hold for the MPoDAC taps: 25

$$DD \text{ unmatched: } F_c^{S-MP\,DD}\Big|_{c=1,2,\dots,C} = \quad (1)$$

$$\sum_{s=0}^{S-1} b_s^{DD}[c]\sqrt{V_s} = b_{DD}^T[c]V \Leftrightarrow BV = \sqrt{P^{DD}},$$

$$V \equiv \sqrt{U \odot W} = [V_{S-1}, \dots, V_1, V_0]$$

$$DD \text{ matched: } F_c^{S-MP\,DD}\Big|_{c=1,2,\dots,C} =$$

$$\sum_{s=0}^{S-1} b_s^{DD}[c]W_s = b_{DD}^T[c]W \Leftrightarrow B^{DD}W = \sqrt{P^{DD}},$$

These are then the linear equations applicable for DD MPoDACs (unmatched and matched).

For COH oDACs we may still use (217) or (218), wherein we might as well label all quantities by the COH superscript.

For coherent detection (COH), for which it suffices that we primarily consider the BiWgt MPoDAC, which are of special interest in the COH case. For given (dyadic) code size, they have the lowest number of paths, S=B, thus are the least complex and most energy efficient (and least affected by various other impairments). The BiWgt COH MPoDACs are capable of ideally losslessly synthesizing at desired symmetric max-full-scale field domain constellation. In particular "perfect" equi-spaced max-full-scale constellations may be synthesized by COH MPoDACs.

The ThWgt MPoDAC need not be considered for COH, since, fortunately, the BiWgt COH B-way MPoDAC is capable of generating inherently "perfect" max-full-scale equi-spaced COH PAM-$2^B$ constellations, as shown in this subsection. Moreover, for the generation of a given C=$2^B$ number of levels, MPoDAC with least number of paths is the BiWgt one, with just S=B paths, thus it is the least complex and has the highest energy efficiency, whereas all other MPoDAC types require more paths (S>B) thus are more complex than the BiWgt MPoDAC. Thus, it is not worth considering any other type of MPoDAC besides the Biwgt one, which is the simplest and best performance one.

We have seen that B is the intrinsic number of bits, i.e. the base-2 log of the number of constellation levels, C. For the B-bits BiWgt COH MPoDACs we have B paths, 1:B splitter fan-out, B:1 combiner fan-in, and in this case required 1-bit gates are of gates—in a preferred implementation of the MPMZM COH MPoDAC the phase-gates are MZM-based.

The MPoDAC transfer factor depends on the (quasi-) static settings of the 1:B splitter and the B:1 combiner. We denote by $$W \equiv \{W_s\}_{s=1}^B \text{ and } U \equiv \{U_s\}_{s=1}^B$$

the power tap vectors—the field transfer factors through the splitter and combiner.

For BiWgt B-bits MPoDACs the code matrices are $2^B \times B$sized. We derive some specific properties (unique to the BiWgt case) of the BiWgt MPoDAC with matched-taps. We recall that the matrix equations in the COH and DD respective cases are:

$$B^{COH}W^{COH} = F^{COH}, B^{DD}W^{DD} = F^{DD} \equiv \sqrt{P^{DD}} \quad (2)$$

For the $B^{DD|COH}$ code matrix (with DD|COHmeaning DD or COH), the rows $b^T[c]$, c=1, 2, $\dots$, $2^B$ of the code matrices, i.e., the codewords, consist of all possible B-bit binary bitstrings (C=$2^B$ of them). In this respect, the sole difference between DD and COH codes is in the two values assumed by each "bit" of the code. For DD, the bits are {0,1}-valued whereas for COH they are ±1-valued. Let us separately treat the properties of the solutions for the DD and COH BiWgt cases in the following subsections, showing that the properties in the COH case may be derived from those of the DD.

BiWgt COH MPoDAC as Perfect Equi-Spaced Constellations Generator

The next two subsections disclose two examples of BiWgt B-bit COH MPoDAC designs, the first one for equi-spaced max-full-scale constellations, while the second preferred solutions trades some performance for design simplicity and robustness.

BiWgt B-Bit COH MPoDAC with Matched Taps—Equi-Spaced Max-Full-Scale Constellation We now disclose our first preferred BiWgt COH MPoDAC design with 'matched-split-combine taps', (i.e. using identical tap vectors for the splitter and combiner: $W_s$=$U_s$, s=1, 2, $\dots$, B), optimizing the field transfer factor over the vector W of B matched tap parameters in order to inherently (i.e., ideally losslessly) generate a "perfect" equi-spaced max-full-scale C=$2^B$ level constellation.

In this case the output field levels are:

$$F_c^{B-MP-matched} = \sum_{s=0}^{B-1} b_s^{COH}[c]W_s = b^{COH}[c] \cdot W,$$

$$b_s^{COH} \in \{-1, 1\}$$

The COH codewords may be readily generated by first writing down the DD "binary counting codes" and affine mapping these DD codes by the substitution $0 \to -1$. E.g., for the BiWgt 3-bit DD MPoDAC, (B=3, C=8) we use the following DD code:

$$\{b_{DD}^T[c]\}_{c=1}^8 = (b_2^{DD}[c], b_1^{DD}[c], b_0^{DD}[c]) =$$

$$\{(0, 0, 0), (0, 0, 1), (0, 1, 0), (0, 1, 1), (1, 0, 0), (1, 0, 1), (1, 1, 0), (1, 1, 1)\}$$

The resulting BiWgt COH code is $$\{b_{COH}^T[c]\}_{c=1}^8 =$$

$$(b_2^{COH}[c], b_1^{COH}[c], b_0^{COH}[c]) = \{(-1, -1, -1), (-1, -1, 1), (-1, 1, -1),$$

$$(-1, 1, 1), (1, -1, -1), (1, -1, 1), (1, 1, -1), (1, 1, 1)\}$$

Collecting all the resulting DD field levels in a vector (i.e., a finite sequence)

$$F^{equi-DD} =$$

$$\left\{\frac{c-1}{2^B-1}\right\}_{c=1}^{2^B} = \frac{1}{2^B-1}[0, 1, 2, \ldots, 2^B - 1] = \left[\frac{1}{2^B-1}, \frac{2}{2^B-1}, \ldots, 1\right]$$

E.g., for $B = 3$, $$F^{equi-DD\,3MP} = \left[\frac{1}{7}, \frac{2}{7}, \frac{3}{7}, \frac{4}{7}, \frac{5}{7}, \frac{6}{7}, 1\right]$$

Thus this DD field domain constellation, which we may synthesize using the DD ({0,1}-valued) BiWgt codewords, is evidently a perfect equi-spaced max-full-scale DD one, over the FS range [0,1].

Note that we are usually interested in equi-spaced DD constellation in the power-domain rather than the field domain, e.g. PAM8:

$$P^{equip-DD\,3MP} = \left[\frac{1}{7}, \frac{2}{7}, \frac{3}{7}, \frac{4}{7}, \frac{5}{7}, \frac{6}{7}, 1\right] \Rightarrow F^{equip-DD\,3MP} =$$

$$\sqrt{P^{equip-DD\,3MP}} = \left[\sqrt{\frac{1}{7}}, \sqrt{\frac{2}{7}}, \sqrt{\frac{3}{7}}, \sqrt{\frac{4}{7}}, \sqrt{\frac{5}{7}}, \sqrt{\frac{6}{7}}, 1\right]$$

The COH MPoDAC embodiment for B-bit (COH PAM-$2^B$) constellation generation, is based on using the photonic structure of FIG. 7A with S=B paths, setting the slow phases in the B paths to be all equal (i.e. ensure coherent "in-phase" addition of all paths in the optical combiner), then tuning the splitter and combiner to assume the dyadic power splitting taps (i.e. have the ratio of the power split and power combine tap values to be forming a geometric sequence $2^{B-1}$: . . . , 4:2:1 and have the splitting and combining taps be matched, i.e. be equal for each of the paths in turn. Then apply the COH code to the device by driving the B phase-gates with bipolar voltages ensuring chirp-free operation. Each of the $C=2^B$ codewords of the oDAC code elicits a particular output field level of the COH PAM-$2^B$ constellation. When the MPoDAC is realized with bipolar driven MZM phase gates we refer to it as MPMZM.

The phase gates (BPSK modulators) are realized as MZM modulators driven by $\pm V^{pk}$ antipodal voltages corresponding to the codewords (e.g. for a B=3, PAM8 generator, we have 3 paths and the three MZMs in the paths will be driven by the following 8 triplets—which the triplets ideally generating the successive equi-spaced levels of the field constellation:

$$\left\{\begin{array}{c} \left(-V^{pk}, -V^{pk}, -V^{pk}\right), \left(-V^{pk}, -V^{pk}, V^{pk}\right), \left(-V^{pk}, V^{pk}, -V^{pk}\right), \\ \left(-V^{pk}, V^{pk}, V^{pk}\right), \\ \left(V^{pk}, -V^{pk}, -V^{pk}\right), \left(V^{pk}, -V^{pk}, V^{pk}\right), \left(V^{pk}, V^{pk}, -V^{pk}\right), \\ \left(V^{pk}, V^{pk}, V^{pk}\right) \end{array}\right\}$$

For minimizing the modulation loss, the peak drive voltage should be taken as $V^{pk}=V_\pi$, i.e., each MZM be driven $\pm V_\pi$. When $V^{pk} < V_\pi$ we have backoff—the constellation still comes out equispaced, but the full scale shrinks down by a factor equal to $k_{bkoff}=V^{pk}/V_\pi$.

BiWgt B-Bit COHMPoDAC with Uniform Fixed Splitter or Combiner for Equi-Spaced Constellation A second MPoDAC design disclosed here gains in simplicity and robustness at the expense of giving up some performance (incurring some inherent loss). This design simply takes the splitter as fixed, uniform, with all its taps equal (thus have equal splitting ratios $$W_s = \frac{1}{B} \Leftrightarrow W = \frac{1}{B}[1, 1, \ldots, 1]^T = \frac{1}{B}1_{all})$$

then proceeding to optimize the combining taps, U. Conversely, it is possible to take the combiner as fixed, uniform, with all its taps equal (thus have equal combining ratios $$U_s = \frac{1}{B} \Leftrightarrow U = \frac{1}{B}[1, 1, \ldots, 1]^T = \frac{1}{B}1_{all})$$

but then optimize over the splitting taps, W.

The performance in the two cases is inherently identical, as it depends just on the products $W_s U_s$. Modeling the case of a BiWgt design (S=B) with fixed splitter taps $$W_s = \frac{1}{B},$$

we substitute this fixed value into MPoDAC equation, yielding $$F_c^{fixed-split-BiWgt\,B-MP\,COH} =$$

$$\frac{1}{\sqrt{B}}\left(\pm\sqrt{U_{B-1}} \pm \sqrt{U_{B-2}} \ldots \pm \sqrt{U_2} \pm \sqrt{U_1} \pm \sqrt{U_0}\right)$$

Here $u_s \equiv \sqrt{U_s}$ are the combiner "field tap", i.e., the transfer from the s-th input port to of the combiner to its output—the optimization proceeds over these combiner "field taps".

To determine the actual values of the taps, we recall the unitary constraint for an ideally lossless combiner, namely, $$\sum_{s=0}^{B-1} u_s^2 = \sum_{s=0}^{B-1} U_s = 1$$

The power combining taps should be in ratios which are the squares of the field combining caps, $$U_{B-1}:U_{B-2}:\ldots, U_2:U_1, U_0 = u_{B-1}^2:u_{B-2}^2:\ldots u_2^2: u_1^2,$$

$$u_0^2 = \left(2^{B-1}\right)^2:\left(2^{B-2}\right)^2:\ldots 4^2:2^2:1^2 = 2^{2B-2}:2^{2B-4}:\ldots, 16:4:1$$

The sum of these ratio terms $$2^{2B-2} + 2^{2B-4} + \ldots + 16 + 4 + 1 = \sum\nolimits_{s=0}^{B-1} 2^{2s} = \frac{1}{3}\left(2^{2B} - 1\right).$$

Normalizing by this sum yields:

$$\left\{\hat{U}_{B-1}, \ldots, \hat{U}_2:\hat{U}_1, \hat{U}_0\right\} =$$

$$\left\{\hat{u}_{B-1}^2, \ldots, \hat{u}_2^2, \hat{u}_1^2, \hat{u}_0^2\right\} = \frac{2^{2B-2}}{\frac{1}{3}\left(2^{2B} - 1\right)} : \frac{2^{2B-4}}{\frac{1}{3}\left(2^{2B} - 1\right)} : \ldots,$$

$$\frac{16}{\frac{1}{3}\left(2^{2B} - 1\right)} : \frac{4}{\frac{1}{3}\left(2^{2B} - 1\right)} : \frac{1}{\frac{1}{3}\left(2^{2B} - 1\right)}$$

These coefficients form a geometric sequence and their sum of squares is unity (consistent with the unitary condition)

Taking the square root of this sequence of ratios yields $$\left\{\hat{u}_{B-1}^2, \ldots, \hat{u}_2, \hat{u}_1, \hat{u}_0\right\} = \frac{2^{B-1}}{\sqrt{\frac{1}{3}\left(2^{2B} - 1\right)}} :$$

$$\frac{2^{B-2}}{\sqrt{\frac{1}{3}\left(2^{2B} - 1\right)}} : \ldots : \frac{4}{\sqrt{\frac{1}{3}\left(2^{2B} - 1\right)}} : \frac{2}{\sqrt{\frac{1}{3}\left(2^{2B} - 1\right)}} : \frac{1}{\sqrt{\frac{1}{3}\left(2^{2B} - 1\right)}}$$

Returning to substitute these field combining taps into (251) yields $$F_c^{fixed-split-BiWgt\ B-MP\ COH} =$$

$$\pm\frac{2^{B-1}}{\sqrt{\frac{B}{3}\left(2^{2B} - 1\right)}} \pm \frac{2^{B-2}}{\sqrt{\frac{B}{3}\left(2^{2B} - 1\right)}} : \ldots \pm \frac{4}{\sqrt{\frac{B}{3}\left(2^{2B} - 1\right)}} \pm \frac{2}{\sqrt{\frac{B}{3}\left(2^{2B} - 1\right)}} \pm$$

$$\frac{1}{\sqrt{\frac{B}{3}\left(2^{2B} - 1\right)}}$$

The MSB field level is obtained by taking all signs to be positive yielding

It is seen that for PAM4 and PAM8 generation the inherent modulation losses of the fixed-splitter BiWgt MPoDACs are moderate (of the order of 0.5 dB and 1 dB), thus the tradeoff between performance and complexity may be worthwhile.

The COH PAM8 and COH PAM4 MPoDAC are special cases (both embodiments: matched taps vs. with fixed splitter or combiner) are important since they are the least complex to implement. We defer the detailed treatment of the photonic circuit for the COH PAM8 3-bit MPMZM until after we will have treated the embodiments of 1:3 splitters and 3:1 combiners. However, we are in a position to already treat here the COH PAM4 2-bit solution, which we do in the next subsection.

The MPMZMs considered here are ideally lossless (and common phase constants are ignored) thus the evaluated field transfer factors and normalized MSBs represent upper bounds on actual performance. The analysis effectively assumed setting the input field into the lossless MPMZM to unity, $E_{in}=1$, such that the generated constellations emerge in standardized form (field transfer factors).

2-Bit COH-PAM4 MPMZM—an MPoDAC Using 2 Parallel MZMs Based on 'Matched-Taps'

The COH 2MP photonic structure combines two BPSK modulators (aka 'phase gates') in parallel (FIGS. 8A and 8B), to generate an 'inherently perfect' (i.e. max-full-scale equi-spaced) COH PAM4 constellation (bipolar PAM4) in the optical field domain.

FIG. 1A illustrates a multi-parallel (MPMZM) 2 bit oDAC architecture for COH PAM4 generation. PG=Phase Gate. PM=Phase Modulator. MC=Mode-Converter.

VAR=Variable (tunable). FIG. 8B—Multi-Parallel MZM (MPMZM) implementation of the 2-bit MPoDAC of the (left) diagram. Here the PGs are implemented as MZMs as shown. In fact, this structure supports not just COH PAM4 generation but also DD PAM4 generation, since the two MZMs may be used as OOK Intensity Gates (IG). Thus, the MZMs may be used either as PG (BPSK) or IG (OOK) modulators, depending on their electrical drives. Thus, 2-bit MPMZM in the (right) diagram is usable for the agile generation of a unipolar/bipolar-PAM4 constellation.

This disclosed embodiment of the 2MP COH (PAM4), a special case (for B=2) of the B-bit COH BiWgt MPoDAC, is of practical technological importance, as the least complex MPoDAC to realize (having just two parallel paths) while maximizing the relative benefit in data rate (doubling spectral efficiency) w.r.t. to a BPSK-based coherent transmitter, or w.r.t. incumbent single-bit DD modulation technology, which is based on OOK modulators. Moreover, a pair of COH 2MP devices may be used to efficiently generate a 16-QAM constellation for coherent transmission, see 5.9.2.

Rather than just specializing the general B-bits results to the special case B=2, it is instructive to swiftly rederive anew the model for this embodiment, in order to gain additional insight and validate the heretofore derived general B formulas.

The embodiment of this section is based on 'matched taps'. The splitter (1:2) and combiner (2:1) are enabled to feature variable split/combine ratios—these ratios, the 'taps' are tunable parameters to be adjusted in the performance optimization. An optimal design for synthesizing a max-full-scale equi-spaced bipolar-symmetric constellation) is enabled by 'matching' the combining taps to the splitting taps, in the sense of having them equal, for each of the two paths:

$$W = (W_1, W_0) \equiv (U_1, U_0) = U.$$

As the unitarity constraint stipulates that $W_1+W_0=1$, $U_1+U_0=1$, it suffices to, adjust a single splitter tap (say $W_0$) and have the corresponding combiner tap, $U_0$, adjusted satisfy $U_0=W_0$. We have already derived in the optimal tap vector solution for this MPoDAC for the target COH PAM4 equi-spaced max-full-scale constellation. The taps vector W should be set to $$W = \hat{W}_{B=2}^{dyadic} = \frac{1}{3}(2, 1) = \left(\frac{2}{3}, \frac{1}{3}\right) = (W_1, W_0)$$

The power splitting taps are in the ratio, $W_1:W_0=2:1$ and since their sum is unity, they must be given by $$\frac{2}{3}, \frac{1}{3},$$

respectively. The generation of the equi-space max-full-scale field constellation is:

$$F_c^{2-MP-matched} = \pm W_1 \pm W_0 = \pm\frac{2}{3} \pm \frac{1}{3} = \frac{1}{3}(\pm 2 \pm 1) = \left(-1, -\frac{1}{3}, \frac{1}{3}, 1\right)$$

2-Bit (COH-PAM4) MPMZM oDAC Using 2-Way MZMs Based on 'Fixed-Split (or Combine)'

This embodiment is based on essentially the same block diagram (FIGS. 8A and 8B) as the 'matched taps' embodiments of the last subsection (as both have B=2 two parallel paths) but here we stipulate that either the splitter or the combiner be 'fixed', i.e. have taps that are correctly set in fabrication (and hopefully vary little due to environmental disturbances). Accordingly, either the combiner or the splitter will be variable, tunable in its splitting ratio (we do not advocate having both the splitter and the combiner fixed, just one of them ought to be fixed to enable mitigation of environmental disturbances). Moreover, for enhanced simplicity and robustness, we prefer to specify that the fixed splitter or combiner taps be "50:50" or close to this value. The main advantage of this embodiment is complexity reduction at the expense of a moderate reduction in performance. This 2-bit embodiment may be viewed as a special case of the BiWgt B-bit COH MPoDAC with uniform fixed splitter or combiner. Let us assume we take the 1:2 splitter as fixed 50:50, i.e., $$W_1 = W_0 = \frac{1}{2}$$

and let us optimize over the two U-taps at the output side. This will provide:

$$F_c^{2-MP-fixed} =$$

$$\frac{1}{\sqrt{2}}(\pm\sqrt{U_1} \pm \sqrt{U_0}) = \frac{1}{\sqrt{2}}\left(\pm\frac{2}{\sqrt{5}} \pm \frac{1}{\sqrt{5}}\right) = \pm\frac{2}{\sqrt{10}} \pm \frac{1}{\sqrt{10}} =$$

$$\frac{1}{\sqrt{10}}(\pm 2 \pm 1) = \frac{1}{\sqrt{10}}(-3, -1, 1, 3) = \left(-\frac{3}{\sqrt{10}}, -\frac{1}{\sqrt{10}}, \frac{1}{\sqrt{10}}, \frac{3}{\sqrt{10}}\right)$$

This resulting PAM4 COH constellation is evidently equi-spaced, but it is not max-full-scale. The MSB (equal to the intrinsic modulation loss) is given by $$MSB^{2-MP-fixed} = F_4^{2-MP-fixed} = \frac{3}{\sqrt{10}} = 0.949 = -0.46 \text{ dB}$$

In contrast, the PAM4 COH constellation generated by the 'matched split/combine' design is max-full scale, i.e. its intrinsic modulation loss is 0 dB. However, the 'fixed' design is a less complex one, as there is nothing to tune in the 50:50 uniform splitter, and there is essentially one combiner tap to tune (as the other one completes it to unity ideally) and one phase to tune in one of the two paths (as just the differential phase matters). The 2:1 combiner may be realized here as a slowly tunable MZM.

As a variant on this fixed 2-bit COH PAM-4 embodiment, in case that we have some ability to target particular splitting ratios for the 1:2 fixed splitter, and have the designed-in value be reproduced relatively accurately in fabrication, it may be worth targeting not a fixed 50:50 splitter but ⅔:⅓ i.e. attempt to fabricate a fixed splitter with the optimal splitting taps, and $$W = (W_1, W_0) = \left(\frac{2}{3}, \frac{1}{3}\right)$$

at the input side, such that upon optimization of the adjustable U-taps at the output side, the resulting constellation would be not just equi-spaced but also closer to being max-full-scale. To understand the degree by which we may improve the design, it is worth working out the tolerance to deviation from the optimal splitter setting $$\left(\frac{2}{3}, \frac{1}{3}\right)$$

(while the U-taps are reoptimized for each tried-out value of the W-taps and performance is assessed). This will provide A PAM4 COH constellation, now parameterized by $W_0$, $U_0$, is obtained by using the 2-bit COH code, $$F^{2-MP-fixed}(W_0, U_0) =$$

$$\{-\sqrt{(1-W_0)(1-U_0)} - \sqrt{W_0 U_0}, -\sqrt{(1-W_0)(1-U_0)} + \sqrt{W_0 U_0},$$

$$\sqrt{(1-W_0)(1-U_0)} - \sqrt{W_0 U_0}, \sqrt{(1-W_0)(1-U_0)} + \sqrt{W_0 U_0}\}$$

The $W_0$ tap of the fixed splitter is taken as a ("fixed" though not precisely known) parameter—ideally we would like it to be for ⅓ optimal max-full-scale constellation, but due to the fabrication tolerances (and possibly also environmental temperature dependence) the value of $W_0$ may move around the targets (or we intentionally set $W_0$ at a nominal value, ½, that is convenient to us (even that may move around, e.g. a nominal 50:50 splitter may come with fabrication errors, say ±10% i.e., we may get $W_0 \in [0.45,0.55]$). Likewise, even when we aim to use the optimal nominal $$W_0 = \frac{1}{3}$$

splitter, we may get ±10% fabrication error, such that $$W_0 \in \frac{1}{3}[0.9, 1.1] = [0.30, 0.37].$$

This indicates the usefulness of a tolerance analysis, whereby we will have $W_0$ as a settable parameter, say anywhere in the range of [0.25,0.55], and for each specific fixed value of the splitter tap, $W_0$, we shall optimize the PAM4 constellation "performance" over the tunable combiner tap parameter, $U_0$ FIG. 12 illustrates a PAM4 COH 2-bit MPMZM with fixed splitter. The splitter fixed tap is somewhere in the range $W_0 \in [W_{low}, 1-W_{low}]$ as explained above, with $W_{low}$ selected as per Table 3 or FIG. 10 or FIG. 11, based on the target NFOM spec. The fixed splitter feeds two parallel fast MZM, preferably implemented as plasmonic ultra-high=speed MZMs (though any MZM implementation is allowed). In fact, we may replace the two MZMs by other types of phase-gates, in particular have them replaced by our two OAR-PG devices. In the implementation we use a pair simple MZMs for the PGs. The two outputs of the two MZM PGs are used as follows. Two outputs, one from each PG, are combined in a third slow MZM (the last one on the RHS), which is used as a variable combiner, tuned by changing the relative phase of the two phase shifters in the two arms by means of inserted slow phase modulators Note: slow phase shifters are denoted by small hollow black rectangles. Fast phase modulators as used in the MZM phase-gates are denoted by the electrodes marked 'S'.

One version of the proposed multi-parallel ODAC 2-bit PIC structure, (i.e. 4-level constellations) is depicted in FIG. 12 (an alternative design is shown in FIG. 13.

Either of these photonic layout are electronically reconfigurable for both PAM4 COH or PAM4 DD transmission, see also optical programmability in 5.10.1. The top (bottom) high-speed MZM in FIG. 12 is driven by the MSB (LSB) bit, as elaborated in the figure caption along with additional details.

The relative optical phase between the two parallel paths of FIG. 12 is stabilized to null while the ratio of magnitudes of two optical fields is calibrated and stabilized to an appropriate design value, to ensure the output 4-level constellation is as uniform as possible. E.g., in the case of coherent transmission, the two superposed fields from the two plasmonic MZM are in the ratio of 2:1, such that four field levels are uniformly spaced: $[\pm3A,\pm A]=[+3A,+A,-A,-3A]$. It is the task of the control-plane to calibrate and stabilize (track) the relative phase and relative magnitudes between the two paths, as actuated by the bias of the slow combining MZM and the two phase modulators in the two paths. The sensing points are the optical monitors at the three free-ports.

It is the task of the control plane to calibrate and stabilize (track) the relative phase and relative combining magnitudes between the two paths (i.e. the combining ratio of the variable combiner MZM), as actuated by the bias of the slow combining MZM and of the two phase slow modulators in the two paths. The control plane is also tasked with having the two fast phase-gate MZMs correctly biased. The relative optical phase between the top and bottom phase-gate MZM paths is stabilized to null, while the ratio of combining magnitudes of the two optical fields is calibrated and stabilized to an appropriate design values to ensure the 4-level output constellation is as uniform as possible on the largest possible full-scale (ideally the output COH PAM4 constellation is perfectly equi-spaced and max-full-scale). The various slow phase controls in the diagram are used as follows: The two phase shifters inside each of the two fast MZMs (the phase-gates) are used to tune each MZM to balanced bias point (such that the output which leads to the combiner would be null in the absence of modulation and the two field levels respectively generated by the two antipodal voltages are of equal magnitude (but opposite signs). The other two outputs of the two fast MZM PGs are optionally sent out to feed two slow photodiodes (PD) plus Trans-Impedance-Amplifiers (TIAs) which are used for monitoring. When each of these two phase shifters is correctly tuned for the condition above, then no light emerges at the corresponding monitor port (the upper and lower PD+TIA).

Ahead of the first coupler of the slow MZM used a combiner, there are two slow phase shifters on the two input waveguides. Conceptually, those phase shifters are not part of the MZM combiner, but they are rather used for tuning the relative phase between the two paths (each path going through a particular phase-gate). This relative phase would ideally be stabilized to null.

The two phase shifters inside the combiner MZM (in between its two couplers) is used to tune the combiner tap, denoted in the analysis above as $U_0$. The middle PD+TIA used for monitoring is fed by the other output port of the variable combiner MZM.

When the combiner tap is properly tuned (assuming that the phase-gate fast MZMs are also properly tuned to have balanced optical paths), ideally all the light emerge at the PAM4 output, which would be maximized and none of the light would emerge at the monitor port feeding the middle PD+TIA.

At the very input of the device, prior to entering the fixed splitter we may optionally insert a phase modulator or an amplitude modulator (the case of phase modulator is shown), used to additively inject a weak sinusoidal pilot tone to be used for monitoring. As already mentioned for the general case of B-bits COH MPoDAC, an alternative design sets the combiner as fixed while tuning the splitter. The splitter and combiner taps now just exchange roles. It is the power-splitting taps that should now be in the ratio $$(W_1, W_0) = \left(\frac{2}{3}, \frac{1}{3}\right).$$

The resulting equi-spaced field constellation is identical to the one above (and the insertion loss is evidently 0.46 dB as well). In fact, the analyses and designs described in this section remain valid if we exchange the words "splitter" and "combiner" while we also exchange the symbols and values $W_s \leftrightarrow U_s$, s=1,2. What this implies for the block diagram of FIG. 13, is that the optical flow first goes through a variable splitter feeding a pair of phase gates, and then we terminate the two paths in a fixed combiner.

FIG. 13 is an alternative embodiment of 2-bit COH PAM4 MPMZM oDAC with fixed combiner (and variable splitter realized as a tunable slow MZM). This embodiment is the dual of FIG. 12 in the sense that the splitter and combiner roles are interchanged.

3-bit (COH-PAM8) MPMZM oDAC using 3-wayMZMs based on the 'fixed-split (or combine)'

Consider a PAM8 COH design based on a fixed-uniform-split design, namely a1:3 splitter with fixed-taps, $$\left(\frac{1}{3}, \frac{1}{3}, \frac{1}{3}\right),$$

35

The 3:1 combiner is made tunable, with taps $$(W_2, W_1, W_0) = \frac{16}{71}, \frac{4}{21}, \frac{1}{21},$$

selected such that that the end-to-end field transfer factors along the three paths (the end-to-end transfer factors of the three paths including the splitter and combiner contributions, as well as the backoff attenuation factor g of the PGs) are actually just the contributions of the splitter and combiner taps to the transfer factors are):

$$\left(\sqrt{W_2}\,g\sqrt{U_2},\ \sqrt{W_1}\,g\sqrt{U_1},\ \sqrt{W_0}\,g\sqrt{U_0}\right) =$$

$$g\left(\sqrt{W_2 U_2},\ \sqrt{W_1 U_1},\ \sqrt{W_0 U_0}\right) =$$

$$g\left(\sqrt{\frac{1}{3}\cdot\frac{16}{21}},\ \sqrt{\frac{1}{3}\cdot\frac{4}{21}},\ \sqrt{\frac{1}{3}\cdot\frac{1}{21}}\right) = g\left(\frac{4}{\sqrt{63}},\ \frac{2}{\sqrt{63}},\ \frac{1}{\sqrt{63}}\right)$$

Assuming no backoff, g=1, the ideally generated fields are $$\pm\frac{4}{\sqrt{63}}\pm\frac{2}{\sqrt{63}}\pm\frac{1}{\sqrt{63}} = \frac{1}{\sqrt{63}}\{\pm 4 \pm 2 \pm 1\} =$$

$$\left\{\frac{-7}{\sqrt{63}},\ \frac{-5}{\sqrt{63}},\ \frac{-3}{\sqrt{63}},\ \frac{-1}{\sqrt{63}},\ \frac{1}{\sqrt{63}},\ \frac{3}{\sqrt{63}},\ \frac{5}{\sqrt{63}},\ \frac{7}{\sqrt{63}}\right\}$$

The full-scale is now $$FS = MSB - LSB = 2\cdot\frac{7}{\sqrt{63}} = \frac{14}{\sqrt{63}} = 1.76,$$

which is −1.1 dB lower than the ideal max-full-scale of 2.

Additional Building Blocks for MPoDAC
Optically Amplified Recirculating (OAR) PG There may be provided a compound photonic circuit built around a basic bipolar-driven MZM (preferably of the plasmonic type) realizing a new type of PG, which may be designed for reduced insertion loss and/or for reduced $V_\pi$ (lower power). This device, referred to as Optically Amplified Recirculating Phase Gate (OAR-PG), exceeds the State-of-the-Art (SotA) performance of plain MZM PGs, by significantly improving the modulation Loss-V tradeoff. Our disclosed novel PG structure (FIG. 14) is based on a core MZM enhanced by photonic circuitry comprising optically amplified feedback to compensate most of the cavity Round-Trip Loss (RTL). The optical amplification may be achieved by means of hybrid-integrated a tightly controlled active gain Semiconductor Optical Amplifier (SOA). Alternatively, other types of optical amplifiers may be used. The advantage may be claimed as either a reduction in PG drive-power (at same electrode length as for a standalone P-MZM used for bi-phase switching; in this example a ~10× reduction), or as a reduction in P-MZM electrode length (at fixed drive power; in this example ~3× reduction, also hence ~3× reduction in modulation loss in dB). This novel PG structure retains the full bandwidth (e.g., of the order of 100 GHz for a SotA plasmonic modulator) of the core MZM around which the compound PG is built.

1:S Splitters, S:1 Combiners, N:M Mode Converters

Variable and/or fixed multiport splitters/combiners are used as building blocks (BB) for performing the multi-parallel fan-out and fan-in functionalities (the 1:S splitters and S:1 combiners) in our disclosed MPoDAC schemes. More generally, we consider tunable N:M mode converters.

Mode-Converters (MC): We refer to an optical device with N input waveguides and M output waveguides (and no other port to leak light out) as an N:M Mode Converter (MC). (the multiport splitters or combiners are special cases of the N:M MCs, taking N=1 or M=1, i.e. 1:N or M:1). The splitter and combiner MCs are BBs in our MPoDACs, and in many cases splitter and combiner MCs are based on more M:N MCs with M>1,N>1, hence we consider multi-input multi-output MCs.

Tunable 2×2 MCs as BBs: Tunable multiport splitters/combiners, and more generally, tunable N:M MCs, may be realized as meshes of simpler BBs: generic 2:2 MC with a tunable 2×2 transfer matrix, the matrix elements of which may be arbitrarily tuned subject to a unitarity constraint (apart from a common phase factor which may remain fixed, or vary in a particular deterministic relationship with the other tuned parameters). FIG. 16 is an example of a VOA-MZM. VOA stands for Variable Optical Attenuator. This is essentially an MZM with a pair of VOAs inserted in the two MZM branches. With the two VOAs incorporated (to actuate the $\alpha_A$ parameter of the MZM by the joint setting of the two VOAs), the resulting overall 2:2 MC may in principle attain perfect extinction at a selected output port (when exciting the overall 2:2 at just one input port) by tuning the two VOAs in opposite directions (reducing attenuation in one VOA while increasing attenuation in the other one, or viceversa) while monitoring the optical power of the selected output ports for its "level of extinction", i.e., minimizing the power at that port by means of tuning the φ-phase essentially minimizing the output power at the selected port over the space of the two parameters φ and $\alpha_A$. Both VOAs are needed when we do not know the sense of the built-in loss asymmetry. In practice we may start by tuning φ for minimal output power, then hold φ fixed and tune α by means of 'push-pull' tuning of the VOAs, and iterate until converging to a minimum (ideally zero) power.

Any state-of-the-art VOA may be used, e.g. for improving an integrated optics MZM structure we may insert electro-absorptive modulators in the two phase modulation paths of the MZM.

We also note that VOA impairments such as non-pure amplitude attenuation (by which we mean that the variable attenuation is accompanied by variable phase modulation) may be counteracted by the phase shift errors that were introduced in the two arms.

In a preferred embodiment we may use MZMs for the two VOAs as well. Thus, we end up with a "recursive-MZM" type of structure—the 'MZM-with-VOA MZMs' preferred embodiment of FIG. 17—wherein in the two interfering paths of the "outer MZM", further to the two PMs we inserted two additional MZMs used as VOAs. This figure may then be viewed as a special case embodiment of the VOA-MZM of FIG. 18, with the VOA also implemented here as an MZM. Thus, we have here a pair of inner MZMs and the outer MZM.

We note that the presence of mild impairments in the two "VOA-MZMs", in particular their finite extinction ratios, would not typically matter for nulling out, in principle, the extinction ratio of the overall 2:2 MC. This is due to the amplitude attenuation factor of MZMs (used as VOAs here) being monotonic functions on some phase sub-domains, hence being tunable in either desired direction (increase or decrease). Moreover, any variable phase shifts accompanying the variable attenuations of the VOAs (e.g. "chirp" of the MZMs used as VOAs) may be counteracted by tuning the two phases of the two PMs, as the VOAs are varied.

To recap, the advantage of these two embodiments of "enhanced MZM" beyond a plain MZM, is that the extinction ratios of these improved devices may be brought down to negligible or at least reduced levels by proper tuning of the two VOAs and the two phase shift errs in the outer MZM branches. These two disclosed embodiments VOA-MZM and its special case, the MZM-with-VOA-MZMs are useful high-precision BBs for multiple applications.

However, our main application here for VOA-MZM (in the context of MPoDACs, though for other applications as well), is to have the VOA-MZMs implement high-precision Phase-Gates (PG) or Intensity-Gates (IG). The VOA-MZM and MZM-with-VOA-MZMs devices disclosed above, may readily be driven electrically to realize either a PG or an IG, since the transfer factor characteristic of any properly tuned VOA-MZM is essentially that of a conventional MZM (in fact, the VOA-MZM realizes a better approximation of the ideal model of an MZM, since the extinction ratio is brought down to negligible levels by proper tuning of the two VOAs and the two phase shift errs in the outer MZM branches).

To realize improved PG or IG we have two alternative embodiments:

(i) A fast-modulated MZM, albeit with the simple fixed 1:2 splitter and 2:1 combiner replaced by a pair of VOA-MZMs, in particular by a pair of MZM-with-VOA-MZMs. See FIG. 18.

(ii) (ii) A VOA-MZM with fast phase modulators inserted in the two arms. See FIG. 19 for this embodiment II.

These two disclosed devices may then be viewed as fast-modulated-MZMs with enhanced precision (with the ability to have their extinction ratio further tuned out, reduced). To run these devices as chirp-free, the first condition is to bias the outer MZM to generate null field when the differential voltage is null. The second condition is to use antipodal push-pull drives which introduced the MZM-based chirp-free PG and IG.

FIG. 21 is an example of an Optical Signal Processor (OSP) that as cascade of MZM-of-VOA-MZMs BBs (with redundant 2:2 MCs eliminated as explained in the text. An application of this OSP is as a precision variable 2×2 MIMO matrix with endless tracking. Due to its complexity this photonic structure is to be typically implemented as a Photonic integrated Circuit (PIC) device.

This compound structure essentially cascades a chain of VOA-MZMs (actually VOA-MZMs of the MZM-with-VOA-MZMs type of FIG. 17) in order to obtain a high-precision 2×2 MIMO block. Note that in this disclosed implementation of the cascade of VOA-MZM stages we made the following modification: when the N-th VOA-MZM is followed by the N+1-th VOA-MZM, then either the output side 2:2 combiner of the N-th stage or the input side 2:2 splitter of the N+1-st stage is discarded from the chain (it suffices to retain just one of these 2:2 MCs. Thus, the chain consists of: VOAs→phase-shifters→2:2_MC→ VOAs→phase-shifters→2:2_MC→VOAs→phase-shifters→2:2MC→ . . . .

At the end of the chain we add, following the last 2:2 MC, an extra pair of phase shifters. An advantage of this cascade (besides its very low extinction ratio) is that since there is redundancy in having multiple VOA-MZMs, therefore it is possible to adjust the settings of the phase parameters of the individual stages such as to achieve endless tracking of any target 2:2 MIMO transfer matrix, without experiencing resets of the voltage drivers at the edges of the voltage ranges of the drivers, in case the phases need to evolve monotonically in one direction over multiple successive spans of $2\pi$.

FIG. 22 is an example of 3:3 and 4:4 Mode Converters, implementing 4×4 and 3×3 optical MIMO, constructed out of VAR 2:2 MCs BBs, as per Reck's work. The 2:2 MCs may be variously implemented in prior art as tunable 2:2 MZMs. To obtain higher precision and more tunability (realization of arbitrary MIMO matrices, not necessarily unitary) the 2:2 MC BBs may be taken as VOA MZMs (MZM-with-VOA-MZMs in particular) as disclosed above.

Improved accuracy arbitrarily programmable S:S MC building blocks may be realized by using variable 2:2 MCs based on VOA-enhanced MZMs.

In FIG. 23 our disclosed variable 4×4 optical MIMO matrix, unitary or non-unitary (tunable 4:4 MC), albeit with just some of the 4:4 ports used, may be constructed as a mesh of 2:2 VOA-MZMs BB (and in turn the VOAs may be realized as MZMs inside each of the VOA-MZMs BBs).

Such arbitrarily variable high-precision SxS optical matrices may be used in quantum photonics or all-optical MIMO equalization for example. We may also use them as the starting point for realizing ultra-high-precision 1:S splitters and S:1 combiners, see next. Finally, improved 2:2 MC may be used to make improved extinction high-speed MZMs.

Tunable 1:S Splitters and S:1 Combiners as Meshes of Arbitrarily Tunable 2:2 MC BBs Evidently, tunable S:S MCs could be reduced to S:1 and 1:S MCs (combiners and splitters). However, it would be wasteful to fabricate full S:S MC and then not excite S−1 input ports upon realizing a multiport splitter, and likewise it would be useful to provide for S−1 output ports which are not used. Thus, a simplification of the original S:S MC full structure is possible, by removing all internal building blocks which solely participate in processing light from unused input ports or feeding unused output ports. Thus, we may remove some of 2:2 MCs of the full S:S MC used as 1:S splitter (remove those directly connected to unused inputs as well as additional ones downstream connected to the those directly connected to unused inputs), and likewise re the unused outputs when a full S:S MC is used as a combiner. Efficient realizations of variable 1:S and variable S:1 modules may be conceptually generated by starting with a S:S and deleting the unused 2:2 MCs that are directly or indirectly fully connected to the unused ports. The resulting 1:S and S:1 structures, efficiently realized out of 2:2 BBs, are shown in FIG. 23 per the Reck structure and in bottom row for S=3 and S=4 (1:3 and 1:4 splitters and 3:1 and 4:1 combiners).

FIG. 24 illustrates an example of a 3-bit BiWgt MPoDAC (both the DD and COH versions) using a VAR 1:3 splitter and a VAR 3:1 combiner just as in the last figure. The difference between DD and COH is the nature of the 1-bit gates (OOK IG vs BPSK PG). The 1:S and S:1 splitter and combiner Reck-based embodiment exemplified for S=3 in the bottom row of FIG. 23), are incorporated in our 3-bit BiWgt PAM8 DD and COH MPoDACs in FIG. 24. Evidently, this may be extended for any S. Here we use the Reck structures for the 1:S and S:1. In the next subsection we disclosed some alternative structures for the 1:S, S:1.

Tunable 1S Splitters and S:1 Combiners Based on the "Tree" Structure

Here we disclose a generic mesh of variable 2:2 MCs structure capable of implementing a variable 1:S splitter or a variable S:1 combiner. We shall describe the generic 1:S splitter, since, by reciprocity, the S:1 combiner is essentially obtained from the same structure traversed in reverse. Four examples are described in FIG. 25 and FIG. 26, wherein we start from a single 2:2 MC used as a 1:2 splitter and successively generate several alternative 1:3, 1:4 and 1:5 structures. To construct a 1:S splitter the idea is to array the 2:2 BBs in a tree structure and start traversing the tree from the root towards the leaves aiming to have S distinct trajectories, ending in precisely S different leaves. There are multiple tree structures ending in S leaves, but some of them topologically (identical to others, while the others are mutually distinct. For the case of S=3, all the ways are topologically equivalent to the VAR 1:3 splitter shown in FIG. 23. However, for S=4 we have two classes, one equivalent to the VAR 1:4 splitter shown in FIG. 23(made out of two VAR 2:2 MCs), while the other class consists of the symmetric tree solution shown in FIG. 24 (right). Both structures utilize three VAR 2:2 MC building blocks, but VAR 1:4 splitter II solution (FIG. 25 (right)), which we disclose, has the advantage of "uniform depth". The total loss through the VAR 1:4 SPLITTER II is the same along all four lightpaths leading from the input to the four outputs—which is not the case with the VAR 1:4 SPLITTER I solution (FIG. 25 (left)), which features non-uniform losses from the root to the four leaves (output ports). The lightpaths leading to the upper port has the highest losses. In fact, ordering the output ports from the bottom up, we have increasing loss.

As for S=5, i.e. 1:5 splitters (see FIG. 26), as we need one more output relative to the 1:4 splitter, we may simply append a 2:2 on either one of the four outputs of the schemes in FIG. 25. It then seems that are a total of 8 different ways for it, but they fall into 4 topological equivalence classes, one representative for each of which is shown in FIG. 26. The first representative(upper left corner) is a Reck-based realization of the 1:5 splitter, essentially obtained by appending the 2:2 to the upper port of VAR 1:4 splitter I. The next appending the 2:2 to port #3 of VAR 1:4 splitter I, is topologically equivalent to the first one. The next two representatives are distinct. Then we proceed to place a 2:2 in turn onto one of the four outputs of VAR 1:4 splitter II. Here due to the symmetry all four ways are topologically equivalent, so they contribute a single representative. Specifying the proposed construction in generality, we start with a "root 2:2 MC", we use one of its inputs (which becomes the input of the 1:Sunder construction) leaving free the other input port of the 2:2. Onto the two outputs of the 2:2, we either connect one of the inputs of another 2:2 or we just declare that output port of the 2:2 to be one of the output ports of the target 1:S. This procedure is recursively repeated, terminating it at any desired point. Once we add a new 2:2 onto one of the outputs of any interim 2:2, we may elect to use either both of its outputs or just one of its outputs as overall outputs of the target 1:S. Any outputs that are not allocated to the overall output are further split via new 2:2 and the process is repeated until we choose to terminate it.

The Sx1 power transfer matrix (a column) describing the tree-based 1:S splitter, is readily obtained by inspection. Its elements (power transfer factors from the input of the 1:S splitter to each of the splitter outputs, are the splitter taps, $W=[W_{S-1}, \ldots, W_1, W_0]$. Since the path through the tree, connecting the overall input port to any 1:S splitter output port, say the j-th one, is unique, we may follow this path in the diagram, list the field transfer factors through each of the traversed 2:2 MCs (or rather 1:2 splitters) and simply multiply these field transfer factors. The power transfer function from the input to the j-th output is the square of the corresponding field transfer factor, therefore it is also equal to the product of the power transfer function along the path from the input to the j-th output. As for the phase of the field transfer factor, we may sum up the phases of the field transfer factors through each of the 2:2 MCs along the path. Note that none of the splitter lightpaths from the input to any output are interfering, therefore, the determination of power proceeds independently of the phase, which is irrelevant in this case.

We now show how to synthesize any desired taps vector, W, i.e., design for any target power splitting ratio at the S outputs (subject to the unitarity constraint, assuming the splitter is lossless). As the 1:S splitter is made of 2:2 MC BBs, the design outcome is the determination of the individual 2:2 power splitting ratios (their phase shifts are irrelevant). Let us assume the input power into the root 2:2 MC of the lossless 1:S splitter is unity. In this case the specified taps $W_{S-1}, \ldots, W_1, W_0$ coincide with the optical powers at the 1:S splitter outputs. The idea is to utilize the conservation of power, working our way from the output backward to the input, tracing in reverse the forward flow of power. The proposed methodology for designing any tree-based 1:S splitter (composed of 1:2 MCs) is to propagate the specified output powers, $W_{S-1}, \ldots, W_1, W_0$, s.t. $W_{S-1}+ \ldots, W_1+W_0=1$, back to the inputs of any of the 1:2 splitters encountered in the backpropagation processes, "collecting powers" this way until we reach the root of the tree, where we should have unity power. When done, we will have evaluated the powers at all the I/O ports of all the splitters. Thus, power at the beginning and end of each branch in the tree is known, therefore the splitting ratios of each 1:2 are readily formulated as ratios of output to input power of each branch. This construction establishes that any tree-based 1:S splitter design (based on 1:2 tunable splitters) is in principle realizable—there is always a solution.

We shall present two examples, which are readily generalized to any 1:S splitter realized as a tree of 1:2 splitter BBs. The first S=4 example is the symmetric tree structure of the VAR 1:4 splitters of FIG. 25(right). FIG. 27A is the tree schematic corresponding to FIG. 25(right). The 1:2 splitter at the root has power splitting ratios $[X_{root}, \overline{X}_{root}]$ where the bar notation means here $\overline{X}_{root} \equiv 1-X_{root}$. The two following 1:2 splitters are denoted $[X_{23}, \overline{X}_{23}]$ and $[X_{01}, \overline{X}_{01}]$(here the double index labeling designates the pair of output ports of the overall 1:4 that are fed by of each of these two splitters).

FIG. 27B i a tree block diagrams of 1:4 splitter embodiments, enabling evaluation of the X-taps—the splitting ratios of the constituent 1:2 splitter building blocks given target taps W0,W1,W2,W3: (left): VAR 1:4 SPLITTER I tree schematic. (right): VAR 1:4 SPLITTER II tree schematic.

Thus, all the 1:2 splitting ratios (the X-taps) are marked on the arrows. The backpropagated powers (expressed in terms of the W-taps) are then added up and marked in FIGS. 27A and 27B at each of the tree nodes. The X-taps, i.e., the 6 splitting ratios of the three 1:2 splitter BBs are then readily written as ratios of the powers listed at the output and input nodes of each branch:

$$X_{root} = W_2 + W_3, \; \overline{X}_{root} = W_{10} + W_1, \; X_{23} = \frac{W_3}{W_2 + W_3},$$

$$\overline{X}_{23} = \frac{W_2}{W_2 + W_3}, \; X_{10} = \frac{W_1}{W_0 + W_1}, \; \overline{X}_{10} = \frac{W_0}{W_0 + W_1}$$

Next consider the asymmetric tree Reck-like design, VAR 1:4 splitter II of FIG. 25(left). FIG. 27A is the tree schematic corresponding to FIG. 25 (left), again denoting the 1:2 splitter at the root as$[X_{root}, \overline{X}_{root}]$ The two following 1:2 splitters are denoted $[X_{123}, \dot{X}_{123}]$ and $[X_{23}, \dot{X}_{23}]$(the subscripts refer to the indexes of all the output nodes that may be reached via the two branches of each of these 1:2 splitters). Backpropagating the W-powers, we obtain the node powers. The ratio of node powers at the output and input of each branch again yields the X-taps, i.e. the 6 splitting ratios of the three 1:2 splitter BBs:

$$X_{root} = W_1 + W_2 + W_3, \overline{X}_{root} = W_0, X_{123} = \frac{W_2 + W_3}{W_1 + W_2 + W_3},$$

$$\overline{X}_{123} = \frac{W_1}{W_1 + W_2 + W_3}, X_{23} = \frac{W_3}{W_2 + W_3}, \overline{X}_{23} = \frac{W_2}{W_2 + W_3}$$

As for S:1 combiners, those are the reciprocal duals of 1:S splitters, hence given the task of combining S beams with power combining taps,
$U_{S-1}, \ldots, U_1, U_0$, s.t. $U_{S-1} + \ldots, U_1 + U_0 = 1$, we view the system as a reverse flow splitting power rather than combining it, and perform the design as if we have splitter rather than a combiner—the W-taps resulting from such equivalent designs are then assigned as the desired U-taps of the combiner.

For any of our disclosed MPoDACs, the procedures above then map any specified taps vector, $W=[W_{S-1}, \ldots, W_1, W_0]$, of the 1:S splitter and any specified taps vector of the S:1 combiner, $U \equiv [U_{S-1}, \ldots, U_1, U_0]$, into the splitting ratios (X-taps) required to be set for each of the constituents 2:2 MC BBs of the splitter and combiner. The proviso is that the splitter and combiner are realized as trees of 2:2 MC BBs.

The key structural difference between the COH and DD cases is in the nature of the gates fanning the light into and out of the parallel paths. In the COH case we have seen that phase gates (BPSK modulators) are used, whereas for DD we shall have the phase gates replaced by intensity gates (OOK modulators). In this case, we may optimize the oDAC parameters for best performance and show that perfect linearity and zero intrinsic modulation-loss of the MPoDAC are no longer possible. The objective is to maximize performance of the various disclosed MPoDACs over their design parameters, for optimal performance. Once we are done, it will become apparent that for DD applications, comparison between the MPoDAC and the SEMZM is no longer clear-cut (as it was for COH applications), since each of the two alternative oDAC approaches (parallel vs. serial) features advantages and disadvantages. The decision which solution be preferred will be seen to depend on the balance of all the performance factors and all technology options w.r.t. the two alternatives. We shall see that adoption of modern photonic technology options such as plasmonic modulation and optical amplification makes the MPoDAC more favorable, leveraging more benefit than SEMZM when all the engineering tradeoffs are considered Optimization of DD BiWgt 2-MP oDAC as PAM4 DD constellation generator Constellation Distance Optimization In terms of optimization criterion, it is the max-full-scale equi-spaced constellation that has the maximal minimum distance, out of all possible constellations of the DD type.

Thus, as measure of performance for synthesizable constellations, we shall adopt the minimum distance of the constellation, i.e. the least of the C−1 Nearest Neighbor (NN) distances between adjacent pairs of constellation levels in the optical power domain. We wish to maximize this worst-case distance, i.e. we adopt a optimization criterion, to be used for all our disclosed DD MPoDACs. Our distance optimization strategy for DD MPoDACs effectively aims to get as close as possible to the upper bound on distance (equal to ⅓ for a PAM4 DD max-full-scale equi-spaced constellation). It should be noted that for the COH MPoDACs this optimization criterion is not generally necessary as we have already disclosed the optimal binary weighted designs attaining "perfect" generation of equi-spaced constellations.

For our DD MPoDAC designs, the distance criterion will turn out to lead to a quadratic programming problem with linear (equality and inequality) constraints).

The case of the DD 2MP (PAM4) optimization, derived below, is technologically important, as it is the simplest MPoDAC to realize (as it has just two parallel paths) while maximizing highest relative benefit in data rate (doubling spectral efficiency) w.r.t. the incumbent single-bit DD modulation technology that is based on OOK modulators. The DD 2MP photonic structure simply combines two such OOK modulators (aka 'intensity gates') in parallel, to generate an imperfect PAM4 constellation in the optical domain, and we aim here to make it "least imperfect", by judicious design of the MPoDAC parameters.

We derive here the optimal operating parameters for the 2MP oDAC for its operation as DD PAM4 generator, based on the distance optimization criterion.

Our generic MP2 structure consists, at its top level, FIG. 28 of a pair of OOK modulators (MOD) aka intensity gates, 'sandwiched' between a 2×2 variable splitter and a 2×2 variable combiner. Any method of electro-optical on-off switching may be used for the Intensity Gates (OOK MODs). Two particular embodiments of the OOK intensity-gates consist of either EAM or as MZM. When the MZM is used as intensity-gate, it is to be biased such that it emit no light at null differential drive voltage, and is switched from unmodulated null output state to an amplitude level, which for full scale would ideally equal unity (in the absence of excess losses and modulation backoff). As the quasi-static phase-shifts in the two arms are always antipodal, their sum is zero at all times (except if there are any drive imbalances during the state transients), thus no chirp is generated in any individual modulator, though chirp may still be generated by coherently combining the modulator paths via the splitter and combiner 'sandwiching' the two parallel paths.

The 2MP-DD, feeds the two parallel paths though a fixed adjustable (tunable) splitter (the 2:2 MC with one input port left free) and recombines them via a combiner (2:2 MC with one output port left free), the joint settings of which determine the binary weights (referred to as taps) with which the three modulation paths phase bias path are combined. To control the generated 8-point 1D constellation the taps values must be accurately set. In addition to the 1:2 splitter and 2:1 combiner inserted in at least one of the two paths slow phase modulators (PM) to control the relative phases between the 1:2 outputs and/or the 2:1 inputs, to enable coherently superposing the three paths, in phase in our preferred embodiment (the phase modulations in the three paths may also be an inherent feature of the splitter and/or combiner). The joint action of the splitter, phase modulators and combiner, referred to as coherentfan-out/fan-in may be adjusted at relatively slow rate (~Hz to ~kHz) for precise tuning of split/combine ratios and phase alignments and appropriate control are evidently essential enablers for this multi-parallel oDAC architecture.

Evidently, to control the generated 4-point 1D constellation, the taps values should be relatively accurately set. To this end, at least one slow phase modulator (PM) is to be provided to control the relative phases between the two paths, to enable coherently superposing them in definite relative phase relations. In most of our embodiments we combine the two paths 'in phase', $\psi=0$. As seen in FIG. 28, slow phase-shifter(s) aka phase modulators (PM) are to be provisioned in at least one of the waveguide paths in between the splitter and combiner (the figure provisioned slow PMs in both paths—when a single slow phase modulator is used its phase swing must be double than that of the pair of slow phase modulators driven in push-pull). Equivalently, slow PMs may be placed at the outputs of the splitter or the inputs of the combiner or within both arms of the MZMs.

To recap, the optimal matched taps in an PAM4 DD design are $$(\hat{W}_1, \hat{W}_0) = (\hat{U}_1, \hat{U}_0) =$$
$$(1 - \hat{U}, \hat{U}) = (1 - (\sqrt{2} - 1), \sqrt{2} - 1) = (2 - \sqrt{2}, \sqrt{2} - 1) = (0.586, 0.414)$$

A Suboptimal Embodiment for Equi-Spaced DD 2MP PAM4 Constellation Generation

A suboptimal design may generate an equi-spaced DD PAM4 constellation with the same distance $$\hat{d}^{pref}_{maximin-dist} = \hat{d}_1 = d_2 = 3 - 2\sqrt{2} = 0.172$$

as our preferred optimal design, however in this new design all three NN distances are equal $3-2\hat{2}=0.172$. Heretofore we needed to have both the 1:2 splitter and 2:1 combiner tunable in order to set the optimal values—in our optimal preferred DD PAM4 design as well as for our equi-spaced DD PAM4 design. Both designs were seen to require matched splitter and combiner, set to a particular (irrational number) tap value, $\hat{W}^{Pref}=\hat{U}^{pref}=\sqrt{2}-1=\hat{W}^{equi}=\hat{U}^{equi}$.

Attaining accurate particular values for a splitter or combiner tap and maintaining them steady, generally requires tunable taps and a calibration and/or control electro-optic subsystem (tuning and control electronic circuitry, electro-optic phase actuation methods, optical monitor points etc.). Such tunability of splitter/combiner taps is evidently a more complex than the alternative of using either a fixed splitter (and variable combiner) or a fixed combiner (and variable splitter) ("fixed" means static, non-tunable, fabricated aiming to attain a prescribed splitting ratio). The problem with fixed splitters or combiners is that they are hard to trim in fabrication, in order to attain the prescribed splitting or combining power ratio. Moreover the power splitting/combining ratio (the tap) may display environmental dependence (vary over temperature and mechanical stress). Nevertheless, one particular value of fixed splitter (or combiner) which is more readily attained and retained is the tap value ½ i.e. '50-50' MC used for either splitting or combining, e.g. a Multi-Mode-Interference (MMI) device, tending to attain 50-50 stable operation by virtue of its structural symmetry. It is useful to explore whether one of the two tunable MCs of the MPoDAC, be it the splitter or the combiner may be replaced by a simple 50-50, without substantially degrading performance. This is idea behind our following disclosed embodiment referred to as '50-50 2MP DD' replacing either the splitter or the combiner in our original preferred design by a simple 50-50 splitter and combiner, then returning to optimize performance over the remaining tunable MC.

We disclose the following lower complexity suboptimal design parameters for of DD PAM4 MPoDAC structure with fixed splitter or combiner, in two flavors: using either a 50-50 splitter and a tunable optimized combiner or a tunable optimized splitter and a 50-50 combiner. In fact, the block diagrams for these two cases (not shown) may be readily obtained as a modification of FIG. 28, taking either the splitter or the combiner to be a FIXED 2:2 MC rather than a VAR 2:2 MC. Alternatively we may take the circuits of FIG. 13 or 14 and use the MZMs as Intensity Gates (IG, i.e., OOK modulators) rather than Phase Gates (PG, i.e., BPSK modulators) in the COH case.

Both design flavors are disclosed to use null relative phase between the two optical paths, $\psi=0$. Our 50:50 DD PAM4 MP2 oDAC structure is reusable for coherent detection of bipolar PAM4

Another useful aspect of the '50:50 preferred' BiWgt 2MP oDAC design just introduced just above, is that the same photonic structure, setting one fixed 50:50 tap and null relative phase parameter, $$\left( W^{50-50} = \frac{1}{2}, U, \psi^{50-50} = 0 \right),$$

is reusable in a sub-optimal (though nearly optimal) design for coherent detection as well (provided that U is reoptimized for COH operation).

As we successively go through the four codewords ($b_1[c]$, $b_0[c]) \in \{(0,0), (0,1), (1,0), (1,1)\}$, the expression $$\frac{b_1[c] + 2b_0[c]}{3}$$

cycles through the four equi-spaced values $$\left[ -1, -\frac{1}{3}, -\frac{1}{3}, 1 \right].$$

Thus, we have generated an equi-spaced COH constellation, but not that it is not a max-full-scale one, since the $$\frac{3}{\sqrt{10}} = 0.948$$

factor in (315) (equal to −0.23 dB) scales the constellation down from max-full-scale $$(FS = 2) \text{ to } \frac{6}{\sqrt{10}} = 1.9$$

(again a loss of −0.23 dB in the FS and in the distance).

A common physical embodiment, based on a pair of parallel MZMs, with a 50:50 splitter and a variable (tunable) combiner set to either ½:⅔ or ⅕:⅘ respectively, may dually serve both 2MP DD and 2MP COH generation of PAM4 or bipolar PAM4.

3-bit BiWgt MPoDAC PAM8 direct-detection constellation generator (3MP-DD) We disclose a BiWgt 3MP oDAC structure at 3 bit resolution, optimizing it as PAM8 generator for direct-detection. Its photonic architecture is the multiparallel one assumed for all our MPoDACs heretofore, specialized to 1:3→3path→3:1 i.e. using S=B=3 bits and paths to generate C=8 constellation levels, the optimization criterion for which is again the distance. The resulting DD PAM8 generator structure (see FIG. 24 (top)) along with its essential parameter settings is henceforth labeled as '3MP-DD'.

This figure, already presented in the context of the 1:S and S:1 splitter/combiner, is repeated in FIG. 31 for ready access here.

This 3MP-DD photonic structure is similar to the one disclosed for coherent detection, except that its three modulators in the three parallel paths are no longer 'phase-gates' (BPSK modulators) but are rather 'intensity gates' (OOK modulators). The three parallel paths are sandwiched between a fixed or preferably adjustable splitter (1:3) and combiner (3:1), the joint settings of which determine the binary weights (referred to as taps) with which the two modulation paths and the bias path are combined. Thus, to control and optimize the generated 8-point 1D constellation, the taps values must be accurately set (as usual with our MPoDAC disclosed designs). Compared with our 2MP-DD earlier disclosed photonic structure we just add a third parallel intensity gated path (now requiring to use 1:3 and 3:1 MCs). Apart from now having 3 parallel paths, the full structural and functional description of the 2MP-DD (which had 2 paths) applies here as well, including the remarks there concerning the phase and taps tuning control and calibration electronics. In particular, least two of the three paths should be equipped with phase modulators (PM) to control the relative phases between the 1:3 outputs and/or the 3:1 inputs, to enable coherently superposing the three paths, in phase. The coherentfan-out/fan-in technology for slow (~kHz rate) precise tuning of split/combine ratios and phase alignments and appropriate control are evidently essential enablers for this multi-parallel oDAC architecture. The techniques of the patent application [43] may be used in order to calibrate and stabilize the coherent fan-out/fan-in.

Once the relative phase-shifts between the paths are set to have all three paths coherently superposed in phase (i.e the common phases of each of the three paths are maintained equal), the field domain taps effectively become real-valued, given by $\{\sqrt{W_0}, \sqrt{W_1}, \sqrt{W_2}\}$ for the splitter (1:3) and $\{\sqrt{U_0}, \sqrt{U_1}, \sqrt{U_2}\}$ for the combiner (3:1) (wherein the W-s and U-s denote the power-domain taps, hence the square root). The taps are adjustable by tuning the 1:3 and 3:1 modules, enabling to adjust the splitting/combining ratios of either the 1:3 or 3:1 modules or both. In case the MC (splitter or combiner) is not tunable, it should be fabricated to high precision, trimmed to the correct fixed target values and device temperature might need to be stabilized.
Deriving the Power-Distances Vector for the Constellation Yields $$d^{3MP-DD} = \{W_0^2, W_1^2 - W_0^2, (1 - W_0)(1 - W_0 - 2W_1), 2W_0 + 2W_1 - 1,$$

$$(1 + W_0)(1 - W_0 - 2W_1), W_0^2 - (2 - W_1)W_1 - 2W_0, (2 - W_0)W_0\}$$

DD embedded-PAM4-3MP oDAC (2 bits over 3 paths)

One way of realizing a B-bit oDAC is to take a higher-order B+1 bits BiWgt oDAC with codeword length one unit higher than that of the target oDAC but "freeze" one of the bits of the higher-order oDAC (typically the frozen bit is the MSB or LSB)—"freezing" a bit means setting it to unity, while still letting the remaining B bits assume all bit combinations. This effectively amounts to a simplification of the optical structure: as the gate corresponding to the always-on bit always guides light, we might as well remove the 1-bit gate (the one associated with the frozen bit) in the corresponding path, which reduces to an unmodulated 'through' waveguide. We refer to this construction as "oDAC embedding". The investment in complexity accompanied with embedding (having B+1 rather than B paths, albeit one of them unmodulated, which requires 1:(B+1) and (B+1):1 splitter an combiner rather than 1:B and B:1) is warranted by improved performance of the DD MPoDAC.

We disclose here a similar concept of "SEMZM embedding": a BiWgt B-bit SEMZM may be realized with better performance by having it embedded in a B+1-bit BiWgt SEMZM, provided that one of its segments is frozen at fixed potential difference or equivalently a sub-wavelength difference in the two optical paths of the BiWgt SEMZM is structurally induced and optionally phase-bias stabilized. The differential phase of the extra fixed-bias segment or of the path differential also participates in the segment phase optimization along with the segment phases of the other B-bit actively switched segments. This construction, whether applied to SEMZM or to MPMZM generally tends to improve performance (increase the oDAC maximin distance and its NFOM figure of merit).

Back to the embedded MPoDAC, here is an exemplary disclosed embodiment of a DD-PAM4 optical generator: A 2MP oDAC is embedded within a 3MP one. In this case, we start with a 3-way oDAC block diagram (the 3MP photonic structure discussed in the last section, but without committing to the taps optimization carried out there) and consider effectively setting to unity one bit out of the three bits of the 3MP oDAC, by modifying the diagram to have the corresponding 1-bit modulating gate removed, leaving a free waveguide for that path. E.g, let us set $b_2=1$ (while still having $W_2>0$, with $W_2$ optimized in the sequel).

FIGS. 34A and 34B provide a comparison of DD PAM4 generation options with BiWgt 2-bit MPoDACs (adding our embedded PAM4-DD-MP to the design options already presented in FIG. 30).

In the examples of FIGS. 34A and 34B we may give up on the constraint of zero extinction ratio (null LSB level). However, in so doing we actually gain in the maxi-min distance. The tradeoff here is between extinction and minimal distance performance.

We now show a remarkable property of embedded MPoDACs: it is possible to operate an embedded B-bit BiWgt DD MPoDAC with a COH code rather than with its original DD code, attaining identical performance to that attained with the original code. This property may be useful in some situations, e.g. to make this type of oDAC reprogrammable, reconfiguring at will between COH and DD transmission.
Simplified Variant of PAM4-DD-3MP-Embedded Based on a Fixed 50:50 Splitter Referring to FIG. 35—the CW path is the MSB path (the top unmodulated path of the three parallel paths of FIG. 35), its-bit effectively set to unity, being fed 42.5% of the input light power. This suggests that a simpler somewhat suboptimal design would feed 50% of the light to the CW path (the top one), leaving 50% to be partitioned between the lower two paths. The 50% light splitting would be generated by a fixed 50:50 splitter one output of which would feed the CW path, while the other 50%-50% splitter output would feed another variable splitter, the two taps of which would be optimized to yield the optimal (given the 50-50 splitting) maximin distance performance. At the other side, for matched taps, we would use a combiner-structure which is a mirror image of the splitters-structure (comprising a variable combiner followed by a 50%-50% combiner).

Converting the Data-Unmodulator Bias Path of the Embedded MPoDAC into a Slow Pilot Injector Finally, we disclose that we may take advantage of the 'bias path' i.e. the path that does not comprise a high-speed IG, in order to insert into that path a relatively slow phase modulator or amplitude modulator for the purpose of injecting a pilot tone which may assist in the calibration and control of the embedded MPoDAC. The slow phase modulator may be for example a thermo-optic or electro-optic modulator. The slow amplitude modulator may be an MZM biased half wave between its on and off states.

Both of these modulator types may be driven by and driven by a low amplitude sinusoidal tones or superpositions thereof.

Non-Binary-Weighted MPoDAC Designs

Binary-weighted (BiWgt) MPoDACs were seen to have their number of parallel paths, S, equal to $\log_2 C \equiv B$, the intrinsic number of bits associated with the oDAC code. We disclose here optical constellation generation based on non-binary-weighted (nonBiWgt) MPoDACs, are defined as having "more paths than intrinsic bits":

nonBiWgt oDAC: $S > \log_2 C \equiv B \Leftrightarrow 2^S > C$.

The nonBiWgt structure comprises "as usual" in our embodiments, a 1:C splitter feeding S=C−1 parallel paths, followed by superposing the paths back by means of a C:1 combiner. Unlike in BiWgt oDACs relatiombetween C and B is no longer $C=2^B$ but rather $2^S > C > 2^B$. The new feature here is the provision of an excess multiplicity of parallel paths such that S will always exceed $\log_2 C \equiv B$, (we recall that B is the minimum number of bits needed to represent C, i.e. for all ThWgt MP oDACs we have $S > \log_2 C \equiv B$ (while for the BiWgt oDACs family we had $S = \log_2 C \equiv B$). nonBiWgt MPoDACs are seen to provide a "larger than needed" multiplicity, S, of parallel paths. As each path comprises an intensity gate (for DD), driven by one bit, the actual numbers of driving bits is also S—seen to exceed the minimum needed number of bits B. As we use "more bits than needed" in each of its C binary codewords of length C, with $2^B < C < 2^S$, we may, in principle, adopt any subset of size C of "codewords" out of the full collection of $2^S$ binary strings of S bits each. A design decision for any nonBiWgt oDAC (be it MPoDAC or SEMZM) is to select the oDAC code, i.e. the said collection of C codewords out of all possible $2^S$ possible codewords driving the S binary additive degrees of freedom of the oDAC.

We note that the input into any DAC (be eDAC or oDAC) almost always consists of $B \equiv \lceil \log_2 C \rceil$ binary lines (if the number of levels Cis an integer power-of-two, $C=2^B$) then the ceiling function may be dropped—we simply have $B \equiv \log_2 C$.

These B-bit-strings simply label each of the C levels of the DAC, "telling" it which level to generate. Each B-bit triplet should internally generate a unique S-bit codeword (with S>B). Taking an B-bit-string and generating a unique S-bit-string requires a digital logic implementation of a Boolean vector function, mapping B-bit words to S-bit words, to which we refer as the "B:S digital encoder" or "Bbit:Sbit mapper":

$$B:S \text{ encoder: } \{0, 1\}^B \to \{0, 1\}^S. \qquad (3)$$

It is apparent that upon transitioning from BiWgt to non-BiWgt MPoDACs we give up on the "Direct Binary Drive"

quality, as now the B bit words should be mapped into S bit words. The problem with the B:S mapper in ultra-fast DACs, is that its power consumption may be excessive, the more so the larger B and/or S are. This indicates that the BiWgt oDACs (be they MPoDACs or prior art SEMZMs) have an inherent advantage in energy efficiency. However, we have already seen that BiWgt oDACs display "oDAC nonlinearity" (interpreted in DAC terminology as deviation of the synthesized constellation (collection of analog output levels) from an ideal max-full-scale equi-spaced constellation. This nonlinearity may be alleviated by migrating from BiWgt MPoDACs to nonBiWgt ones, though as soon as S>B (even for S=B+1) we already need a B:S digital encoder, which degrades energy efficiency. However, for relatively small B and S and for modest increments of S above B (e.g., S=B+1 or S=B+2) the power consumption of the B:S digital encoder might be tolerable.

As a concrete example of nonBiWgt MPoDAC we may contemplate a 4:8 embedded oDAC, meaning B=3 bits, S=4 paths, $C=2^B=2^3=8$ levels. We note that a B=3 bits BiWgt MPoDAC to generate an 8-level constellation, C=8, was disclosed above using just S=B=3 levels, but here we add an extra bit to each codeword (which requires adding an extra path, having 4 paths rather than 3). We also note that with S=4 paths, had we opted for a BiWgt design we could have generated a $2^4=16$ level code, however in our nonBiWgt design, we are content with generating a $2^3=8$ level code. This means that we have to give up 8 levels out of the 16 level code, or equivalently select 8 levels out of 16, which best approximate our target 8-level constellation.

Thermometer-Weighted (ThWgt)C-Level MPoDACs Embodiments

In this section we disclose the structure and design of a Thermometer-Weighted (ThWgt) family of MPoDACs.

The ThWgt MPoDACs are a subset of the larger family of nonBiWgt MPoDACs. Thus, the number of paths S should satisfy (360)$S > \log_2 C \equiv B$. In fact, for a given number of constellation levels, C, the ThWgt MP oDAC for a size C constellation uses S=C−1 paths. The S=C−1 setting automatically satisfies the nonBiWgt condition, as the following identity is readily verified: $C-1 > \log_2 C \Leftrightarrow 2^{C-1} > C$, C=3, 4, 5, . . . .

Note that in ThWgt implementations it is not necessary to have C dyadic. Non-power-of-2 code sizes are allowed.

These design guidelines effectively specify the dimensions of the code matrix B, as being $C \times S = C \times (C-1)$ Exemplary Embodiment ThWgt MPoDAC for 4-level constellations; two parallel paths:

$$C = 4, S = C - 1 = 3 > \log_2 C = \log_2 4 = 2; B_{[4 \times 3]}^{ThWgt}.$$

3-level ThWgt MPoDAC with 2 paths:

$$C = 3, S = C - 1 = 2 > \log_2 C = \log_2 3 = 1.58; B_{[3 \times 2]}^{ThWgt}.$$

8-level ThWgt MPoDAC with 7 paths:

$$C = 8 \ S = C - 1 = 7 > \log_2 8 = 3; B_{[8 \times 7]}^{ThWgt}.$$

To complete the BiWgt family structural description, we should specify the Thermometer-Codes:

The ThWgt DD MPoDAC has C−1 paths and the code has size C. Its "ThCode matrix"

$$B^{ThWgt}_{[C\times(C-1)]}$$

is constructed as follows:

The c-th row of the matrix, c=1, 2, . . . , C, has its first c−1 elements 1, while the rest of the elements in the row (C-c of them) are zero (this implies that the top row is all-zero, while the bottom row is all-ones). An alternative description: Start with a lower triangular matrix (i.e. all ones on its diagonal and under it, all-zeros above it) and atop it append an all-zeros row. Examples:

$$B^{ThWgt}_{[4\times3]} = \begin{bmatrix} 0 & 0 & 0 \\ 1 & 0 & 0 \\ 1 & 1 & 0 \\ 1 & 1 & 1 \end{bmatrix}, B^{ThWgt}_{[3\times2]} = \begin{bmatrix} 0 & 0 \\ 1 & 0 \\ 1 & 1 \end{bmatrix} (362) \quad (4)$$

Here we also disclose alternative structures of ThCode matrices, obtained from basic ThWgt matrix structures described above.

One way to generate new ThCode matrices is to reverse the columns (last column becomes the first one, etc.). A more general way is to perform any permutation on the columns. Note that these operations preserve the first row (the all-zeroes one) and the last row (the all-ones one). More generally permutations of all rows possibly compounded by the previously mentioned transformations are also allowed. Note: beware that some of the reversible transformations (the ones including row permutations) require accompanying reversals or permutations of the W vector and/or the $F^{ThWgt}$ vector to generate meaningful solutions of the equation $$B^{ThWgt}_{[C\times(C-1)]}W = F^{ThWgt},$$

i.e. the two said vectors may no longer be monotonically ordered when the modified matrices are used. Yet another way of generating new ThWgt matrices is to start from any invertible matrix with elements {0,1}, provided that this matrix contains an all-ones row (not necessarily at the top or bottom of the invertible matrix).

If we retain just the matrices with the {1,1,1} row at the bottom, we get the following 18 matrices, any of which may be used as codes for ThWgt MPoDAC (and a solution is assured to exist for arbitrary constellation generation with each of them, since the lower 3×3 block obtained after removing the top all-zeros row, is an invertible matrix—the linear algebraic argument why the solution always exists for arbitrary constellation is made below for the "classical" ThCode $$B^{ThWgt}_{[4\times3]}$$

in (362) but the same argument pertains for any of the matrices below, all of which have their last three rows forming invertible sub-matrices—of FIG. 46).

All resulting matrix variants described above may be adopted as ThCodes and will exhibit, in principle, essentially identical performance. Now that we have specified the ThWgt MPoDACs, structurally, and stated a multitude of code variants, let us investigate the attainable performance and derive the optimal split/combine tap parameters. The key benefit of the C-level DD ThWgt MPoDAC (which has C−1 parallel paths) is its capability of generating any desirable max-full-scale C-level constellation, by judicious setting of its matched split/combine tap parameters. Thus, are no there are no max-full scale DD constellations (with C levels) that cannot be synthesized by the ThWgt MPoDAC with C−1 parallel paths. In particular, the max-full-scale C-level equi-space constellation is always attainable with a C−1 paths ThWgt MPoDAC.

An example of a target power-domain max-full-scale DD PAM4 constellation, $(P^{ThWgt})^T[P_1, P_2, P_3, P_4]^T$ is given by:

$$W^T(F_2, F_3) = [W_2, W_1, W_0]^T = \left[\sqrt{P_2}, \sqrt{P_3} - \sqrt{P_2}, 1 - \sqrt{P_3}\right]^T \quad (5)$$

The downside of ThWgt designs is that they are energy-inefficient and are have higher complexity, the more so the larger the code size (constellation size), C, is. The energy inefficiency stems from both the necessity of having a B:(C−1) bits digital encoder, as well as requiring multiple modulator drivers, S=C−1 of them, one for each parallel path. However, for low values of C, as disclosed here, these deficiencies would not typically place a heavy burden.

The 3-way 2-bit ThWgt PAM4 DD is presented in FIG. 36. To generate PAM4 DD, (C=4) with the ThWgt MPoDAC we require S=3 paths—to be compared with the corresponding BiWgt MPoDAC, which requires just S=$\log_2$ C=2paths. Therefore, by adding in just a single path to the BiWgt 2-path DD design, we attain inherently perfect linearity and maximal dynamic range (inherently generate equi-spaced max-full-scale operation). In contrast, the original BiWgt has its min-distance downgraded relative to a perfect constellation.

Note that the optical layout of the 3-way 2-bit ThWgt PAM4 DD embodiment introduced here (FIG. 36) is identical to that of the 3-bit (3-way) BiWgt PAM8 DD MPoDAC—both devices features 3 parallel paths, however the ThWgt generates just a 2-bit (PAM4 DD) constellation, whereas the BiWgt device generates a 3-bit constellation (PAM8 DD). What is gained with the ThWgt MPoDAC that constellation may be synthesized inherently perfectly, in particular a equi-spaced max-full-scale one.

In terms of added complexity, to enjoy the high accuracy of the ThWgt constellation, the original two-way structure needed for a BiWgt PAM-4 DD MPoDAC should be augmented by one more path. Moreover, the ThWgt PAM4 DD oDAC requires now 1:3 splitters and 3:1 combiners (rather than 2:1 and 1:2), and is also less energy-efficient since we have 3 modulators to drive rather than 2 of them, and the ThWgt design also requires the 2:3 digital encoder to map 2-bits (specifying PAM4) into 3-bits (to drive the three paths). Such encoder may be realized with a small number of digital gates, albeit hard to implement at ultra-high-speed for an ultra-fast oDAC.

The photonic layout of the ThWgt PAM4 (FIG. 36) is essentially identical to that FIG. 31 (the PAM8 DD BiWgt MPoDAC), but now we are able to generate a 'perfect' PAM4 DD constellation rather than a somewhat distorted PAM8 DD one. It is also worth comparing the ThWht DD-PAM4 design of FIG. 36 with that of FIG. 33 (the DD-PAM4-3MP-embedded oDAC). Both these oDAC designs generate PAM4, but the ThWgt option trades off having to use an electronic 2 bit:3 bit encoder in exchange for attaining a 'perfect' constellation, whereas the embedded DD-PAM4-3MP MPoDAC uses "Direct Binary Drive" of two bits, but has its constellation distorted.

MPoDACs Augmented by Other Photonic Technologies

MPoDACs with Internal (Semiconductor) Optical Amplification ((S)OA)

Optical modulators generally suffer from large excess losses. e.g. plasmonic modulators are highly useful for high modulation bandwidth and low drive voltages, but the downside is that they suffer from large modulation loss. Likewise, Silicon Photonic and Indium Phosphide (InP) based modulators may exhibit relatively large losses. Moreover, oDAC structures tend to further exacerbate modulation losses due to losses stemming from the oDAC structure.

Fortunately, MPoDACs turn out to be highly compatible with Optical Amplification (OA). In particular in integrated photonic MPoDAC structure, Semiconductor Optical Amplifiers (SOA) may be beneficially integrated (typically hybridly) in preferred configurations disclosed in this subsection. It turns out that combining MPoDACs with (S)OAs, in the way disclosed below, yields much improved performance than that delivered by combining SEMZM oDACs with SOA. We preview here that the reason is that the MPoDACs inherently enable accommodating SOAs internally at locations in the optical flow which are more amenable to improved tolerance to the patterning-effect impairments of SOAs, whereas no such locations exist in SEMZMs.

MPoDAC Patterning Effect Advantage

SOA patterning effect brief background: The SOA is a nonlinear element with memory [44]. The nonlinearity of the SOA is mainly due to carrier depletion induced saturation, whereas its memory is due to its finite carrier lifetime. The signal-dependent instantaneous gain of the saturated SOA results in non-Gaussian statistics at the output, and the finite memory of the SOA leads to bit patterning effects, thus resulting in "nonlinear", i.e., signal-dependent enhancement of the intersymbol interference (ISI), on top of the "linear" ISI enhancement stemming from fiber dispersion, optical and electrical filters. The bandwidth limitation in all-optical signal processing based on SOAs is attributed to the patterning effect in the output pulse sequence, namely the decay of amplitudes for subsequent mark bits. Patterning-free operation requires a full recovery of the carriers between subsequent pulses, i.e., the delay between two consecutive pulses has to be larger than the carrier recovery time of the SOA. Pattern effects result from long recovery times of gain and carrier induced phase change, inducing penalties due to the non-instantaneous recovery dynamics of the cross-phase and cross-gain modulation. The operating speed is limited by the recovery of the carrier density, which takes place on a time scale of typically 20-100 ps, and leads to patterning effects on the switched signal, which become detrimental at high bitrates. Patterning effects are manifested as having response to a bit depends on the prior sequence of bits, i.e. they generate a form of (non-linear) Inter-Symbol-Interference (ISI). For an Intensity Gate (OOK modulator) followed by a SOA the patterning effect is largest for a long sequence of 1's followed by a long sequence of 0's, or vice versa. The patterning effect is more pronounced for signals with large peak to average ratio, such as higher-order multilevel signal constellations. This indicates that generally multi-level oDACs may not be compatible (i.e. may not work well) with SOA. If a SOA is inserted externally, at the multi-level modulated output of any oDAC (be it conventional SEMZMs or our MPoDACs) considerable distortion is generated due to patterning effects induced in the SOA, given the relative high Peak-to-Average-Power Ratio (PAPR) of the multi-level constellation at the oDAC output.

SOA inserted intra-MPoDAC: Fortunately, the MPoDAC architecture (MPMZM in particular) enables an alternative to inserting SOAs not at the oDAC output—in MPoDACs, SOAs (or other OA types) may preferentially be inserted within each of the multiparallel optical paths (between the splitter and combiner corresponding ports), whereat the signals are ideally constant envelope BPSK, thus ideally free-of-patterning effects. Inside each path the SOA may be inserted either before or after each PG or IG MZM. To compensate for PG losses, an array of SOAs is most favorably inserted right at the outputs of each of the 1-bit gate array outputs or anywhere else between the 1-bit gates and the combiner inputs. The principle is to insert the SOAs before high PAPR is being generated by the combiner superposing the fields from the multiple incoming paths (since the patterning effect is lower for a low PAPR signal). See FIG. 37(*top*) for a generic COH MPoDAC wherein the PG array is implemented as an MZM array and the active gain array is inserted right thereafter. FIG. 37 (bottom) shows an exemplary embodiment of a 3-way MPMZM-with-SOA. This MPoDAC uses an array of three MZMs for the 1-bit gates (PGs for COH or IGs for DD) followed by an array of three SOAs. The VAR 1:3 splitter and VAR 3:1 combiner are implemented based on the Reck structure of 5.4.2, as a mesh of slow tunable MZM and PM building blocks, but other variable splitter/combiner implementations are possible.

To elaborate on the reduction of the patterning effect, once our COH MPoDACs are equipped with SOAs, the field waveform amplitude at the output of an IG (OOK modulator) varies rapidly during bit transitions. But for a PG, its BPSK modulated field has constant amplitude, except during the transients, which may be relatively brief for ultra-high-speed modulators (such as plasmonic modulators). Thus, SOA patterning effects may not be totally eliminated for a COH MPoDAC (which inserts a SOA to follow each BPSK PGs in each path), nevertheless, SOA patterning effects are greatly reduced (relative to a configuration having a SOA inserted at the multilevel signal output). Another way to quantify the low level of patterning is to note that BPSK signals (their switching transients included) exhibit the lowest Peak-to-Average-Power-Ratio (PAPR)—significantly lower than that of multilevel signals. Moreover, for our preferred embodiments of MPMZM which are based on ultrafast plasmonic MZMs, the durations of the level transients are even shorter than usual, further reducing the impact of the deleterious patterning effect. This discussion indicates that yet another advantage of our disclosed MPoDAC structures is their amenability to optical amplification with the patterning effect impairment substantially reduced. For sufficiently high SOA gain, SOA-MPoDACs may yield net modulation gain rather than just reduced net modulation loss. This advance, relative to the prior-art SEMZM oDAC technology (which is unable to exploit SOAs effectively due to patterning effects) is enabled by the multi-parallel oDAC structure, the only structure amenable to inserting the SOAs right at in the path of low PAPR optical components.

PAM4-DD MP3-embedded with SOA: It is also possible to insert SOAs following the Intensity Gates (OOK modulators) in a DD MPoDAC, but this is less advantageous (yet preferable over inserting the SOA to the output of the DD MPoDAC).

Despite the matched taps design having no intrinsic modulation loss, when it comes to using OA in MPoDACs, the reduction of intrinsic loss by matched taps yields a marginal benefit. It is preferable to adopt a fixed uniform splitter along with the SOA (in fact, in FIG. 37(top) we provisioned for this option when we labelled the 1:S splitter as either VAR or fixed). A fixed uniform fixed splitter assists the OA design by providing equal powers at the SOA inputs, which helps prevent SOA saturation when the optical levels at the splitter output are disparate in level due to the spread in the 1:S splitter taps values. The intrinsic modulation loss of the uniform design would typically be offset by the much larger SOA gain, which may even saturate to a fixed value when the input level into the SOA is not too low. Moreover, by giving up on variable splitter taps, we circumvent the need the calibration and control of the matched-taps MPoDAC design for both the splitter and combiner. In any case we still have to calibrate and control the combiner taps.

Plasmonic MZM based MPoDACs (MPMZMs)

Any of the MPoDACs embodiments disclosed in this work may be specifically realized as MPMZMs based on using plasmonic MZMs for their phase gates or intensity gates, as applicable.

Having mentioned the high optical loss of plasmonic MZMs, the rationale of our (S)OA-P-MZM embodiment is to mitigate the high modulation loss when plasmonic MZM 1-bit gates are used in our disclosed MPMZM oDACs, by also incorporated (S)OA gain, in order to compensate in this case for the excessive plasmonic modulation loss.

At the subsystem level, we propose embodiments jointly leveraging the three elements of Plasmonic Modulation, (S)OA and MPMZM oDACs. In particular, we disclose a (S)OA-Plasmonic-MPMZM ((S)OA-P-MZM) oDAC structure, which is an MPMZM with (semiconductor) optical amplifiers inserted after the plasmonic-MZM 1-bit gates in each of the parallel paths. FIG. 37 (bottom) may also be used, as is, to illustrate this embodiment (in the exemplary case of S=3, which may be readily extended to a different number of paths), with the proviso that the MZM modulators depicted in that figure are plasmonic ones.

Since >100 GHz bandwidth per each 1-bit gate will needed in next product generations of optical interconnects, plasmonic MZMs are beneficial to adopt as ultra-fast PGs at reasonable $V_\pi$, but would still be affected by quite high modulation loss (of the order of 8-12 dB) in the plasmonic active region. Alternatively, plasmonic MZMs may be designed with shorter electrodes, to reduce loss, albeit at the expense of increased drive power (fixed $V_\pi$-Length product).

Note 1: we have the (S) of SOA encircled in brackets as we may also consider future non-SOA based OAs such as in-waveguide optical amplification, to be inserted following the (plasmonic-)MZMs in each of the multi-parallel paths.

Note 2: The OAR-PG may be a more efficient alternative PG compound structure based on an MZM with optically amplified feedback. In that embodiment having the high-speed MZM be of the plasmonic type, would also be highly beneficial. However, in this subsection we assume for the PG or IG recurring building blocks in our MPoDAC, a simple conventional MZM (albeit realized with plasmonics). Nevertheless, whenever PGs are used, throughout this work, this section included, the more complex yet better performing OAR-PGs could be substituted for them.

MPMZM Tuning: Off-Line Calibration, Online Tracking Control

Our BiWgt MPMZM oDAC, uses B MZMs for a B-bits (PAM-$2^B$) constellations, thus requires no B:C encoder. The only required electronics a low-rate controller for calibration and real-time stabilization. Inherent to our opto-electronic architecture (for the BiWgt MPMZM as well as that of our other disclosed variants) is the relatively slow tuning of the splitter and combiner taps (which should have prescribed values for optimal performance, as extensively derived in this work for our multiple embodiments) as well as the tuning of the relative phases between the multi-parallel paths (which should be set and stabilized to null). A key advantage of our disclosed architecture is that the slow Calibration & Control electronic plane is totally decoupled from the ultra-high speed electrical data path—the voltages modulating the 1-bit gates according to the incoming codewords. Essentially, the MPMZM is offline- and online-tuned by adjusting the optical splitter and optical combiner settings at very slow speed (sub-Hz rates to mitigate temperature-induced drifts and up to KHz rates to counteract acoustically-induced disturbances), by means of calibration and control techniques. This inherent decoupling of the ultra-high-speed modulation vs the ultra-slow-speed calibration and control implies in our MPMZM oDAC architecture, enables high-precision calibration of the oDAC along with arbitrary reprogram ability of its (non)linear ("staircase") transfer function, which in principle may be perfectly linearized; alternatively it may be predistorted in any prescribed way to mitigate another nonlinearity in the transmission chain (though the BPSK MZM operation is inherently linear in our case).

To implement the Control & Calibration (C&C) of our MPMZM oDAC, we actuate multi-parametric control of multiple phase degrees of freedom ("phase knobs") in large-scale PICs, based on multi-parametric extremum-seeking control. In order to calibrate and track the photonic circuit of an MPMZM (e.g., the MPoDAC devices of FIGS. 7A-7C or many other similar figures in this work) we use monitor PDs as slow probes at any free output ports of the system (and if such free output ports are not available, then we optically tap the output or internal waveguide of interest, to syphon off a small fraction of the light to be photo detected at slow speed to be used as monitor point. C&C optimal actuation of K phase knobs is feasible by sensing far fewer than K optical monitor points by using the methodology of "extremum-seeking control". To "self-configure" the optimal split/combine ratios, we sense the photonic circuit state by injecting an optical pilots on the input or at other critical points in the photonic circuit, supplemented by weak orthogonal dithering at slow rates, additively applied into all Phase Modulator and MZM phase biases and synchronously detecting harmonic and inter-modulation products due to the individual or joint modulations at any of the slow and/or fast active modulation devices, using for the sensing of the harmonics and intermodulation, the PDs+ TIAs at any available monitor points (see above), performing synchronous detection using as electrical mixing references signals at the frequencies of the injected sinusoidal pilot tones.

QAM Generation by IQ-MPoDACs

Additional Building Blocks (BB) Arising in Vector (Complex, 2D, IQ) MPoDACs Quadrature Multiplexer (QMUX) BB The QMUX is defined here as a 2:1 module superposing two optical inputs in quadrature (FIG. 38A). One of the two inputs into the QMUX is shifted by $\pm\pi/2$ and then combined with the other input through a 2:1 50:50 combiner). The $\pm\pi/2$ phase-shift may be achieved by a single slow phase-shifter or a pair of them, or it may be structurally achieved by having one arm a quarter-wavelength longer or shorter than the other arms. The linear I/O model of the QMUX is a linear combination of the two inputs, with taps given by 1 and ±j: $Z(t)=I(t)\pm jQ(t)$. This linear combination of two signals, $I(t)$, $Q(t)$ will be referred to as "quadrature multiplexing". The $\pm\pi/2$ phase-shift may be achieved by a single slow phase-shifter or a pair of them, or it may be structurally achieved by having one arm a quarter-wavelength longer or shorter than the other arms.

FIG. 38A illustrates a Quadrature Multiplexer (QMUX) building block—linear I/O model. Bias electrodes (not shown) could be added to the two arms for phase stabilization. FIG. 38B illustrates a Prior-art QPSK modulator MOD, comprising on a pair of parallel PGs (BPSK modulators) feeding a QMUX.

QAM MPoDACs—Quadrature Modulation by a Pair of 1D COH PAM oDACs

A pair of COH 1D oDACs or may be used as In-phase and In-Quadrature (IQ) tributaries to generate a QAM modulated optical signal, in which both the amplitude and the phase of the light are varied from symbol to symbol. This is actually prior art. QAM generation by nesting pairs of IQ SEMZMs, to double spectral efficiency, was already demonstrated. Here we disclose in particular multiplexing pairs of our PAM MPoDACs to generate $2^{2B}$-QAM, for B=2,3,4, .... See FIG. 39 for a QAM generator based on nesting a pair of COH PAM-$2^B$ MPoDACs, by feeding the two MPoDACs into a QMUX (i.e., introducing 90° phase difference between the two COH PAM outputs prior to summing them up in a 50:50 combiner). The two subsystems used as IQ tributaries (namely those are our disclosed MPoDACs, not in their system-level IQ combining) are unique.

Thus, quadrature multiplexing of two PAM-$2^B$ constellation generators by means of a QMUX, generates a $2^{2B}$-QAM constellations (4QAM, 16QAM, 64QAM, 256QAM, .... As an example, for B=3, let us derive the transfer factor of a 64QAM generator based on quadrature-multiplexing two PAM8 COH constellations, generated using our disclosed 3-way MPoDACs with matched-taps design (assuming as usual that the splitters, combiners and phase-gate MZMs are lossless and we operate the MZM phase-gates in the two I and Q MPoDACs without backoff, i.e. treating the ideal case):

$$F_b^{64QAM-ours} = \frac{1}{4}\sum_{s=0}^{2}b_s^I W_s^I + j\frac{1}{4}\sum_{s=0}^{2}b_s^Q W_s^Q$$

$$= \frac{1}{4}\left[\frac{1}{7}\{-7,-5,-3,-1,1,2,5,7\}+\right.$$

$$\left. j\frac{1}{7}\{-7,-5,-3,-1,1,2,5,7\}\right]$$

where the subscript $$b \equiv \left(b_0^I, b_1^I, b_2^I, b_0^Q, b_1^Q, b_2^Q\right)$$

denotes the 6-vector (string) of bipolar (±1) bits driving the three PGs of the

I-MPoDAC and the three PGs of the Q-MPoDAC, and in last expression in (369) the sum of two sets of numbers is defined as an "outer sum" or "set sum": the set of all possible sums of elements from the first and second set. Thus, a 64QAM equi-spaced constellation is expressed as the "outer-sum" of two PAM-8 equi-spaced constellations along the I and Q complex plane axes.

The multiple factors of $$\frac{1}{\sqrt{2}}$$

occurring m the first equality above are accounted for as follows: The $$\frac{1}{\sqrt{2}}-s$$

preceding and following the two curly brackets are the IQ splitter and QMUX combiner transfer factors. The $$\frac{1}{\sqrt{2}}-s$$

preceding and following the two sums inside the curly brackets are the transfer factors of the 1:2 splitters and 2:1 combiners within the two paths internal to each of the two PAM-8 MPoDACs.

Note that the QAM constellation that may be generated this way are sized $2^{2B}$. In order to generate $2^{2B-1}$-QAM, B=2, 3, 4 . . . , i.e., 8QAM, 32QAM, 128QAM, 512QAM, . . . , we may use a $2^{2B}$-QAM generator (as disclosed above), but have its electrical driver system preceded by a digital encoder (different than the one referred to heretofore) to ban certain 1D symbol combinations in the two PAM-$2^B$ MPoDACs working in unison, thus providing the mapping from the integer index labeling each of the constellation symbols, $2^{2B-1}$ to the pair of indexes labeling the $2^B$ levels of individual I and Q PAM MPoDACs. In simple terms, to generate $2^{2B-1}$-QAM, certain combinations of levels of the two I and Q PAM MPoDACs (in fact, half of them) are removed. The IQ-multiplexing of a pair of PAM-C COH generators to form $C^2$-QAM is essentially known art. It follows that we may generate, in principle, using a pair of our MPoDAC tributaries, QAM constellations of any size (our novelty is in the usage of the two subsystems, not in their system-level IQ combining).

Moreover, we may combine multiple degrees of freedom of multiplexing MPoDAC-generated QAM signal tributaries, each generated out of pairs of MPoDACs. We may use Wavelength Division Multiplexing (WDM) and/or S patial Division Multiplexing (SDM) and/or Polarization Division Multiplexing (PDM) (also known as Dual Polarization Multiplexing (DPM), as exemplified in FIGS. 40A-40B for PDM-64QAM based on four nested 2-bit MPoDACs. We may also directly multiplex 1D MPoDAC-generated PAM signal tributaries (be they COH or DD) onto these multiplexing DOFs, e.g. modulate independent PAM-$2^B$ MPoDAC 1D constellations onto multiple CW subcarriers of different frequencies (FDM), or inject two independent PAM-$2^B$ MPoDAC 1D constellations onto the X and Y polarization components (PDM), or inject independent PAM-$2^B$ MPoDAC 1D constellations onto multiple cores of a multicore-fiber (SDM).

FIG. 40A discloses the PIC core architecture of a single carrier (CW laser fed) optical transmitter based on four PAM-$2^B$ tributaries successively multiplexed in IQ-phase (using a pair of QMUXes) and in polarization (using a Polarization Division Multiplexer (PDM)), in order to generate a PDM-QAM-$2^{2B}$ output optical signal.

FIG. 40B illustrates a preferred embodiment for B=2 bits per MPoDAC: Four 2-way BiWgt MPoDACs of the MPMZM type, each internally comprising two parallel plasmonic MZMs used as PGs, assuming state-of-the-art 200 Msym/sec modulation rate for plasmonic MZMs, each of the four MPoDAC lanes generates a B×200 Mb/s=400 Mb/s PAM-4 COH optical signal. IQ-multiplexing these PAM-4 COH signals in pairs via the two QMUXes, (IX and QX via the first QMUX, IY and QY via the second QMUX) generates a pair of QAM-16 optical signals labeled X and Y, each at the rate of 2×400 Mb/s=800 Mb/s. Finally, multiplexing these two optical signals via the PDM generates 2×QAM-16 the output signal on the output fiber, carrying two independent 800 Mb/s signals on each of the X and Y polarizations. Its aggregate rate is 1.6 Tb/s for this single carrier signal, which has spectral efficiency of 8 bits/symbol.

Optical Programmability for 1D and 2D MPoDACs (PAM and QAM)

Optical programmability is a recent trend whereby optical constellation generators are designed with the ability to modify their constellation parameters (in particular the constellation size).

We have already disclosed MPoDAC for PAM-$2^B$ fixed constellation generation, in particular MPMZM oDACs featuring B parallel MZMs. Yet another advantage of these disclosed structures is their amenability to agile optical programmability with little extra conditioning—it turns out that it is possible to arbitrarily (re)configure, on-the-fly, not just of the shape of the oDAC staircase transfer function. (the positions of the constellation points along the optical field axis), and/or the constellation size (number of steps in the staircase). This optical re-programmability applies to both COH as well as DD MPoDACs. Moreover, it is possible to readily switch the between the COH to DD MPoDAC functionalities—transitioning from having a prescribed bipolar constellation in field-domain to a prescribed unipolar one in the power domain. Typically (but not necessarily) the constellations in each switching state (each corresponding to the selected number of levels COH/DD optical domain) are specified as equi-spaced max-full-scale ones. In fact, in the disclosures heretofore and their models, we adopted tunable MPoDAC splitter and/or combiner, and have seen that the "oDAC staircase", i.e. the values of the optical levels, is determined the taps vector settings, typically subject to certain constraints on the positions of the field or power constellation levels.

The modification of the oDAC levels (for a fixed number, of levels C=2B) is 'Mode-I' of optical programmability.

'Mode-II' is the reprogramming of the PAM constellation size, C=$2^B$, i.e., effecting agile switching of the number of constellation levels, in the field optical domain for COH, in the field optical power for DD.

'Mode-III' is the switching between the COH and DD target optical domains.

As for mode-II programmability, switching the constellation size, S=$2^B$, is not entirely arbitrary, but there is an obvious constraint set by the initially invested opto-electronic resource—the number of provided parallel paths, equipped with PG or IG drivers, in the opto-electronic hardware. An oDAC photonic circuit nominally designed for B-bits, may then be reconfigured to operate as an b-bits oDAC, for any b satisfying with b≤B.

Thus, the MPoDAC is reprogrammable, on-the-fly, to switch between multiple constellations of different sizes, provided these sizes are no larger than $2^B$, with B the number of parallel optical paths provided in the oDAC optical layout. Thus, all PAM-$2^b$ formats for b=1, 2, . . . , B−1 may be switched among.

As particular examples, a PAM16 (COH or DD) MPMZM may also generate (COH or DD) PAM8, PAM4, and PAM2 (which is BPSK or OOK). A PAM8 (COH or DD) MPMZM may also generate (COH or DD respectively) PAM4 or PAM2 (note: COH PAM2=BPSK; DD PAM3=OOK).

Mode II Programmable MPoDAC with Variable Splitter or Combiner (Matched Taps)

We exemplify our disclosure of mode-II optical reprogram ability for a BiWgt MPMZM oDAC initially designed as a COH PAM8 generator (the general case for any B is readily extrapolated from this B=3 embodiment). Starting with a 3-way MPMZM, nominally used as 3-bit (COH PAM8) BiWgt MPoDAC, the constellation size may be reprogrammed from PAM8 (B=3) down to PAM4 (b=2) or even BPSK (b=1), by setting new appropriate values for the split & combine taps of the three-path MPoDAC, adjusting the taps to extinguish light via some of the three MZMs. E.g., to switch from PAM8 to PAM4 we turn off the top MZM, nulling out the upper tap $W_2$=0 in both the splitter and the combiner, while we distribute the light power in a 2:1 ratio to the remaining two paths, setting $$(W_2, W_1, W_0) = (U_2, U_1, U_0) = \left(0, \frac{2}{3}, \frac{1}{3}\right).$$

This taps-reconfigured 3-way system is ideally indistinguishable from a 2-way system with just two paths and with its 1:2 splitter and 2:1 combiner set to $$(W_1, W_0) = \left(\frac{2}{3}, \frac{1}{3}\right)$$

(note that in both cases the taps vector satisfy the unitarity condition). This establishes that the 3-way system having its matched taps values switched from the $$\left(\frac{4}{7}, \frac{2}{7}, \frac{1}{7}\right) \text{ to } \left(0, \frac{2}{3}, \frac{1}{3}\right)$$

will accordingly switch from COH PAM8 to COH PAM4.

If we wish to have this MPMZM switch to PAM2 COH, i.e. to BPSK 2-point constellation transmission, we simply reconfigure the tunable splitter and combiner taps to the values (W$_2$, W$_1$, W$_0$)=(U$_2$, U$_1$, U$_0$)=(0, 0, 1), i.e., in effect we turn-off the upper two MZMs, having all the light traverse the bottom MZM which acts as a phase-gate, i.e. a BPSK modulator.

Thus, the 3-bit MPMZM optical layout of FIG. 7B, nominally designed as a 3-bit MPMZM, is actually programmable, by means of modifying its electronics to switch to any of the following COH constellations, compactly written COH PAM-8|4|2 (here | denotes "or"):

$$PAM\text{-}8_{COH} = \left\{-1, -\frac{5}{7}, -\frac{3}{7}, -\frac{1}{7}, \frac{1}{7}, \frac{3}{7}, \frac{5}{7}, 1\right\}, PAM\text{-}4_{COH}$$

$$= \left\{-1, -\frac{1}{3}, \frac{1}{3}, 1\right\}, PAM\text{-}2_{COH} = \{-1, 1\} = BPSK$$

US 12,695,512 B2

One impairment especially degrading the quality of higher-order constellations is having an extinction ratio at the upper port which is not sufficiently low (due to imperfect setting $W_2$ ..0 not precisely nulled out). Thus, a residual low-level modulated signal may leak from the upper path (which was supposed to be cut off) into the desired PAM4 signal generated at the mid-port and upper-port. This extinction ratio leakage is modelled as having the three taps be $$(W_2, W_1, W_0) = \left(\chi, \frac{2}{3}(1-\chi), \frac{1}{3}(1-\chi)\right)$$

rather than $$\left(0, \frac{2}{3}, \frac{1}{3}\right)$$

with $\chi$ being measure of extinction, equal the actual residual power ratio at the upper port of the 1:3 when we command $W_2=0$ at that port (note: this is a somewhat simplistic model, ignoring possible finite extinction at the mid-port and bottom port of the splitter as well, but the source of impairment is apparent). The imperfect extinction impairment, degrading the switched lower order constellation, may be alleviated by one of two methods: (i) by detuning the phase bias(es) of the MZM PG(s) (nominally supposed to be turned-off) to have null output, i.e. steering the residual light (leaking from the upper port of the 1:3 splitter) to the unused port of the MZM used as the PG of the upper path. (ii) by turning off the bipolar signal voltage driving the MZM used as the PG of the upper path. The rationale is that the PG model is (203) may be rewritten in more physical detail, using for the backoff factor the expression $$k_{bkoff} = \frac{V_d}{V_\pi}\frac{\pi}{2},$$

where $V_d$ is the actual peak voltage driving the MZM (the actual applied voltage is $\pm V_d$) and $\varphi_b$ is the differential phase bias between the two arms of the MZM:

$$F_b = \sin\left(\frac{b^{PG}\cdot V_d}{V_\pi}\frac{\pi}{2} + \varphi_b\right) = b^{PG}\cdot\sin\left(\frac{V_d}{V_\pi}\frac{\pi}{2} + \varphi_b\right), \quad (6)$$
$$b^{PG} \in \{-1, 1\}$$

Thus, by reducing $V_d$ down to null or close to it (method (ii)) or by tuning the MZM phase bias such that $$\frac{V_d}{V_\pi}\frac{\pi}{2} + \varphi_b = 0,$$

i.e. setting $$\varphi_b = -\frac{V_d}{V_\pi}\frac{\pi}{2},$$

we would ideally null out the transfer factor through the MZM, thus get no light at its output even when there is leakage of light from the splitter to the MZM output (note: to null out the MZM transfer factor, we may also aim for $$\frac{V_d}{V_\pi}\frac{\pi}{2} + \varphi_b = \pm\pi).$$

Actually, since neither of the methods (i) and (ii) may be perfectly tuned, both methods may be used in unison to compound their attainable suppressions of the residual leakage. However, method (ii) may be harder to implement than method (i), since it requires complicating the high-speed mixed-signal driver circuitry, from having 2-state bipolar $\pm V_0$ drive voltages to having 3-state $\{\pm V_0, 0\}$ drive voltages (note: since the tuning of the splitter and combiner may typically be relatively slow, of the order of 0.1-1 msec which sets an upper bound on the reprogramming transient, a simpler way to turn off the voltage driver may be to disconnect the DC power supply to the fast electronic gates).
Mode II Programmable MPoDAC with Fixed Splitter or Combiner We mention that the most effective reprogram ability is afforded when both the splitter and combiner taps are tunable, as we have heretofore used in our matched-taps designs. If either the splitter or the combiner is fixed (while the combiner or splitter are variable, respectively) we have seen that we may get a reasonable constellation (albeit somewhat degraded) relative to the matched-taps case, but for a fixed constellation size as treated heretofore. If we attempt to reprogram such device, e.g. one with a fixed splitter, for generating a constellation having fewer bits (a lower B-value), we must null out some of the parallel paths, i.e. but that is not possible from the splitter side (as we have assumed the splitter to be fixed). We may still null out the paths that need nulling out, but then the collection of light from the splitter will be less efficient. Thus, we conclude that such a device, with fixed splitter may still be switched to a lower-order constellation but inefficiently so. For example. let us model the programmability performance of the COH PAM8 MPoDAC, which was based on a uniform-split design (1:3 splitter with fixed-taps, $$\left(\frac{1}{3}, \frac{1}{3}, \frac{1}{3}\right),$$

a 3:1 combiner with tunable taps ideally set at $^{16}/_{21}, ^4/_{21}, ^1/_{21}$), in the fixed-uniform split design. Evidently, we are not able to switch off either of the three paths by means of tuning the splitting ratios which are now fixed, $$\left(\frac{1}{3}, \frac{1}{3}, \frac{1}{3}\right).$$

We may, however, select one of the three paths, say the bottom one, as the one to be blocked at the tunable combiner, accepting a loss of a factor of $^1/_3$ in power at the splitter (as the light split at the lower path, via the $$W_0 = \frac{1}{3}$$

tap is wasted, since the light in this path is to be blocked further downstream by setting the bottom tap of the combiner to null, and/or by turning off the MZM PG of the lower path by methods (i) and/or (ii) above (bias phase detuning and/or drive voltage nulling). In addition, to handle the useful light, both the splitter and combiner remaining taps (the upper and mid ones) are to be set in in a 2:1 ratio, i.e. the taps of tunable 3:1 combiner are set to the values $$(U_2, U_1, U_0) = \left(0, \frac{4}{5}, \frac{1}{5}\right)$$

whereas for the fixed uniform splitter we evidently have $$(W_2, W_1, W_0) = \left(\frac{1}{3}, \frac{1}{3}, \frac{1}{3}\right).$$

The end-to-end transfer factors of the three paths (including the splitter and combiner contributions, excluding backoff attenuation factor g of the PGs, i.e., taking g=1) is then $$\left(\sqrt{W_2}\sqrt{U_2}, \sqrt{W_1}\sqrt{U_1}, \sqrt{W_0}\sqrt{U_0}\right) == \left(0, \frac{2}{\sqrt{15}}, \frac{1}{\sqrt{15}}\right)$$

The generated constellation is then $$\pm 0 \pm \frac{2}{\sqrt{15}} \pm \frac{1}{\sqrt{15}} = \frac{1}{\sqrt{15}}\{\pm 2 \pm 1\} = \left\{\frac{-3}{\sqrt{15}}, \frac{-1}{\sqrt{15}}, \frac{1}{\sqrt{15}}, \frac{3}{\sqrt{15}}\right\}$$

The full-scale is now $$FS = MSB - LSB = 2 \cdot \frac{3}{\sqrt{15}} = \frac{6}{\sqrt{15}} = 1.55,$$

which is −2.2 dB lower than the ideal max-full-scale of 2.

In contrast, in the case of the matched-splitter-combiner design of the programmable PAM-8|4|2 COH constellation generator, as disclosed above, we have 0 dB intrinsic max-full-scale loss, i.e., switching from PAM8 to PAM4 we remain at max-full-scale.

We conclude that the programmable PAM-8|4|2 COH constellation generator with uniform-fixed-splitter, although feasible, it does not provide sufficient performance, falling 2.2 dB in full-scale under the alternative PAM-8|4|2 COH constellation generator with matched-splitter-combiner taps, which was seen to feature a max-full-scale constellation, thus constitutes our preferred embodiment for programmable PAM-8|4|2 COH.

We conclude that to realize the constellation programmability, it is best to use both splitter and combiners which are tunable, rather than using a uniform splitter (or combiner). Nevertheless, the extra losses associated with reprogrammability may still be tolerable in certain cases. Thus, the optimal design methodology for programmability is to adopt here matched-split-combine designs for the optically programmable oDAC.

Mode II Programmable DD MPMZMs

Let us now consider DD designs of programmable MPMZMs. For this case we disclose a similar methodology to that developed above for programmability of COH MPMZMs.

Starting from a B-way BiWgt DD MPMZM generating a (B-bit) PAM-$2^B$ constellation may be also developed for programmable DD MPMZMs. Here is an exemplary embodiment for B=3:

Given a 3-way BiWgt MPMZM with matched taps, $(\hat{W}_2, \hat{W}_1, \hat{W}_0) = (\hat{U}_2, \hat{U}_1, \hat{U}_0) = (0.418, 0.341, 0.241)$ designed for optimal PAM8 DD generation as in 5.5.3, we have three paths equipped with IGs (OOK modulators). We may also reconfigure this structure for PAM-4 DD and PAM-2 DD (which amounts to OOK) as follows: The three matched taps are then reconfigured (switched), away from the values disclosed in 5.5.3 to the following values, whereby the upper tap is taken null, to turn off the upper path, while the mid and bottom taps are taken to correspond to the optimal matched taps for a PAM4 DD constellation $$(0, \hat{W}_1, \hat{W}_0) = (0, \hat{U}_1, \hat{U}_0) = (0, 2 - \sqrt{2}, \sqrt{2} - 1) = (0, 0.586, 0.434) \quad (7)$$

If we wish to have this MPMZM switch to PAM2 DD, i.e. to an OOK 2-point constellation transmission, we simply reconfigure the tunable splitter and combiner taps to the values $(W_2, W_1, W_0) = (U_2, U_1, U_0) = (0, 0, 1)$, i.e., in effect we turn-off the upper two MZMs, have all the light traversing the bottom MZM which acts as an intensity-gate, i.e. as an OOK modulator.

Mode-III Programmability: Switching BiWgt MPoDACs Between COH and DD

Finally, we consider switching the 3-bit BiWgt MPMZM between programmable COH and DD PAM-8|4|2 modes.

An evident way to do this is to use a common 3-way MPMZM photonic layout, while equipping the driver electronics with the ability to switch between three states, $\{\pm V_d, 0\}$ supporting both bipolar $\{\pm V_d\}$ (for COH) and unipolar $\{0, V_d\}$ (for DD) drives. In effect this reconfigures the 1-bit gate functionalities of the three MZMs between PG and IP. The settings of the matched taps for the respective COH and DD cases have already been described. We now have a full solution for COH|DD PAM-8|4|2 programmability (6 states in total).

However, programmability solutions based on switchable ultra-high-speed electronics (having the drivers switch between $\{\pm V_d\}$ and $\{0, V_d\}$) are more complex and prone to impairment than a solution solely based on switching just the tap values in low-speed electronics (reconfiguring the taps values at kHz to MHz rates), while leaving the ultra-high speed electronics unchanged. Fortunately, in 5.5.4.1 we have already outlined a methodology to use bipolar drives (COH codes) for DD PAM generation. In the context of optical programmability, this enables performing the DDE← →COH reprogramming transient without affecting the high-speed electronics at all, just switching the MPMZM taps entirely at relatively low rate (kHz to MHz), reconfiguring just the oDAC taps within about a msec or less. The high-speed electronics continues operating based on bipolar analog drivers circumventing the need to switch between unipolar (for DD) and bipolar (for COH) drivers.

We now detail the design of programmable MPMZM oDACs (solely driven by COH codes, no DD/COH code switching) which are most readily reconfigurable (reprogrammable) to switch between COH and DD constellation. This DD← →COH reprogrammability methodology is applicable just for embedded systems. As a consequence, our target DD PAM or COH PAM programmable constellation orders are b-bits ($2^b$ levels) with b≤B, (including transitions between DD and COH constellations of $2^b$ levels), yet we require a B+1-way MPMZM oDAC photonic structure, having one path unmodulated (acting as "optical bias" in the DD mode, while we deplete this path of light in the COH mode) while the other paths are all equipped with PGs to perform BPSK modulations (see the embedded MPoDAC concept in 5.5.4), enabling to switch between any b-bits (with b≤B) COH constellation (which may attain optimal max-full-scale performance by proper selection of its tap vector) vs. any b'-bits DD constellation, with b'≤B (the DD constellation will be bounded to have an FS less than max-full-scale, but may nevertheless be optimized for maximin operation, attaining at the same maximin distance that a standalone embedded DD MPMZM system would attain). In any case in both the DD PAM-$2^b$ and COH PAM-$2^b$ modes of this reprogrammable system, we invariably use the COH binary code (even for DD) fed into the B bipolar electronic drivers (with the B+1-th path, say the top one, left unmodulated).

Another even more flexible variant (albeit somewhat more complex as it requires an extra PG) of the MPMZM system just described, also uses just COH codes to programmably select to output either COH or DD constellations, but invests in adding an extra PG (relative to the previous variant above), replacing the unmodulated path by a BPSK modulated path, as well, such that now we have a total of B+1 PG modulated paths (such that the device appears as a standard B+1-bit BiWgt MPMZM). We are now able to operate this B+1-way device in two modes, transitioning between them on-the-fly: (i): COH PAM-$2^b$ constellation generator (now with b≤B+1). (ii): embedded DD PAM-$2^b$ constellation generator (now with b'≤B).

In COH mode (i), in case we aim for max constellation size, i.e., b=B+1, we just use the BiWgt design as earlier disclosed in this work (setting the matched taps accordingly), whereas when we aim for a lower constellation order, i.e., b≤B+1 we just turn off B+1−b of the PGs, leaving just b of the PGs on (as disclosed earlier in this subsection, by nulling out the corresponding taps, optionally also by detuning the individual MZM biases to steer the light to the free port, optionally also by turning off the RF drives—the optional measures increasing the light extinction in the turned off paths).

In order to switch to DD mode (ii), we digitally modify the COH code to consist of a B-bit COH counting code augmented by another all-ones column, such that the MSB (left-most) of each codeword be unity, such that the top path PG be now invariably driven by the MSB=1 bit, behaving as if it is unmodulated (we still reserve its ability to be modulated, to be used when switching to mode (i) again). In addition, we now input, for this mode (ii), the proper taps vector $W_{COHembDD}$ (353), which is evaluated as shown there, in terms of the taps vector $W_{DD}$ that would have been selected in case we implemented a 'straightforward' B-bits BiWgt MPMZM.

A specific example follows for B=3. This programmable MPMZM oDAC, reconfigurable for up-to-3-bit-COH/up-to-2-bit-DD, is based on a 3-way standard BiWgt COH MPMZM structure, i.e. having three parallel paths, each equipped with a PG (FIGS. 7A and 7B). When used in COH mode (i), it generates a 3-bit PAM-8 COH constellation as described in 5.3.4.5, while it may also be reconfigured as 2-bit PAM-4 COH generator by neutralizing one of the three paths (say the top one) or as a BPSK COH generator by neutralizing two of the three paths (using binary weighted taps active paths, whether there are three or two paths or just one).

To reprogram the device to DD mode (ii), wherein PAM4-DD or OOK are the programmable sub-options, the driving bit of the upper path PG is set to unity (i.e., a fixed voltage bias Vdis applied to the upper PG). In order to configure PAM4-DD operation, the remaining two PGs are driven by the 2-bit bipolar counting code,{{−1, −1},{−1,1}, {1, −1}, {1,1}} (each codeword corresponds to a PAM4-DD level). We also need to reprogram the three matched taps to [0.663, 0.212, 0.126].

We may also reprogram the device to operate as an OOK generator by having the upper path PG set to unity (i.e., a fixed voltage bias $V_d$ is applied to the upper PG), disabling one of the two remaining paths (just as described above for path cutoff in the COH mode) while using the third path PG as a BPSK modulator (i.e. bipolarly driven by the {±1} code). The key to intuitively, grasp how BPSK modulation may generate OOK, is the role of bias light from the upper path that is unmodulated, "lifting" the BPSK field to unipolar OOK. In terms of the taps setting for DD OOK operation (driven by the bipolar {±1} code) we have $$W_{COHembDD} = \left[\frac{1}{2}, 0, \frac{1}{2}\right]$$

(assuming the actively modulated path is the bottom one—in case the actively modulated path is the mid one we then use the taps $$W_{COHembDD} = \left[\frac{1}{2}, \frac{1}{2}, 0\right].$$

In any case we neutralize one path, have one path as CW bias and have one path BPSK modulated). Note: The tap values here may be shown to formally be a special case of the general B-bit embedding, as treated in 5.5.4, however, the intuitive CW-bias based explanation above is more illuminating.

To wrap-up this subsection on 1D PAM DD/COH constellations, we note that the programmability of the prior-art SEMZM oDACs is much more limited, due to the fact that in that system there is no easy analog for the capability of tuning MPoDAC taps, on-the-fly. To tune the differential phase contributions of MPMZM segments, the only recourse is modifications of the peak drive voltages, but that is difficult to implement at ultra-high-speed (and costly to duplicate the electronic attenuator HW for all segments). The comments above pertain mainly to non-ThWgt BiWgt SEMZM (e.g. BiWgt SEMZM). For ThWgt SEMZM, the tunability of the constellation size is easier, by turning off the ultra-high-speed drivers to certain of the multiple SEMZM segments, but the drawback may be that the ThWgt has many more segments, thus the electronic overhead of variable attenuators in the RF path, for tuning the phase, may be excessive.

Enhanced Performance of Programmable Modes-II,III by Shutting Down in 1-Bit Gates We mention that the performance (constellation quality) of reprogrammable modes II and III may be enhanced by optionally taking additional measures beyond the retuning of the split and combine taps, as described above. In addition, we may cut off the RF path of certain of the MZM PG or IG drivers (those belonging to the paths of which need to be disabled in the course of "constellation demotion") and/or optionally detune the MZM to steer its residual modulated light to the free output port of each MZM PG or IG driver).

Doing so for all the 1-bit gates in all the paths would actually results in nulling out (turning off) the MPoDAC output. In fact this may be augmented by setting just one of the taps of the splitter and combiner to unity and making sure that the respective taps nulled out in the splitter and combiner do not have identical indexes.

This 'total shutdown' capability is also useful for enabling the ability to shut-down the MPoDAC output (without turning off the CW light source).

Mode-I Reprogrammability: Modifying the Constellation Shape at Fixed Number of Levels.

Further to programming oDAC resolution (b B), the shape of the QAM constellation is also programmable (this was referred to as Mode-I programmability) by fine-tuning the split/combine ratios and possibly the peak drive voltages. Moreover, for any b≤B, we may reconfigure the oDAC output characteristic, reprogramming any 1D constellation with $S=2^b$ points which are either 'regular' (equi-spaced) bi-polar symmetric ones, or are nonuniformly distributed, specifying offsets and nearest-neighbor separations. Thus, the locations of the constellation points along the optical field axis may be varied, to possibly realize or best-approximate the desired non-linear oDAC response (e.g. to compensate for some other nonlinearity in the system). However, it will become apparent that positions of the constellation points are not entirely amenable to arbitrary specification, as there are mathematical constraints imposed by the multiparallel binary weighted structure which may not be satisfied. We have seen that these constraints may be relieved, in principle, by adopting a thermometer-weighted (ThWgt) multiparallel structure, at the expense of increasing the MPoDAC complexity by requiring more paths and also requiring additional digital electronics (a B:S encoder to generate the thermometer code).

Multiplexing of 1D (PAM) Programmable Constellation Generators

Once the programmability of a single carrier MPoDACs is enabled, it is useful to combine multiple degrees of freedom in order to multiplex, i.e. aggregate multiple programmable PAM signal tributaries, (each tributary being generated out of pairs of IQ MPoDACs, as described above) in order to obtain highly flexible variable rate optical signals. We may multiplex programable PAM tributaries via Wavelength Division Multiplexing (WDM), and/or Frequency Division Multiplexing (FDM), i.e. sub-carrier multiplexing, and/or S patial Division Multiplexing (SDM), and/or Polarization Division Multiplexing (PDM) (also known as Dual Polarization Multiplexing (DPM).

We may also directly multiplex 1D MPoDAC-generated PAM signal tributaries (be they COH or DD) onto these multiplexing DOFs, e.g. modulate independent PAM-$2^B$ MPoDAC 1D constellations onto multiple CW subcarriers of different frequencies (FDM), or inject two independent PAM-$2^B$ MPoDAC 1D constellations onto the X and Y polarization components (PDM), or inject independent PAM-$2^B$ MPoDAC 1D constellations onto multiple cores of a multicore-fiber (SDM).

Another degree of optical multiplexing, not listed above, is (quadrature) phase multiplexing. The phase degrees of freedom, the I and Q quadratures, are the multiplexed physical quantities in this case, which deserves special attention and is treated in the next subsection.

Programmable Optical QAM Generators—by IQ Muxing 1D MPoDACs

To generate $C^2$-QAM (with $C=2^B$), for COH transmission, we may provide IQ-multiplexing a pair of our MPoDACs, each generating C-PAM COH. The two MPoDACs are IQ-nested via a 1:2 splitter and a QMUX combiner, as shown in FIG. 39, to generate $2^{2B}$-QAM by having the two IQ tributary PAM-$2^B$ COH fields superposed in quadrature (with 900 phase difference). This QAM-generator structure will be referred to here as 'IQ MPoDAC'. In particular 64-QAM may be optically generated by an IQ MPoDAC comprising a pair of 3 bit BiWgt COH MPMZMs, each generating PAM-8 COH, combined in quadrature via a QMUX.

As soon as the two IQ-nested MPMZMs are made programmable, the size of our QAM constellation may then be reconfigured by using suitable electronics (to tune the splitter/combiner taps, and optionally to shut down individual PG gates of the two IQ tributary PAM COH oDACs. Here we disclose how an IQ-MPoDAC photonic structure designed to generate $2^{2B}$-QAM may have its ancillary electronics equipped to enable programmability in the two IQ tributary MPMZM, in order to be able to switch back and forth to lower-order QAM constellations. We have already shown in the last section how to make the PAM output of a single B-way MPMZM "resolution-programmable" in the sense of reconfiguring any of the constellations PAM-$2^b$, b=1, 2, . . . , B. For reprogrammability of the PAM COH constellation size, the ancillary electronics should enable retuning the split and combine taps and optionally shutting down the RF path of some of the MZM PG drivers and/or optionally detuning the MZM to steer its residual modulated light to the free output port of each MZM PG driver. This is the electronic enablement required to convert a fixed COH PAM-$2^B$ MPoDAC into a COH PAM-$2^b$ one (for b=1, 2, . . . , B).

We disclose here such MPMZMs, each being electronically enabled to be reprogrammed to generate PAM-$2^b$ (b=1, 2, . . . , B), are IQ-combined to generate programmable $2^{2b}$-QAM constellations (for b=1, 2, . . . , B—with B the number of parallel paths in each of the two I and Q MPoDACs). E.g., having a pair PAM-8 COH MPMZMs IQ-nested via a 1:2 splitter and a QMUX combiner, once the two I and Q MPMZMs are electronically enabled to switch among PAM-8, PAM-4 or PAM-2 (=BPSK) (all three being symmetric coherent constellations, in the PAM COH sense defined in this work), then their IQ-nesting yields either 64QAM or 32QAM or 4QAM (which amounts to QPSK). To recap, the structure of FIG. 39, specialized to B=3, and equipped with suitable electronics becomes and agile 64|16|4-QAM IQ-MPoDAC (where 4-QAM means QPSK).

Back to the generic $2^{2B}$-QAM IQ-MPoDAC, electronically equipped for programmability, we have just seen that the QAM constellation that may be generated this way are sized $2^{2b}$, with for b=1, 2, . . . , B e.g. QPSK, 16QAM, 64QAM, 256QAM . . . . But how about 8QAM, 32QAM, 128QAM, 512QAM? In order to generate $2^{2B-1}$-QAM, B=2, 3, 4 . . . , we use a $2^{2b}$-QAM, (with b=1, 2, . . . , B), programmable generator (as disclosed above), but have its electrical driver system preceded by a digital encoder to ban certain 1D symbol combinations in the two PAM-$2^b$ MPoDACs working in unison, thus providing the mapping from the integer index labeling each of the constellation symbols, $2^{2b-1}$ to the pair of indexes labeling the $2^b$ levels of individual I and Q PAM MPoDACs. In simple terms, to generate $2^{2b-1}$-QAM, certain combinations of levels of the two I and Q PAM MPoDACs (in fact, half of them) are removed.

It follows that we may generate, in principle, using a pair of our B-way MPoDAC tributaries (having B parallel paths with PGs in each), QAM constellations of order $2^\beta$, $\beta=2, 3,$ 4, . . . , 2B–1,2B, i.e., 4|8|16|32|64|128|256| . . . –QAM. Generating the orders 8, 32, 128, . . . require an encoder, the orders 16, 64, 256, . . . do not (these QAM constellation sizes just require Direct Binary Drives applying the codewords directly to the two BiWgt IQ tributary MPMZMs), thus we may arrange for a bypass in the digital encoder, when needed to switch to these constellations, engage the encoder back when the orders 8, 32, 128, . . . , are needed.

Moreover, we may utilize various types of optical degrees of freedom for multiplexing programmable QAM signal tributaries, (each tributary being generated out of pairs of IQ MPoDACs, as described above). Thus, we disclose multiplexing our programmable QAM tributaries via either Frequency Division Multiplexing (FDM) and/or S patial Division Multiplexing (SDM) (e.g. multiple modes or cores of an optical fiber) and/or Polarization Division Multiplexing (PDM) (also known as Dual Polarization Multiplexing (DPM), e.g. consider FIG. 40 (top), specializing it to PDM-64QAM (i.e. B=3 bits for each of the four MPMZM MPoDACs) based on four nested MPMZMs each with 1|2|3-bits, i.e. four such IQ-XY multiplexed lanes exhibit a programmable aggregate spectral efficiency of 4|6|8|10|12 bits/symbol. The first two lanes are IQ-multiplexed via a QMUX to generate two 64QAM tributaries. These two tributaries are then polarization-multiplexed.

This could be the basis for a highly efficient agilely-programmable coherent optical transmitter: it is energy-efficient, as it operates with direct-binary-drive, thus eliminating the need for electronic DACs or other forms of less efficient oDACs; it is optical power efficient as we have shown that there is no intrinsic loss for COH constellation generation with MPMZMs. It is spectrally efficient when promoted to use all MPoDAC multipath resources, but it may trade off spectral efficiency for optical power efficiency, i.e., OSNR by demoting the constellation size via the agile programming. The constellations quality is high since the 1D (single quadrature, single polarization) COH MPMZMs intrinsically operate to generate 'perfect' max-full-scale field domain 1D PAM COH constellations.

Another interesting feature of this MPMZMs based PDM-64QAM transmitter is that its calibration and testing is facilitated by the capability to completely turn off one or more or all of the four single-quadrature-single-polarization lanes (the four COH PAM-8 MPMZMs. Heretofore, for programmability of MPMZMs we have not had the need to turn off all MZMs at once, but here we disclose that this might be achieved, with high extinction ratio, as follows: The 1:B splitter is retuned to have all the input CW power steered to one of its taps, say the top one, which is set equal to unity; the other taps are then necessarily null, ideally. The B:1 combiner is set to have just one of its taps set to unity, provided that this combiner tap is not connected to the same path leading from the splitter tap that was set to unity. Say, the combiner tap set to unity is the bottom one.

This ensures that any path is either fed from or feeds into a zero tap. Optionally, we may also steer the modulated optical power of each MZM-based PG to the free port of the MZM, and/or turn off the RF drive to each of the MZM-based PGs. This output shutdown capability has already been described for 1D constellations in 5.10.1.5. Here this is applied to the I and Q tributary MPoDACs.

Another aspect disclosed here is programmability and/or modular manufacturing enablement at the top subsystem level, e.g. on-the-fly converting the PDM-QAM transmitter into a quad of DD PAM-4 independent transmitters. Since we are now able to either turn off each one of the four lanes, or turn off pairs or triplets lanes at a time, we may perform testing and calibration of the individual quadrature MPMZMs for individual X or Y polarizations. In effect this is an additional form of programmability, enabling to switch from either dual polarization QAM to single polarization QAM or to any of four independent PAM I or Q tributaries of the two polarizations for the purpose of testing or calibrating them independently.

Our scope is single-carrier scheme, and the [Y]-scheme depicted in FIG. 40D is also a single-carrier one. We note that beyond single carrier embodiments, the [Y]-scheme also comprises embodiments intended to perform Frequency Division Multiplexing (FDM) or WDM of multiple C-QAM signals (C=4, 8, 16, 32, . . . ). However, these multi-carrier embodiments are outside our comparison scope, which is single-carrier optical constellation generation—in each of our embodiments, all our MPoDACs are assumed to have their optical input fed by a common CW monochromatic (single-frequency) signal. To recap, FIG. 39 illustrates a QAM scheme generation in which the modulator arrays are proper BPSK ones (in our I and Q tributary 1D COH PAM MPoDACs), and not a QPSK one.

The QAM generator scheme just uses a single QMUX multiplexing two MPoDACs wherein each of which there is a modulator array of BPSK modulators that are all summed up in-phase w.r.t. one another, in each of the I and Q tributaries MPoDACs that are quadrature-multiplexed.

In the MPoDACs-based QAM generator, the QMUX is performed at the very end, after the two individual PAM-8 I and Q tributaries have been generated (with B:1 combiners, internally). The power combining taps of the B:1 splitter(s) as well the B:1 combiner(s) used in both schemes should be BinaryWeighted in the sense that they must form a geometric series. We have seen this in the case of a single PAM-8 MPoDAC.

Multi-Bit (Multi-Level) Optical Gates (OG)

We now disclose an oDAC generalization, referred to as Multi-Level (ML)-driven Multiparallel oDAC (ML-driven MPoDAC) whereby the multiple parallel paths may contain multi-bit OGs.

The term 1-bit Optical Gate (OG) was originally coined in this invention to describe a two-level optical modulator, be it an Intensity modulator, OOK (referred to here as intensity gate (IG)) or a phase modulator, BPSK (referred to here as phase gate (PG)).

The disclosed Multi-Parallel oDAC essentially consisted of an interferometer with S-paths, each comprising a 1-bit OG.

Let us now extend the 1-bit OG concept to a multi-bit (or multi-level) OG defined as means to have the input light-wave modulated to one of $C_G$ discrete amplitude levels, as actuated by a string of $\beta_G$ bits, referred to as the 'driving bits', forming the OG-code. The original 1-bit OG features $\beta_G=1$ bit, and $C_G=2$ levels, but a 'proper' multi-bit OG is driven by an OG-code comprising at least two bits, i.e., $\beta_G \geq 2$ and $C_G \geq 3$. A generic multi-bit OG, including the 1-bit OG as a special case, is defined as having $\beta_G \geq 1$ and $C_G \geq 2$. The special case $\beta_G=1$, $C_G=2$ retrieves the single-bit OG, introduced in previous disclosed embodiments of the invention, namely either the Intensity Gate (IG) for DD or the Phase Gate (PG) for COH.

Thus, a multi-level OG includes the two-level (1-bit) OGs, namely our earlier introduced 'phase-gates' and 'intensity gates' as special cases.

The code length, in bits, is obtained $\beta_G=\lceil \log_2 C_G \rceil \geq 2$, with $\lceil \bullet \rceil$ denoting the ceiling operation. In particular, we are interested in embodiments based on 'dyadic codes' whereby $C_G$ is an integer power-of-two, $C_G \in \{2, 4, 8, 16, \ldots\}$, in which case, $\beta_G = \log_2 C_G \geq 1$. The 'multi-level OG', may be equivalently referred as 'multi-bit OG'. A 'proper' multi-bit OG is an optical modulation means driven by 2 or more actuating bits.

Sophisticated ML-driven OGs e.g., 3-level OGs for duo-binary generation are feasible and useful for optical transmission with direct-detection, as a replacement for our 1-bit plain Intensity Gates. A 3-level OG is driven by $\beta_G = \lceil 3 \rceil = 2$ bits (its 3 levels are in one-to-one correspondence with by 3 of the 4 possible bit pairs). However, in the sequel we focus in particular on usage of 'dyadic' ML-driven OGs, wherein $C_G = 2^{\beta_G}$, $\beta_G \in$ Integers, i.e., these OGs generate 4, 8, 16, . . . levels, as actuated by 2,3,4, . . . bits.

Hardware-wise, the multi-bit OG includes the modulation means plus its particular driver. Those two elements, together, are considered to constitute the OG (thus, the OG is actually an Electro-Optic-Gate driven by multiple electrical levels to generate a discrete optical output. In the simplest form an OG consists of a simple modulator (MOD), in particular an MZM, and a multi-level electrical driver. The electrical multi-level signal driving the MOD to generate $C_G$ discrete optical levels, is referred to in the communication literature as Pulse Amplitude Modulator (PAM), and the generated waveform is PAM-$C_G$, an electrical signal with $C_G$ electrical voltage levels. Since we now deal with PAM signals in both the electrical and optical domains, it is useful to distinguish between them by adopting the nomenclature of ePAM (electrical PAM) and oPAM (optical PAM). E.g., an MZM-based multi-level OG is essentially an MZM driven by an ePAM signal, such as to generate a corresponding oPAM signal of the same order (number of levels).

In these definitions the multi-level OGs may be based on any modulation means+electrical PAM driver that is electrically driven by a string of bits to generate multiple optical levels. The modulation means may be either a simple modulator, such as an MZM or EAM, driven by an ePAM signal, or a compound oDAC structure and its driver, e.g., one of the oDAC structures disclosed in this invention (including the structures disclosed in this section, i.e., the OG definition is recursive).

Multi-Level-Driven MultiParallel oDAC (ML-Driven MPoDAC)

Let us now disclose and define the ML-driven MPoDAC, as a multi-parallel oDAC with $S \geq 2$ paths, where the paths have general structure as the ones disclosed heretofore (in the case of 1-bit OGs), albeit having the 1-bit PG or IG in at least one of the paths replaced by a proper ML-driven OG. Thus, at least one of the $S$ paths must have its field modulated to more than two levels (the rest of the paths may have their fields modulate to two levels or more). For dyadic MPoDACs proper ML-driven PAM-OG(s) use 4, 8, . . . levels, thus at least one of the parallelized OGs is has to have its number of levels from the set $\{4, 8, \ldots\}$, whereas each of the other OGs have a number of levels from the set $\{2, 4, 8, \ldots\}$.

E.g. for a 4-way ML-driven MPoDAC, $[C_4, C_3, C_2, C_1] = [2,4,2,8]$ are valid level-counts for the four parallelized OGs. The corresponding bit-counts are $[\beta_4, \beta_3, \beta_2, \beta_1] = [1, 2,1,3]$. The code is the 7-bits binary string $$b_0^{(4)} \cdot b_1^{(3)} b_0^{(3)} \cdot b_0^{(2)} \cdot b_0^{(1)} b_0^{(1)} b_0^{(1)},$$

partitioned into sub-codes of lengths $\beta_4, \beta_3, \beta_2, \beta_1$, with each subcode driving one of the four OGs (the substrings of the sub-codes are delineated by dots for clarity).

For an ML-driven MPoDAC wherein the OG in the s-th path generates $C_s \equiv 2^{\beta_s}$-levels oPAM, assuming that the device be designed such that all output levels of the multi-level driven MPoDAC are distinct (do not coincide), then the total number of output optical levels is $$C = \prod_{s=1}^{S} C_s = 2^{\sum_{s=1}^{S} \beta_s} = 2^{\beta}.$$

Thus, the levels of each path get multiplied, whereas the bits-per-path contributions get added up:

$$\beta = \sum_{s=1}^{S} \beta_s.$$

In particular, for S=2, (i.e., two paths, two-way ML-driven MPoODAC) the rule for parallelizing the pair of multi-level OGs is (with '||' denoting 'in-parallel with'): $oPAM[C_1] || oPAM[C_2] = oPAM[C_1 C_2]$.

In words, having the two paths comprise OGs generating $C_1$, $C_2$ optical levels each (e.g. a pair of MZMs driven by respective RF PAM signals with $C_1, C_2$ electrical levels, the ML-driven oDAC then generates optical PAM at $C = C_1 C_2$ levels. The corresponding bit-counts describing the two partial RF DACs are $\beta_1$, $= \log_2 C_1, \beta_2 = \log_2 C_2$, $\beta = \log_2 (C_1 C_2) = \beta_1 \beta_2$. Thus, one path (driven by one of the RF PAM drivers) contributes $\beta_1$ bits, the other path (driven by the other RF PAM driver) contributes $\beta_2$ bits, such that the overall optical PAM generator features $\beta_1 + \beta_2$ In fact, this rule is valid even if one or both paths are actually realized as compound oDACs, in particular ML-driven-oDACs.

All MPoDACs comprise a photonic circuit and an electronic driver circuit. Some examples of the ML-driven MPoDACs and a general case are depicted in FIGS. 43-44. FIG. 43 and FIG. 42 depict a S=2 (two-way, i.e. two paths) realization, FIG. 43 depicts the general S-paths case and FIG. 44 depicts a 3-way realization. The drivers in this systems are assumed agile (reconfigurable), such that the generated ePAM orders may be electronically reprogrammed in hardware, e.g., the drivers in FIG. 43 and FIG. 42 consist of ePAM generator pairs which may be independently reconfigured as either PAM2 or PAM4 (compactly denoted PAM2|4, where '|' means OR).

As visible in the figures, and more generally for all our ML-driven MPoDACs, their photonic structures comprise (just like their earlier counterparts based on 1-bit gates) means to split the input light into the S-paths (1:S-split), means to combine the light of the S-paths (S:1-split); moreover, in at least S−1 of the paths (preferably in all S paths) means are provided for slow phase modulation and possibly multi-tone phase dithering means, in order to bring all paths in a definite phase relationship, typically in phase, but it is also possible to bring some paths in anti-phase, to the others, i.e., to have their relative phases flipped 180° relative to the other paths (using anti-phase in some path amounts to reversing the sign of the constellation generated by the corresponding OG). Note: This proviso on either 0° or 180° phase relationships allowed among the superposed fields in the S:1 combiner also applies to the MP-oDAC based on 1-bit OGs as disclosed throughout this invention. These requirements are in common with MPoDACs entirely based on 1-bit (i.e., two-level) gates. The only difference is that at least one of the MPoDACs is a multi-level gate (with $C_G>2$ levels, $C_G>4$ for dyadic versions).

In fact, all the considerations in optical modeling of the MPoDACs and their operational use of the, carry over here from MPoDAC based on 1-bit OGs to the MPoDAC variants based on multi-level OGs. In particular, the most useful photonic designs are obtained by setting and maintaining the oDAC parameters such as to achieve the following conditions: (i) Coherent addition of fields of the S-paths in the S:1 combiner. (ii) matched splitter-combiner design: The optical-power split/combine ratios (referred to as 'taps') of the 1:S and S:1 are identical: $W_s=U_s=1, 2, \ldots, s$. Note: In idealized design the unitary constraint $$\sum_{s=1}^{S} W_s = 1$$

is used. The field transfer factors for the 1:S and S:1 are then also matched: $u_s=w_s=\sqrt{W_s}$, $s=1, 2, \ldots, S$. (iii) Optimization be performed over $S-1$ of matched-taps $w_s$ (unitarity makes one ratio redundant). E.g., if $S=1$ it suffices to optimize over the $w_1$ parameter.

The structural specification of the multi-level driven MPoDACs (e.g., as in the figures) must be augmented by a parametric specifications: (i) the overall target oPAM constellation of the MPoDAC and whether it is for DD or COH. (ii) the optical amplitude levels to be generated by the constituent multi-level OGs (the oPAM constellations for each OG) (iii) the optimal setting of the MPoDAC splitting and combining ratios $\{W_1, W_2, \ldots W_{S-1},\}$. It may then be analytically or numerically verified that at least the inherent (subject to ideal conditions) physical model for the topological structure generates useful constellations of output levels. 'Perfect' Non-negative (PNN), DD, COH PAM—optimal levels & taps Heretofore we have not specified the multi-level (i.e., PAM) constellations involved in these descriptions (apart from labeling them as electrically generated (ePAM) or optically generated (oPAM), which is an operational distinction). We further distinguish between Nonnegative (NN) PAM (with all its levels non-negative) and Bipolar (BI) PAM with its levels real-valued of any sign (some levels non-negative, other levels negative). Optical fields are generally complex-valued but since the disclosed MPoDAC brings all fields in phase or in anti-phase, thus after undergoing phase alignments and derogating the common phase, the fields are real-valued. respectively.

There are two optical transmission modes, either use Intensity Modulation with Direct Detection (IM-DD simply abbreviated here DD) or use Coherent detection (COH). The optimal DD and COH constellations are NN and BI. The normalized unity-full-scale unipolar equi-spaced DD and COH PAM constellations are derived next, in forms amenable to working out the MPoDAC optimal split/combine taps. We start from 'Perfect' Non-Negative (PNN) constellations, 'perfect' in the sense that these non-negative constellations are ideal full-scale equi-spaced ones. The first four PNN constellations in increasing order are:

$$PAM_{PNN}[2] \equiv \{0, 1\}, PAM_{PNN}[4] \equiv \left\{0, \frac{1}{3}, \frac{2}{3}, 1\right\},$$

$$PAM_{PNN}[8] \equiv \left\{0, \frac{1}{7}, \frac{2}{7}, \frac{3}{7}, \frac{4}{7}, \frac{5}{7}, \frac{6}{7}, 1\right\}$$

-continued $$PAM_{PNN}[16] \equiv$$

$$\left\{0, \frac{1}{15}, \frac{2}{15}, \frac{3}{15}, \frac{4}{15}, \frac{5}{15}, \frac{6}{15}, \frac{7}{15}, \frac{8}{15}, \frac{9}{15}, \frac{10}{15}, \frac{11}{15}, \frac{12}{15}, \frac{13}{15}, \frac{14}{15}, 1\right\}$$

It is convenient to have $PAM_{PNN}$ compactly expressed in terms of the RNG (range) sequence, $$RNG[u, v, d] \equiv \{u, u+d, u+2d, u+3d, \ldots, v\}, s.t. \frac{v-u}{d} \in \square$$

The most general $\beta$-bits, $2^\beta$-levels PAM-PNN dyadic constellation is then expressed as the range:

$$PAM_{PNN}[2^\beta] - RNG\left[0, 1, \frac{1}{2^\beta - 1}\right]$$

We have already seen in our treatment of MPoDACs with 1-bit gates, that, surprisingly, PNN constellations, despite being 'perfect', are not actually useful to generate for transmission with Direct-Detection (DD). The non-negativity of these constellation befits DD, but the fact that the optical field PNN constellations are equi-spaced is actually non-optimal for DD, since the optimal DD constellation is actually equi-spaced and full-scale in the intensity (optical power) domain. But the MPoDAC devices are coherent ones, always superposing fields in-phase or possibly in anti-phase Therefore, a PNN constellation in the power-domain must be mapped back to underlying field levels by taking the square root. E.g., a DD PAM8 ideal constellation in the field domain would be obtained:

$$PAM[8]_{DD} = \sqrt{PAM[8]_{PNN}} \equiv \sqrt{\left\{0, \frac{1}{7}, \frac{2}{7}, \frac{3}{7}, \frac{4}{7}, \frac{5}{7}, \frac{6}{7}, 1\right\}} =$$

$$\left\{0, \sqrt{\frac{1}{7}}, \sqrt{\frac{2}{7}}, \sqrt{\frac{3}{7}}, \sqrt{\frac{4}{7}}, \sqrt{\frac{5}{7}}, \sqrt{\frac{6}{7}}, 1\right\}$$

$$PAM_{COH}[2] \equiv \{-1, 1\}, PAM_{COH}[4] \equiv \left\{-1, -\frac{1}{3}, \frac{2}{3}, 1\right\},$$

$$PAM_{COH}[8] \equiv \left\{-1, \frac{-5}{7}, \frac{-3}{7}, \frac{-1}{7}, \frac{1}{7}, \frac{3}{7}, \frac{5}{7}, 1\right\}$$

$$PAM_{COH}[16] \equiv$$

$$\left\{-1, \frac{-13}{15}, \frac{-11}{15}, \frac{-9}{15}, \frac{-7}{15}, \frac{-5}{15}, \frac{-3}{15}, \frac{-1}{15}, \frac{3}{15}, \frac{5}{15}, \frac{7}{15}, \frac{9}{15}, \frac{11}{15}, \frac{13}{15}, \frac{15}{15}\right\}$$

The general $PAM_{COH}$ formula is derived as follows ($1_{all}$ is an all-ones vector of proper dimension):

$$PAM_{COH}[2^\beta] =$$

$$2 \cdot PAM_{PNN}[2^\beta] - 1_{all} = 2 \cdot RNG\left[0, 1, \frac{1}{2^\beta - 1}\right] - 1_{all} = RNG\left[-1, 1, \frac{2}{2^\beta - 1}\right]$$

yielding (the COH constellation min distance is seen double, $$\frac{2}{2^\beta - 1},$$

$$[LSB, MSB] = [-1, 1]) \, PAM_{COH}[2^\beta] = RNG\left[-1, 1, \frac{2}{2^\beta - 1}\right]$$

For a generic S-way $\beta$-bits ML-driven MPoDAC with its S OGs driven by substrings of the overall $\beta$-bits code of respective lengths $\beta_S, \ldots \beta_3, \ldots, \beta_2, \beta_1$ with $$\beta = \sum_{s=1}^{S} \beta_s,$$

there are $C=2^\beta$ possible codewords corresponding to the $C=2^\beta$ levels of the output oPAM constellation. It is useful to relate the codewords to the sub-codes generated by each of the S OGs. Let the $\beta$ bits of the MPoDAC be marked by the OG they belong to (using bracketed superscripts, $^{(s)}$, whereas all bits are contiguously counted from right to left, starting with 0 and ending up in:

$$b \equiv \underbrace{b_\beta^{(S)} \ldots b_{\sum_{s'=1}^{S-1} \beta_{s'}}^{(S)}}_{OG\#S} \cdot, \ldots, \cdot \underbrace{b_{\sum_{s'=1}^{s-1} \beta_{s'} + \beta_s - 1}^{(s)} \ldots b_{\sum_{s'=1}^{s-1} \beta_{s'}}^{(s)}}_{OG\#s},$$

$$\ldots, \cdot \underbrace{b_{\beta_1+\beta_2+\beta_3-1}^{(3)} \ldots b_{\beta_1+\beta_2}^{(3)}}_{OG\#3} \cdot \underbrace{b_{\beta_1+\beta_2-1}^{(2)} \ldots b_{\beta_1}^{(2)}}_{OG\#2} \cdot \underbrace{b_{\beta_1-1}^{(1)} \ldots b_0^{(1)}}_{OG\#1}$$

Finally, the reconfigurable structure (FIG. 43) is also capable of being reprogrammed to generate opt PAM16, by parallelizing two PAM4 driven OGs to tile up four copies of the $\frac{3}{15}_{PAM4}$, each of span 3-LSB-intervals (LSBs referred to the target PAM16 constellation) by applying successive shifts of 4-LSB-intervals (the effect of the outer sum with the $2^{nd}$ $\frac{12}{15}$PAM4 term). The drivers for the bottom and top OGs are now both configured such as to drive both OGs by independent RF PAM4 signals. The power split/combine matched taps for this option are set to $$[W_0, W_1] = \left[\frac{1}{5}, \frac{4}{5}\right].$$

The field taps of the matched splitter/combine are then $$[u_1, u_0] = \left[\sqrt{\frac{1}{5}}, \sqrt{\frac{4}{5}}\right] = [v_1, v_0].$$

Another option may involve a provision of an RF PAM8 generator for one of the paths in FIG. 43 (which may be strenuous upon electronic technology for energy-efficient ultra-high-speed drivers for datacenters) or alternatively adopt the topologies as depicted in FIGS. 43 and 44. E.g., FIG. 44 is obtained by recursively using our opt PAM8 ML-driven-MP oDAC, as the OG of the top path, whereas the bottom path is driven by a PAM2 generator (i.e., we have a 1-bit OG in the other path).

Other examples of Multi-Level driven MPoDAC (ML-MPoDAC) to be potentially developed per this invention, may be based on relatively low count number of levels per path and on a low count of parallel paths. The least complex, preferred embodiments to be realized in a technology evolution scenario, are depicted in FIG. 43 for the fast data path level and in FIG. 42 for the control level, for the two-way ML-MPoDAC, and in FIG. 44 for three-way ML-MPoDAC, whereas FIG. 43 depicts a generic architecture with S paths.

The disclosed architecture enables making these oDACs reprogrammable (reconfigurable) if any combination of ePAM2 or ePAM4 drives is allowed for the individual multi-level OGs, i.e., if the paths are driven by reconfigurable ePAM2|4 electrical (RF) generators.

Another Example of ML-Driven MPoDACs with PAM2|4 Drivers

The case when all OGs are driven by PAM2 electrical signals reproduces the 1-bit-OG based MPoDACs.

There is provided a 2-way ML-MPoDAC (S=2 paths) driven by a pair of RF PAM2|4 generators. An ePAM4 generator is a 4-level electrical DAC, actuated by a pair of bits specifying the four PAM levels, which may be either unipolar (for DD) or bipolar (for COH). An ePAM2 generator is just a two-level driver (the levels may be unipolar {0,1} or bipolar, {−1,1}, in normalized form). ePAM2|4 generator is any prior art agile DAC that may generate either four levels (in response to codewords 00, 01, 10, 11 for example) or just generate the two extreme (MSB and LSB) levels, if the actuating bit-pairs are restricted to only 00,11, i.e., just the MSB and LSB are transmitted. Thus, the structure disclosed in FIG. 43, 42 features a reconfigurable, ML-driven MPoDAC, flexibly re-programmable on-the-fly to generate PAM4|8|16 as follows (here '||' denotes 'in parallel', i.e., two paths):

ePAM2||IePAM2→oPAM4   $[C_1, C_2]=[2,2] \therefore C=2 \cdot 19$   2=4 levels ePAM2||ePAM4=oPAM8 $[C_1, C_2]=[2,4] \therefore C=2 \cdot 4=8$ levels
ePAM4||ePAM2=oPAM8 $[C_1, C_2]=[4,2] \therefore C=4 \sim 2=8$ levels
ePAM4||IePAM4=oPAM16   $[C_1,$   $C_2]=[4,4] \therefore C=4 \cdot 4=16$ levels The oDAC is driven by a pair of independent RF PAM2|4 electrical units (typically in a mixed-signal ASIC referred to as driver, which may include RF amplification for the modulators of the OGs). ePAM4 drivers, which are 'reprogrammable' to be reconfigured on-the-fly between ePAM2 and ePAM4, are readily realized starting from a PAM4 DAC core. E.g., if 00,01,10,11 bit-pairs activate the generation of the four PAM levels (say, sorted in increasing order) then simply not feeding the 01, 10 combinations to the PAM4 unit has it effectively converted into a PAM2 driver (at the same full-scale), as the LSB and MSB levels are then generate.

As in the earlier disclosed 1-bit based MPoDACs, a slow digital controller should be provisioned to supervise the integrity of the coherent combination of paths in a prescribed ratio (set the slow phases for coherent optical superposition, and set and stabilize the split/combine ratios), ensuring that imperfections in the optical combination minimally degrade the DAC staircase linearity (uniformity).

The preferred modulators used in the ML-driven MPoDACs are of the MZM type, in which case we refer to the resulting oDACs as 'ML-driven MPMZM'. For the MZM (in fact for other types of modulators as well, e.g. EAM) the modulator transfer characteristic is nonlinear. Therefore, generating electrical PAM levels to generate prescribed optimal constellations for the OGs of the various paths requires accounting for the sine-shaped nonlinear characteristic of the MZM (this issue, is associated with multi-level operation but does not arise in the earlier disclosed MPMZMs based on two-level OGs). The driver technology most suited for this application (in fact for conventional generation of a multilevel optical signal by a multilevel DAC) must then have the ability to tune or 'tweak' the electrical levels of the constellations driving each of the OGs in the ML-driven MPMZM.

Evidently, a single ML-MPoDAC device generates the optical multilevel constellation for one optical transmission lane at a time. Multiple ML-MPoDACs may be arrayed in parallel to generate multi-lane signals to be multiplexed over wavelength and/or polarization and/or or optical quadratures. E.g., IQ-nesting a pair of ML-MPoDACs of the same order of their output optical PAM constellations a QAM signal would be generated.

Interestingly, the structure of the two-way ML-driven oDAC of FIG. 43 is akin to an IQ modulator. In fact, we may flexibly reprogram the device of FIG. 43 to cease its PAM generation functionality and generate instead QAM4 (QPSK) and QAM16 COH constellations. This is simply achieved by tuning the relative phase between the two paths to be 90° rather than 0° (or 180°) and tuning the input and output splitter/combine to 50-50 (3 dB) settings. The selection between QAM4 and QAM16 is then activated by switching the ePAM drivers from ePAM2 to ePAM4.

Optimized DD Constellation Generation Using the ML-Driven-MPoDACs

The resulting constellations, heretofore generated in the descriptions above, have been a unipolar (non-negative, equi-spaced), which are of theoretical value. Inspection of ideal DD field constellations indicates that in order to obtain reasonable quality constellations for DD it is imperative to deviate from the equi-spaced constellations paradigm (i.e., not actually generate PNN constellations for DD).

In the case of PAM8 DD generation, we should design an RF constellation by theoretically assuming adjustable levels to be optimized, along with the taps which no longer have the values evaluated for the PNN and COH cases:

$$PAM[8]_{DD} \equiv \left\{ 0, \sqrt{\frac{1}{7}}, \sqrt{\frac{2}{7}}, \sqrt{\frac{3}{7}}, \sqrt{\frac{4}{7}}, \sqrt{\frac{5}{7}}, \sqrt{\frac{6}{7}}, 1 \right\} \cong$$

$$W_0^{DD} \underbrace{\{c_0, c_1\}}_{RF\,PAM2_{DD}} + (1 - W_0^{DD}) \underbrace{\{c_0', c_1', c_2', c_3'\}}_{RF\,PAM4_{DD}},$$

Although the RHS is an 8-vector (as generated by the outer-linear-combination of a 2-vector and a 4-vector) and there are 2+4+1=7 parameters to optimize in the RHS (which is a nonlinear function of these parameters, thus we do not have enough degrees of freedom. Moreover, eight equations equating corresponding elements on both sides are nonlinear. An optimization criterion should not be getting the two 8-vectors on the RHS and LHS close to each other (e.g., in the mean-square sense), but it is rather maximizing the minimal distance of the constellation, a maxi-min problem as amply explained in the case of 1-bit gates based MPoDAC. The optimization should be conducted over the 4 levels of the adjustable PAM4, the two levels of the adjustable PAM2 and one tap (7 parameters totally). The quasi-optimal methodology one disclosed in this proposal for the MPoDACs based on 1-bit OGs carries over to this case (though the mathematical model is different now): the minimal distance of the constellation is to be maximized over the optimization parameters. The mathematics of such optimization will not be pursued here.

Fortunately, the optimization of the taps does not impact the topology of the ML-driven-MPoDAC itself. In particular, the photonic layout structures of FIG. 1-4 are suitable for both DD and COH optical PAM generation, irrespective of the optimal tap parameter (which are different for DD and COH, they are only identical for PNN and COH). The only difference is generation of either unipolar or bipolar ePAM RF signals in the two drivers. It is possible to combine the two types of signals in a single driver with parallel ePAM4 DD or COH circuit units, to dually serve both DD and COH DD ML-driven MPoDACs.

MPoDAC tradeoffs between using single-bit and multi-bit OGs Finally, let us compare MPoDACs (MP-MZM) in particular, based on single-bit OGs vs their counterparts based on multi-bit OGs. For a given order, say PAM16, the single-bit MPoDAC disclosed design requires having $\log_2$, 16=4 parallel paths. The splitter and combiner are now 1:4 and 4:1, i.e. there is a higher optical and taps control complexity than the two-path solution driven by two ePAM4 generators (and the misalignment impairment of contributed by the four optical paths is expected greater than that of in two optical paths case). On the other hand, four ePAM2 generators are much simpler (and have lower electrical power consumption altogether) than a pair of ePAM4 generators. We conclude that the single-bit vs. multi-bit OGs tradeoff implies tradeoffs between electrical and optical complexities, and different levels optical power consumptions. Nevertheless, since the generation of ePAM4 has matured in recent years, the usage of two ePAM4 generators while reducing the optical complexity to just two-paths may represent a sweet-point of the optical-electronic tradeoffs at this point. As experience is going to be accrued on realization of 1:S and S:1 tunable split/combine functionality, the tradeoff may evolve in favor of the single-bit OG based solutions.

FIG. 47 illustrates an example of method 470 for optical digital to analog conversion.

Method 470 may include a sequence of steps 471, 472, 473 and 474.

Step 471 may include receiving an input optical signals. Step 472 may include splitting, by a combiner, an input optical signal to multiple path input signals. Step 473 may include optically processing, the multiple path input signals, by the multiple optical paths, in parallel to provide path output signals. Step 473 may include applying optical modulation by optical gates of the multiple optical paths and under a control of multiple electrical modulators, to provide optical signals having a value selected out of multiple constellation levels.

Step 473 may include at least one out of: (a) Preprocessing, before the optical modulation by the optical gate, the input path signals.b) Post-processing the output signals outputted from the optical gate. The pre- and/or post processing may include amplifying and/or attenuating and/or phase amendments and the like.

Step 474 may include combining, by a combiner, multiple path output signals that may be outputted from the multiple optical paths to provide an oDAC output signal. The values of the oDAC may be values of a single quadrature constellation.

Method 470 may include one or more of the following steps: (a) Step 481 of configuring the optical gates to operate while driven by electrical modulators as phase gates or as intensity gates. (b) Step 482 of measuring, by a measurement circuit, different signals within an optical digital to analog converter that may include the multiple optical paths. (c) Step 483 of tuning, by a tuning circuit, phase differences between different optical paths. (d) Step 484 of tuning, by a tuning circuit, the splitter and the combiner. (e) Step 485 of compensating for temperature induced drifts and for compensating for acoustically induced disturbances. (f) Step 485 may include compensating for temperature induced drifts at a first compensation frequency and compensating for acoustically induced disturbances at a second compensation frequency that may be at least one hundred time bigger than the first compensation frequency.

SEMZM oDACs serially accumulate the binary-modulated optical phases induced in each of the modulation segments to form multilevel phase-domain samples, to be mapped, via optical interference, into multilevel optical amplitude (or power) levels arrayed in an Optical Constellation (OC).

PAM4 SEMZM Analytical Model for DD and COH

The SEMZM oDAC Transfer Factor (TF), $F_c$, in the optical-field domain, is the ratio of the multilevel output field to the input CW field amplitudes, labeled by an index c, labeling the OCs levels/codewords, ranging over {1,2,3, 4} for a PAM4 OC, $$F_c = \sin\left[b_1[c]\phi_1^{pk} + b_0[c]\phi_0^{pk}\right], c = 1, 2, 3, 4, \tag{8}$$

where $$\phi_i^{pk}, i = 1, 2$$

are the peak half-differential phases across the segment capacitors wrapped around the two waveguides.

For PAM4, the oDAC 'code' $b \equiv [b_1[c], b_0[c]]_{c=1,2,3,4}$ is the set of four two-bit codewords, corresponding to the four PAM4 levels respectively given for a DD OC and a COH OC, by $b^{DD} = \{[0,0], [0,1], [1,0], [1,1]\}$ and $b^{COH} \equiv \{[-1,1], [1,-1], [1,1]\}$ When the electrical drive scheme for the SEMZM modulation segments ensures no-chirp, the OC field levels are real-valued. Physically, the argument of the sine models the phase accrual over the two modulation segments, which individually contribute phases $$\phi_s|_{s=1,2} \in \left\{0, \phi_1^{pk}\right\}$$

for DD OC generation, and $$\phi_s|_{s=1,2} \in \left\{\pm\phi_1^{pk}\right\}$$

for COH OC generation. The sine function in models the optical interference between the fields from the upper and lower arms of the SEMZM in the output coupler combiner.

From the above is can be shown that the four OC field levels for DD PAM4:

$$F^{DD} \equiv \left\{F_1^{DD}, F_2^{DD}, F_3^{DD}, F_4^{DD}\right\} = \left[0, \sin\phi_0^{pk}, \sin\phi_1^{pk}, \sin\left(\phi_0^{pk} + \phi_1^{pk}\right)\right].$$

Abbreviate the Least (Most) Significant Bit as LSB (MSB). The LSB field level of the OC is $$F_1^{DD} = 0.$$

Evidently it is worth maximizing the MSB field level (which also maximizes the PAM4 MSB power level), thus we impose the constraint $$\phi_0^{pk} + \phi_1^{pk} = \frac{\pi}{2},$$

$$\phi_0^{pk} < \phi_1^{pk},$$

ensuring $$F_{MSB}^{DD} \equiv F_4^{DD} = \sin\left(\phi_0^{pk} + \phi_1^{pk}\right)\big|_{\phi_0^{pk} + \phi_1^{pk} = \frac{\pi}{2}} = 1.$$

The condition $$\phi_0^{pk} < \phi_0^{pk}$$

may be adopted without loss of generality, as it just amounts to a labeling convention for the two segments. Once said constraint is set, then reduces to the following optical field-OC parameterized solely by $$\phi_0^{pk}, F^{DD} \equiv \left\{F_c^{DD}\right\}_{c=1,2,3,4} = \left[0, \sin\phi_0^{pk}, \cos\phi_1^{pk}, 1\right]$$

with the OC levels ascending:

$$F_1^{DD} < F_2^{DD} < F_3^{DD} < F_4^{DD}.$$

But DD OCs are formulated in the optical-power domain. The 'power OC' is obtained by squaring the field levels to illustrate that $$P^{DD} \equiv \left\{\left(F_c^{DD}\right)^2\right\}_{c=1,2,3,4} = \left[0, \sin^2\phi_0^{pk}, \cos^2\phi_1^{pk}, 1\right]$$

The OC NN-distances in the power-domain are obtained by taking first differences of the sequence of OC power levels:

$$\begin{aligned}
d^{DD}\left(\phi_0^{pk}\right) &\equiv \left\{d_1^{DD}, d_2^{DD}, d_3^{DD}\right\} = \left\{P_{c+1}^{DD} - P_c^{DD}\right\}_{c=1,2,3} \\
&= \left[\sin^2\phi_0^{pk}, \cos^2\phi_0^{pk} - \sin^2\phi_0^{pk}, \right. \\
&\qquad \left. 1 - \cos^2\phi_0^{pk}\right] \\
&= \left[\sin^2\phi_0, 1 - 2\sin^2\phi_0, \sin^2\phi_0\right] \\
&= \frac{1}{2}\left[1 - \cos 2\phi_0, 2\cos 2\phi_0, \right. \\
&\qquad \left. 1 - \cos 2\phi_0\right]
\end{aligned}$$

Optimization of the PAM4 DD Constellations Using the Segmented MZM Serial oDAC

We are now ready to optimize the DD PAM4 constellation over the power-domain NN distances between the OC power levels. We adopt min-distance (MD) as the PAM4 OC figure of merit to optimize over, since Bit Error Rates (BER) over the optical transmission link is dominated by the least of distances between Nearest Neighbors (NN) pairs of OC levels, the so-called Minimal-Distance (MD). As the two NNs spaced at MD are the 'weakest link' of the OC, predominantly degrading BER, it makes sense to maximize the MD. Thus, we adopt 'maximize-MD' or in brief 'maximin-distance' as our oDAC optimization criterion, which turns out analytically tractable for PAM4. It is beneficial to maximize the OC Full-Scale (FS). For a 'dyadic' SEMZM designs, modulation backoff is counterproductive (as far as BER is concerned), despite seemingly improving oDAC linearity). It is preferable to have the OC stretched to its max-full-scale (assuming power consumption may be afforded). A max-full-scale constraint is then imposed on our DD PAM4 design, to ensure that the LSB is 0 and the MSB is unity, yielding FS=MSB−LSB of unity. Moreover, it now suffices to optimize the OC maximin design over a single parameter, say $$\phi_0^{pk}.$$

The maximin optimization problem for a generic 4-level OC is then:

$$d_{min-dist}^{DD} = \max_{\phi_0^{pk}} \min \left\{ d_1^{DD}(\phi_0^{pk}), d_2^{DD}(\phi_0^{pk}), , d_3^{DD}(\phi_0^{pk}) \right\} \tag{9}$$

Here the inner min selects the largest of the three elements of the vector (for each of the $$\phi_0^{pk}$$

values) whereas the outer max optimizes the selected largest element over $$\phi_0^{pk}.$$

Solving maximin mathematical problems is generally subtle, even for two-parameters but here we have reduced our parameterization to one parametric degree of freedom, $$\phi_0^{pk}.$$

Moreover, inspection of the three NN-distances indicates that $d_3 = d_1$ (both distances equal to $$\sin \phi_0^{pk})$$

thus it suffices to maximin over just the two distances $d_1, d_2$, considerably simplifying the optimization, as we have the two relevant NN-distances dependent on a single parameter, $$\phi_0^{pk},$$

to optimize over, thus we can provide a reduction to a 1D maximin:

$$d_{min-dist}^{DD} = \max_{\phi_0^{pk}} \min\overline{\{d_1^{DD}(\phi_0^{pk}), d_2^{DD}(\phi_0^{pk})\}}^{MD(\phi_0^{pk})} = \max MD(\phi_0^{pk})$$

To find the max-MD, imagine drawing a vertical line at a variable abscissa $$\phi_0^{pk},$$

considering the two points of intersection of this vertical with the $$d_1^{DD}, d_2^{DD}$$

graphs, and selecting, out of the two intersection points, the lower one, which then traces the black thick curve, which is $$MD(\phi_0^{pk}).$$

It remains to 'tune' the abscissa parameter $$\phi_0^{pk}$$

to have the $$MD(\phi_0^{pk})$$

graph peak (this is the max part of the maximin procedure); evidently this occurs right at the intersection point of graphs $$d_1^{DD}(\phi_0^{pk}), d_2^{DD}(\phi_0^{pk}).$$

Thus the optimal $$\phi_0^{pk}$$

satisfies the equation, $$d_1^{DD}(\phi_0^{pk}) = d_2^{DD}(\phi_0^{pk}) \Leftrightarrow \sin^2 \phi_0^{pk} = 1 - 2\sin^2 \phi_0^{pk}$$

with solution $$\phi_0^{pk} = \hat{\phi}_0^{pk} = a\sin\left(\frac{1}{\sqrt{3}}\right).$$

An alternative form of the solution is obtained by using, for $d_1, d_2$, the alternative cosine based trigonometric (trigo) expressions is $$d_1^{DD}(\phi_0^{pk}) = d_2^{DD}(\phi_0^{pk}) \Leftrightarrow \frac{1}{2}(1 - \cos 2\phi_0^{pk}) = \cos 2\phi_0^{pk}$$

and the solution of which is $$\phi_0^{pk} = \hat{\phi}_0^{pk} = \frac{1}{2}\mathrm{acos}\left(\frac{1}{3}\right).$$

Despite appearing different in their inverse trigo functions, the two alternative optimizer phase solutions are actually equal:

$$\hat{\phi}_0^{pk} \equiv \frac{1}{2}\cos\left(\frac{1}{3}\right) = \mathrm{asin}\left(\frac{1}{\sqrt{3}}\right) = 0.6155.$$

The optimal design phase for the second segment, $$\hat{\phi}_0^{pk},$$

is obtained as the angle complementary to $$\hat{\phi}_0^{pk}:\hat{\phi}_1^{pk} = \frac{\pi}{2} - \hat{\phi}_0^{pk} = \frac{\pi}{2} - \mathrm{asin}\frac{1}{\sqrt{3}} = \mathrm{asin}\sqrt{\frac{2}{3}} = 0.9553$$

Having derived the optimizer parameter $$\hat{\phi}_0^{pk},$$

have it now plugged into the power OC (7), yielding its optimum design:

$$P^{DD}(\hat{\phi}_0^{pk}) = \left[0, \sin^2\mathrm{asin}\left(\frac{1}{\sqrt{3}}\right), \cos^2\mathrm{asin}\left(\frac{1}{\sqrt{3}}\right), 1\right] = \left[0, \frac{1}{3}, \frac{2}{3}, 1\right]$$

Let the two segment lengths required in our optimal design be $\hat{L}_1, \hat{L}_2$. Assume that the peak voltages driving the two SEMZM segments are both selected at the $\pi$-switching voltage, $V_\pi$. Here $V_\pi$ refers to a fictitious MZM with electrode length equal to the sum of the two SEMZM segment lengths, $L_\pi \equiv \hat{L}_1 + \hat{L}_0$ (this is a special case, for a two-segment SEMZM, of the general derivation preceding eq. 30 of [1]). Then $$\hat{\phi}_0^{pk} = \frac{L_s}{L_\pi}\frac{\pi}{2},$$

therefore the optimal ratio of the two segment lengths is:

$$\hat{L}_1 : \hat{L}_0 = \hat{\phi}_0^{pk} = \mathrm{asin}\sqrt{\frac{2}{3}} : \mathrm{asin}\sqrt{\frac{1}{3}} = 1.55:1,$$

deviating significantly from conventional 'dyadic' 2:1 ratio of segment electrodes lengths for PAM4.

Modeling and Optimization of PAM4 COH Constellations Using the Serial SEMZM

A 'perfect' COH PAM4 constellation may be defined as the max-full-scale equi-spaced bipolar symmetric OC (having both positive and mirror negative field levels):

$$F^{COH} = \left[-1, -\frac{1}{3}, \frac{1}{3}, 1\right]$$

To derive the PAM4 COH OC as a function of the phase design parameters, there may be provided the following four field levels for the COH PAM4 OC, $$F^{COH}(\phi_0^{pk}) \equiv \{F_1^{COH}, F_2^{COH}, F_3^{COH}, F_4^{COH}\} = [\sin(-\phi_1^{pk} - \phi_0^{pk}),$$

$$\sin(-\phi_1^{pk} + \phi_0^{pk}), \sin(\phi_1^{pk} - \phi_0^{pk}), \sin(\phi_1^{pk} + \phi_0^{pk})]$$

$$F^{COH}(\phi_0^{pk}) = [-1, -\cos 2\phi_0^{pk}, \cos 2\phi_0^{pk}, 1]$$

where the phase constraint $$\phi_0^{pk} + \phi_1^{pk} = \frac{\pi}{2}$$

was used in the last line to obtain the compact trigo expressions.

Surprisingly, the same optimizer phase parameter $$\hat{\phi}_0^{pk},$$

as derived for DD PAM4, also maximin-optimizes, yielding a 'perfect' COH PAM4 constellation in this case as well:

$$F^{COH}(\hat{\phi}_0^{pk}) = F^{COH}\left(\mathrm{asin}\sqrt{\frac{1}{3}}\right) = \left[-1, -\frac{1}{3}, \frac{1}{3}, 1\right]$$

Optimized Electronic Drivers and Improved Photonic Structures For PAM2|4-Driven Multi-Parallel Optical Digital to Analog Converters The previous examples illustrated a PAM2|4 driven Multi-Parallel optical Digital to Analog Converter (oDAC) based on coherently combining parallelized Mach-Zehnder Modulators (MZM). Here, in the case that there are two parallelized MZM paths in the said oDAC, we disclose a design of the two electronic DAC (eDAC) drivers for the two MZMs which is more resilient to electronic mismatch errors stemming from random deviations of the electrical current sources of the two drivers. Moreover, we also teach how to mitigate the nonlinear effect of the sine-shaped MZM voltage-to-optical-field transfer characteristic for most linear (uniform) constellation, i.e. for maximal eye-opening performing these two improvements jointly. Contrary to 'engineering common sense', which would suggest the usage of a pair of identical (balanced) drivers, given that the same peak voltages and 4-level voltage constellations are called for at the electrical terminals of the two MZMs in terms of optimal MPoDAC optical coherent combining, we inventively describe an improved joint design intentionally imbalancing the two drivers in terms of the cascade of their current-steering eDAC section and their Trans-Impedance-Amplifier (TIA) section following it, the output of which feeds the electrodes of the respective MZM. We teach how to select the peak current and TIA trans-resistance parameters of the two eDACs such as to optimize the resilience to electronic mismatch errors of the optical output constellation of the eDAC, such that its statistical and deterministic deviations from the nominal uniform constellations be minimized, both in terms of mismatch errors suppression and in terms of mitigation of the nonlinear transfer characteristic of the MZMs. We then disclose an alternative structure of the photonic structure of the said oDAC, conceptually conceived by replacing the MZMs in the two paths of the multi-parallel oDAC by two segments SEMZMs, each of which is optimized in terms of its two-segments and their drive voltages. For a preferred embodiment of this new photonic structure, using just two parallel SEMZMs, each with two-segments, there is then a total of four Non-Return-to-Zero (NRZ) drivers needed to generate an optical bipolar PAM16 constellation at the output of this new MP-oDAC, and there is no need for digital encoders encoding a given number of input bits to a larger number of output bits, which is advantageous as digital encoders have high power consumption at ultra-large speeds.

FIGS. 49, 50, 51, 52, 53, 54A, 54B, 54C, 54D; 55 and 56 illustrates examples of optical DACS, or parts of optical DACs and a method.

There may be provided a oDAC that has optical paths such as a first optical path and a second optical path. See, for example, FIGS. 50 and 51.

The first and second optical paths are configured to receive a first path input signal and a second path input signal.

An input optical power ratio between the power of the first path input signal and the power of the second path input signal differs from one. See, for example W1 and W0 of FIG. 50.

The first optical path comprises a first modulator that is driven by a first driver that comprises a first trans-impedance amplifier that has a first trans-impedance value and is configured to receive by a first input current that exhibits a first peak input current value. An example of drivers and trans-impedance amplifiers are provided in FIG. 51.

The second optical path comprises a second modulator that is driven by a second driver that has a second trans-impedance amplifier that has a second trans-impedance value and is configured to receive by a second input current that exhibits a second peak input current value.

A trans-impedance ratio between the first trans-impedance value and the second trans-impedance value is configured to compensate for the ratio between the first peak input current value and the second peak input current value.

The oDAC according to claim 17, wherein the first optical path is configured to output a first path output signal, wherein the second optical path is configured to output a second path output signal, wherein the combiner is configured to optically combine (i) a first product of a multiplication between the first path output signal and a first combiner weight; and (ii) a second product of a multiplication between the second path output signal and a second combiner weight; wherein an optical power combining ratio between the first combiner weight and the second combiner weight differs from one. See, for example combiner weights W1' and W0' of FIGS. 50 and 51.

The first input current and the second input current may have two possible values—their value can be controlled by one bit.

Figure 51:
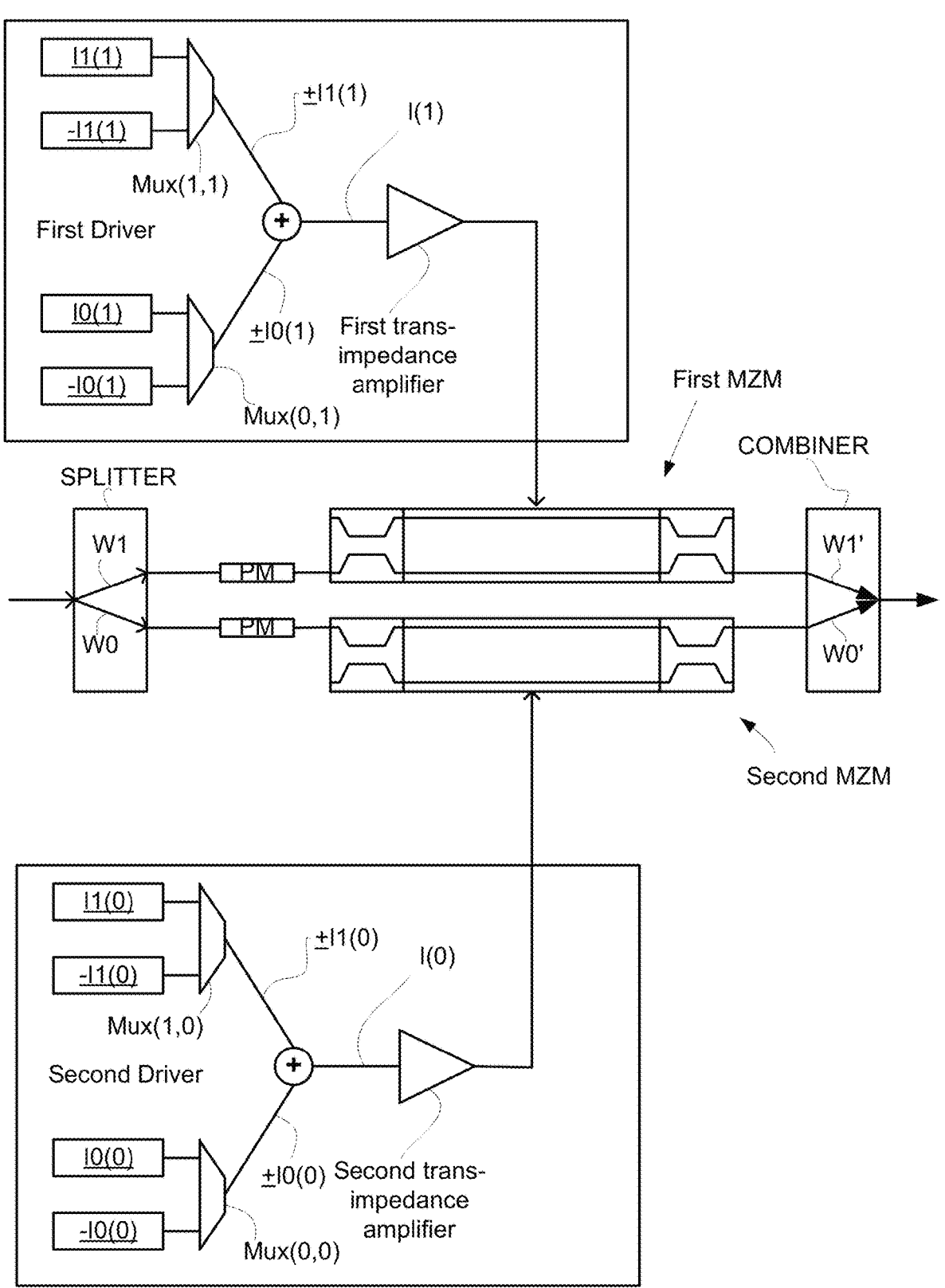
FIG. 51 illustrates an example of a PAM4-driven 2P-oDAC.

The first input current and the second input current have four possible values—their value can be controlled by two bits. FIG. 51 illustrates a two bit control scheme—one bit for multiplexer mux (1,1) and a second bit for multiplexer muc(0;1).

The input optical power ratio may range between 2 and 20.

The input optical power ratio may range between 4 and 6.

The first driver may include first current sources that precede the first trans-impedance amplifier, wherein a product of (i) a mean input current inputted to the first trans-impedance amplifier, multiplied by (ii) the first trans-impedance value, may be constant.

The second driver may include second current sources that precede the second trans-impedance amplifier. A product of (i) a mean input current inputted to the second trans-impedance amplifier, multiplied by (ii) the second trans-impedance value, may be constant.

The first modulator may be a first Mach-Zehnder-Modulator (MZM) and wherein the second modulator may be a second MZM.

Each one of the first MZM modulator and the second MZM modulator may be a non-segmented MZM modulator. See, for example, FIG. 51.

At least one of the first MZM modulator and the second MZM modulator may be a segmented MZM modulator. See, for example, FIG. 54D.

Each one of the first MZM modulator and the second MZM modulator may be a segmented MZM modulator that consists essentially of a sequence of a first segment and a second segment.

Each segment may be fed by an electrical two-level driver.

A phase shift ratio between a phase shift introduced by the first segment and a phase shift introduced the second segment of a MZM modulator of the first and second MZM modulators may range between 1.1 and 1.95.

The first segment of the first MZM modulator may be fed by the first trans-impedance amplifier, the second segment of the first MZM modulator may be fed by a third trans-impedance amplifier, wherein a ratio between (i) a first product of a multiplication of a first segment length by a mean output voltage of the first trans-impedance amplifier, and (ii) a second product of a multiplication of a second segment length by a mean output voltage of the third trans-impedance amplifier substantially equals 1.552. See, for example, FIG. 54D.

A segment length ratio between a length of the first segment and a length of the second segment may range between 1.1 and 1.95.

The segment length ratio may substantially equal 1.552.

The multiple optical paths may be only the first optical path and the second optical path; and wherein the oDAC may be configured to output signals that are selected out of 2-level pulse amplitude modulation (PAM) signals, 4-level PAM signals, 8-level PAM signals and 16-level PAM signals.

The first driver also may include first current sources that precede the first trans-impedance amplifier, wherein the second driver also may include second current sources that precede the second trans-impedance amplifier; wherein a ratio between the first trans-impedance-value and the second trans-impedance value may be about four. See, for example, FIG. 51.

The first driver may include first current sources that precede the first trans-impedance amplifier, wherein the second driver also may include second current sources that precede the second trans-impedance amplifier; wherein a ratio between a mean input current inputted to the first trans-impedance amplifier and a mean input current inputted to the first trans-impedance amplifier may be about 0.25. See, for example, FIG. 51.

The multiple optical paths may include a first optical path and a second optical path. The multiple path input signals may include a first path input signal and a second path input signal. An input optical power ratio between a power of the first path input signal and a power of the second path input signal differs from one. For example W0 may differ from W1.

The first optical path may include a first modulator and a second modulator, the first modulator may include a first segment that may be followed by a second segment, the second modulator may include a third segment that may be followed by a fourth segment. The first segment may be driven by a first driver, that may include a first trans-impedance amplifier. The second segment may be driven by a third driver that may include a third trans-impedance amplifier. The third segment may be driven by a second driver that may include a second trans-impedance amplifier. The fourth segment may be driven by a fourth driver that may include a fourth trans-impedance amplifier. See, for example FIG. 54A, whereas an example of drivers are provided in FIG. 51.

In this scenario—a first modulator phase shift ratio between a phase shift introduced by the first segment to a phase shift introduced by the second segment may range between 1.1 and 1.95. A second modulator phase shift ratio between a phase shift introduced by the third segment to a phase shift introduced by the fourth segment may range between 1.1 and 1.95.

The first modulator phase shift ratio may substantially equal 1.552.

The first trans-amplifier has a first trans-impedance value. The second trans-amplifier has a second trans-impedance value. The third trans-amplifier has a third trans-impedance value. The fourth trans-amplifier has a fourth trans-impedance value.

The first trans-amplifier value may equal the second trans-impedance value. The third trans-impedance value may equals the fourth trans-impedance value. The first trans-impedance value may differ from the third trans-impedance value.

The first trans-impedance value may be about one fourth of the third trans-impedance value.

There may be provided a method for optical digital to analog conversion using any of the mentioned above and/or the mentioned below oDACs.

1. Generating BIP-oPAM4: Tx #1: ePAM4-Driven-MZM; Tx #2: 2NRZ-Driven-SEMZM

1.1 Some Abbreviations and Notations

Mach-Zehnder-Modulator (MZM); Segmented-MZM (SEMZM).
Pulse Amplitude Modulation (PAM).
Electrical PAM (ePAM); Optical PAM (ePAM). Digital to Analog Converter (DAC).

Thermometer-Weighted (ThWgt); Binary-Weighted (BiWgt); Segmented (Seg) DAC types
Electrical PAM (ePAM); Optical PAM (ePAM). Unipolar (UNIP); Bipolar (BIP).
Quadrature Amplitude Modulation (QAM). In-Phase and Quadrature (IQ).
Electrical DAC (eDAC); Optical DAC (oDAC). Direct Digital Drive (DDD).
Standard Deviation (STD); Relative STD (RSTD).
Multi-Parallel oDAC (MPoDAC), as introduced in [1-4].
Least Significant Level (LSL); Most Significant Level (MSL); Full-Scale (FS).
Building Block (BB); Transmitter (Tx).
| denotes OR, e.g. 4|2 means 4 OR 2; a|b|c denotes a OR b OR c for any objects a,b,c. {a, b, . . . , z} denotes a column vector with elements a, b, . . . , z.

$$1_m^\vee$$

denotes the all-ones column m-vector:

$$1_m^\vee \equiv \underbrace{\{1, 1, \dots, 1\}}_{m\ ones}.$$

$$1_{C \times S}^\vee$$

denots an all-ones matrix of dimensions C×S.
□ denotes the Shur (elementwise) product, u□v, of compatible vectors.
$v^{\square 2}$ is the Shur-square:

$$v^{\square 2} \equiv v \square v \equiv \{v_1^2, v_2^2, \dots, v_m^2\} \text{ for } v \equiv \{v_1^1, v_1^2, \dots, v_1^m\}.$$

For any function $f(\bullet): \square \to \square$, and vector $v \in \square \to \square^n$, $f(v) = \{f(v_1), f(v_2), \dots, f(v_n)\}$ is defined elementwise, e.g., the sine of a vector is the vector of the sines of the elements of the vector.

$\langle \bullet \rangle$ denotes the (stochastic) Mean (expectation) of a Random Variable (RV).

Any generic RV, R, is decomposed as mean, $\langle R \rangle$ +perturbation, $\delta_R$: $R = \langle R \rangle + \delta R$.

The variance of R is denoted, $$\mathrm{var}\{R\} \equiv \sigma_R^2 \equiv \langle |R|^2 \rangle.$$

Let R={$R_1, R_2 \dots, R_m$} be a random vector. Its variance vector is defined as the vector of variances of its components:

$$\sigma_R^2 \equiv \{\sigma_{R_1}^2, \sigma_{R_1}^2, \dots, \sigma_{R_m}^2\}.$$

⊗ denotes Kronecker Product (Kprod);
⊕ denotes Kronecker Sum (in the sense defined in this disclosure and in M. Nazarathy and I. Tomkos, "Energy-efficient reconfigurable 4|16|64|256-QAM transmitter based on PAM2I4-driven optical DACs," Phot. Technol. Lett. 34, 1159-1162, 2022 (denoted "energy-efficient reference".)

Other, less frequent, abbreviations and notations will be introduced in the text as needed.

1.2 Introduction

This disclosure addresses eDAC drivers design for our PAM2I4-driven 2Parallel-oDAC, assessing the overall quality of the optical domain output constellation of our oDAC, accounting for the MZM nonlinearity, as well as for the electronic mismatch errors of the eDAC drivers, and also designing the ePAM4 drivers to mitigate the impact of the MZM nonlinearity. Conventional high-speed optical transmitters typically comprise an MZM optically fed by a laser and electronically fed by an eDAC driver, in turn actuated by the data to be transmitted. Since the MZM voltage-to-optical-field characteristic is nonlinear, it would be beneficial to have its driver electrical constellation modified such as to compensate for the MZM non-linear modulation characteristic, the net result being the generation of a uniform constellation in the optical field domain. The modified eDAC constellation is said to be predistorted—it is no-longer a uniform constellation but it rather has its levels shifted away from the nominal positions that a uniform constellation (of the same LSL and MSL, hence same FS as the predistorted constellation) would have.

The eDAC driver predistortion concept carries over to our PAM2I4-driven Multi-parallel (MP) oDAC design. In the sequel, we present, for simplicity MP-oDACs with just 2 parallel paths (though the concepts readily generalize to multiple (more than two) parallel optical paths). In a PAM2I4-driven 2-parallel oDAC, at least one of the two MZMs in the two parallel paths is driven by an BIP-PAM4 eDAC which is to be suitably predistorted, such that the MZM in the corresponding path generates a uniform optical PAM4 constellation. In particular, it is beneficial to use direct-digital-drive for the predistorted-BIP-PAM4 eDAC, meaning that this PAM4 eDAC with C=4 levels is driven by just two parallel input bit-lines, a setup we refer to as Direct-Digital-Drive (DDD), $$B = \log_2 C = \log_2 4 = 2 \text{ bits} \tag{1}$$

where it is noted that $\log_2 C$ is the minimal number of bits required to distinguish between C distinct levels.

We refer to an ePAM4 predistorted design with B=2 bits as a preDistBiWgt eDAC. Note: preDistBiWgt is a bit of a misnomer, as for ePAM BiWgt uniform constellation design the two source currents must be in 2:1 ratio, whereas now, in order to have the output levels arbitrarily position the ratio of the two source currents will generally depart depart from 2:1. But the qualifier preDistBiWgt suggests departing from a BiWgt design and modifying the current sources ratio, to shifts the PAM4 levels to desired locations.

An alternative design for arbitrarily 'predistortable' ePAM4 drivers, may be based on a predistorting a ThWgt eDAC. This requires three current sources, S=C−1=4−1=3 which now no longer have equal means as they would for a ThWgt eDAC generating a uniform constellation. Now the three mean current sources are not necessarily equal. The parallel digital input into the preDist-ThWg eDAC then requires 3 parallel bit-lines (one bit per current source). The predistBiWgt design outlined above seems preferrable over the, predistThWgt design, as its DDD digital actuation structure of predistBiWgt uses the minimally required number of parallel input bit-lines, namely just two (see (1) above). Prior to treating ePAM4 preDist-BiWgt drivers, let us address, in the next section more general non-uniform eDACs, dubbed preDistPAM-C eDACs.

In the sequel we revisit the statistical modeling of eDACs starting from statistical characterization of the elementary switched elements in eDACs. Our interest is in ultra-high-speed optical communication, which requires ultra-wide-band eDACs to drive the optical modulators. The eDACs are typically realized using currents-steering aka currents switching. Fortunately, the statistical properties of other eDAC structures, namely resistor-switched or capacitor switched eDACs are equivalent to those of the currents switched eDACs, therefore our results are of wider generality. Our top-level objective in this paper is to develop statistical tools for modeling oDAC impairments due to the electronic mismatch errors in the eDACs internally driving the oDACs. In fact, the statistical analysis of eDACs and oDACs may be unified.

1.3 Matrix-Based Modeling of Current-Steering eDACs

The two types of DAC of interest to us here (be they eDAC and oDAC) may be described by a common matrix formalism, as partially introduced in PCT patent application PCT/IB2021/060857 which is incorporated herein by reference for oDACs modeling, ported and adapted here for the first time eDAC modeling in preparation of developing an all-analytic approach to statistical modeling of BIP eDACs.

Fundamentally, random fabrication and material imperfections dictate that the current sources of any DAC ASIC cannot be perfectly fabricated to precisely operate at their nominal designed value, due to inevitable statistical variations among the current source MOS transistor devices. Thus, the multiple elementary current sources should be realistically modeled as drawn from a statistical distribution (typically a normal distribution). These imperfections of the elementary sources current values are referred to as 'electronic mismatch errors', or in short 'mismatch'—a fundamental eDAC impairment to be statistically modeled here. Henceforth all currents are viewed as random variables with perturbations around their nominal values (their means) due to electronic mismatch errors.

The motivation is to provide analytical tools to enable an assessment of the resilience of the disclosed optical DACs to electronic mismatch errors inherently affecting the eDAC drivers of the disclosed oDACs. Fortunately, eDACs of the BiWgt and ThWgt type are linear devices, enabling a streamline matrix-based model to be now developed.

Note: The proofs of most of the inferred results below will be omitted for brevity.

Nevertheless, any missing derivations may readily be reconstructed by readers trained in elementary random signal analysis, starting from the clearly stated assumptions.

Consider a stochastic ensemble of nominally identical eDACs. Each eDAC comprises S current sources, generating currents $I_s$, s=0, 1, 2, . . . , S−1, where S is the number of sources. The source currents, $I_s$ are Random Variables (RV), thus $I \equiv \{I_{S-1}, I_{S-1}, \ldots, I_1, I_0\}$ is a random vector. Note the unusual reverse indexing from S−1 down to 0 for the elements of I. Moreover, the source currents $I_s$ are assumed all positive, $\langle I_s \rangle > 0$ for S=0, 1, . . . , S−1 even for bipolar (differential) eDACs, wherein antipodal negative sources are effectively obtained by switching circuits, modeled by a switching or code matrix, C, of size C×S with elements all ±1, such that $$J = CI \qquad (2)$$

where $J=\{J_1, J_2, \ldots, J_C\}$ (a column vector) is the output C-levels current constellation generated by the eDAC. The transposes of the rows of the code matrix C are denoted $b^T[c]$, for c=1, 2, . . . , C where $b[c]=\{[C]_{c1}, [C]_{c2}, \ldots, [C]_{cS}\}$ are called the eDAC codewords, and the set of codewords is called the eDAC code.

The code matrix C for the eDAC (see (2)) is in fact similar to the code matrix B for the SEMZM-oDACs and MP-oDACs as introduced in PCT patent application PCT/IB2021/060857 which is incorporated herein by reference and M. Nazarathy and I. Tomkos, "Accurate Power-Efficient Format-Scalable Multi-Parallel Optical Digital-to-Analogue Conversion," Photonics 8, 38, 2021, except that domain and co-domain of the linear transformation are not current-domains as for (2) but are rather different physical quantities (though both B for BIP oDACs and C for BIP eDACs are ±ivalued matrices, notwithstanding the different interpretations of the input and output to the corresponding linear transformation).

The linear transformation (2) yields the following c-th output current level $$J_c = b^T[c]I = [C]_{c,1}I_{S-1} + [C]_{c,2}I_{S-2} + \ldots + [C]_{c,S-1}I_2 + [C]_{c,S}I_0 = \qquad (3)$$

$$\pm I_{S-1} \pm I_{S-2} \pm \ldots \pm I_2 \pm I_0$$

where the signs are determined by the ±1 values in the c-th row of the matrix C, i.e. the elements of the c-th codeword. For a ThWgt BIP-eDAC the size S of the source current array (and the length of each codeword vector), equals S=C−1 (with C the size of the codewords—and of the output current constellation. The successive codewords are of the form $$b^{ThWgt}[c] = \{\underbrace{-1, -1, \ldots, -1}_{C-c\ minus-ones}\underbrace{1, 1, \ldots 1}_{c-1\ ones}\}.$$
(equation unnumbered, adjacent to line 45)

For a BiWgt BIP eDAC the size S of the source current array (and the length of each codeword vector), equals S=B−1, with B=log$_2$C the minimal number of bits describing the size C of the output constellation.

The BiWgt codewords $b^{BiWgt}[c]$ are B-bit bitstrings forming a 'counting code': the successive codewords are ±1-valued bitstrings corresponding (according to the mapping 0↦−1 and 1↦+1) to the base-2 representations of the successive integers 0, 1, 2, . . . , C−1).

This implies (from elementary binary representation considerations) that $$\left(b^{BiWgt}[c]\right)^T\{2^{B-1}, 2^{B-2}, \ldots, 4, 2, 1\} = c-1 \qquad (10)$$

The simple linear combination (3) of source currents model with ±1 coefficients renders the evaluation of the second-order statistics is relatively straightforward, once the second-statistics of the source current vector $I \equiv \{I_{S-1},$ $I_{S-1}, \ldots, I_1, I_0\}$ is specified. Let us introduce the respective Least-Significant-Level (LSL) $J_1$ and the Most-Significant-Level (MSL), $J_C$ of an eDAC current output constellation.

Def: 'Full-Scale' (FS) of an eDAC is defined as the difference between the MSL and LSL:

$$FS \equiv J_C - J_1 \qquad (11)$$

Evidently the FS is a RV as the MSL and LSL are. A useful metric is the mean FS, $\langle FS \rangle$:

$$\langle FS \rangle = \langle J_C \rangle - \langle J_1 \rangle \quad \langle FS \rangle = \langle J_c \rangle - \langle J_1 \rangle \qquad (12)$$

The segment $[\langle J_1 \rangle, \langle J_C \rangle]$ of the real-axis is referred to as the Full-Scale Range (FSR). Its length equals the mean-FS. Note that the C constellation levels (points) partition the FSR into C−1 constellation 'steps' aka 'increments' aka 'Nearest-Neighbor (NN) intervals'.

Def: The 'Steps', $\nabla J_c$, of a 1D constellation of levels defined as the lengths of the intervals between pairs of adjacent levels of the constellation:

$$\nabla J_c \equiv J_{c+1} - J_c, c = 1, 2, 3, \ldots, C-1 \qquad (7)$$

$$\nabla J_1 \equiv J_2 - J_1, \nabla J_2 \equiv J_3 - J_2, \ldots, \nabla J_{C-1} \equiv J_C - J_{C-1}. \qquad (13)$$

The sequence of constellation steps is arrayed into a 'steps vector'

$$\nabla J \equiv \{\nabla J_c\}_{c=1}^{C-1}.$$

The steps-operator, $\nabla$, alternatively called first-difference operator is the linear mapping $$\nabla : \square^C \to \square^{C-1}, J \mapsto \nabla J, J_c \mapsto \nabla J_c \equiv J_{c+1} - J_c. \qquad (14)$$

Lemma: The c-th level, $J_c$ of a constellation $$J \equiv \{J_c\}_{c=1}^C$$

is obtained by accumulating the first c−1 steps of the given sequence, having them added to the initial element, $J_1$:

$$J_c = J_1 + \sum_{i=1}^{c-1}\nabla J_i \qquad (9)$$

Formula (9) for the c-th level of the output constellation, in terms of the steps, is the solution of the recursion, $$J_{c+1} = J_c + \nabla J_c \qquad (15)$$

The Full-Scale of the constellation is then given by the accumulation of all C−1 steps:

$$FS = J_C - J_1 = \sum_{i=1}^{C-1} \nabla J_i \qquad (16)$$

The (arithmetic) 'average step' is obtained by scaling the FS equation by the 1/C−1 factor:

$$\nabla \overline{J} \equiv \frac{1}{C-1} \sum_{i=1}^{C-1} \nabla J_i = \frac{1}{C-1} FS \qquad (17)$$

Taking the (stochastic) mean of the average step yields the 'mean-average-step':

$$\langle \nabla \overline{J} \rangle \equiv \frac{1}{C-1} \sum_{i=1}^{C-1} \langle \nabla J_i \rangle = \frac{1}{C-1} \langle FS \rangle. \qquad (18)$$

The mean-average-step $\langle \nabla \overline{J} \rangle$ coincides with the fixed step of a deterministic 'nominal' uniform reference constellation $$J^{nom} \equiv \left\{ J_c^{nom} \right\}_{c=1}^{C}$$

specified to have its LSL and MSL respectively coinciding with the mean LSL and mean MSL of the given constellation:

$$J_c^{nom} = J_1 + (c-1)\nabla \overline{J} = \qquad (19)$$
$$J_1 + (c-1)\frac{FS}{C-1} = \frac{c-1}{C-1}(J_C - J_1) = \frac{C-c}{C-1} \cdot J_1 + \frac{c-1}{C-1} \cdot J_C$$

BiWgt vs. ThWgt mean currents BiWgt eDACs are driven in parallel by S=B actuation bits where B=$\log_2$ C, C=$2^B$, since in our model, BiWgt eDACs of both UNIP|BIP polarities conceptually use just S=B nominal current sources, $$\{I_s\}_{s=0}^{B-1},$$

arrayed in the vector $I^{BiWgt}$ in reverse order, with $I_0$ (s=0 index) in the last element of $I^{BiWgt}$, $I_1$ (s=1 index) ahead of it, $I_{B-1}$ in the first element of $I^{BiWgt}$. Note: Actual circuits of BIP BiWgt eDACs may use twice as many sources, having the source currents ±I, generated by two separate current sources rather than being derived from a single source, since BIP sources may be paired up in antipodal pairs (providing for each current level both signs of that current level). In contrast, in our mathematically convenient model, J=CI, wherein I comprises B positive source currents, this effect is attained by using a ±1-valued code matrix, such that the bipolar sign flips ±1 in the linear combinations forming the $J_c$ currents be conceptually provided by ±1-valued codewords. As a result, our simple matrix-based model does not correctly predict cross-correlations between eDAC output levels. Nevertheless, for the purpose of statistical modeling of variances, this construction, using just B positive source currents, is indistinguishable from a circuit-oriented model based on 2B bipolar source currents.

Thus our model uses as many effective current sources, S=B=$\log_2$ C, as the number of bits, B, determining the C=$2^B$ codewords or levels. In contrast, the ThWgt eDAC architecture uses S=C−1 sources. The B current sources in our model for BiWgt eDACs (be they UNIP|BIP) form a so-called 'dyadic sequence'—a geometric sequence with ratio 2, $$\langle I_s \rangle = 2^s \langle I_0 \rangle, \text{ for } s = 0, 1, 2, \dots, B-1, \qquad (15)$$

$$\left\langle I^{BiWgt} \right\rangle = \left\{ 2^{B-1}\langle I_0 \rangle, 2^{B-2}\langle I_0 \rangle, \dots, 4\langle I_0 \rangle, 2\langle I_0 \rangle, \langle I_0 \rangle \right\}$$

where we note that the first element, indexed s=0, $\langle I_0 \rangle$, of the increasing geometric sequence is the least element, and it is also the GCD of the dyadic sequence of elements.

In UNIP BiWgt eDACs, the B current sources are weighted by 0|1 values, forming the following linear combination, implemented by having the switching matrix either include or exclude (either steer-in or block, divert away) some or all of the current sources:

$$\langle J_c \rangle = \qquad (20)$$
$$(0|1)2^{B-1}\langle I_u \rangle + (0|1)2^{B-2}\langle I_u \rangle + \dots + (0|1)4\langle I_u \rangle + (0|1)2\langle I_u \rangle + (0|1)\langle I_u \rangle$$

The level-index, c, for UNIP determines the 0|1 weights of each source, per the bitstring specified in the c-th UNIP codeword, $b_{UNIP}[c]$, which embodies a 'counting code'.

The codewords (and coding matrix) of BIP BiWgt eDACs are obtained from the UNIP ones by the replacements 0→−1, 1→1. Thus, BIP BiWgt eDACs, the B current sources (15) are weighted by ±1 values, generating the following linear combination, having the switching matrix either add up or subtract some or all of the current sources, flipping or not flipping the polarity of each of the contributing current sources:

$$\langle J_c \rangle = \pm 2^{B-1}\langle I_u \rangle \pm 2^{B-2}\langle I_u \rangle + \dots \pm 4\langle I_u \rangle \pm 2\langle I_u \rangle \pm \langle I_u \rangle \qquad (21)$$

Here, the output level index, c, determines the particular ±signs used for weighting each current source, corresponding to the ±1 elements of the c-th BIP codeword, $b_{BIP}[c]$.

Thus, the source currents (15) serve to model either UNIP|BIP BiWgt eDACs.

The mean total source current (applicable to both UNIP|BIP BiWgt eDACs) is obtained by summing up the elements dyadic finite sequence (15), yielding:

$$\left\langle I_{tot}^{BiWgt} \right\rangle = \left\langle \sum I^{BiWgt} \right\rangle = \sum \left\langle I^{BiWgt} \right\rangle = \sum_{s=0}^{B-1} 2^{B-1-s} \langle I_0 \rangle = \sum_{s'=0}^{B-1} 2^{s'} \langle I_0 \rangle \qquad (22)$$
$$= \left( 2^{B-1} + 2^{B-2} + \dots + 4 + 2 + 1 \right)\langle I_0 \rangle = \left( 2^B - 1 \right)\langle I_0 \rangle = (C-1)\langle I_0 \rangle$$

Current Normalizations by the Unary Current

For a given chip, batch or production lot of eDACs, it is useful to 'calibrate' all current sources by having them expressed in units of a particular reference current, referred to 'unary current', $I_u$ (the subscript u stands for 'unit' or 'unary'). The nominal value of the RV $I_u$, i.e., its mean, $\langle I_u \rangle$, is going to be used as a normalizing unit of measurement to peg all currents aboard the chip as well as formulate their first and second order statistical metrics. The choice of the current level constituting the mean unary current is arbitrary, Smart selection of the unary current guided by eDAC modeling convenience, such as to yield easier to handle expressions in terms of the normalized currents on the eDAC chip.

Conventional choices of the 'unary current' are to select the current having the least mean. This works well for BiWgt|ThWgt eDACs but turns out unsuitable for more general constellations as required here. We adopt a unary current definition applicable to arbitrarily shaped constellations, in particular to non-uniformly spaced constellations, such as predistorted ones, requiring current sources, i, departing from the ThWgt or BiWgt specified designs (equal mean current sources and dyadic currents sources respectively). To address such constellations, we introduce a general definition for $\langle I_u \rangle$, applicable to non-uniform constellations as well, yet reducing to conventional definitions, once the constellation is taken uniform.

Def: Unary random current, $I_u$: The unary current is defined as the random current of a fictitious current source, conceptually constructed on the same eDAC chip, of mean value $\langle I_u \rangle$ given by the 'mean-average step' of the given (generally nonuniform) constellation, $$\langle I_u \rangle \equiv \langle \overline{\nabla J} \rangle \equiv \langle \overline{\nabla J_c} \rangle = \frac{1}{C-1} \langle FS \rangle = \frac{1}{C-1} \langle J_C - J_1 \rangle = \frac{1}{C-1}[\langle J_C \rangle - \langle J_1 \rangle] \tag{19}$$

with the 'mean-average step' defined as the stochastic mean applied to the arithmetic average, in this case applied to the sequence of constellation steps:

$$\langle \overline{\nabla J} \rangle \equiv \langle \overline{\nabla J_c} \rangle = \frac{1}{C-1} \sum_{i=1}^{C-1} \langle \nabla J_i \rangle = \frac{\langle J_C \rangle - \langle L_1 \rangle}{C-1} = \frac{\langle FS \rangle}{C-1} \tag{23}$$

In the special case that the mean output current constellation is uniform (e.g., for UNIP|BIP BiWgt eDACs) the definition above for $\langle I_u \rangle$ reduces to the fixed NN-separation of the given uniform constellation. In particular, for the BIP BiWgt eDAC:

$$BIP\ BiWgt|ThWgt:\ \langle J_c \rangle = (2c - C - 1)\langle I_0 \rangle \tag{24}$$

with $\langle I_0 \rangle$ the least source current. The fixed NN-spacing of this arithmetic sequence is:

$$\langle I_u \rangle \equiv \langle \overline{\nabla J_c} \rangle = 2\langle I_0 \rangle \tag{25}$$

Actually, the BIP unary current is twice the least source current for BiWgt|ThWgt BIP eDACs, $$BIP\ BiWgt|ThWgt:\ \langle I_u \rangle \equiv \langle \overline{\nabla J_c} \rangle = 2\langle I_0 \rangle \tag{23}$$

where the ThWgt result was not derived here but it may be similarly derived.

It is useful to also list the expressions for the LSL and MSL and the FS of the BIP eDAC:

$$BIP\ BiWgt|ThWgt:\ \langle J_{1|C} \rangle = \mp (C-1)\langle I_0 \rangle, \tag{26}$$

$$\langle FS \rangle \equiv \langle J_C \rangle - \langle J_1 \rangle = 2(C-1)\langle I_0 \rangle = (C-1)\langle I_u \rangle$$

Equipped with the pertinent unary current $\langle I_u \rangle$ for any eDAC, it is useful to introduce normalized representations of all current quantities in our statistical model, having them divided by $\langle I_u \rangle$ rendering the statistical model formulation simpler and more elegant.

i. All amplitude-domain quantities, be they random variables or deterministic metrics (mean, STD), are normalized by the mean unary current, $\langle I_u \rangle$. Any current RV or amplitude-domain statistical metric of the eDAC is then expressed in units of $\langle I_u \rangle$. The normalized scalars or vectors are designated by over-crescents, e.g., $$\hat{I}_s \equiv I_s/\langle I_u \rangle,\ \hat{I} \equiv I/\langle I_u \rangle,\ \hat{\sigma}_{I_s} = \hat{\sigma}_{I_s}/\langle I_u \rangle = \sigma_{\hat{I}_s} \tag{27}$$

We also introduce the alternative compact superscript notation, $\langle\ \rangle$ to designate the mean (expectation) of the currents or current vectors (equivalent to wrapping by $\langle\ \rangle$).

The following are examples of normalized mean currents or current vectors, $$\hat{I}_s^{\langle\rangle} \equiv \langle \hat{I}_s \rangle = \langle I_s \rangle \equiv \langle I_s \rangle/\langle I_u \rangle,\ \hat{I}^{\langle\rangle} \equiv \langle \hat{I} \rangle = \langle I \rangle/\langle I_u \rangle \tag{28}$$

$$\hat{J}_c \equiv J_c/\langle I_u \rangle,\ \hat{J} \equiv J/\langle I_u \rangle$$

$$\hat{J}_c^{\langle\rangle} \equiv \langle \hat{J}_c \rangle \equiv \langle J_c \rangle \equiv \langle J_c \rangle/\langle I_u \rangle,\ \hat{J}^{\langle\rangle} \equiv \langle \hat{J} \rangle = \langle J \rangle/\langle I_u \rangle$$

where $\langle \hat{I}_s \rangle = \langle I_s \rangle$ and $\langle \hat{J}_c \rangle = \langle J_c \rangle$ reflect the commutativity of the normalization and mean (expectation) operations. We mainly reserve the alternative notation $\langle\ \rangle$ for the mean in the context of mean-normalized (or normalized-mean) currents:

$$\hat{I}_s^{\langle\rangle} \equiv \langle \hat{I}_s \rangle,\ \hat{I}^{\langle\rangle} \equiv \langle \hat{I} \rangle,\ \hat{J}_c^{\langle\rangle} \equiv \langle \hat{J}_c \rangle,\ \hat{J}^{\langle\rangle} \equiv \langle \hat{J} \rangle \tag{29}$$

As examples, the normalized mean source currents of UNIP|BIP BiWgt eDACs are:

$$\hat{I}^{\langle\rangle BiWgt} \equiv \left\{ \hat{I}_s^{\langle\rangle BiWgt} \right\}_{s=0}^{B-1} = \left\{ 2^{B-1}, 2^{B-2}, \ldots, 4, 2, 1 \right\}, \tag{28}$$

$$\hat{I}_s^{\langle\rangle BiWgt} \equiv \left\langle \hat{I}_s^{BiWgt} \right\rangle = 2^s$$

The normalized output current levels of BIP BiWgt|ThWgt eDACs are:

$$\hat{J}_c^{BIP\ BiWgt|ThWgt} = \frac{1}{2}(2c - C - 1) \tag{29}$$

where for the case of the BIP BiWgt eDAC, wherein $\langle I_u \rangle = 2\langle I_0 \rangle$ as 1er (23), we have $$J_c^{BIP\ BiWgt|ThWgt} = (2c - C - 1)\langle I_0 \rangle = \frac{1}{2}(2c - C - 1)\langle I_u \rangle \tag{30}$$

The normalized output current levels of UNIP BiWgt|ThWgt eDACs are:

$$\tilde{J}_c^{UNIP\ BiWgt|ThWgt} = c - 1 \tag{30}$$

where for UNIP BiWgt|ThWgt eDACs, for which $\langle I_u \rangle = 2\langle I_0 \rangle$ we used $$\tilde{J}_c^{UNIP\ BiWgt|ThWgt} = (c-1)\langle I_0 \rangle = (c-1)\langle I_u \rangle\Big). \tag{31}$$

It is also useful to normalize the total current of a UNIP|BIP BiWgt|ThWgt constellation.

Since $$I_{tot}^{\langle\rangle} \equiv \langle I_{tot} \rangle = J_C$$

for either UNIP or BIP BiWgt|ThWgt, then dividing by $$\langle I_u \rangle \tilde{I}_{tot}^{\langle\rangle} \equiv \langle \tilde{I}_{tot} \rangle = \tilde{J}_C.$$

But for UNIP|BIP $$J_C = J_c|_{c:=C} = (C-1)I_0 \therefore \hat{J}_C = (C-1)I_0 / \langle I_u \rangle \tag{33}$$

Using $\langle I_u^{UNIP|BIP} \rangle = (1|2)\langle I_0 \rangle \therefore I_0 / \langle I_u^{UNIP|BIP} \rangle = 1\Big|\frac{1}{2}$ yields $$\tilde{I}_{tot}^{\langle\rangle} \equiv \langle \tilde{I}_{tot} \rangle =$$

$$\hat{J}_C = \begin{cases} C-1 \text{ for } UNIP \\ \frac{1}{2}(C-1) \text{ for } BIP \end{cases}, I_{tot}^{\langle\rangle} \equiv \langle I_{tot} \rangle = J_C = \begin{cases} (C-1)\langle I_u \rangle \text{ for } UNIP \\ \frac{1}{2}(C-1)\langle I_u \rangle \text{ for } BIP \end{cases}$$

For BIP eDACs, solving $$I_{tot}^{\langle\rangle} \equiv \frac{1}{2}(C-1)\langle I_u \rangle$$

for $\langle I_u \rangle$ yields (consistent with $$\langle I_u \rangle = \frac{1}{C-1}\langle FS \rangle (19)): \tag{34}$$

$$\langle I_u^{BIP} \rangle = \frac{2}{C-1}I_{tot}^{\langle\rangle} = \frac{1}{C-1}\langle FS^{BIP} \rangle$$

1.4 Second-Order Statistics of Electronic Mismatch Errors in Current-Steering eDACs Electronic mismatch errors for the current sources of a current-steering eDAC are well modeled in the electronic DAC literature, see Pelgrom et al (M. J. M. Pelgrom, A. C.

J. Duinmaijer and A. P. G. Welbers, "Matching properties of MOS transistors," in *IEEE Journal of Solid-State Circuits*, vol. 24, no. 5, pp. 1433-1439, 1989) followed by a flurry of later works refining the MOS mismatch models. The mismatch errors, referred to here as (mismatch induced) perturbations, $\delta I_s = I_s - \langle I_s \rangle$ are the deviations of the source currents from their means, denoted here. As per Pelgrom et al, we assume that the source currents, $I_s$, are statistically independent (hence uncorrelated), such that the variance of each eDAC output current level, $$J_c^{BIP} = \pm I_{S-1} \pm I_{S-2} \pm \dots \pm I_2 \pm I_0,$$

is given by the sum of variances of the source currents (for ThWgt eDACs S=C−1; for BiWgt eDACs S=B);

$$\sigma_{J_c^{BIP}}^2 \equiv \mathrm{var}J_c = \mathrm{var}I_{S-1} + \mathrm{var}I_{S-2} \pm \dots \mathrm{var}I_2 + \mathrm{var}I_0 = \sum_{i=0}^{S-1}\sigma_{I_i}^2, \tag{32}$$

$$\forall s \in \{0, 1, 2, \dots, S-1\}$$

The BIP eDAC output variance vector then has all its elements equal:

$$\sigma_{J^{BIP}}^2 = 1\frac{\forall}{S}\sum_{i=0}^{S-1}\sigma_{I_i}^2 \tag{33}$$

To advance, we are to relate the individual source current variances to the current source structural parameters. For all current-steering eDACs of interest, the variances $$\{\sigma_{I_s}^2\}_{s=0}^{S-1}$$

of the S source currents are given by the following Proposition I: The eDAC current sources, $$\{I_s\}_{s=0}^{S-1},$$

are statistically independent, have variances that are proportional to their means, $\mathrm{var}I, \partial(I_s)$, and are gaussian distributed $$I_s \sim \mathrm{normal}\big[\langle I_s \rangle, \sigma_{uu}^2\langle I_s \rangle\big],$$

with $$\sigma_{uu}^2 > 0$$

a proportionality factor relating means and variances for all current sources on the eDAC chip, wafer or batch of wafers, assuming statistical spatial homogeneity of the chip|wafer|batch and barring systematic mismatch errors:

$$\mathrm{var}\{I_s\} \equiv \sigma_{I_s}^2 = \sigma_{uu}^2\langle I_s \rangle, s = 0, 1, 2, \dots, S-1 \tag{37}$$

Moreover, 'relative variance' of any eDAC current source, say the s-th one, is inversely proportional to the mean current of that source (relative variance of a RV being defined as the variance divided by the square of the mean):

$$\text{var}^{rel}\{I_s\} \equiv \left(\sigma_{I_s}^{rel}\right)^2 \equiv \frac{\sigma_{I_s}^2}{\langle I_s \rangle^2} = \frac{\sigma_{uu}^2}{\langle I_s \rangle} \tag{38}$$

The 'relative-standard-deviation' of the s-th current source, aka 'coefficient of variation' (defined as the standard deviation normalized by the mean), is then given by $$\sigma_{I_s}^{rel} \equiv \sqrt{\text{var}^{rel}\{I_s\}} \equiv \frac{\sigma_{I_s}}{\langle I_s \rangle} = \frac{\sigma_{uu}}{\sqrt{\langle I_s \rangle}}. \tag{39}$$

Proposition I implies that larger area (wider, higher conductance) current source transistors, which generate higher mean currents, have proportionally higher variances (see (37)), yet their relative variances get smaller in inverse proportion to the mean source currents (per (39)). Thus, although stronger current sources aboard the eDAC chip have larger variance, nevertheless they are relatively more 'quiet', a manifestation of the weak-law-of-large-numbers.

Proof of proposition I: A paramount insight in Pelgrom et al. is that for any current source on the chip, say $I_s$, (for s=0, 1, 2, . . . , S−1), the 'relative variance' is inversely proportional to the the MOS transistor active area (sometimes equivalently restated that 'relative STD' is inversely proportional to the square root of the MOS transistor active area):

$$\tag{40}$$

$$\text{Pelgrom [5]:} \text{var}^{rel}\{I_s\} \equiv \frac{\sigma_{I_s}^2}{\langle I_s \rangle^2} = \left(\sigma_I^{rel}\right)^2 \propto \frac{1}{\text{Area}} \Leftrightarrow \sigma_{I_s}^{rel} \equiv \frac{\sigma_{I_s}}{\langle I_s \rangle} \propto \frac{1}{\sqrt{\text{Area}}}$$

to first-order (barring higher-order corrections), assuming that all MOS transistors are subject to a fixed potential drop. In current sources arrays the MOS transistors active areas may assumed rectangular of various widths $W_s$ but sharing a common length $L_s=_L$, and also sharing a common depth. Since $\text{Area}_s=W_s \cdot L_s=W_s \cdot L_0 \therefore \text{Area}_s \propto W_s$, it follows from Pelgrom's model (40) that the relative variance (34) comes out inversely proportional to the transistor width.

$$\text{var}^{rel}\{I_s\} \equiv \frac{\text{var}\{I_s\}}{\langle I_s \rangle^2} = \left(\sigma_I^{rel}\right)^2 \propto \frac{1}{\text{Area}} = \frac{1}{W_s \cdot L_s} \propto \frac{1}{W_s} \tag{42}$$

Equivalently, the relative standard deviation is inversely proportional to the square root of the area, hence also inversely proportional to the square root of the transistor active region width:

$$\sigma_I^{rel} \propto \frac{1}{\sqrt{\text{Area}}} \propto \frac{1}{\sqrt{W_s}} \tag{35}$$

The higher-order refined electronic mismatch models which followed Pelgrom et al seminal work Pelgrom et al, provided refined additive corrections to the dominant term $$\frac{1}{\sqrt{W_s}}.$$

Noting that $L_s$ is taken constant, and so is the depth of all active areas constant, it follows that the MOS transistor on-state conductances are proportional to the device widths, $W_s$, (since the conduction of a surface resistor is proportional to its transverse area, given a fixed depth). And since all MOS transistor active areas are subject to a common voltage drop, then, by Ohm's law, each mean source current is proportional to the respective source active region conduction, which is turn is proportional to the width, $W_s$, thus so are mean source currents proportional to the widths:

$$\langle I_s \rangle \propto W_s \tag{36}$$

To intuitively make this conclusion plausible, note that increasing the transistor width n-fold, amounts (neglecting boundary effects) to having n transistors in parallel, evidently yielding an n-fold increase in current. Our key var $I_s \propto \langle I_s \rangle$ assertion (37) in Proposition I (the inverse proportionality of the relative variance in the mean for each current source) then logically stems from from $$\text{var}^{rel}\{I_s\} \propto \frac{1}{W_s} \tag{42}$$

and from $\langle I_u \rangle \propto W_s$(42) yielding $$\text{var}^{rel}\{I_s\} \propto \frac{1}{W_s} \propto \frac{1}{\langle I_s \rangle}.$$

To recap, $$\text{var}^{rel}\{I_s\} \propto \frac{1}{\langle I_s \rangle}.$$

Now, denoting the coefficient of inverse proportionality between the relative variance and the mean current by $$\sigma_{uu}^2,$$

yields the inverse proportionality formulation (38) just proven here:

$$\text{var}^{rel}\{I_s\} \equiv \sigma_{I_s}^2/\langle I_s \rangle^2 = \sigma_{uu}^2/\langle I_s \rangle \tag{37}$$

Multiplying both sides of the last equality by $\langle I_s \rangle$ and cancelling $\langle I_s \rangle$ then establishes the validity of the var $I_s \propto \langle I_s \rangle$ key rule (37) in Proposition I (the proportionality of the source current variances and means):

$$\text{var}\{I_s\} \equiv \sigma_{I_s}^2 = \sigma_{uu}^2 \langle I_s \rangle, \ s = 0, 1, 2, \ldots, S-1. \tag{38}$$

We are now ready to express the currents vector variance in terms of the currents vector mean, $$\sigma_I^2 \equiv \{\sigma_{I_{S-1}}^2 \sigma_{I_{S-2}}^2, \ldots, \sigma_{I_1}^2, \sigma_{I_0}^2\} =$$

$$\{\sigma_{uu}^2 \langle I_{S-1} \rangle, \sigma_{uu}^2 \langle I_{S-2} \rangle, \ldots, \sigma_{uu}^2 \langle I_1 \rangle, \sigma_{uu}^2 \langle I_0 \rangle\} = \sigma_{uu}^2 \langle I_{S-1} \rangle,$$

$$\langle I_{S-2} \rangle, \ldots, \langle I_1 \rangle, \langle I_0 \rangle\}$$

or compactly $$\sigma_I^2 = \sigma_{uu}^2 \langle I \rangle \tag{47}$$

Thus, given the coefficient of proportionality $$\sigma_{uu}^2$$

for the eDAC chip, and given the mean source currents, the variances of all current sources are uniquely determined.

Equivalently, specifying the mean and variance (or relative variance) of any single current source aboard the chip amounts to specifying $$\sigma_{uu}^2$$

(as ratio of the variance and mean for that given current source), thus uniquely determining the $2^{nd}$ order statistics of all current sources on the chip. It is this observation that suggests selecting a convenient reference current on the chip, referred to as 'unary current' and specifying its (relative) variance, subsequently enabling to evaluate all means and variances of the current sources and of the current output levels aboard the the eDAC. It is useful to normalize all means and STDs of the current sources and current output levels by the mean of the unary current, expressing all currents in units of the 'unary current', as pursued next.

eDAC Statistics Compactly Reformulated Using Current Normalizations (Using the Unary Current)

We now show that specifying the mean and relative variance (or relative STD) of the unary current determines the joint statistics of the entire array of eDAC current sources.

We start by noting that unary-mean-current $\langle I_u \rangle$ is a deterministic scalar, whereas the unary current $I_u$ is a RV, and as such it may be decomposed as mean plus perturbation:

$$I_u = \langle I_u \rangle + \delta I_u.$$

eDAC chips will then be statistically characterized by identifying the unary current distribution (and in particular the mean unary current its variance, STD and RSTD metrics). The same distribution may also pertain to the wafer and or production lot for the particular eDAC devices batch, provided the 'statistical conditions' are invariant across the wafer and over the production process. It is useful to adopt the Relative Standard Deviation (RSTD) of the unary current RV $I_u$ as a relevant metric parameterizing the mismatch of current sources (transistors) on the chip, waver or production lot, denoting the relative variance of $I_u$ by $$\sigma_u^2,$$

as customary in the literature:

Def: The 'relative mismatch', $\sigma_u$ of an eDAC chip (or wafer or production lot, assuming statistical homogeneity, i.e., spatial stationarity) is defined as the Relative Standard Deviation (RSTD) (aka 'coefficient of variation') of the selected unary current, $I_u$, for that chip, wafer or production lot:

$$\sigma_u \equiv \sigma_{I_u}^{rel} \equiv \frac{\sigma_{I_u}}{\langle I_u \rangle} \tag{48}$$

Squaring the relative mismatch (48) yields the Relative Variance of the unary current synonymously referred to as squared mismatch:

$$\sigma_u^2 \equiv \frac{\sigma_{I_u}^2}{\langle I_u \rangle^2} = \mathrm{var}^{rel}\{I_u\} \tag{39}$$

Given an eDAC chip, the mean unary current and its relative mismatch, $\sigma_u$ fully specify the second-order statistics of any current sources on the chip. The actual STD and Variance of the eDAC unary current source, $I_u$, are obtained in terms of $\sigma_u, \langle I_u \rangle$ by the simple formulas $$\sigma_{I_u} = \sigma_u \langle I_u \rangle, \sigma_{I_u}^2 = \sigma_u^2 \langle I_u \rangle^2 \tag{50}$$

For a particular eDAC chip, wafer or batch, consider an actual or fictitious reference source current having the mean $\langle I_u \rangle$, which is the least mean current; let its associated random current (mean+perturbation) be $I_u$. The unary current, $I_u$, like any other current, satisfies the var $I \propto \langle I_u \rangle$ proportionality property (37): the variance of $I_u$ is proportional to its mean with proportionality constant, $$\sigma_{uu}^2,$$

$$\mathrm{var}\{I_u\} \equiv \sigma_{I_u}^2 = \sigma_{uu}^2 \langle I_u \rangle, \tag{40}$$

Solving this equation for proportionality constant, $$\sigma_{uu}^2$$

(which is the constant ratio of variance and mean for any current on the chip, which ratio is solely characteristic of the eDAC chip material and fabrication) yields:

$$\sigma_{uu}^2 = \sigma_{I_u}^2 / \langle I_u \rangle \tag{52}$$

(not to be confused with of $$\sigma_u^2 = \sigma_{I_u}^2/\langle I_u\rangle^2).$$

Let us now relate the var/mean proportionality constant $$\sigma_{uu}^2$$

to the relative mismatch $$\sigma_u^2,$$

both being alternative parameterizations of the statistical quality of an eDAC chip, wafer or batch. Substituting (50) into (50) yields $$\sigma_{uu}^2 = \sigma_{I_u}^2/\langle I_u\rangle = \sigma_u^2\langle I_u\rangle^2/\langle I_u\rangle = \sigma_u^2\langle I_u\rangle.$$

To recap:

$$\sigma_{uu}^2 = \sigma_u^2\langle I_u\rangle \Leftrightarrow \sigma_u^2 = \sigma_{uu}^2/\langle I_u\rangle \tag{53}$$

Thus, we have two related eDAC chip characterizations, $$\sigma_{uu}^2, \sigma_u^2$$

at our disposal. For given fabrication process (assumed homogeneous across the chip|wafer|batch) $\sigma_{uu}$ is uniquely determined by the material and fabrication process (irrespective of the DAC current sources structures), whereas $\sigma_u$ is set by both the material fabrication process and the mean of the current source taken as unary current reference (thus, $\sigma_u$ depends on the current sources structure as well).

Corollary: The variance and relative variance of the eDAC current sources $I_s$ in terms of the $$\sigma_{uu}^2, \sigma_u^2$$

parameters:

$$\text{var}\{I_s\} \equiv \sigma_{I_s}^2 = \sigma_{uu}^2\langle I_s\rangle = \sigma_u^2\langle I_u\rangle\langle I_s\rangle, s = 0, 1, 2, \ldots, S-1 \tag{54}$$

$$\text{var}^{rel}\{I_s\} \equiv \left(\sigma_{I_s}^{rel}\right)^2 = \sigma_{uu}^2/\langle I_s\rangle = \sigma_u^2\langle I_u\rangle/\langle I_s\rangle \tag{41}$$

Normalized Second-Order Statistics of eDAC Source Currents and Output Currents

The standard deviations of the various currents are also similarly normalized. The crescent over the STD indicates having it measured in units of $\langle I_u\rangle$:

$$\hat{\sigma}_{I_s} \equiv \sigma_{I_s}/\langle I_u\rangle, \hat{\sigma}_I \equiv \sigma_I/\langle I_u\rangle = \sigma_{\hat{I}} \tag{42}$$

$$\hat{\sigma}_{J_c} \equiv \sigma_{J_c}/\langle I_u\rangle = \sigma_{\hat{J}_c}, \hat{\sigma}_J \equiv \sigma_J/\langle I_u\rangle = \sigma_{\hat{J}}$$

ii. All squared-current quantities (in particular, variances) are normalized by the squared mean unary current, $\langle I_u\rangle^2$:

$$\hat{\sigma}_{I_s}^2 \equiv \sigma_{I_s}^2/\langle I_u\rangle^2 = \hat{\sigma}_{I_s}^2, \hat{\sigma}_I^2 \equiv \sigma_I^2/\langle I_u\rangle^2 = \sigma_{\hat{I}}^2 \tag{43}$$

$$\hat{\sigma}_{J_c}^2 \equiv \sigma_{J_c}^2/\langle I_u\rangle^2 = \sigma_{\hat{J}_c}^2, \hat{\sigma}_J^2 \equiv \sigma_J^2/\langle I_u\rangle^2 = \sigma_{\hat{J}}^2$$

These normalized variances are proportional to the corresponding normalized means $$\hat{\sigma}_{I_s}^2 = \sigma_{\hat{I}_s}^2 \equiv \text{var}\{\langle I_s\rangle/\langle I_u\rangle\} = \frac{\sigma_{I_s}^2}{\langle I_u\rangle^2} = \frac{\sigma_u^2\langle I_u\rangle\langle I_s\rangle}{\langle I_u\rangle^2} = \frac{\sigma_u^2\langle I_s\rangle}{\langle I_u\rangle} = \sigma_u^2\hat{I}_s^{\langle\rangle}. \tag{44}$$

where $$\sigma_{I_s}^2 = \sigma_u^2\langle I_u\rangle\langle I_s\rangle \tag{54}$$

was used in the fourth equality.

Indeed, by Proposition I, the unnormalized variance is proportional to the unnormalized mean, and the normalizations of the variance and mean are proportional to the two proportional quantities, hence are proportional to each other.

Corollary: The normalized representations $$\{\hat{I}_s\}_{s=0}^{S-1}$$

(obtained as $\hat{I}_s \equiv I_s/\langle I_u\rangle$) of the eDAC current sources $$\{I_s\}_{s=0}^{S-1}$$

are independent and gaussian distributed. The variance and relative variance of the normalized current sources $\hat{I}_s$ are:

$$\text{var}\{\hat{I}_s\} \equiv \sigma_{\hat{I}_s}^2 = \sigma_u^2\hat{I}_s^{\langle\rangle} \text{ for } s = 0, 1, 2, \ldots, S-1, \sigma_{\hat{I}}^2 = \sigma_u^2\hat{I}^{\langle\rangle} \tag{45}$$

$$\text{var}^{rel}\{\hat{I}_s\} \equiv \sigma_{\hat{I}_s}^2/\left(\hat{I}_s^{\langle\rangle}\right)^2 = \sigma_u^2/\hat{I}_s^{\langle\rangle}, s = 0, 1, 2, \ldots, S-1 \tag{46}$$

The variance and relative variance of the unnormalized source currents, $I_s$ in terms of the normalized mean currents:

$$\sigma_{I_s}^2 \equiv \text{var}\{I_s\} = \sigma_u^2\langle I_u\rangle^2\hat{I}_s^{\langle\rangle} = \sigma_{I_u}^2\hat{I}_s^{\langle\rangle}, \sigma_I^2 = \sigma_u^2\langle I_u\rangle^2\hat{I}^{\langle\rangle} = \sigma_{I_u}^2\hat{I}^{\langle\rangle} \tag{61}$$

$$\hat{\sigma}_{I_s}^2 \equiv \text{var}^{rel}\{I_s\} = \sigma_u^2/\hat{I}_s^{\langle\rangle} =_r \text{var}^{rel}\{\hat{I}_s\} \equiv \sigma_{\hat{I}_s}^2$$

15. Model and Second-Order Statistics of PAM-C eDAC Driving Mach-Zehnder Modulator In this subsection we generalize the matrix linear model $J=CI$ (2) of current-steering eDACs to the most general nonlinear context. The first simple extension is the 'Trans-resistance eDAC', namely a current-steering DAC feeding it output current into a linear current-to-voltage converter, e.g., a Trans-Impedance-Amplifier (TIA) with trans-resistance current-to-voltage conversion factor $R_0$ (or more simply just using a resistor to take the output voltage across). The model is evidently still linear:

$$V = R_0 J = R_0 CI \qquad (47)$$

The next non-trivial model extension assumes a memo-ryless-post-nonlinearity mapping, $f(\cdot)$ acting on the output constellation:

$$U = f(V) = f(R_0 J) = f(R_0 CI) \qquad (48)$$

E.g., the mapping $g(\cdot)$ may stand for the memoryless model of a power amplifier featuring compression effects, in which case the U is the voltage-domain output.

The case of interest here is E/O transduction (conversion from the electrical to the optical domain) by means of an electro-optic modulator, in particular an MZM, driven by an eDAC. The memoryless phase to optical field 'Transfer Characteristic'(TC),$g(\cdot)$, of the MZM, implements the non-linear map g: $\theta \rightarrow F$, where the domain $\theta$ is the MZM drive phase (the phaseshifts induced in the two arms of the MZM by the differential drive voltages are $\pm\theta$, proportional to the push-pull differential voltages applied to the two MZM arms—thus we refer to $\theta$ as the 'MZM-arm-phase') whereas the co-domain F of the $g(\cdot)$ mapping is the modulated optical field at the MZM output. Concretely, the generic $g(\cdot)$ map is a sine function, $$F = g(0) = \sin(0), \quad F_c = g(\theta_c) = \sin\theta_c \qquad (64)$$

provided that the MZM output field F, is normalized, expressed in units of the peak field at the MZM output, attained for MZM-arm phase $$\theta = \frac{\pi}{2}.$$

The corresponding constellations $\theta$,v,J, in respective opti-cal-phase, voltage and current domains are proportional:

$$\theta = \frac{\pi}{2V_\pi} V = \frac{\pi}{2V_\pi} R_0 J = z_0 J, \text{ with } z_0 \equiv \frac{\pi}{2V_\pi} R_0 \qquad (65)$$

Note: The four quantities F,$\theta$,V,J may be considered either constellation vectors or random variables assuming one of C values in their respective domains.

Generally, the MZM voltages $V \in V$ in (2) are taken as differential ones, $V \equiv V^{(1)} - V^{(0)}$, with $V^{(1)}, V^{(0)}$ the potential drops across the top and bottom waveguides of the MZM. For a push-pull MZM, $V^{(1)}, V^{(0)}$ are designed antipodal: $V^{(1|0)} = \pm V_\Delta = \pm V/2$ (such that $$V_\Delta \equiv \frac{1}{2}(V^{(1)} - V^{(0)}) = \frac{1}{2} V.$$

The top arm-phase yielding the field-domain MSL $F_C = 1$ is $$\theta_C = \frac{\pi}{2}$$

(the corresponding bottom arm-phase of the MZM should be opposite, $$-\frac{\pi}{2}).$$

The corresponding peak voltage levels applied to the two capacitors/transmission lines around the two MZM wave-guides are $$\pm \frac{V_\pi}{2}.$$

The MZM TC (64) may be written as a compound function in alternative forms, differing in their input domains:

$$F = g(\theta) = g(\theta) - g(z_0 J) = g\left(\frac{\pi}{2V_\pi} V\right), \text{ with } g(\cdot) := \sin(\cdot) \qquad (49)$$

Decompose the output field $F_c = g(\theta_c) = \sin \theta_c (64)$, into mean+perturbation (generically using $g(\cdot)$):

$$(50)$$

$$F_c = \langle F_c \rangle + \delta F_c = g[\underbrace{z_0(\langle J_c \rangle + \delta J_c)}_{\theta_c}] =$$

$$g\left[\underbrace{z_0 \langle J_c \rangle}_{\theta_0} + \underbrace{z_0 \delta J_c}_{\delta\theta}\right] \cong \left\{g[\theta_0] + g'[\theta]_{\theta := \theta_0} \delta\theta\right\}_{\theta_0 := z_0 \langle J_c \rangle, \delta\theta := z_0 \delta J_c} =$$

$$g[z_0 \langle J_c \rangle] + g'[z_0 \langle J_c \rangle] z_0 \delta J_c$$

where the approximate equality is a first-order Taylor series expansion $g[\theta_0 + \delta\theta] \cong g[\theta_0] + g'[\theta]_{\theta := \theta_0} \delta\theta$ of $g(\theta)$ around $\theta = \theta_0$. To recap, setting $\theta_0 = z_0 \langle J_c \rangle$ and $\delta\theta = z_0 \delta J_c$ yields $$F_c = \langle F_c \rangle + \delta F_c = g[z_0 \langle J_c \rangle] + z_0 g'[z_0 \langle J_c \rangle] \delta J_c \qquad (68)$$

with $g'[z_0 \langle J_c \rangle]$ the derivative of $g(\cdot)$ WRT $\theta$ at $\theta = \theta_0 = z_0 \langle J_c \rangle$.

Expressing the per-component equation (68) in vector form, yields:

$$F = \langle F \rangle + \delta F = g[z_0 J] = \qquad (69)$$

$$g[\underbrace{z_0(\langle J \rangle + \delta J)}_{\theta}] = g[z_0 \langle J \rangle + z_0 \delta J] \cong [z_0 \langle J \rangle] + g'[z_0 \langle J \rangle] \Box z_0 \delta J =$$

$$g[z_0 \langle J \rangle] + z_0 g'[z_0 g'[z_0 \langle J \rangle] \Box \delta J$$

with $\square$ the Shur (elementwise) product of compatible vectors and g' the derivative of $g(\theta)$. Separating both sides of equation (69) into mean and perturbation we have two equations, $$\langle F \rangle = g[z_0\langle J \rangle], \; \delta F = z_0 g'[z_0\langle J \rangle]\square\delta J, \tag{70}$$

where the first equation in (70) for the output mean, $\langle F \rangle$, is compatible with subsec. 2.2.5 of M. J. M. Pelgrom, Analog-to-Digital Conversion, 4ed, Springer Nature Switzerland—neglecting the second-order correction to the mean there. Evidently equations (70) hold for any TC of the form $F=g(z_0J)$, but our interest here is the the MZM case wherein $g(z_0J)=\sin(z_0J)$, therefore, $g'(z_0J)\equiv g'[\theta]_{\theta:=z_0}J= \cos[\theta]_{\theta:=z_0}J=\cos(z_0J)$.

With these substitutions, (68),(69) become, $$F_c = \langle F_c \rangle + \delta F_c = \sin(z_0\langle J_c \rangle) + z_0\cos(z_0\langle J_c \rangle)\delta J_c \tag{51}$$

$$F = \langle F \rangle + \delta F = \sin(z_0\langle J \rangle) + z_0\cos(z_0\langle J \rangle)\square\delta J$$

Separating the mean and perturbation of the MZM output, we have, $$\langle F \rangle = \sin(z_0\langle J \rangle) \tag{52}$$

$$\delta F = z_0\gamma\square\;\delta J = z_0 y\square\;\delta(CI) = z_0\gamma\square\;(C\delta I) \text{ with } \gamma := \cos(z_0\langle J \rangle).$$

where in the last equation J=CI was substituted, such that $\delta J = \delta(CI)=C\delta I$.

To recap, the output field perturbation is given by $$\delta F = z_0\gamma\square\;(C\delta I) = z_0(diagMat\{\gamma\}C)\delta I \tag{73}$$

with the vector $$\gamma = \cos(z_0\langle J \rangle) = \sin'(\theta)|_{\theta=z_0\langle J \rangle} \tag{74}$$

the elements of which are $$\gamma_c = \cos(z_0\langle J_c \rangle) = \cos\langle\theta_c \rangle = \sin'(\theta_c)|_{\theta_c=z_0\langle J_c \rangle} \tag{53}$$

i.e., the first-order derivatives of the sine TC of the MZM, evaluated at the points $\theta_c:=\langle\theta_c \rangle=z_0\langle J \rangle$, which in turn are the mean MZM arm-phases induced by the eDAC driver output current levels.

In (73), the Shur-multiplication $\gamma\square$ was alternatively represented, in a familiar linear algebra notation, as a multiplication by a c×c diagonal matrix, denoteddiagMat$\{\gamma\}$, with the elements of the vector $\gamma$ arrayed along its diagonal.

We summarize and elaborate on the results above in a proposition generally applicable to modeling electronic mismatch and noise propagation for eDACs driving memoryless nonlinearities, in particular.for an optical Tx comprising an MZM driven by a current-steering electronic DAC.

Proposition II: Consider an optical Tx comprising an MZM fed by a current-steering based ThWgt|BiWgt eDAC driver, mapping its current sources vector, I, to the MZM arm-phase $\theta$ according to the linear model:

$$\theta = \frac{\pi}{2V_\pi}V = \frac{\pi}{2V_\pi}R_0 J = z_0 J = z_0 CI, \text{ with } z_0 \equiv \frac{\pi}{2V_\pi}R_0 \tag{54}$$

The perturbation vector $\delta F$ of the optical field-domain constellation, F, at the MZM output is given by a linear transformation of the source current perturbation vector $\delta I$, represented as the following matrix-vector product, $$\delta F = z_0(diagMat\{\gamma\}C)\delta I \tag{55}$$

where $\gamma=\cos(z_0\langle J \rangle)=\sin'(\theta)|_{\theta=z_0\langle J \rangle}$ (74) is referred to as the 'MZM slopes' vector aka 'MZM small gains' vector and diagMat$\{\gamma\}$ is a diagonal matrix having the elements of $\gamma$ arrayed along its diagonal.

The variance vector of the optical field constellation, F, at the MZM output is given by:

$$\sigma_F^2 = (diagMat\{\gamma\}z_0 C)^{\square 2}\sigma_I^2 = \sigma_u^2\langle I_u \rangle^2 z_0^2 diagMat\{\gamma^{\square 2}\}C^{\square 2}\hat{I}^{()} \tag{78}$$

Specifically, for a BIP eDAC driver of the MZM:

$$MZM \text{ driven by } BIP \; PAM-C \; eDAC: \sigma_F^2 = \sigma_u^2(\langle I_u \rangle z_0)^2 \hat{I}_{tot}^{()}\gamma^{\square 2}, \tag{79}$$

$$\sigma_{F_c}^2 = \sigma_u^2(\langle I_u \rangle z_0)^2 \hat{I}_{tot}^{()}\gamma_c^2 = \frac{\pi^2\sigma_u^2}{C-1}\cdot\gamma_c^2 = \frac{\pi^2\sigma_{uu}^2}{2I_{tot}^{()}}\cdot\gamma_c^2,$$

$$c = \{1, 2, 3, \dots, C-1\}$$

Proof of Proposition II. To show (78) use the following Lemma: Given a random vector x with independent components, its variance propagation rule via a linear transformation represented by a compatible matrix, T, is given by:

$$\sigma_{TX}^2 = T^{\square 2}\sigma_x^2 \tag{56}$$

Setting X:=I, T:=diagMat$\{\gamma\}z_0 C$ yields the first equality in (78). For the second equality use $$\sigma_I^2 = \sigma_u^2\langle I_u \rangle^2 \hat{I}^{()}. \tag{61}$$

The variances (79) at the BIP eDAC output are obtained by plugging into (78) the Shur-square $$C_{BIP}^{\square 2} = 1_{C\times S}^{y}$$

of the code matrix, $C_{BIP}$, all elements of which are $\pm 1$, therefore the elements of $$C_{BIP}^{\square 2} \ are \ (\pm 1)^2 = 1,$$

i.e., are all-ones:

$$\sigma_F^2 = \sigma_u^2 \langle I_u \rangle^2 z_0^2 diagMat\{\gamma^{\square 2}\} C^{\square 2} \hat{I}^{\lozenge} = \tag{57}$$

$$\sigma_u^2 \langle I_u \rangle^2 z_0^2 diagMat\{\gamma^{\square 2}\} 1_{C \times S}^{\forall} \hat{I} = \sigma_u^2 \langle I_u \rangle^2 z_0^2 \hat{I}_{tot}^{\lozenge} \gamma^{\square 2}$$

where to show the last equality above, we used $$1_{C \times S}^{\forall} \hat{I}^{\lozenge} = \left( \sum \hat{I}^{\lozenge} \right) 1_C^{\forall} = \hat{I}_{tot}^{\lozenge} 1_C^{\forall} \ and \ diagMat\{\gamma^{\square 2}\} 1_C^{\forall} = \gamma^{\square 2}.$$

Taking the c-th element of the first line in (79) yields the variance of c-th field level of the BIP eDAC, $$\sigma_{F_c}^2 = \sigma_u^2 \langle I_u \rangle^2 z_0^2 \hat{I}_{tot}^{\lozenge} \gamma_c = \sigma_u^2 (\langle I_u \rangle z_0)^2 \frac{1}{2}(C-1)\gamma_c^2 \tag{82}$$

with the second equality in (82) obtained using $$\hat{I}_{tot}^{\lozenge} \equiv \langle I_{tot} \rangle / \langle I_u \rangle = \frac{1}{2}(C-1). \tag{33}$$

Next, let us replace the product $\langle I_u \rangle z_0$, occurring formulas (79), and in (82) by a more insightful parameter. The current-to-phase gain $z_0(65)$ maps the eDAC output currents, $J_c$, into MZM arm-phases, $\theta_c = z_0 J_c$ $\therefore$ $\langle \theta_c \rangle = z_0 \langle I_u \rangle$, for $c=1, 2, \ldots, C$. In particular, for the MSL (c=C), $\langle \theta_C \rangle = z_0 \langle J_C \rangle$. To operate the MZM without backoff (i.e., over its output max full-scale-range) requires setting $$\langle \theta_C \rangle = \frac{\pi}{2}$$

(such that $\sin \langle \theta_C \rangle = 1$), i.e., $$\langle \theta_C \rangle = \frac{\pi}{2} = z_0 \langle J_C \rangle = z_0 \langle I_{tot} \rangle = z_0 \frac{1}{2} \langle I_u \rangle (C-1). \tag{83}$$

where in the last two equalities, $\langle J_C \rangle = \langle I_{tot} \rangle$ and $\langle I_{tot} \rangle = \frac{1}{2}(C-1)\langle I_u \rangle$ for BIP (33) were used. Equating the $2^{nd}$ and $5^{th}$ expressions in the chain of equalities (83), yields the equation $$\frac{\pi}{2} = z_0 \langle I_u \rangle \frac{1}{2}(C-1).$$

Solving this linear equation for $z_0 \langle I_u \rangle$ yields, $$z_0 \langle I_u \rangle = \frac{\pi/2}{\frac{1}{2}(C-1)} = \frac{\pi}{C-1} \tag{84}$$

Plugging (84) into (82), establishes the second equality in the last line of (79):

$$BIP: \sigma_{F_c}^2 = \tag{85}$$

$$\sigma_u^2 (\langle I_u \rangle z_0)^2 (C-1)\gamma_c^2 = \sigma_u^2 \cdot \left( \frac{\pi}{C-1} \right)^2 \cdot (C-1)\gamma_c^2 = \frac{\pi^2 \sigma_u^2}{C-1} \cdot \gamma_c^2$$

It remains to justify the last equality in the last line of (79). Considering the last expression BIP:

$$\sigma_{F_c}^2 = \frac{\pi^2 \sigma_u^2}{C-1} \cdot \gamma_c^2 \ in \ (85),$$

plug in $$\sigma_u^2 \equiv \left( \sigma_{I_u}^{rel} \right)^2 = \sigma_{uu}^2 / \langle I_u \rangle, \tag{53}$$

yielding, $$BIP: \sigma_{F_c}^2 = \frac{\pi^2 \sigma_u^2}{C-1} \cdot \gamma_c^2 \bigg|_{\sigma_u^2 = \sigma_{uu}^2 / \langle I_u \rangle} = \tag{58}$$

$$\frac{\pi^2 \sigma_u^2}{(C-1)\langle I_u \rangle} \cdot \gamma_c^2 = \frac{\frac{1}{2}\pi^2 \sigma_u^2}{\frac{1}{2}(C-1)\langle I_u \rangle} \cdot \gamma_c^2 \bigg|_{I_{tot}^{\lozenge} := \frac{1}{2}(C-1)\langle I_u \rangle} =$$

$$\frac{\frac{1}{2}\pi^2 \sigma_u^2}{I_{tot}^{\lozenge}} \cdot \gamma_c^2 = \frac{\pi^2 \sigma_u^2}{2 I_{tot}^{\lozenge}} \cdot \gamma_c^2$$

where the critical step is plugging in $$I_{tot}^{\lozenge} = \frac{1}{2}(C-1)\langle I_u \rangle. \tag{33}$$

This verifies the last equality in (79).

To recap (79), we have two alternative operational formulations for the variance of the c-th output field level:

$$MZM \ driven \ by \ BIP \ PAM-C \ eDAC: \sigma_{F_c}^2 = \frac{\pi^2 \sigma_u^2}{C-1} \cdot \gamma_c^2 = \frac{\pi^2 \sigma_{uu}^2}{2 I_{tot}^{\lozenge}} \cdot \gamma_c^2, \tag{87}$$

$$c = (1, 2, 3, \ldots, C-1).$$

1.6 BIP oPAM4-MZM Module: Realized as Current-Steering DDD BIP ePAM4 eDAC+MZM Nonuniform arbitrarily shaped electrical constellations are required for realizing predistorted drivers for the MZM-based modulated optical sources in particular optical DACs (eDAC). MZM predistortion means shifting the positions of the levels of the electrical drive such as to counteract the nonlinearity of the MZM voltage-to-light transfer characteristic.

For the purpose of constructing an optical Tx based on a current-steering eDAC+MZM, suitable for coherent optical detection, it would be useful to have the capability of electrically generating any specified non-uniform Bipolar (BIP PAM-C constellation using the minimal number of current sources in the eDAC, namely $B=\log_2 C$ current sources, under the proviso that the BIP-PAM constellation satisfy antisymmetry (yielding BIP signals with both $\pm$-levels, such that a pair of Bipolar (BIP) IQ-tributaries may be generated to be IQ-nested to form optical QAM). Having $B=\log_2 C$ current sources in the eDAC is referred to as 'Direct Digital Drive' (DDD), as the $B=\log_2 C$ incoming bits into the eDAC, defining the codeword index labeling the output level, are directly applied to the B current sources (without necessitating a power-hungry digital encoder, as in case the number S of current sources satisfies S>B). DDD eDAC structures are highly energy-efficient, as they need no digital encoder. The digital mapping of B bits to S bits (with S>B) is eliminated.

An instance of the DDD eDAC architecture is the Binary-Weighted (BiWgt) one, however, a BiWgt eDAC is solely capable of generating a nominally uniform electrical constellation, thus a BiWgt eDAC would be non-optimal for linearizing an MZM.

It turns out that DDD BIP PAM-4 is the only multilevel BIP PAM-C constellation amenable to arbitrary non-uniform shaping of the C-point antisymmetric output constellation. It is only for C=4, that the DDD and BIP requirements may be satisfied for an eDAC.

Below we show how to generate arbitrary non-uniform anti-symmetric 4-point 1D constellations, using a current-steering BIP ePAM-4 eDAC, DDD-driven by a pair of bit-lines, directly mapped to switch a pair of bipolar current sources of different magnitudes which are summed up to yield the eDAC output.

Such DDD BIP PAM4 eDAC used to drive an MZM, may be designed for optimal predistortion of an MZM (i.e., shaping of the nonuniform ePAM4 antisymmetric constellation driving the MZM), such as the MZM generate a nominally uniform oPAM4 constellation at the MZM output, in the optical-field domain. An optimally predistorted DDD BIP PAM-4 eDAC feeding an MZM forms an opto-electronic module usable as a Building-Block (BB) recurring in the parallel optical paths our PAM2|4 driven Multi-Parallel (MP) oDAC, which was disclosed in PCT patent application PCT/IB2021/060857 which is incorporated herein by reference and disseminated in the energy-efficient reference, which requires ePAM4 drivers.

In this subsection we model such DDD BIP PAM-4 eDAC driver of MZM. We show how to size the two eDAC bipolar current sources for optimal MZM predistortion, and assess the statistics of electronic-mismatch errors at the eDAC source output.

DDD BIP PAM-4 eDAC Modeling with Arbitrary Antisymmetric Constellation Shaping

A generic eDAC output current 4-point constellation (e.g. for a 2-bit BiWgt eDAC as of interest here) is denoted $$\langle J \rangle = \{J_1, J_2, J_3, J_4\}$$

The eDAC output constellation currents are RVs as they may be perturbed by various errors, namely 'electronic mismatch' errors and other perturbative effects of distortion, noise. Here we model just mismatch errors.

Let us first consider the nominal (ideal) currents of the constellation, i.e., its mean currents, stripping the mismatch perturbations away. A BIP PAM-4 constellation is antisymmetric, thus it must satisfy:

$$\langle J_1 \rangle = -\langle J_4 \rangle, \langle J_2 \rangle = -\langle J_3 \rangle \tag{59}$$

The 4-level BIP-ePAM4 constellation is then specified by just two output levels, taken as $\langle J_3 \rangle$, $\langle J_4 \rangle$:

$$\langle J \rangle = \{\langle J_1 \rangle, \langle J_2 \rangle, \langle J_3 \rangle, \langle J_4 \rangle\} = \{-\langle J_4 \rangle, -\langle J_3 \rangle, \langle J_3 \rangle, \langle J_4 \rangle\} \tag{89}$$

The code matrix and the source currents vector are given by:

$$C_{BIP-PAM4}^{BiWgt} = [-1-1; -11; 1-1; 11], \langle I \rangle = \{\langle I_2 \rangle, \langle I_1 \rangle\} \tag{90}$$

where we use a matrix notation listing the elements in the successive rows of the matrix separated by semicolons.

The code matrix, $$C_{BIP-PAM4}^{BiWgt},$$

is seen to implement a counting code just as specified for BiWgt eDACs generating uniform constellations PCT patent application PCT/IB2021/060857 which is incorporated herein by reference. However, the mean source current vector is no longer dyadic (does not form a geometric sequence)—the mean source currents, $\langle I_2 \rangle$, $\langle I_1 \rangle$, are no longer in 2:1 ratio, rather the ratio of the two source currents is adjusted according to the desired uneven spacings of the antisymmetric BIP PAM4 output constellation.

The linear I/O relation $$\langle J \rangle = C_{BIP-PAM4}^{BiWgt} \langle I \rangle,$$

amounts to four linear equations, just two of which are independent. Having chosen to parameterize $\langle J \rangle$ by $\langle J_3 \rangle$, $\langle J_4 \rangle$ in (89), the two independent equations correspond to the $3^{rd}$ and $4^{th}$ rows of $$C_{BIP-PAM4}^{BiWgt},$$

$$\langle J_3 \rangle = \langle I_1 \rangle - \langle I_0 \rangle, \langle J_4 \rangle = \langle I_1 \rangle + \langle I_0 \rangle, \tag{91}$$

This system of equations may always be solved for $\langle I_1 \rangle$, $\langle I_0 \rangle$, for any specification of $\langle J_3 \rangle$, $\langle J_4 \rangle$. The solutions for the requisite current sources, $\langle I_1 \rangle$, $\langle I_0 \rangle$ to generate any specified output target levels $\langle J_3 \rangle$, $\langle J_4 \rangle$ are:

$$\langle I_1 \rangle = \frac{1}{2}(\langle J_4 \rangle + \langle J_3 \rangle), \langle I_0 \rangle = \frac{1}{2}(\langle J_4 \rangle - \langle J_3 \rangle) \tag{92}$$

Any antisymmetric PAM-4 target constellation, $\langle J \rangle$ (89), may be synthesized by these current sources $\langle I_1 \rangle$, $\langle I_0 \rangle$.

In particular, second equation in (91), implies that the mean MSL $\langle J_4 \rangle$ (the largest eDAC output current level) equals the sources total current, $\langle J_4 \rangle = \langle I_{tot} \rangle$, proven as follows (the first equality above follows from (91)):

$$\langle J_4 \rangle = \langle I_1 \rangle + \langle I_0 \rangle = \langle I_1 + I_0 \rangle = \langle I_{tot} \rangle \tag{60}$$

Let us now normalize equations (91) and (92) relating the mean eDAC source and output currents. The normalizations consist of divisions of the currents by the unary current, $\langle I_u \rangle$, given for a generally non-uniform BIP constellation by the formula $$\langle I_u^{BIP} \rangle = \frac{2}{C-1} I_{tot}^{\langle\rangle} = \frac{1}{C-1} \langle FS^{BIP} \rangle. \tag{34}$$

Here, C=4, yielding, $$\langle I_u \rangle \equiv \langle I_u^{BIP} \rangle = \frac{2}{C-1} I_{tot}^{\langle\rangle} \Big|_{C=4} = \frac{2}{3} \langle I_{tot} \rangle = \frac{2}{3} (\langle I_1 \rangle + \langle I_0 \rangle) \tag{94}$$

The superscript $^{BIP}$ is discarded in the remainder of this section, since we exclusively address BIP eDACs (in particular $\langle I_1 \rangle$ henceforth denotes the unary current of a BIP constellation, as already adopted in the first equality (94)). Dividing (89) by the unary current $$\langle I_u \rangle = \frac{2}{3} \langle I_{tot} \rangle, \tag{94}$$

the normalized BIP PAM4 output current constellation is, $$\langle \tilde{J} \rangle = \langle J \rangle / \langle I_u \rangle = \tag{95}$$

$$\frac{\langle J \rangle}{\frac{2}{3}\langle I_{tot}\rangle} = \left\{ -\langle \tilde{J}_4 \rangle, -\langle \tilde{J}_3 \rangle, \langle \tilde{J}_3 \rangle, \langle \tilde{J}_4 \rangle \right\} = \left\{ -\frac{3}{2}, -\langle \tilde{J}_3 \rangle, \langle \tilde{J}_3 \rangle, \frac{3}{2} \right\}$$

where the normalized levels $\langle J_3 \rangle$, $\langle J_4 \rangle$ are defined|derived as follows:

$$\langle \tilde{J}_3 \rangle \equiv \langle J_3 \rangle / \langle I_u \rangle = \frac{\langle J_3 \rangle}{\frac{2}{3}\langle I_{tot}\rangle} = \frac{3}{2} \cdot \frac{\langle J_3 \rangle}{\langle I_{tot} \rangle}, \tag{61}$$

$$\langle \tilde{J}_4 \rangle \equiv \langle J_4 \rangle / \langle I_u \rangle = \langle I_{tot} \rangle / \langle I_u \rangle = \frac{\langle I_{tot} \rangle}{\frac{2}{3}\langle I_{tot}\rangle} = \frac{3}{2}$$

The source currents themselves may also be normalized by the unary current. Given $\langle I_1 \rangle$, $\langle I_0 \rangle$ the normalized source currents are obtained as follows:

$$\langle \tilde{I}_{1|0} \rangle = \langle I_{1|0} \rangle / \langle I_u \rangle = \frac{\langle I_{1|0} \rangle}{\frac{2}{3}\langle I_{tot}\rangle} = \frac{3}{2} \cdot \frac{\langle I_{1|0} \rangle}{\langle I_1 \rangle + \langle I_0 \rangle} \tag{97}$$

We may directly divide equations (92) by the unary current (94), yielding the normalized equations, $$\langle \tilde{I}_2 \rangle = \frac{1}{2}\left(\langle \tilde{J}_4 \rangle + \langle \tilde{J}_3 \rangle\right) = \frac{1}{2}\left(\frac{3}{2} + \langle \tilde{J}_3 \rangle\right), \tag{98}$$

$$\langle \tilde{I}_1 \rangle = \frac{1}{2}\left(\langle \tilde{J}_4 \rangle - \langle \tilde{J}_3 \rangle\right) = \frac{1}{2}\left(\frac{3}{2} - \langle \tilde{J}_3 \rangle\right)$$

A BIP PAM4 eDAC generating any desired max-full-scale output constellation may be designed by using (98). This result is going to be used in the sequel, in conjunction with pre-distorted optical BIP-PAM4 generation driving an MZM.

Second-Order Statistics of the Non-Uniform BIP-PAM4 eDAC

For eDAC statistical analysis, all mean currents in equations (91),(92) are generalized to Random Variables:

$$J_3 = I_1 + I_0, J_4 = I_1 + I_0 \tag{99}$$

$$I_1 = \frac{1}{2}(J_4 + J_3), I_0 = \frac{1}{2}(J_4 - J_3)$$

The eDAC source currents, $I_{1=0}$, may be perturbed due to diverse effects, some systematic, some inherently stochastic. In particular we are interested in the well-known device fabrication 'mismatch' [5,6], setting the fundamental limits of eDAC performance, once all systematic sources of errors are mitigated. We aim to assess the statistical performance of such optical modulated sources. To this end we develop a statistical propagation model of the electronic mismatch errors of the current sources of the current-steering BIP-PAM4 eDAC drivers, end-to-end to the optical outputs of MZM-based optical Transmitters (Tx) or to the optical outputs of MZM-based oDACs, (in particular our MP-oDAC with MZMs in its parallel paths). Although we could directly specialize Proposition II or formula (87) to the BIP PAM4 case, it is useful to rederive the results anew for this simplest PAM4 case, in order to verify the general formulation.

The perturbations (deviations from the means) of the output currents $J_3$, $J_4$ in (99) are $$\delta J_3 = \delta I_2 - \delta I_1, \delta J_4 = \delta I_2 + \delta I_1 \tag{100}$$

Using the independence of the $I_2, I_1$ random currents (generated in distinct MOS devices, implying that $\delta I_3$, $\delta I_4$ are uncorrelated) let us show that the two perturbation RVs $\delta J_3$, $\delta J_4$ are zero-mean uncorrelated as well, $\langle \delta J_3 \cdot \delta J_4 \rangle = 0$, with identical variances, $$\sigma_{J_3}^2 = \sigma_{J_4}^2,$$

given by $$\sigma_{J_{3|4}}^2 = \tag{101}$$

$$\langle |\delta J_{3|4}|^2 \rangle = \langle |\delta I_1 \mp \delta I_0|^2 \rangle = \underbrace{\langle |\delta I_1|^2 \rangle}_{\sigma_{I_1}^2} + \underbrace{\langle |\delta I_0|^2 \rangle}_{\sigma_{I_0}^2} \pm \underbrace{\langle \delta I_3 \cdot \delta I_0 \rangle}_{0} = \sigma_{I_1}^2 + \sigma_{I_0}^2$$

It is apparent that the $\mp$ sign above makes no difference in the squared perturbation evaluation, implying that $$\sigma_{J_3}^2 = \sigma_{J_4}^2 = \sigma_{I_1}^2 + \sigma_{I_0}^2.$$

Further recall $J_4 = I_1 + I_0 \equiv I_{tot}$ (see (99)), thus (101) is compactly recapped as $$\sigma_{J_{3|4}}^2 = \sigma_{I_1+I_0}^2 = \sigma_{I_1}^2 + \sigma_{I_0}^2.$$

Moreover, from the BIP PAM4 constellation antisymmetry, we have $J_{1|2} = J_{3|4}$, therefore all four output constellation symbols have identical variances, evaluated as the variance of $$\sigma_{I_{tot}}^2$$

of the total source current, which equals the sum of variances of the two source currents:

$$\sigma_{J_{1|2|3|4}}^2 = \sigma_{\pm I_1 \pm I_0}^2 = \sigma_{I_1+I_0}^2 = \sigma_{I_1}^2 + \sigma_{I_0}^2 = \sigma_{I_{tot}}^2 \quad (102)$$

We now express the variances of the individual source currents in (102) as per (37) of Proposition I, paraphrased here, $$\sigma_{I_{1|0}}^2 = \sigma_{uu}^2 \langle I_{1|0} \rangle, \quad (103)$$

reducing (102) to an expression proportional to the mean $\langle I_{tot} \rangle$ of the total current:

$$\sigma_{J_{1|2|3|4}}^2 = \sigma_{I_{tot}}^2 = \sigma_{I_1+I_0}^2 = \sigma_{I_1}^2 + \sigma_{I_0}^2 = \quad (62)$$

$$\sigma_{uu}^2 \langle I_1 \rangle + \sigma_{uu}^2 \langle I_0 \rangle = \sigma_{uu}^2 (\langle I_1 \rangle + \langle I_0 \rangle) = \sigma_{uu}^2 \langle I_1 + I_0 \rangle = \sigma_{uu}^2 \langle I_{tot} \rangle$$

with the independence of $\langle I_1 \rangle$, $\langle I_0 \rangle$ used in the $3^{rd}$ equality, (103) used in the $4^{th}$ one, linearity used in the $5^{th}$ and $6^{th}$ ones, and the definition $I_{tot} \equiv I_1 + I_0$ of total current used in the last one. To recap, $$\sigma_{J_c}^2 = \sigma_{uu}^2 \langle I_{tot} \rangle \text{ for } c = 1, 2, 3, 4, \ \sigma_J^2 = \sigma_{uu}^2 \langle I_{tot} \rangle 1_4^{\vee} \quad (105)$$

where in the second equality in (105) the 'variance vector'

$$\sigma_J^2$$

(the vector of variances of the scalar elements of the vector J) for the BIP-PAM4 constellation is given (using $$\sigma_{J_c}^2 = \sigma_{uu}^2 \langle I_{tot} \rangle,$$

namely the LSH equality in (105)):

$$\sigma_J^2 = \quad (63)$$

$$\sigma_{\{J_1,J_2,J_3,J_4\}}^2 \equiv \{\sigma_{J_1}^2, \sigma_{J_2}^2, \sigma_{J_3}^2, \sigma_{J_4}^2\} = \sigma_{uu}^2 \langle I_{tot} \rangle \{1, 1, 1, 1\} = \sigma_{uu}^2 \langle I_{tot} \rangle 1_4^{\vee}$$

It is useful to alternatively express the result (105) for the BIP PAM4 output variance by having it normalized by the square of the unary current, dividing both sides of (105) by $\langle I_u \rangle^2$ (with $$\langle I_u \rangle = \frac{2}{3} \langle I_{tot} \rangle), \quad (94)$$

yielding:

$$\hat{\sigma}_{J_c}^2 \equiv \sigma_{\frac{J_c}{I_u}}^2 = \sigma_{J_c/\langle I_u \rangle}^2 = \quad (107)$$

$$\frac{\sigma_{J_c}^2}{\langle I_u \rangle^2} = \frac{\sigma_{uu}^2 \langle I_{tot} \rangle}{\langle I_u \rangle^2} = \frac{\sigma_{uu}^2}{\langle I_u \rangle} \cdot \frac{\langle I_{tot} \rangle}{\langle I_u \rangle} = \sigma_u^2 \cdot \frac{\langle I_{tot} \rangle}{\langle I_u \rangle} = \sigma_u^2 \cdot \frac{\langle I_{tot} \rangle}{\frac{2}{3}\langle I_u \rangle} = \frac{3}{2} \sigma_u^2$$

where $$\sigma_u^2 = \sigma_{uu}^2 / \langle I_u \rangle \quad (53)$$

and $$\langle I_u \rangle = \frac{2}{3} \langle I_{tot} \rangle \quad (94)$$

were used. To recap (105) and (107), for c=1,2,3,4:

Lemma: Output statistics of a BIP PAM4 eDAC:

$$BIP-PAM4 : \sigma_{J_c}^2 = \sigma_{uu}^2 \langle I_{tot} \rangle, \ \hat{\sigma}_{J_c}^2 = \frac{3}{2} \sigma_u^2, \quad (108)$$

$$\hat{\sigma}_J^2 = \frac{3}{2} \sigma_u^2 1_4^{\vee}, \text{ for } c = 1, 2, 3, 4$$

with parameters $\sigma_{uu}^2 = \sigma_u^2 \langle I_u \rangle$, $\quad (53)(64)$ $$\sigma_u^2 = \sigma_{uu}^2 / \langle I_u \rangle \Big|_{\langle I_u \rangle := \frac{2}{3} \langle I_{tot} \rangle} = \frac{3}{2} \cdot \frac{\sigma_{uu}^2}{\langle I_{tot} \rangle}$$

This statistical analysis of arbitrarily shaped BIP PAM4 generation, is useful for designing optimal drivers for BIP PAM4 optical Tx-s, e.g., for use as IQ tributaries in QAM16 optical Tx-s, or for modeling our preferred oDAC implementations.

Consider now the cascade of a BIP-PAM4 driver, a TIA amplifier with trans-resistance (current-to-voltage gain $R_0$) and an MZM with p-voltage $V_\pi$. The mean output field constellation is given by $$\langle F \rangle = \sin(\langle \theta \rangle) = \quad (110)$$

$$\sin(z_0 \langle J \rangle) = \sin(z_0 \langle \hat{J} \rangle \langle I_u \rangle) = \sin\left[z_0 \left\{ -\frac{3}{2}, -\langle \hat{J}_3 \rangle, \langle \hat{J}_3 \rangle, \frac{3}{2} \right\} \langle I_u \rangle \right] =$$

-continued $$\sin\left[\left\{-\frac{3}{2}z_0\langle I_u\rangle, -\left\langle\tilde{J}_3\right\rangle z_0\langle I_u\rangle, \left\langle\tilde{J}_3\right\rangle z_0\langle I_u\rangle, \frac{3}{2}z_0\langle I_u\rangle\right\}\right]$$

where the relation $$\langle\tilde{J}\rangle = \left\{-\frac{3}{2}, -\left\langle\tilde{J}_3\right\rangle, \left\langle\tilde{J}_3\right\rangle, \frac{3}{2}\right\} \tag{95}$$

between the normalized ($\langle J\rangle = \langle\hat{J}\rangle / \langle I_u\rangle$), and unnormalized ($\langle J\rangle = \langle\hat{J}\rangle \langle I_w\rangle$), constellations was used in the third equality above.

For maximal output full-scale, the MSL and LSL in the MZM arm-phase domain are to be set to the respective values $$\langle\theta_{4|1}\rangle = \pm\frac{\pi}{2},$$

such that $$\langle F_1\rangle = \sin\langle\theta_1\rangle = \sin\left(-\frac{\pi}{2}\right) = -1, \ \langle F_4\rangle = \sin\langle\theta_4\rangle = \sin\frac{\pi}{2} = 1.$$

Inspecting (110), $\langle\theta_{4|1}\rangle$ are identified as the antipodal last and first elements in the 4-vector in curly brackets there. Thus, it suffices to set the last element to $\pi/2$ in order to attain the MZM output max-full-scale condition, $\langle F_{4|1}\rangle = \pm 1$:

$$\frac{3}{2}z_0\langle I_u\rangle = \frac{\pi}{2} \Leftrightarrow z_0 = \frac{\pi}{3\langle I_u\rangle} \Leftrightarrow z_0\langle I_u\rangle = \frac{\pi}{3} \tag{111}$$

For these settings the MZM mean output constellation (110) is simplified as follows:

$$\langle\theta\rangle = z_0\langle J\rangle = \left\{-\frac{\pi}{2}, -\frac{\pi}{3}\left\langle\tilde{J}_3\right\rangle, \frac{\pi}{3}\left\langle\tilde{J}_3\right\rangle, \frac{\pi}{2}\right\}. \tag{112}$$

This is the phase-domain mean constellation driving the MZM, substitution of which into $\langle F\rangle = \sin(\langle\theta\rangle)$ (110) yields:

$$\langle F\rangle = \sin(z_0\langle J\rangle) = \tag{113}$$
$$\sin\left[z_0\left\{-\frac{3}{2}, -\left\langle\tilde{J}_3\right\rangle, \left\langle\tilde{J}_3\right\rangle, \frac{3}{2}\right\}\langle I_u\rangle\right] = \sin\left[\left\{-\frac{\pi}{2}, -\frac{\pi}{3}\left\langle\tilde{J}_3\right\rangle, \frac{\pi}{3}\left\langle\tilde{J}_3\right\rangle, \frac{\pi}{2}\right\}\right]$$

Thus the max-full-scale mean field-domain output constellation of the PAM4 driven MZM is given by, $$\langle F\rangle = \left\{-1, -\sin\left[\frac{\pi}{3}\left\langle\tilde{J}_3\right\rangle\right], \sin\left[\frac{\pi}{3}\left\langle\tilde{J}_3\right\rangle\right], 1\right\} \tag{114}$$

In order to attain 'perfect' (uniform and max-full scale) optical constellation generation at the MZM output, $$'perfect' : \langle F\rangle = \left\{-1, -\frac{1}{3}, \frac{1}{3}, 1\right\}, \tag{115}$$

we must adjust the the eDAC output inner symbols $$\pm\sin\left[\frac{\pi}{3}\langle\hat{J}_3\rangle\right]$$

in (114) to the values $$\pm\frac{1}{3}.$$

Solving the equation $$\langle F_3^{'perfect'}\rangle = \frac{1}{3} = \sin\left[\frac{\pi}{3}\left\langle\tilde{J}_3\right\rangle\right]$$

for $\langle\hat{J}_3\rangle$ yields the optimal inner levels setting:

$$\left\langle\tilde{J}_3^{'perfect'}\right\rangle = \frac{3}{\pi}a\sin\frac{1}{3} \tag{116}$$

Plugging the optimal mean inner level (116) into the mean MZM arm-phase constellation (112) yields the optimally predistorted drive constellations in the phase-domain:

$$\langle\theta^{'perfect'}\rangle = z_0\langle J^{'perfect'}\rangle = \left\{-\frac{\pi}{2}, -\frac{\pi}{3}\cdot\frac{3}{\pi}a\sin\frac{1}{3}, \frac{\pi}{3}\cdot\frac{3}{\pi}a\sin\frac{1}{3}, \frac{\pi}{2}\right\} = \tag{117}$$
$$\left\{-\frac{\pi}{2}, -a\sin\frac{1}{3}, a\sin\frac{1}{3}, \frac{\pi}{2}\right\} = a\sin\left\{-1, -\frac{1}{3}, \frac{1}{3}, 1\right\}$$

To recap, $$\langle\theta^{'perfect'}\rangle = \left\{-\frac{\pi}{2}, -a\sin\frac{1}{3}, a\sin\frac{1}{3}, \frac{\pi}{2}\right\} \tag{118}$$

Thus, for perfect output constellation generation, the outer symbols in the phase-domain must satisfy $$\langle\theta_{4|1}\rangle = \pm\frac{\pi}{2} \text{ phase } \left(\text{i.e., } F_{4|1} = \sin\langle\theta_{4|1}\rangle = \pm 1\right),$$

whereas the inner symbols must satisfy $$\langle\theta_{3|2}\rangle = \pm a\sin\frac{1}{3} \left(\text{i.e., } F_{3|2} = \sin\langle\theta_{3|2}\rangle = \pm\frac{1}{3}\right).$$

The corresponding drive voltage constellation is obtained from $$\langle\theta\rangle = \frac{\pi}{2V_\pi}\langle V\rangle$$

(in turn obtained from $$\theta = \frac{\pi}{2V_\pi} V \qquad (65)$$

Solving $$\langle\theta\rangle = \frac{\pi}{2V_\pi}\langle V\rangle$$

for $\langle v \rangle$ yields:

$$(119)$$

$$\langle V\rangle = \frac{V_\pi}{\pi/2}\langle\theta\rangle = \frac{V_\pi}{\pi/2}\left\{-\frac{\pi}{2}, -asin\frac{1}{3}, asin\frac{1}{3}, \frac{\pi}{2}\right\} =$$

$$\left\{-V_\pi, -\frac{V_\pi}{\pi/2}asin\frac{1}{3}, \frac{V_\pi}{\pi/2}asin\frac{1}{3}, V_\pi\right\} = \left\{-1, -\frac{2}{\pi}asin\frac{1}{3}, \frac{2}{\pi}asin\frac{1}{3}, 1\right\}V_\pi$$

The slopes-vector, $\gamma$ for the optimally predistorted phase constellation (117), is:

$$\gamma \equiv \{\gamma_1, \gamma_2, \gamma_3, \gamma_4\} = \cos\left(\langle\theta\rangle\right) = \cos\left[asin\left\{-1, -\frac{1}{3}, \frac{1}{3}, 1\right\}\right] = \qquad (120)$$

$$\cos\left\{-\frac{\pi}{2}, -asin\frac{1}{3}, asin\frac{1}{3}, \frac{\pi}{2}\right\} = \left\{0, \cos\left[asin\frac{1}{3}\right], \cos\left[asin\frac{1}{3}\right], 0\right\}$$

The $$\gamma_{3|2} = \cos\left[asin\left(\frac{1}{3}\right)\right]$$

slopes in the last expression in (120) may be obtained using the curious trigonometric identity $\cos[asin(s)]=\sqrt{1-s^2}$, yielding the following MZM slopes at the 'perfect' phase operating points on the MZM TC:

$$\gamma_{3|2} = \cos[asin(s)] = \sqrt{1 - \left(\frac{1}{3}\right)^2} = \frac{2\sqrt{2}}{3}, \gamma_{4|1} = 0 \qquad (121)$$

where $\gamma_{4|1}=0$ makes sense, as the MZM TC attains its max|min at $$\langle\theta_{4|1}\rangle = \pm\frac{\pi}{2} \Rightarrow \langle F_{4|1}\rangle = \sin\langle\theta_{4|1}\rangle = \pm 1.$$

Substituting (121) into (120) yields our slopes-vector for the max-full-scale optimally predistorted BIP-PAM4:

$$\gamma \equiv \{\gamma_1, \gamma_2, \gamma_3, \gamma_4\} = \cos(z_0\langle J\rangle) = \cos(\langle\theta\rangle) = \left\{0, -\frac{2\sqrt{2}}{3}, \frac{2\sqrt{2}}{3}, 0\right\} \qquad (122)$$

It is also useful to specify the Shur-square (vector of element-wise squares) of the particular slopes vector (122) which attains optimal predistortion:

$$\gamma^{\odot 2} \equiv \{\gamma_1^2, \gamma_2^2, \gamma_3^2, \gamma_4^2\} = \left\{0, \frac{8}{9}, \frac{8}{9}, 0\right\}$$

This, Shur-squared slopes vector is used to evaluate the propagation of stochastic perturbations from the eDAC to the optical output of the perfectly-predistorted MZM. We specialize the generic formula (87), repeated here, $$MZM \text{ driven by } BIP \; PAM-C \; eDAC{:}\sigma_{F_c}^2 = \frac{\pi^2\sigma_u^2}{C-1}\cdot\gamma_c^2 = \frac{\pi^2\sigma_{uu}^2}{2I_{tot}^\Diamond}\cdot\gamma_c^2, \qquad (65)$$

$$c = \{1, 2, 3, \ldots, C-1\}$$

for the particular PAM4 constellation size, C=4, taking c=2|3, yielding $$\sigma_{F_{2|3}}^2 = \frac{\pi^2\sigma_u^2}{C-1}\cdot\gamma_{2|3}^2\Big|_{C:=4,\gamma_{2|3}^2=\frac{8}{9}} = \frac{\pi^2\sigma_u^2}{3}\cdot\frac{8}{9} = \frac{\pi^2\sigma_{uu}^2}{2I_{tot}^\Diamond}\cdot\frac{8}{9}.$$

Numerically simplifying the fractions in the last two expressions finally yields for the oPAM4 output field inner levels:

$$MZM \text{ driven by } BIP \; PAM-4 \; eDAC{:}\sigma_{F_{2|3}}^2 = \frac{8\pi^2\sigma_u^2}{27} = \frac{4\pi^2\sigma_{uu}^2}{9I_{tot}^\Diamond} \qquad (66)$$

As for the oPAM4 optical field outer levels they null out (and so do their variances) since for max-full-scale operation the operating points on the MZM TC fall right at the max and min of the sine TC.

The resulting oPAM4 constellation variance is then: (125)

$$MZM \text{ driven by } BIP \; PAM-4 \; eDAC{:}\sigma_F^2 = \qquad (67)$$

$$\left\{0, \frac{8\pi^2\sigma_u^2}{27}, \frac{8\pi^2\sigma_u^2}{27}, 0\right\} = \left\{0, \frac{4\pi^2\sigma_{uu}^2}{9I_{tot}^\Diamond}, \frac{4\pi^2\sigma_{uu}^2}{9I_{tot}^\Diamond}, 0\right\}$$

$$\sigma_F = \left\{0, \frac{2\pi}{3}\sqrt{\frac{2}{3}}, \frac{2\pi}{3}\sqrt{\frac{2}{3}}, 0\right\}\sigma_u =$$

$$\{0, 1.71\sigma_u, 1.71\sigma_u, 0\} = \left\{0, \frac{2\pi}{3\sqrt{I_{tot}^\Diamond}}, \frac{4\pi^2\sigma_{uu}^2}{9I_{tot}^\Diamond}, 0\right\}\sigma_{uu}$$

Note: The following derivation verifies that $$\frac{8\pi^2\sigma_u^2}{27} = \frac{4\pi^2\sigma_{uu}^2}{9I_{tot}^\Diamond},$$

just invoking $$\sigma_u^2 = \sigma_{uu}^2/\langle I_u\rangle, \langle FS\rangle = 3\langle I_u\rangle = \qquad (68)$$

$$2I_{tot}^\Diamond{:}\frac{8\pi^2\sigma_u^2}{27} = \frac{8\pi^2\sigma_{uu}^2}{27\langle I_u\rangle} = \frac{8\pi^2\sigma_{uu}^2}{9\cdot 3\langle I_u\rangle} = \frac{8\pi^2\sigma_{uu}^2}{9\cdot\langle FS\rangle} = \frac{8\pi^2\sigma_{uu}^2}{9\cdot 2I_{tot}^\Diamond} = \frac{4\pi^2\sigma_{uu}^2}{9I_{tot}^\Diamond}.$$

To recap we have derived the field-domain variance vector and STD vector for a 'perfect (i.e., uniform and max-full-scale) optical field domain BIP-PAM4 constellation at optical output of an MZM driven by an optimally predistorted ePAM4 eDAC. The inversely proportional dependence of the variance on the mean total current, $\langle I_{tot} \rangle$ of the eDAC driver current sources indicates that it is worth fully exploiting the area available on the eDAC chip to maximize $\langle I_{tot} \rangle$, which improves the resilience of the optical output field constellation to mismatch errors.

The MZM driven by an optimally predistorted ePAM4 eDAC forms a module useful as a BB in diverse use-cases, e.g.:

i. A pair of these optimally predistorted BIP oPAM4 BBs may be IQ-nested to generated optical QAM16 for an optical Transmitter (Tx) to be used in a conventional COH receiver. Note: Formulas (125) for the variances of BIP-oPAM4 optical constellation at the output of an optimally predistorted MZM may be used to assess the statistical quality of a conventional QAM16 optical transmitter nesting two BIP-oPAM4 IQ tributaries, in particular its resilience to the electronic mismatch errors of its two drivers.

ii. Several of these BIP oPAM4 BBs may be parallelized to generate PAM4-driven MP-oDAC as per the teaching of PCT patent application PCT/IB2021/060857 which is incorporated herein by reference, also disseminated in the energy-efficient reference. A preferred embodiment of the MP-oDAC, (also disclosed in PCT patent application PCT/IB2021/060857 which is incorporated herein by reference and disseminated in the energy-efficient reference) uses just 2 optical parallel paths comprising MZMs, thus a pair of BIP oPAM4 BBs would be required to drive the two MZMs. This preferred oDAC embodiment, referred to as 'PAM4-driven 2-parallel MP-oDAC', efficiently generates oPAM16, as physically and statistically modeled in the next subsection.

1.7 BIP-PAM16 oDAC Variance Optimization by Imbalancing the PAM4 eDAC Drivers Pair This subsection commences with brief review and exposition of the mathematical model of the physical principle of operation of the novel Dual-Parallel PAM4-driven oDAC, already discussed in PCT patent application PCT/IB2021/060857 which is incorporated herein by reference and in the energy-efficient reference, considering the formation of the mean optical output based the mathematical concept of Kronecker sum (Ksum). The Ksum construction is is useful analytical tool in MP-oDAC modeling, elaborated upon here in an alternative tabular form.

Our main objective is to evaluate the second-order statistical performance of this oDAC in the wake of stochastic mismatch of the transistors of the current sources in the two BIP-PAM4 sub-eDACs forming the oDAC electrical driver.

The exposition of the principle of operation of the PAM4|2-driven MP-oDAC oDAC effectively pertains to mean signals in the electronic and optical domains, initially ignoring random perturbations, such as electronic mismatch, focusing on deriving the first-order statistics of the oDAC. The formation of the oDAC output field in terms of the pair of eDAC optical signals is first reviewed.

As per [1,4], assume that the PAM2|4 drivers in FIG. 51 are set to specifically generate a pair of ePAM4 driving the two MZMs. Then the dual-parallel oDAC forms a linear combination of the oPAM4 optical fields traversing the MZMs, as generated by optical field superposition of the two parallel paths, which are fed by uneven CW optical powers in the ratio of 4:1. The output optical field F is given by the Kronecker sum (KSum), $\oplus$, (see the energy-efficient reference), of the optical fields $\frac{4}{5}F^{(1)}, \frac{1}{5}F^{(0)}$ superposed at the combiner output due to the field contributions of the top (indexed $^{(1)}$) and bottom (indexed $^{(0)}$) MZMs.

$$F = \frac{4}{5}F^{(1)} \oplus \frac{1}{5}F^{(0)} \tag{127}$$

Note: The notation $F^{(1|0)}$ here replaces the notation $M_{1|0}$ in the energy-efficient reference. The mean of the KSum (127) equals the Ksum of the means, $$\langle F \rangle = \frac{4}{5}\langle F^{(1)} \rangle \oplus \frac{1}{5}\langle F^{(0)} \rangle = \frac{4}{5}\left\{-1, -\frac{1}{3}, \frac{1}{3}, 1\right\} \oplus \frac{1}{5}\left\{-1, -\frac{1}{3}, \frac{1}{3}, 1\right\} = \tag{128}$$

$$\left\{-\frac{12}{15}, -\frac{4}{15}, \frac{4}{15}, \frac{12}{15}\right\} \oplus \left\{-\frac{3}{15}, -\frac{1}{15}, \frac{1}{15}, \frac{3}{15}\right\} = PAM_{BIP}[16]$$

where each of $F^{(1|0)}$ is a perfect BIP PAM4 constellation in the mean, $$\langle F^{(1)} \rangle = \langle F^{(0)} \rangle = \left\{-1, -\frac{1}{3}, \frac{1}{3}, 1\right\} = PAM_{BIP}[4] \tag{129}$$

and with the BIP PAM4|16 generic constellations defined as $$PAM_{BIP}[4] \equiv \left\{-1, -\frac{1}{3}, \frac{1}{3}, 1\right\}, \tag{69}$$

$$PAM_{BIP}[16] \equiv \left\{-1, \frac{-13}{15}, \frac{-11}{15}, \frac{-9}{15}, \frac{-7}{15}, \right.$$

$$\left. \frac{-5}{15}, \frac{-3}{15}, \frac{-1}{15}, \frac{1}{15}, \frac{3}{15}, \frac{5}{15}, \frac{7}{15}, \frac{9}{15}, \frac{11}{15}, \frac{13}{15}, 1\right\}$$

Note that in order to generate 'perfect' uniform $oPAM_{BIP}$ [4] optical sub-constellations at the two MZM outputs, requires electrically feeding the two MZM by non-uniform, properly predistorted ePAM4 constellations, as generated by optimized drivers, as derived in subsections 1.6 and 1.8.

Elaborating on the mathematical concept of KSum, $W = u \oplus v$, of a pair of vectors, as introduced in the energy-efficient reference, a formal definition of the KSum is based on the Kronecker product, $\otimes$, and on conventional vector addition:

$$u \oplus v \equiv u \otimes 1^{\vee}_{len(v)} + 1^{\vee}_{len(u)} \otimes v. \tag{70}$$

For the analysis here, we adopt less formal, yet rigorous, equivalent approach to the Ksum evaluation consists of vectorization of an 'addition table' of u, v: Imagine constructing an 'addition table' for the two vectors u, v, viewed as lists, by having the elements of u, v arrayed as entries into the horizonal and vertical header of a table. Each entry in the body of the table is formed as the sum of the corresponding elements in the headers u, v. Viewing the table body as a matrix of dimensions len(v)×len(u) the KSum vector, u⊕v, is obtained by vectorizing the table body matrix, i.e., generating a column vector of length len(v)·len(u) by stacking the columns of the matrix atop one another, moving down along the successive columns from left to right.

We use this 'Vectorized Addition Table' (VAT) construction to evaluate the Ksum of the two vectors $$\frac{4}{5}\langle F^{(1)}\rangle, \frac{1}{5}\langle F^{(0)}\rangle$$

occurring in (128), namely $$\frac{4}{5}\langle F^{(1)}\rangle = \left\{-\frac{12}{15}, -\frac{4}{15}, \frac{4}{15}, \frac{12}{15}\right\}, \tag{132}$$

$$\frac{1}{5}\langle F^{(0)}\rangle = \left\{-\frac{3}{15}, -\frac{1}{15}, \frac{1}{15}, \frac{3}{15}\right\}.$$

The addition table for these two vectors is then readily worked out in Table 1.

TABLE 1

Addition Table for the evaluation of the KSum of the two vectors in (132).

|  | $-\frac{12}{15}$ | $-\frac{4}{15}$ | $\frac{4}{15}$ | $\frac{12}{15}$ |
|---|---|---|---|---|
| $-\frac{3}{15}$ | $-1$ | $-\frac{7}{15}$ | $\frac{1}{15}$ | $\frac{9}{15}$ |
| $-\frac{1}{15}$ | $-\frac{13}{15}$ | $-\frac{5}{15}$ | $\frac{3}{15}$ | $\frac{11}{15}$ |
| $\frac{1}{15}$ | $-\frac{11}{15}$ | $-\frac{3}{15}$ | $\frac{5}{15}$ | $\frac{13}{15}$ |
| $\frac{3}{15}$ | $-\frac{9}{15}$ | $-\frac{1}{15}$ | $\frac{7}{15}$ | $1$ |

It remains to vectorize the 16 elements of the addition table of the two vectors in (132), reading the table entries top-down along each column, stacking the columns from left to right in turn, to form a single long column vector, which is nothing but the KSum:

$$\langle F\rangle = \frac{4}{5}\langle F^{(1)}\rangle \oplus \frac{1}{5}\langle F^{(0)}\rangle = \left\{1, \underbrace{\frac{-13}{15}, \frac{-11}{15}, \frac{-9}{15}}_{1st\ column}, \underbrace{\frac{-7}{15}, \frac{-5}{15}, \frac{-3}{15}, \frac{-1}{15}}_{2nd\ column},\right. \tag{133}$$

$$\left.\underbrace{\frac{1}{15}, \frac{3}{15}, \frac{5}{15}, \frac{7}{15}}_{3rd\ column}, \underbrace{\frac{9}{15}, \frac{11}{15}, \frac{13}{14}}_{4th\ column}, 1\right\} \equiv PAM_{BIP}[16]$$

This completes the first-order statistics evaluation of our oDAC, proving that the dual-parallel structure (disclosed in PCT patent application PCT/IB2021/060857 which is incorporated herein by reference and also described in the energy-efficient reference) does generate a 'perfect' BIP-PAM16 optical constellation, (133), in the mean.

Figure 50:
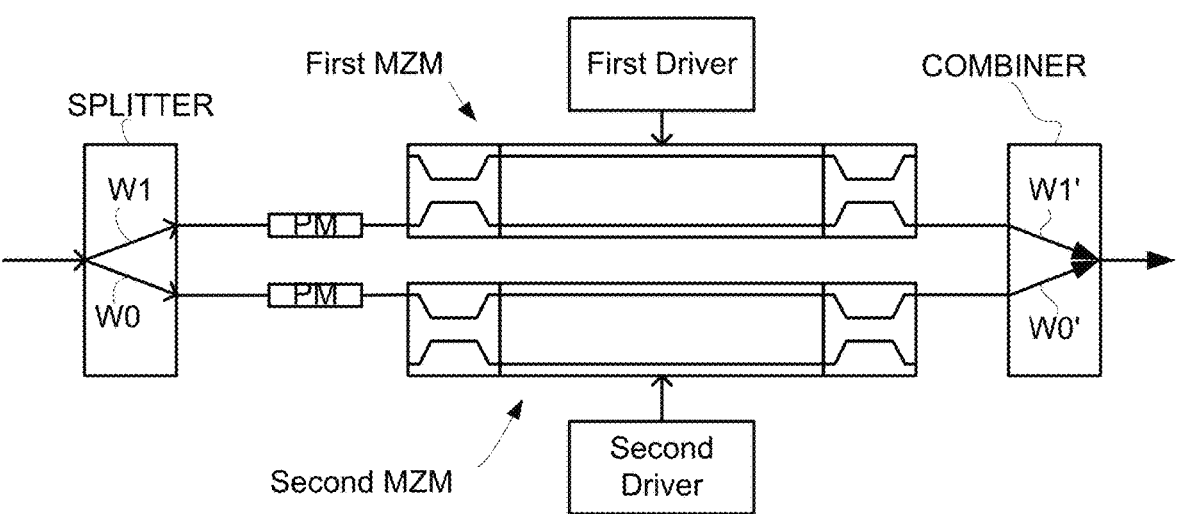
FIG. 50 illustrates an example of a multi-parallel ODAC.

FIG. 50 is a conceptual block diagram of the PAM4-driven 2P-oDAC along with its two ePAM4 MZM drivers. This diagram will be used for modeling the stochastic mismatch mitigation optimization.

Figure 54A:
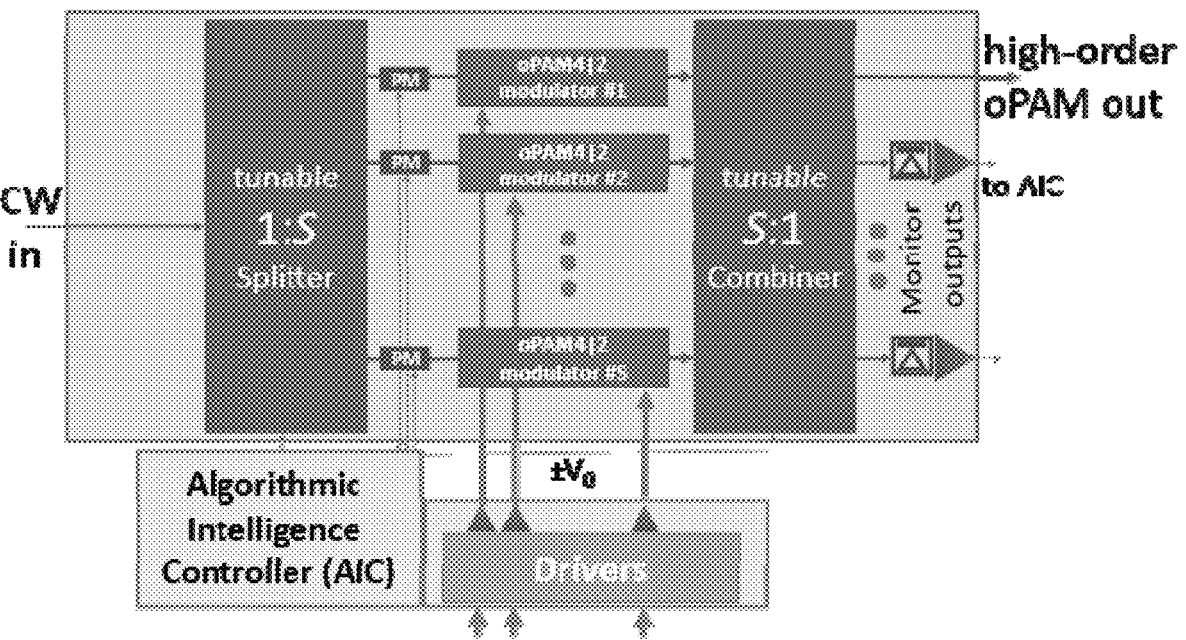
FIGS. 54A, 54B, 54C and 54D illustrate examples of ODACs.

Proceeding now to our main objective in this subsection, namely the second-order statistics of the electronic current sources mismatch in the oDAC driver, FIG. 54A depicts the most general realization of the PAM4-driven Dual-parallel-oDAC, presenting a conceptual block diagram of its two MZM drivers highlighting the current sources allocation within the driver chip comprising the two BIP-PAM4 sub-DACs. Note: Actual circuit realizations thereof may appear quite different from that of the eDACs in FIG. 52, albeit implementing the functionality of the abstract block diagram of FIG. 54A.

The PAM4 sub-drivers module feature two topologically identical PAM4 eDACs, the components of which are labeled by nominally different parameters, $$\{I_0^{(s)}, I_1^{(s)}, R^{(s)}\}, s = 0, 1,$$

with s the index designating the MZM. Noting that the two MZMs (MZM #1 and MZM #0) should be driven by the same top mean voltage, $V_\pi/2$, it seems natural to take $$I_0^{(0)} = I_0^{(1)}, I_1^{(0)} = I_1^{(1)}, R^{(0)} = R^{(1)},$$

i.e., make the corresponding parameters of the two drivers identical, in effect having superscripts $^{(0)},^{(1)}$ discarded, as the two PAM4 sub-drivers are taken identical in every respect, both topologically and in terms of their actual parameter values. We refer to this setup as the 'baseline' design, whereby the two PAM4 drivers are not only structurally identical, but they are also 'parametrically identical', i.e. feature identical corresponding parameters. Such obvious 'baseline' oDAC electrical driving design parameterization of the structure in FIG. 52, based on a pair of BIP-PAM4 drivers that are identical in every respect, generating identical mean total currents, equal to half the total current sourcing capacity of the drivers chip, seems good engineering practice. Indeed, as the two MZMs are identical and should be identically driven by max-full-scale constellations, there seems to be no a-priori reason to consider any other eDACs design but the symmetrical one, based on a pair of identical predistorted BIP-PAM4 sub-DACs, with identical current sources, $\langle I^{(1)}\rangle = \langle I^{(0)}\rangle$ generating identical current constellations, $\langle J^{(1)}\rangle = \langle H^{(0)}\rangle$ driving the two MZMs via two identical TIAs, i.e., $R^{(1)} = R^{4)}$ generating identical voltage-domain constellations, $\langle V^{(1)}\rangle = \langle V^{(0)}\rangle$, applied to the two MZMs, these identical voltage constellations, generating identical MZM-arm-phase constellations, $\langle \theta^{(1)}\rangle = \langle \theta^{(0)}\rangle$, which in turn generate identical field constellations, $\langle F^{(1)}\rangle = \langle F^{(0)}\rangle$, with the aforementioned constellations in the voltage, phase, and optical field domains given by $$\langle J^{(1|0)}\rangle R^{(1|0)} = \langle V^{(1|0)}\rangle = \left\{-V_\pi, -\frac{V_\pi}{\pi/2}asin\frac{1}{3}, \frac{V_\pi}{\pi/2}asin\frac{1}{3}, V_\pi\right\} \tag{144}$$

$$\langle \theta^{(1|0)}\rangle = \frac{\pi/2}{V_\pi}\langle V^{(1|0)}\rangle = \left\{-\frac{\pi}{2}, -asin\frac{1}{3}, asin\frac{1}{3}, \frac{\pi}{2}\right\}$$

$$F^{(1|0)} = sin\langle \theta^{(1|0)}\rangle = \left\{-1, -\frac{1}{3}, \frac{1}{3}, 1\right\} \tag{71}$$

'Engineering common sense' would then suggest adopting such 'baseline' identical design parameters, $$R^{(1)} = R^{(0)} \& \langle I^{(1)}\rangle = \langle I^{(0)}\rangle \Rightarrow \langle J^{(1)}\rangle = \langle J^{(0)}\rangle \Rightarrow \langle V^{(1)}\rangle = \langle V^{(0)}\rangle \tag{135}$$

where the implications above respectively stem from the switching linear transformation of currents and the TIA I/O current-to-voltage conversion:

$$C\langle I^{(1|0)}\rangle = \langle J^{(1|0)}\rangle, \ \langle J^{(1|0)}\rangle R^{(1|0)} = \langle V^{(1|0)}\rangle, \tag{136}$$

However . . . a. question may be posed whether there exist any other eDAC-pair designs besides the aforementioned 'parametrically identical' baseline design. What if we used two different source currents in the eDAC, $\langle I^{(1)}\rangle \neq \langle I^{(0)}\rangle$)? Then, in light of the first linear mapping in (136), we would have $\langle J^{(1)}\rangle \neq \langle J^{(0)}\rangle$ but this does not imply that $\langle V^{(1)}\rangle \neq \langle V^{(0)}\rangle$! We could still have $\langle V^{(1)}\rangle = \langle V^{(0)}\rangle$, i.e. deliver identical MZM drive voltages to the two MZMs (which is our necessary condition to get the desired identical MZM fields, $\langle F^{(1)}\rangle = \langle F^{(0)}\rangle$, simply by ensuring that we satisfy the condition $$\langle I^{(1)}\rangle R^{(1)} = \langle I^{(0)}\rangle R^{(0)}, \tag{137}$$

Indeed, by the first line of (142)(72), $\langle I^{(1)}\rangle R^{(1)} = \langle V^{(1)}\rangle$ and $\langle I^{(0)}\rangle R^{(0)} = \langle V^{(0)}\rangle$, therefore $$\langle I^{(1)}\rangle R^{(1)} = \langle I^{(0)}\rangle R^{(0)} \Rightarrow \langle V^{(1)}\rangle = \langle V^{(0)}\rangle \Rightarrow \langle F^{(1)}\rangle = \langle F^{(0)}\rangle \tag{139}$$

Thus, asymmetric (imbalanced) eDAC designs with $\langle I^{(1)}\rangle \neq \langle I^{(0)}\rangle$ do exist for driving the two MZMs in the MP-oDAC with identical fields. E.g., assume that we depart from the balanced design $\langle I^{(1)}\rangle = \langle I^{(0)}\rangle$ by doubling the current $\langle I^{(1)}\rangle$ relative to $\langle I^{(0)}\rangle$. If this were accompanied by halving the TIA trans-resistance gain $R^{(1)}$ relative to $R^{(0)}$, we would then still satisfy (139). The products current x trans-resistance are the same for both MZMs, thus the voltages are the same, thus the arm-phases of the two MZMs are the same, thus the MZM fields are the same, formally described in the following chain of equivalences is $$\langle F^{(1)}\rangle = \langle F^{(0)}\rangle \Leftrightarrow \langle \theta^{(1)}\rangle = \langle \theta^{(0)}\rangle \Leftrightarrow \langle V^{(1)}\rangle = \tag{140}$$

$$\langle V^{(0)}\rangle \Leftrightarrow \langle J^{(1)}\rangle R^{(1)} = \langle J^{(0)}\rangle R^{(0)} \Leftrightarrow \langle J^{(1)}\rangle z_0^{(1)} = \langle J^{(0)}\rangle z_0^{(0)}$$

$$\Leftrightarrow C\langle I^{(1)}\rangle R^{(1)} = C\langle I^{(0)}\rangle R^{(0)} \Leftrightarrow C\langle I^{(1)}\rangle z_0^{(1)} = \tag{141}$$

$$C\langle I^{(0)}\rangle z_0^{(0)} \Leftrightarrow \langle I^{(1)}\rangle R^{(1)} = \langle I^{(0)}\rangle R^{(0)} \Leftrightarrow \langle I^{(1)}\rangle z_0^{(1)} = \langle I^{(0)}\rangle z_0^{(0)}$$

The last equivalence in the chain (140) stems from the current-to-phase gain formula $$z_0^{(1|0)} \equiv \frac{\pi/2}{V_\pi} R^{(1|0)},$$

indicating the proportionality of $$z_0^{(1|0)}, R^{(1|0)}.$$

The equivalence before the last, $$C\langle I^{(1)}\rangle z_0^{(1)} = C\langle I^{(0)}\rangle z_0^{(0)} \Leftrightarrow \langle I^{(1)}\rangle R^{(1)} = \langle I^{(0)}\rangle R^{(0)}$$

is justified by observing that although counting code matrix, C, used in DDD eDACs (BiWgt eDACs in particular) is sized 4×2, hence it is not invertible (it cannot be simply cancelled out from both sides), nevertheless the columns of C are independent (it has full rank), as may be verified for the counting code codewords.

A similar argument establishes the equivalence $$C\langle I^{(1)}\rangle z_0^{(1)} = C\langle I^{(0)}\rangle z_0^{(0)} \Leftrightarrow \langle I^{(1)}\rangle z_0^{(1)} = \langle I^{(0)}\rangle z_0^{(0)}.$$

Thus, the most general requirement still enabling 'normal' operation of the two MZMs (which 'see' identical voltage constellations at their terminals) is $$\langle I^{(1)}\rangle z_0^{(1)} = \langle I^{(0)}\rangle z_0^{(0)} \tag{142}$$

This is the most general condition equivalent to the equality of MZM fields, whereas condition (137) was just a sufficient one The underlying inventive concept here to explore design options besides the obvious balanced design of (135), $$\langle I^{(1)}\rangle = \langle I^{(0)}\rangle \text{ and } R^{(1)} = R^{(0)} \Leftrightarrow z_0^{(1)} = z_0^{(0)}.$$

The mathematical argument above has established that there actually is a multitude of imbalanced design solutions, whereby $$\langle I^{(1)}\rangle \neq \langle I^{(0)}\rangle, z_0^{(1)} \neq z_0^{(0)}, R^{(1)} \neq R^{(0)}, \tag{143}$$

and some of these solutions (intentionally setting different currents, different trans-resistances and different current-to-phase conversion gains for the two eDAC to MZM drivers paths) feature better statistical performance than the naïve balanced design (135) (whereby two eDAC to MZM driver paths are taken identical). Our invention teaches the adoption of unequally-sized current arrays in the two BIP-PAM4 drivers, i.e., have the total current capacity resource $\langle I_{tot}\rangle$ available on the drivers chip unevenly partitioned between the two BIP-PAM4 sub-eDACs, subject to the constraint $$\langle I_{tot}^{(1)}\rangle + \langle I_{tot}^{(0)}\rangle = \langle I_{tot}\rangle,$$

(with $\langle I_{tot}\rangle$ the given total current budget on the chip hosting the two sub-eDACs). The two sub-DACs, source total currents (with p≠0.5, generally) are then $$\langle I_{tot}^{(1)}\rangle = p\langle I_{tot}\rangle, \ \langle I_{tot}^{(0)}\rangle = (1-p)\langle I_{tot}\rangle \tag{144}$$

such that the sub-DACs currents are in the following ratio:

$$\langle I_{tot}^{(1)} \rangle / \langle I_{tot}^{(0)} \rangle = p / (1 - p) \qquad (145)$$

This amounts to taking $\langle J^{(1)} \rangle \neq \langle J^{(0)} \rangle$ in (137), therefore, in light of the requirement $$\langle \theta^{(1)} \rangle = \langle \theta^{(0)} \rangle = \langle \theta \rangle = \left\{ -\frac{\pi}{2}, -\text{asin}\frac{1}{3}, \text{asin}\frac{1}{3}, \frac{\pi}{2} \right\} \qquad (146)$$

in order to maintain equal MZM arm-phase constellations, we need to set unequal current-to-phase conversion gains, $$z_0^{(1)} \neq z_0^{(0)},$$

i.e., design intentionally imbalanced TIAs (different trans-resistances) for the two sub-DAC drivers of the two parallel MZMs. In particular, considering the MSLs (C=4) of the two sub-DACs, (the respective last elements of the vectors $\langle I^{(1|0)} \rangle$ in (137)), since both sub-eDACs should drive identical MSL voltages $V_\pi/2$ into the two parallel MZMs abroad the oDAC we have:

$$\langle \theta_4^{(1)} \rangle = \frac{\pi}{2} = z_0^{(1)} \langle J_4^{(1)} \rangle = z_0^{(1)} \langle I_{tot}^{(1)} \rangle, \qquad (147)$$

$$\therefore z_0^{(1)} = \frac{\pi}{2} / \langle I_{tot}^{(1)} \rangle = \frac{\pi / 2}{\langle I_{tot} \rangle p},$$

$$\langle \theta_4^{(0)} \rangle = \frac{\pi}{2} = z_0^{(0)} \langle J_4^{(0)} \rangle = z_0^{(0)} \langle I_{tot}^{(0)} \rangle,$$

$$\therefore z_0^{(0)} = \frac{\pi}{2} / \langle I_{tot}^{(0)} \rangle = \frac{\pi / 2}{\langle I_{tot} \rangle (1 - p)},$$

$$z_0^{(1)} \langle I_{tot}^{(1)} \rangle = z_0^{(0)} \langle I_{tot}^{(0)} \rangle = \frac{\pi}{2} \qquad (73)$$

Thus the voltage-to-phase conversion factors $$z_0^{(1|0)}$$

(and also the two trans-resistances $R^{(1|0)}$) must be inversely proportional to the total currents $$\langle I_{tot}^{(1|0)} \rangle$$

of the two sub-drivers, i.e., $$z_0^{(1|0)} \left( \text{and } R^{(1|0)} \right)$$

should be set in inverse ratio to that of the total currents of the two eDAC sub-drivers:

$$R^{(1)} : R^{(0)} = z_0^{(1)} : z_0^{(0)} = \langle I_{tot}^{(0)} \rangle : \langle I_{tot}^{(1)} \rangle = \frac{\langle I_{tot} \rangle (1 - p)}{\langle I_{tot} \rangle p} = (1 - p)/p \qquad (149)$$

Note: The total current of each sub-DAC equals the peak sub-DAC current—the Most Significant Level (MSL). Thus, we shall synonymously refer to $$\langle I_{tot}^{(1|0)} \rangle$$

as 'peak sub-DAC currents' or as 'sub-DAC total currents'.

The trans-resistance ratio and the other ratios stated in (149) ensure that the voltage-domain optimal predistorted constellations driving the two MZM be identical, such that they generate identical uniform max-full-scale field-domain constellations at the two parallel MZM optical outputs.

We now explore the statistical performance advantage of this imbalanced disclosed design family, having the two BIP-PAM4 sub-DACs intentionally imbalanced, mismatched in their peak currents (under the constraint that the mean optical field levels fed into the two MZMs stay identical, which, as seen above, requires that the mismatched peak currents be compensated by matching changes in the two TIA current-to-voltage conversion factors).

Second-Order Statistics Model of the MP-oDAC in the Wake of ePAM4 Drivers Electronic Mismatch The performance advantage of the imbalanced eDAC drivers based design for our PAM4-driven 2-parallel MPo-DAC is improved resilience to electronic mismatch errors of the two driving eDACs, manifesting in a higher quality constellation at the MP-oDAC output, contingent on developing a statistical model enabling optimized peak currents allocations for the intentionally imbalanced eDAC drivers. The quality of the MP-oDAC optical output constellation may be quantified by metrics such as the Error Vector Magnitude (EVM), Integral NonLinearity (INL) or Differential NonLinearity(DNL). These statistical metrics may be traced to the variances of the optical levels of the constellation, collected in the variance vector of the C-point constellation:

$$\sigma_F^2 = \sigma_{\{F_1 F_2, ..., F_C\}}^2 \equiv \{ \sigma_{F_1}^2, \sigma_{F_2}^2, ..., \sigma_{F_C}^2 \}$$

A concise scalar statistical measure of performance, derived from the variance vector, consists of the maximal element of the variance vector, i.e., the level peak variance. In our preferred PAM4 driven MP-oDAC embodiment we have C=16, as generated by optical parallel combining of the two MZMs driven by the two imbalanced sub-DACs.

In the remainder of this section we derive the 16-elements variance vector for the MP-oDAC output optical field, starting from the electronic mismatch error statistics of the chip hosting two sub-DACs driving the MP-oDAC. The variance vector result at the MP-oDAC output will be amenable to optimization (minimization) by imbalancing the two sub-DAC drivers (and by compensating with appropriate TIA trans-resistances). The evaluation of the second-order output statistics of the MP-oDAC is based on this key property:

Lemma The variance of the Kronecker sum of any two independent random vectors, u,v, is given by the Kronecker sum of the respective variances of the two vectors:

$$\sigma_{U \oplus V}^2 = \sigma_U^2 \oplus \sigma_V^2 \qquad (150)$$

Proof: Viewing U⊕V as the vectorization addition table with u,v taken as horizontal and vertical headers, then the mutual independence of u,v implies that any element $U_n$ in U be independent of any element $V_m$ in V. The sum $U_m+V_n$, inserted in the mn-th location in the 2D array, is then a RV with variance $$\sigma^2_{U_m+V_n}.$$

Let us now construct a second Ksum-table, this time with headers $$\sigma^2_U, \sigma^2_V$$

(these are deterministic parameters now) then the sum of the n-th element of $$\sigma^2_U$$

and the m-th element of $$\sigma^2_V,$$

namely $$\sigma^2_{U_m} + \sigma^2_{V_n}$$

is inserted in the mn-th location of the second Ksum table. Now comparing the two Ksum tables (2D arrays, matrices) element-by-element, in the mn-th location of the first matrix we have $$\sigma^2_{U_m+V_n}$$

whereas in the mn-th location of the second matrix we have $$\sigma^2_{U_m} + \sigma^2_{V_n}.$$

But $$\sigma^2_{U_m+V_n} = \sigma^2_{U_m} + \sigma^2_{V_n}$$

due to the statistical independence of the two vectors U, V (which implies that $U_n, V_m$ be independent) thus the two Ksum matrices are equal element-by-element, establishing the equality in (150).□.

Here we work out an instance of (150), for the special case that u,v are taken as random 4-vectors, as arising in the analysis of the PAM4-driven 2-parallel MP-oDAC. We proceed to derive the variance vector describing the second-order statistics of the field-domain constellations generated by the two MZMs, highlighting their dependence on the total-current-allocation-ratio, p, between the two sub-DACs. Our derivation will enable optimizing over the currents allocation parameter, p, in order to attain minimal total variance at the oDAC output, i.e., better mitigate the impact of stochastic mismatch of currents onto the oDAC performance. The starting point of the optimization over the currents allocation parameter, p, is the key result (125) for the mismatch variance vector at the output of an MZM driven by an optimally predistorted BIP-PAM4 field domain nominal constellation, such that the 'perfect' oPAM4 field constellition $$\langle F \rangle = \left\{ -1, -\frac{1}{3}, \frac{1}{3}, 1 \right\}$$

be generated at the MZM output. The fluctuations around the 'perfect' oPAM4 as a result of the eDAC driver electronic mismatch are characterized by the variance vector given in formula (125), repeated here:

$$MZM \text{ driven by } BIP \ PAM-4 \ eDAC : \sigma^2_F = \left\{ 0, \frac{4\pi^2 \sigma^2_{uu}}{9 I^{\lozenge}_{tot}}, \frac{4\pi^2 \sigma^2_{uu}}{9 I^{\lozenge}_{tot}}, 0 \right\} \quad (151)$$

The two random vectors $F^{(1)}, F^{(0)}$ at the two MZM outputs are deterministic functions of the two random currents $J^{(1)}$, $J^{(0)}$, hence of the two source currents $I^{(1)}, I^{(0)}$, as generated in the two BIP-PAM4 sub-drivers. As the current source arrays generating $I^{(1)}, I^{(0)}$ are typically in distinct locations on the chip, the two random vectors $I^{(1)}$, $I^{(0)}$ are mutually independent, hence so are $F^{(1)}, F^{(0)}$ mutually independent vectors. This in turn implies that the two scaled vectors $\frac{4}{5}F^{(1)}$ and $\frac{1}{5}F^{(0)}$ (to be Ksummed) are also mutually independent. The optical fields $F^{(1)}, F^{(0)}$, both have the functional form for the probability distributions of the generic BIP-PAM4 constellation, F in (151), albeit with different parameterizations in terms of the respective mean peak currents, $$\langle I^{(1|0)}_{tot} \rangle,$$

of each of the two sub-DAC structures:

$$\sigma^2_{F^{(1|0)}} = \left\{ 0, \frac{4\pi^2}{9} \cdot \frac{\sigma^2_{uu}}{\langle I^{(1|0)}_{tot} \rangle}, \frac{4\pi^2}{9} \cdot \frac{\sigma^2_{uu}}{\langle I^{(1|0)}_{tot} \rangle}, 0 \right\} \quad (152)$$

The variance vectors of the scaled MZM constellations $\frac{4}{5}F^{(1)}$, $\frac{1}{5}F^{(0)}$ are readily found by scaling the variances (152) through the squares of the respective, $\frac{4}{5}$, $\frac{1}{5}$, scaling factors:

$$\sigma^2_{\frac{4}{5}F^{(1)}} = \left(\frac{4}{5}\right)^2 \cdot \sigma^2_{F^{(1)}} = \frac{16}{25} \cdot \left\{ 0, \frac{4\pi^2}{9} \cdot \frac{\sigma^2_{uu}}{\langle I^{(1)}_{tot} \rangle}, \frac{4\pi^2}{9} \cdot \frac{\sigma^2_{uu}}{\langle I^{(1)}_{tot} \rangle}, 0 \right\} = \quad (153)$$

$$\left\{ 0, \frac{64\pi^2}{225} \cdot \frac{\sigma^2_{uu}}{\langle I^{(1)}_{tot} \rangle}, \frac{64\pi^2}{225} \cdot \frac{\sigma^2_{uu}}{\langle I^{(1)}_{tot} \rangle}, 0 \right\}$$

$$\sigma^2_{\frac{4}{5}F^{(1)}} = \left(\frac{1}{5}\right)^2 \cdot \sigma^2_{F^{(1)}} = \frac{1}{25} \cdot \left\{ 0, \frac{4\pi^2}{9} \cdot \frac{\sigma^2_{uu}}{\langle I^{(0)}_{tot} \rangle}, \frac{4\pi^2}{9} \cdot \frac{\sigma^2_{uu}}{\langle I^{(0)}_{tot} \rangle}, 0 \right\} = $$

$$\left\{ 0, \frac{4\pi^2}{225} \cdot \frac{\sigma^2_{uu}}{\langle I^{(0)}_{tot} \rangle}, \frac{4\pi^2}{225} \cdot \frac{\sigma^2_{uu}}{\langle I^{(0)}_{tot} \rangle}, 0 \right\}$$

It is useful to streamline the cumbersome expressions in (155) by defining shorthand notations, $$\sigma^2_{mid} \equiv \frac{64\pi^2}{225} \cdot \frac{\sigma^2_{uu}}{\langle I^{(1)}_{tot} \rangle} = \frac{4\pi^2 \sigma^2_{uu}}{225 \langle I_{tot} \rangle} \cdot \frac{16}{p} \tag{154}$$

$$\sigma^2_{lo} \equiv \frac{4\pi^2}{225} \cdot \frac{\sigma^2_{uu}}{\langle I^{(0)}_{tot} \rangle} = \frac{4\pi^2 \sigma^2_{uu}}{225 \langle I_{tot} \rangle} \cdot \frac{1}{1-p}$$

$$\sigma^2_{hi} \equiv \sigma^2_{mid} + \sigma^2_{lo} = \frac{4\pi^2 \sigma^2_{uu}}{225 \langle I_{tot} \rangle} \cdot \left[ \frac{16}{p} + \frac{1}{1-p} \right]$$

where in the first and second line we used $$\langle I^{(1)}_{tot} \rangle = p \langle I_{tot} \rangle, \ \langle I^{(0)}_{tot} \rangle = (1-p) \langle I_{tot} \rangle \tag{144}$$

and in the third line we defined $$\sigma^2_{hi}$$

as the sum of $$\sigma^2_{mid}, \sigma^2_{lo},$$

which was evaluated by summing the first two lines, yielding the third line in (154).

All elements of F will be shown to belong to the set $$\{ \sigma^2_{lo}, \sigma^2_{mid}, \sigma^2_{hi} \}$$

of the three variance values introduced in (154). The random vectors $\frac{4}{5}F^{(1)}$ and $\frac{1}{5}F^{(0)}$ in (153) have variances vectors compactly rewritten now as $$\sigma^2_{\frac{4}{5}F^{(1)}} = \{ 0, \sigma^2_{mid}, \sigma^2_{mid}, 0 \}, \ \sigma^2_{\frac{1}{5}F^{(0)}} = \{ 0, \sigma^2_{lo}, \sigma^2_{lo}, 0 \} \tag{155}$$

TABLE 2

Addition Table for the evaluation of
the KSum of the two vectors in (132).

| | 0 | $\sigma^2_{mid}$ | $\sigma^2_{mid}$ | 0 |
|---|---|---|---|---|
| 0 | 0 | $\sigma^2_{mid}$ | $\sigma^2_{mid}$ | 0 |
| $\sigma^2_{lo}$ | $\sigma^2_{lo}$ | $\sigma^2_{hi}$ | $\sigma^2_{hi}$ | $\sigma^2_{lo}$ |
| $\sigma^2_{lo}$ | $\sigma^2_{lo}$ | $\sigma^2_{hi}$ | $\sigma^2_{hi}$ | $\sigma^2_{lo}$ |
| 0 | 0 | $\sigma^2_{mid}$ | $\sigma^2_{mid}$ | 0 |

Specializing the formula $$\sigma^2_{U \oplus V} = \sigma^2_U \oplus \sigma^2_V \tag{150}$$

of the Lemma above to $$U := \frac{4}{5} F^{(1)}, \ V := \frac{4}{5} F^{(0)},$$

using (155) for the variances of $\frac{4}{5}F^{(1)}$ and $\frac{1}{5}F^{(0)}$, and invoking the result (150) in last lemma, yields, $$\sigma^2_F = \sigma^2_{\frac{4}{5}F^{(1)} \oplus \frac{1}{5}F^{(0)}} = \tag{156}$$

$$\sigma^2_{\frac{4}{5}F^{(1)}} \oplus \sigma^2_{\frac{1}{5}F^{(0)}} = \{ 0, \sigma^2_{mid}, \sigma^2_{mid}, 0 \} \oplus \{ 0, \sigma^2_{lo}, \sigma^2_{lo}, 0 \} = \{ 0, \sigma^2_{lo},$$

$$\sigma^2_{lo}, 0, \sigma^2_{mid}, \sigma^2_{hi}, \sigma^2_{hi}, \sigma^2_{mid}, \sigma^2_{mid}, \sigma^2_{hi}, \sigma^2_{hi}, \sigma^2_{mid}, 0, \sigma^2_{lo}, \sigma^2_{lo}, 0 \}$$

where the explicit components form of the 16-vector $$\sigma^2_F$$

in the second line of (156) was obtained by vectorizing the Ksum addition table of $$\{ 0, \sigma^2_{mid}, \sigma^2_{mid}, 0 \}, \{ 0, \sigma^2_{lo}, \sigma^2_{lo}, 0 \},$$

as described in Table 2 (wherein entries equal to $$\sigma^2_{mid} + \sigma^2_{lo}$$

are denoted $$\sigma^2_{hi}$$

as per the last equality in (154)). Reading off the 16 entries in the table, top-down, along each column and left-to-right from column to column, yields the 16-vector in the last line of (156).

Substituting (154) into (156) yields the output field vector parameterized by p:

$$\sigma^2_F(p) = \sigma^2_{\frac{4}{5}F^{(1)} \oplus \frac{1}{5}F^{(0)}} = \tag{157}$$

$$\{ 0, \sigma^2_{lo}, \sigma^2_{lo}, 0, \sigma^2_{mid}, \sigma^2_{hi}, \sigma^2_{hi}, \sigma^2_{mid}, \sigma^2_{mid}, \sigma^2_{hi}, \sigma^2_{hi}, \sigma^2_{mid}, 0, \sigma^2_{lo},$$

$$\sigma^2_{lo}, 0 \} = \frac{4\pi^2 \sigma^2_{uu}}{225 \langle I_{tot} \rangle} \{ 0, \frac{1}{p}, \frac{1}{p}, 0, \frac{16}{p}, \frac{16}{p} + \frac{1}{1-p}, \frac{16}{p} + \frac{1}{1-p},$$

$$\frac{16}{p}, \frac{16}{p}, \frac{16}{p} + \frac{1}{1-p}, \frac{16}{p} + \frac{1}{1-p}, \frac{16}{p}, 0, \frac{1}{p}, \frac{1}{p}, 0 \} \text{ with}$$

$$\sigma^2_{mid}(p) \equiv \frac{4\pi^2 \sigma^2_{uu}}{225 \langle I_{tot} \rangle} \cdot \frac{16}{p},$$

$$\sigma^2_{lo}(p) \equiv \frac{4\pi^2 \sigma^2_{uu}}{225 \langle I_{tot} \rangle} \cdot \frac{1}{1-p},$$

$$\sigma^2_{hi}(p) \equiv \frac{4\pi^2 \sigma^2_{uu}}{225 \langle I_{tot} \rangle} \cdot \left[ \frac{16}{p} + \frac{1}{1-p} \right]$$

Figure 53:
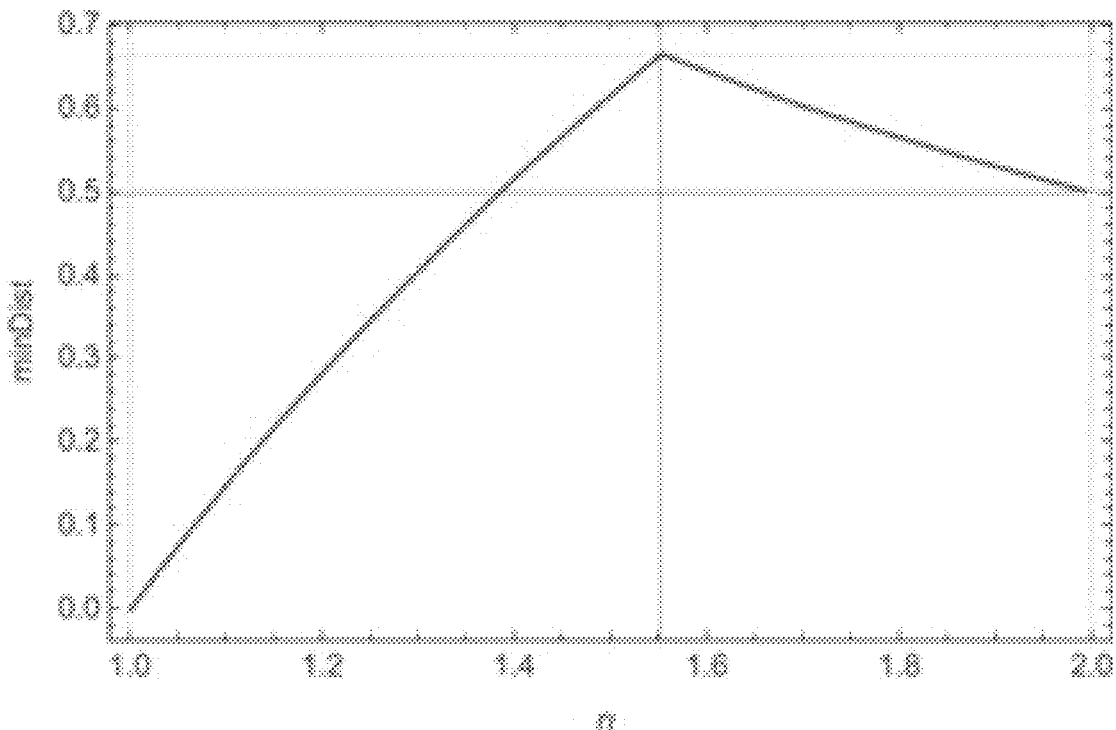
FIG. 53 illustrates an example of a minimal distance of the BIP-oPAM4 constellation.

The argmin of $$\sigma^2_{hi}(P)$$

occurs at p=0.8 (i.e.

$$\sigma_{hi}^2(0.8) \leq \sigma_{hi}^2(p), \, \forall \, p \in (0, 1)$$

as per in FIG. 53 plotting the relative variances $$\sigma_{\sim hi}^2, \sigma_{\sim mid}^2, \sigma_{\sim lo}^2$$

(defined here as the original variance values $$\sigma_{hi}^2, \sigma_{mid}^2, \sigma_{mid}^2$$

expressed in convenient units of $$\min(\sigma_{hi}^2),$$

such as to declutter FIG. 53, effectively discarding the constant $$\frac{4\pi^2 \sigma_{uu}^2}{225 \langle I_{tot} \rangle},$$

irrelevant for optimization purposes):

$$\left\{ \sigma_{\sim hi}^2, \sigma_{\sim mid}^2, \sigma_{\sim lo}^2 \right\} \equiv \left\{ \sigma_{hi}^2, \sigma_{mid}^2, \sigma_{mid}^2 \right\} / \min(\sigma_{hi}^2) \qquad (74)$$

Figure 52:
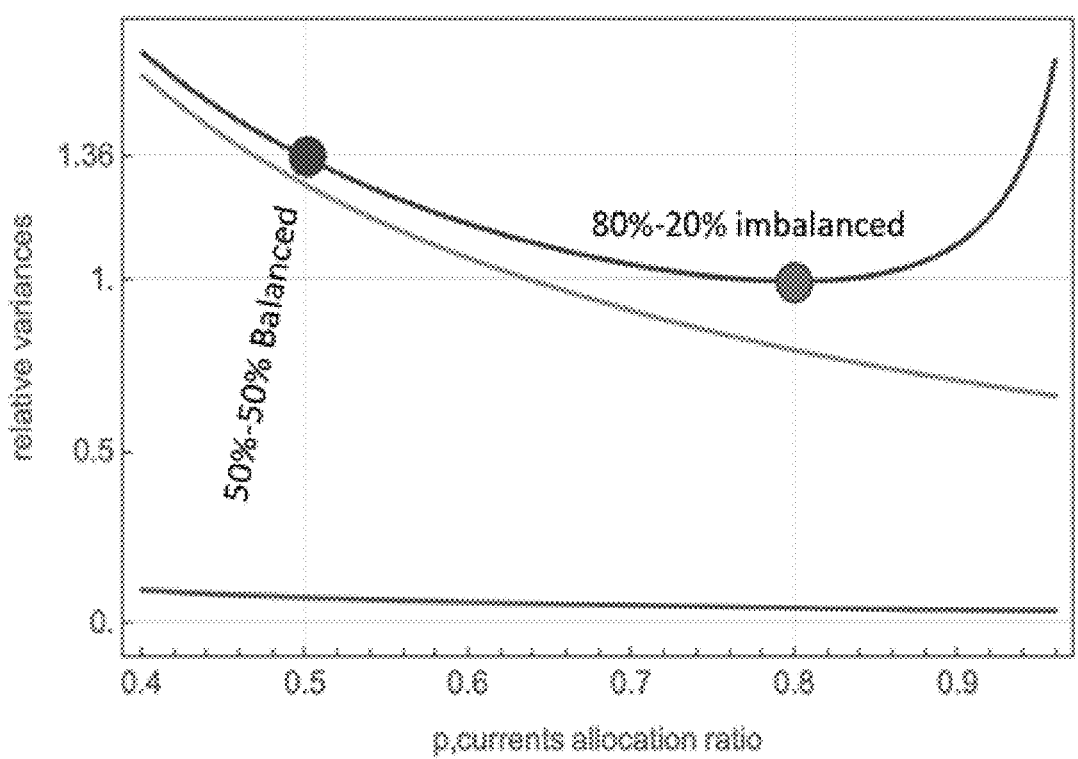
FIG. 52 illustrates an example of relative variance versus current allocation ratios.

In particular, the top curve plotted in FIG. 52 is the one to minimize as it describes the dominant variance element(s):

$$\qquad (75)$$

$$\sigma_{hi}^2(p) \equiv \frac{\sigma_{hi}^2(p)}{\min[\sigma_{hi}^2(p)]} =$$

$$\frac{\sigma_{hi}^2(p)}{\min[\sigma_{hi}^2(p)]} = \frac{\dfrac{2\pi^2 \sigma_{uu}^2}{225 \langle I_{tot} \rangle} \cdot \left[ \dfrac{16}{p} + \dfrac{1}{1-p} \right]}{\dfrac{2\pi^2 \sigma_{uu}^2}{225 \langle I_{tot} \rangle} \cdot \left[ \dfrac{16}{p} + \dfrac{1}{1-p} \right]\Big|_{p=0.8}} = \frac{1}{25} \left[ \frac{16}{p} + \frac{1}{1-p} \right]$$

The relative variances to be compared are $$\sigma_{\sim hi}^2(0.8) = 1, \sigma_{\sim hi}^2(0.5) = 1.36$$

indicating that the naïve design variance is 36% 'noisier' (in terms of mismatch errors induced perturbations at the MP-oDAC optical output) than the optimized design attained for currents allocation ratio p=0.8:

$$\sigma_{hi}^2(0.5)/\sigma_{hi}^2(0.8) = \sigma_{\sim hi}^2(0.5)/\sigma_{\sim hi}^2(0.8) = 1.36. \qquad (76)$$

Evidently, $$\sigma_{lo}^2(p) < \sigma_{mid}^2(p) < \sigma_{hi}^2(p), \, \forall \, p \in (0, 1)$$

indicating that the peak optical levels variance elements in the vector $$\sigma_F^2$$

are the $$\sigma_{hi}^2(p)$$

elements, recurring four times in the $$\sigma_F^2$$

16-vector (see first line of (157)). Formally, $$\max \sigma_F^2 = \sigma_{hi}^2(p), \, \forall \, p \in (0, 1) \qquad (77)$$

where the max of a vector means the largest element(s) of the given vector (optimization for any given p over the levels index c=1, 2, . . . , 16, identifying four of the elements, valued $$\sigma_{hi}^2(p),$$

as the largest ones, is not to be confused with optimization over p of $$\sigma_{hi}^2(p)).$$

Recalling the current allocation $$\langle I_{tot}^{(1)} \rangle = p \langle I_{tot} \rangle, \langle I_{tot}^{(0)} \rangle = (1-p) \langle I_{tot} \rangle, \qquad (144)$$

since the argmin of $$\sigma_{hi}^2(p) \text{ is } p = 0.8,$$

then the optimizing allocation is 80%-20% optimal current sources allocation:

$$\langle I_{tot}^{(1)} \rangle = 0.8 \langle I_{tot} \rangle, \langle I_{tot}^{(0)} \rangle = 0.2 \langle I_{tot} \rangle.$$

Thus, the total area available to the current sources should be partitioned 80%-20% between the two sub-eDACs, 80% (20%) for the driver of the top (bottom) MZM.

Thus, in order to obtain the aforementioned advantage of minimized mean square electronic mismatch error, 80% of the given total active current sources area must be allocated to the sub-driver for the top MZM (with 20% of the total current 'budget' left for the driver of the bottom MZM). In addition, we are also to imbalance the two TIAs used to interface the current-domain sub-eDACs to the voltage-driven transmission lines of the two MZMs.

FIG. 52 illustrates Plots of $$\sigma_{lo}^2(p) \propto \frac{1}{p}, \sigma_{mid}^2(p) \propto \frac{16}{p}, \sigma_{hi}^2(p) \propto \frac{16}{p} + \frac{1}{p}$$

(the three curves from bottom to top), vs. the currents allocation ratio, p, occurring in (154), The three curves depict the three types of variance components occurring in the optical field constellation vector, F, $$\{0, \sigma_{lo}^2, \sigma_{lo}^2, 0, \sigma_{mid}^2, \sigma_{hi}^2, \sigma_{hi}^2, \sigma_{mid}^2, \sigma_{mid}^2, \sigma_{hi}^2, \sigma_{hi}^2, \sigma_{mid}^2, 0, \sigma_{lo}^2, \sigma_{lo}^2, 0\}$$

The optical field levels with the worst (highest) variance are $$\sigma_{hi}^2(p).$$

Minimizing this worst case variance over p, it is apparent that 'sweet-point' is p=0.8, i.e. an 80%-20% design for the relative peak currents (or current swings) of the two eDAC BIP-PAM4 eDACs.

The current-to-phase conversion factors, $$z_0^{(1|0)}$$

required to match the intentionally-imbalanced source currents of the two sub-drivers, were expressed in (147), repeated below, in terms of the total currents of the two sub-eDACs:

$$z_0^{(1)} = \frac{\pi}{2}/\langle I_{tot}^{(1)}\rangle = \frac{\pi/2}{\langle I_{tot}\rangle p}, z_0^{(0)} = \frac{\pi}{2}/\langle I_{tot}^{(0)}\rangle = \frac{\pi/2}{\langle I_{tot}\rangle(1-p)}, \quad (162)$$

It is useful to compare the $$z_0^{(1|0)}$$

factors with the 'baseline' factor $$z_0^{50:50},$$

arising in the naïve balanced solution (which assumes identical BIP-PAM4 eDACs, and identical trans-resistances for the two TIAs):

$$z_0^{50:50} \equiv z_0^{(1)}\Big|_{p=0.5} = \frac{\pi/2}{\langle I_{tot}\rangle p}\Big|_{p=0.5} = \frac{\pi}{\langle I_{tot}\rangle} \quad (163)$$

Dividing the two current-to-phase conversion factors $$z_0^{(1|0)} \quad (162)$$

by $$z_0^{50:50} = \frac{\pi}{\langle I_{tot}\rangle}, \quad (163)$$

as just derived above, yields the 'TIAs imbalance ratios', indicating the parameters relative deviation ratios from the naïve 50:50 design:

$$R_0^{(1)}/R_0^{50:50} = z_0^{(1)}/z_0^{50:50} = \frac{\pi/2}{\langle I_{tot}\rangle p}/\frac{\pi}{\langle I_{tot}\rangle} = \frac{1}{2p} \quad (78)$$

$$\therefore z_0^{(1)}/z_0^{50:50}\Big|_{p=0.8} = \frac{1}{2p}\Big|_{p=0.8} = 0.625$$

$$z_0^{(0)}/z_0^{50:50} = \frac{\pi/2}{\langle I_{tot}\rangle(1-p)}/\frac{\pi}{\langle I_{tot}\rangle} = \frac{1}{2(1-p)}$$

$$\therefore z_0^{(0)}/z_0^{50:50}\Big|_{p=0.8} = \frac{1}{2(1-p)}\Big|_{p=0.8} = 2.5$$

where we used the fact that the ratio of trans-impedances equals the ratio of the current-to-phase gains, $z_0$ (since $$z_0 = \frac{\pi/2}{V_\pi}R_0$$

is directly proportional to $R_0$). Thus, relative to the 50:50 balanced naïve design, in the optimized design, the TIA trans-resistance for the top sub-driver should be reduced by a factor of 0.625 i.e., by 37.5% (to compensate for having its eDAC peak current increased by a factor of 2.5, i.e. by 150%), whereas TIA trans-resistance for the top sub-driver should be increased by a factor of 2.5, i.e., by 150%, as a result of having decreased its current by a factor of 0.625, i.e. by 37.5%). This is the inevitable investment to be made in order to enable the reduction of the variance of the mismatch error by 26.5%, upon adopting the disclosed imbalance design. The benefit of the imbalanced optimal design is reducing the peak variance of mismatch induced errors by a factor of 0.74, i.e. by 26%, WRT to the naïve design:

$$\sigma_{hi}^2(0.8)/\sigma_{hi}^2(0.5) = \sigma_{\sim hi}^2(0.8)/\sigma_{\sim hi}^2(0.5) = 1/1.36 = 0.74 \quad (79)$$

The modifications required for the TIAs as quantified above, in order to benefit from the improved statistical mismatch resilience, upon adopting the optimized imbalance design eDAC sub-drivers for the PAM4-driven 2-parallel MP-oDAC, imply that the enhanced TIA trans-impedance gains may require additional area and electrical power allocation.

Note: One of the two TIAs requires larger area and electrical drive power than the naïve design, (due to its larger trans-resistance) whereas the other TIA requires less area and drive power (due to its reduced trans-resistance). However, overall, it appears that the net area and net electrical power consumption of the TIAs is higher in the naïve design. This is an investment to be made in exchange for improved statistical resilience performance. When a chip model of the TIA circuit area vs. TIA gain (trans-resistance) as well as the model of the eDAC source currents vs. their circuit are known, it is possible to perform joint optimization of both the TIA areas and source current areas, given a fixed total chip area constraint. In addition, the power consumption of the TIAs generally increases with the trans-resistance and must be accounted for, but depending on the application, for high-end precision oDACs the investment in TIA area and TIA power (at fixed allocation of total currents sources area and power) may be worthwhile.

1.8 Unified Modelling of Two Modules: BIP ePAM4-Driven-MZM Vs. 2NRZ-Driven-SEMZM In subsection 1.6 we modeled the DDD BIP-ePAM4-driven MZM optical module capable of nominally generating uniform oPAM4 at its optical output.

Such module, to which we refer in brief as 'ePAM4+MZM' may be used as an optical building block (BB) for either the purpose of IQ-nesting in 16QAM coherent constellation generation or for the purpose of aggregating two such ePAM4+MZM modules to form our BIP-oPAM16 MP-oDAC structure disclosed in PCT patent application PCT/IB2021/060857 which is incorporated herein by reference later disseminated in the energy-efficient reference. This second application was analyzed and optimized in the last subsection.

In PCT patent application PCT/IB2021/060857 which is incorporated herein by reference and subsequently in M. Nazarathy and I. Tomkos, "'Perfect' PAM4 Serial Digital-Optical Conversion," Phot. Technol. Lett. 33, 475-478, 2021, we discussed an alternative structure for generating uniform oPAM4, namely a two-segment Segmented MZM (SEMZM) albeit with optimized segment lengths and/or segment drive voltages (departing from the 2:1 ratio of prior art), such that the resulting optical PAM4 constellation be nominally (inherently, ideally) optimal. The electrical drives feeding the two MZM segments are 2-level, NRZ drives for BIP constellation polarity. Let us refer to such module (the SEMZM optical structure and its two NRZ drivers) (2NRZ+SEMZM).

In this subsection, we analyze this alternative realization oPAM4 MZM, namely a 2-segment SEMZM, comparing its signal model with that of the DDD ePAM4-driven MZM, analyzed in the previous subsection. Thus, this subsection is devoted to the two options for 'perfect' (i.e., max-full-scale uniform) oPAM4 generation:

1: The ePAM4+MZM module for oPAM4 generation.

2: The 2Segment-SEMZM module for oPAM4 generation.

We prove below that the mathematical models of the two options are analogous, i.e., what one module can do, the other can too—either of these two options may be crafted to generate any desired (antisymmetric) non-uniform BIP oPAM4 constellations.

Notwithstanding the equivalent I/O performance of these two options of oPAM4 generation, there are significant engineering tradeoffs between the energy and complexity resources needed to have these two options implemented. Module #2 trades off electro-optical complexity (partitioning of the MZM electrode in two segments vs. using a plain MZM in option Module #1), in exchange for reducing the electronic drive complexity and power-consumption relative to option Module #1: It is simpler and more energy efficient to use just two independent NRZ signals as drives in Module #2, as opposed to the requirement for a properly predistorted ePAM4 driver in Module #1. Conversely, having the MZM partitioned into two electrically decoupled segments in Module #2 is more challenging than just using a single plain MZM in Module #1.

We show that both Tx-s #1, #2 are equivalent in their I/O mappings, both capable of generating arbitrary antisymmetric BIP-oPAM4 constellations, having their four output levels settable at any desired positions by means of either proper selection of the two ePAM4 source current values $\{I_1, I_0\}$ for the PAM4-driven MZM in the case of Tx #1, or by properly designing the lengths of the two segment electrodes in the SEMZM and/or the antipodal drive voltages on the segments in the case of Tx #2. Either of the two Tx options are able to synthesize an arbitrarily backed off and arbitrarily shaped 4-level (bipolar oPAM4) constellation. In particular, uniform optical 4-level BIP-oPAM4 constellations, with no backoff, referred to as 'perfect' BIP-PAM4 constellations may be synthesized.

Both Tx-s #1, #2 are in principle capable of generating such 'perfect' constellations. Nevertheless, there are meaningful engineering tradeoffs between these two mathematically I/O-equivalent Tx options.

Unified Analytical Modeling of Both oPAM4 Generation Modules #1 and #2

The output normalized field constellation generated by either module (the MZM of #1 or or the SEMZM of #2) is $F=Sin[\theta]$, or $F=Sin[\theta_c]$ for c=1,2,3,4 componentwise.

For either of Module #1 or Module #2, define the (SE) MZM arm-phase constellations, $$\theta \equiv \{\theta_1, \theta_2, \theta_3, \theta_4\} = \{-\theta_4, -\theta_3, \theta_3, \theta_4\} \tag{166}$$

to designate the antisymmetric 'MZM-drive-phase constellation', wherein the elements $\theta_c$, for c=1,2,3,4 denote half-the-difference between the optical phases accrued along the top arm (the bottom arm is just $-\theta_c$ when the top arm is $\theta_c$) of either the standalone ePAM4-driven MZM (Module #1) or for the 2NRZ-driven SEMZM (Module #2) for which $\theta_c$, for c=1,2,3,4 denotes the sum of the two segment phases $\phi_1$, $\phi_0$:

$$\theta_c = \pm\phi_1 \pm \phi_0 \tag{167}$$

where the index c=1,2,3,4 determines the respective signs in the signed addition above, namely $--, -+, +-, --$. Thus, $\phi_{1,0}$ are interpreted for the SEMZM as the absolute values of the possible phase contributions of the two SEMZM segments, and $\phi_{1,0}$ are sign-modulated by the two respective NRZ bipolar drivers. Formally, elaborating on (167), $$\theta_c \equiv b_1[c]\phi_1 + b_0[c]\phi_0 = \pm\phi_1 \pm \phi_0, c = 1, 2, 3, 4 \tag{168}$$

$$\theta_c \equiv b[c]\Phi, \text{ with } c-th \text{ codeword}: b[c] \equiv \{b_1[c], b_0[c]\}, \Phi \equiv \{\phi_1, \phi_0\}$$

$$\text{Code matrix}: C_{4\times2} \equiv \{b[1]; b[2]; b[3]; b[4]\} = \tag{80)(81}$$

$$\{-1, -1; -1, 1; 1, -1; 1, 1\}$$

This is the model for the SEMZM Option #2.

Interestingly, the same equations apply to the BIP ePAM4+MZM Tx #1, provided that phase quantities $\phi_{1,0}$ are defined differently: Those are now the phases induced by each of the two BIP-ePAM4 current sources, $I_1, I_0$ albeit with each current source conceptually standalone, the other current source being conceptually nulled out.

We recall that, operationally, the BIP-ePAM4 driver generates $$J_{1|2|3|4} = \pm I_1 \pm I_0 \qquad (82)$$

Note: Both current sources operate in unison to form the output currents, $J_{1|2|3|4}$, so the definition of $\phi_{1|0}$ in the case of Option #1 is conceptual. Using the linearity of the eDAC output current to MZM arm-phase, we have $$\phi_{1|0} \equiv z_0 I_{1|0} = \frac{\pi}{2V_\pi} R_0 I_{1|0} \qquad (83)$$

where, again, $\phi_{1|0}$ is now taken as the MZM-drive-phase response corresponding to the drive source current $I_{1|0}$ on its own (i.e., with $I_{0|1}$ set to zero). Here the proportionality constant $Z_0$ is given by $$z_0 \equiv \frac{\pi}{2V_\pi} R_0,$$

with $R_0$ the trans-resistance (voltage to current conversion factor) of the TIA interfacing the current steering eDAC driver to the MZM.

Note that the source currents $I_{1|0}$ of Module #1 are mapped into the phase domain according to the same proportionality factor $z_0$ that maps eDAC output currents, $J_c$, into output phases $\theta_c = z_0 J_c$. The effective phases $\phi_1, \phi_0$, are then conceptual (in the MZM arm-phase-domain) proportional representations of the respective $I_1, I_0$ source currents:

$$\Phi \equiv \{\phi_1, \phi_0\} \equiv \{z_0 I_1, z_0 I_0\} = z_0\{I_1, I_0\} = z_0 I \qquad (173)$$

We henceforth refer to $\phi_s$, s=1,0 as 's-phases', (respectively, segment-phases in Option-#1 and source-phases in Option-#2), and we defined an 's-phases vector', $\Phi$, collecting the two scalar s-phases. Note: In the case of Option #2, the s-phases $\phi_1, \phi_0$ are just the phaseshifts induced in the two segments of the segmented-MZM (more precisely, the segment labeled s, with s=1|0 is differentially driven by potential difference $\phi_1$ applied to the upper guide while an opposite potential difference is applied to the lower waveguide. Combining (173) with the current sources to current outputs mapping $J = C_{4\times2} I$ and with the output-current to MZM-phase mapping $\theta = z_0 J = z_0 C_{4\times2} I$, yields:

$$\theta = C_{4\times2} J = z_0 C_{4\times2} I = C_{4\times2} z_0 I = C_{4\times2} \Phi \qquad (84)$$

To recap, $$\theta = C_{4\times2} \Phi \Leftrightarrow \theta_c = \pm\phi_1 \pm \phi_0 \qquad (175)$$

This is interpreted as a virtual phase-domain PAM4-DAC, consisting of a pair 's-phases', $\Phi \equiv \{\phi_1, \phi_0,\}$, linearly mapped into the four (SE)MZM arm-phases $\theta$ (166), as sum and difference linear combinations of the $\Phi$-phases, $$\theta_3 = \theta_1 - \theta_0, \ \theta_4 = \theta_1 + \theta_0 \qquad (176)$$

The two s-phases $\phi_1$, $\#_0$ have dual meanings, either the SEMZM segment-phases for Option #2 or effective 'source phases' for Option #1 (measuring the source current in phase units), in which case (176) may be interpreted as follows:

Option#1 : $BIP\ ePAM4 + MZM$ $$\theta_3 = \phi_1 - \phi_0 = z_0 I_1 - z_0 I_0 = z_0(I_1 - I_0) = z_0 I_3, \qquad (177)$$

$$\theta_4 = \phi_1 + \phi_0 = z_0 I_1 + z_0 I_0 = z_0(I_1 + I_0) = z_0 I_4$$

consistent with $$\theta = C_{4\times2}\Phi = z_0 C_{4\times2} I = z_0 J,$$

$$\theta_c \equiv b_1[c] J_1 + b_0[c] J_0 = \pm J_1 \pm J_0, \ c = 1, 2, 3, 4$$

Thus, the linear model (176) applies to both options: the BIP-ePAM4+MZM and the 2NRZ+2S-SEMZM, for either of which the bipolar codewords determine the signs of the $\pm\phi_1 \pm \phi_0$ linear combinations:

$$\phi \equiv \{\theta_1, \theta_2, \theta_3, \theta_4\} = \qquad (85)$$

$$\{-\theta_4, -\theta_3, \theta_3, \theta_4\} = \{-\phi_1 - \phi_0, -\phi_1 + \phi_0, \phi_1 - \phi_0, \phi_1 + \phi_0\} = C_{4\times2}\Phi$$

or equivalently, with $b^T[c]] = \{b_1[c], b_0[c]\}$ the c-th row of $C_{4\times2}$:

$$\theta_c = \pm\phi_1 \pm \phi_0 = b_1[c]\phi_1 + b_0[c]\phi_0 = b^T[c]\Phi, \ c = 1, 2, 3, 4 \qquad (86)$$

Corresponding to the MZM phase levels $\theta_3, \theta_4$ the MZM output field levels are:

$$F_4 = \sin\theta_4, \ F_3 = \sin\theta_3 \qquad (87)$$

Conversely, specifying $\theta_3, \theta_4$ (which completely determines the antisymmetric field 4-level constellation F={$-F_4$, $-F_3, F_3, F_4$}), we readily work back the required drive phases, using the arcsine inverse trigonometric function, denoted here asin:

$$\theta_4 = a\sin F_4, \ \theta_3 = a\sin F_3 \qquad (88)$$

Once, the $\theta_3, \theta_4$ phases are known, we invert (solve) the system of equations (176), yielding $\phi_1$, $\phi_0$ for any given $\phi_3, \phi_4$ drive phases, hence for any desired field levels $F_3, F_4$:

$$\phi_1 = \frac{1}{2}(\theta_4 + \theta_3) = \frac{1}{2}(a\sin F_4 + a\sin F_3), \tag{182}$$

$$\phi_0 = \frac{1}{2}(\theta_4 - \theta_3) = \frac{1}{2}(a\sin F_4 - a\sin F_3)$$

Once $\phi_1$, $\phi_0$ are obtained, we will have completed the oPAM4 oDAC design for the given $F_3, F_4$, be it for either Option #1 or Option #2.

In the case of Option #1 (the BIP-PAM4 driven MZM) the two 'source-phases' $\phi_1$, $\phi_0$ obtained in (182) are mapped back into the two BIP-PAM4 eDAC source currents, $I_1, I_0$:

$$\{I_1, I_0\} = \tag{183}$$
$$\{z_0^{-1}\phi_1, z_0^{-1}\phi_0\} = \left\{ \frac{z_0^{-1}}{2}(a\sin F_4 + a\sin F_3), \frac{z_0^{-1}}{2}(a\sin F_4 - a\sin F_3) \right\}$$

In the case of Option #2 (the SEMZM) $\phi_1, \phi_0$ are simply the two segment phases. In case the differential drive voltages applied to the two SEMZM segments, are identical (both denoted by V), the segment phases are proportional to the respective segment lengths, $L_{1|0}$ (according to the linear relation $$\phi_{1|0} = \frac{L_{1|0}}{L_{\pi|2}} \frac{\pi}{2}$$

(where $L_{\pi/2}$ is the length at which the applied peak differential voltage V induces $\pi/2$ peak differential phase, i.e. $\pi$ phase difference between the two arms corresponding to $\pm\pi/2$ phase in the two MZM arms—note that $L_{\pi/2}$ is a function of the applied peak differential voltage). Thus, the ratio of the segment lengths equals the ratio $\phi_1{:}\phi_0$ of segment phases, in turn given by (182):

$$r_L \equiv L_1 : L_0 = \phi_1 : \phi_0 = \frac{a\sin F_4 + a\sin F_3}{a\sin F_4 - a\sin F_3} \tag{184}$$

The ratio $r_L$ of SEMZM segment lengths (or of the s-phases) is expressed in (184) in terms of the specified optical field levels $F_3, F_4$ of the target antisymmetric oPAM4 constellation, $F = \{-F_4, -F_3, F_3, F_4\}$.

To completely specify the layout of the SEMZM, i.e., determine $L_1, L_0$ we also require, besides, $r_L$, the electrodes total length, $L_{tot} \equiv L_1 + L_0$ (to which the total phase $\phi_{tot} \equiv \phi_1 + \phi_0 = \theta_4$ of the two segments is proportional). In optical engineering, the corresponding total phase $\phi_{tot}$ of the two segments is specified as a fraction $k_{bkoff}$ of $\pi/2$, $$\phi_{tot} = \theta_4 = k_{bkoff} \frac{\pi}{2}. \tag{89}$$

with the backoff factor evidently defined as the ratio $k_{bkoff}$ of the total phase $\phi_{tot}$ to the phase $\pi/2$, (recall that it is is the $\pi/2$ peak differential arm-phase $\theta_4$ that maximizes the (SE)MZM peak transmission). Using (182), the total phase, $\phi_{tot}$ is given (consistent with $F_4 = \sin(\phi_1 + \phi_0) = \sin\theta_4$) by:

$$\phi_{tot} \equiv \phi_1 + \phi_0 = \tag{186}$$
$$\frac{1}{2}(a\sin F_4 + a\sin F_3) + \frac{1}{2}(a\sin F_4 - a\sin F_3) = a\sin F_4 = \theta_4$$

$$k_{bkoff} \equiv \phi_{tot} / \frac{\pi}{2} = a\sin F_4 / \frac{\pi}{2} \therefore F_4 = \sin\phi_{tot} = \sin\left(k_{bkoff} \frac{\pi}{2}\right) \tag{90}$$

Some special case designs:
a. Inherently 'perfect' constellation: uniform, no-backoff, $k_{bkoff} = 1$:

$$F = \left\{ -1, -\frac{1}{3}, \frac{1}{3}, 1 \right\}$$

Substituting $$F_3 = \frac{1}{3}, F_4 = 1$$

into (186), (182), yields for the s-phases:

$$\phi_1 = \frac{1}{2}\left(a\sin 1 + a\sin\frac{1}{3}\right) = \frac{1}{2}\left(\frac{\pi}{2} + a\sin\frac{1}{3}\right) = a\sin\sqrt{\frac{2}{3}}, \tag{91}$$

$$\phi_0 = \frac{1}{2}\left(a\sin 1 - a\sin\frac{1}{3}\right) = \frac{1}{2}\left(\frac{\pi}{2} - a\sin\frac{1}{3}\right) = a\sin\sqrt{\frac{1}{3}}$$

where peculiar trigonometric identities were used for the final expressions in each line.

Substituting these s-phases into (184) yields the optimal lengths (and phases) ratio for attaining the 'perfect' uniform (equispaced) max-full-scale (no-backoff) constellation:

$$r_L \equiv L_1 : L_0 = \phi_1 : \phi_0 = a\sin\sqrt{\frac{2}{3}} / a\sin\sqrt{\frac{1}{3}} = 1.552 \tag{189}$$

Interestingly, this very same lengths ratio was already derived (by a different method) for a Direct-Detection (DD) SEMZM in M. Nazarathy and I. Tomkos, "'Perfect' PAM4 Serial Digital-Optical Conversion," Phot. Technol. Lett. 33, 475-478, 2021, however, the derivation here directly establishes that the same segment electrodes layout design (with the two segments in $r_L = 1.552:1$ ratio rather than the conventional binary 2:1 ratio) is useful beyond DD, and may also serve to realize a bipolar coherent-grade SEMZM generating 'perfect' BIP-oPAM4.

b. Max-full-scale (no-backoff) constellation, $F_4 = 1$, albeit non-uniform, $$F_3 \neq \frac{1}{3},$$

i.e., the inner symbols are not at their 'perfect' positions $$\pm\frac{1}{3}$$

$$F = \{-1, -F_3, F_3, 1\} = \tag{92}$$

$$\{-1, -\sin\theta_3, \sin\theta_3, 1\} = \{1, -\sin(\phi_1 - \phi_0), \sin(\phi_1 - \phi_0), 1\}.$$

where $F_3 = \sin\theta_3 = \sin(\phi_1 - \phi_0)$ was used.
From $F_4 = 1$, it follows that $$\theta_4 = \phi_1 + \phi_0 = a\sin F_4 = a\sin 1 = \frac{\pi}{2}.$$

Thus, $$\frac{\pi}{2} = \phi_1 + \phi_0 = r_L\phi_0 + \phi_0 = (r_L + 1)\phi_0 \therefore \phi_0 = \frac{1}{r_L + 1}\frac{\pi}{2} \therefore \phi_1 = \tag{93}$$

$$r_L\phi_0 = \frac{r_L}{r_L + 1}\frac{\pi}{2} \therefore \theta_3 = \phi_1 - \phi_0 = \frac{r_L}{r_L + 1}\frac{\pi}{2} - \frac{1}{r_L + 1}\frac{\pi}{2} = \frac{r_L - 1}{r_L + 1}\frac{\pi}{2}$$

It then follows that the inner field level $F_3$ is given by $$F_3 = \sin\theta_3 = \sin\left(\frac{r_L - 1}{r_L + 1}\frac{\pi}{2}\right) \tag{94}$$

The resulting three NN-distances for the antisymmetric max-full-scale constellation $F = \{F_1, F_2, F_3, F_4\} = \{-1, -F_3, F_3, 1\}$ are then given by:

$$d_{32}(r_L) = F_3 - (-F_3) = 2F_3 = 2\sin\left(\frac{r_L - 1}{r_L + 1}\frac{\pi}{2}\right), \tag{193}$$

$$d_{43}(r_L) = d_{21}(r_L) \equiv 1 - F_3 = 1 - \sin\left(\frac{r_L - 1}{r_L + 1}\frac{\pi}{2}\right)$$

The constellation minimal distance is $$d_{min-dist} = \{d_{43}, d_{32}, d_{21}\} = \min\{d_{43}, d_{32})\} =$$

$$\min\{1 - F_3, 2F_3\} = \min\left\{1 - \sin\left(\frac{r_L - 1}{r_L + 1}\frac{\pi}{2}\right), 2\sin\left(\frac{r_L - 1}{r_L + 1}\frac{\pi}{2}\right)\right\}$$

FIG. 53 illustrates a plot of the minimal distance of the BIP-oPAM4 constellation generated by either Tx #1 or Tx #2, as a function of $r_L$, the ratio of segment lengths for Tx #2 (the SEMZM) which is also equal to the ratio $r_Y$ of the two source currents of the ePAM4 driver in Tx #1 (ePAM4+ MZM). It is apparent that the minimal distance is maximized at the point $r_L = 1.552$, the abscissa of the intersection of the two branches of nearest-neighbor distances.

FIG. 53 plots the two nearest-neighbor-distance functions vs. the ratio of lengths $r_L \pm L_1:L_0$, namely, $d_{32}(r_L)$ and $d_{43}(r_L)$ (193) over the intervals [1, 1.552] and [1.553,2] respectively. The union of these two graphs forms the minimal-distance graph. The maximal-minimal-distance is found at the point of intersection of these two curves, which, as expected, has abscissa $r_L = 1.552$ c. Uniform, constellation, albeit backed-off (with $k_{bkoff} < 1$), rather than max-full-scale:

$$F = \sin\left(k_{bkoff}\frac{\pi}{2}\right)\left\{-1, -\frac{1}{3}, \frac{1}{3}, 1\right\} \therefore F_3 = \sin\left(k_{bkoff}\frac{\pi}{2}\right), \tag{95}$$

-continued $$F_4 = \sin\left(k_{bkoff}\frac{\pi}{2}\right)$$

We then have $$\phi_{tot} = k_{bkoff}\frac{\pi}{2}$$

and from (184) we have the segments ratio design:

$$\tag{183)(96}$$
$$L_1:L_0 = \phi_1:\phi_0 = \frac{a\sin F_4 + a\sin F_3}{a\sin F_4 - a\sin F_3}\bigg|_{F_3 = \frac{1}{3}\sin\left(k_{bkoff}\frac{\pi}{2}\right), F_4 = \sin\left(k_{bkoff}\frac{\pi}{2}\right)} =$$

$$\frac{k_{bkoff}\frac{\pi}{2} + a\sin\left(\frac{1}{3}\sin\left(k_{bkoff}\frac{\pi}{2}\right)\right)}{k_{bkoff}\frac{\pi}{2} - a\sin\left(\frac{1}{3}\sin\left(k_{bkoff}\frac{\pi}{2}\right)\right)}$$

Note 1: A shrunk (backed-off) 'perfect', i.e., uniform, oPAM4 design; upon setting $k_{bkoff}$ 1 in (183), the 'perfect' design addressed in the energy-efficient reference is retrieved:

Note 2: The derivations of relative lengths $L_1:L_0$ above evidently all pertain to Option #2 (SEMZM), but whenever we analyze s-phases and their ratio, it pertains to both Options.

As for Option #1 (the MZM driven by BIP-ePAM4), we may work back from the s-phases, $\phi_1$, $\phi_0$ to $I_1, I_0$ (s-phases and source-currents are proportional). In particular, $$I_1 : I_0 = \phi_1 : \phi_0 \tag{97}$$

Thus, for a 'perfect' output BIP-PAM4 field constellation, $$F = \left\{-1, -\frac{1}{3}, \frac{1}{3}, 1\right\},$$

combining the last equation above with (189), the source currents ratio is $$r_I \equiv I_1:I_0 = \phi_1:\phi_0 = r_L = a\sin\sqrt{\frac{2}{3}} / a\sin\sqrt{\frac{1}{3}} = 1.552 \tag{98}$$

Most generally for an arbitrary BIP-PAM4 field constellation, combining the last equation above with (184), the source currents ratio of Module #1 must be $$r_I \equiv I_1:I_0 = \phi_1:\phi_0 = \frac{a\sin F_4 + a\sin F_3}{a\sin F_4 - a\sin F_3} \tag{99}$$

Consistent with $\Phi \equiv \{\phi_1, \phi_0\} = z_0\{I_1, I_0\} = z_0 I$ (173) the current domain sources are given (using $$I_{1|0} = z_0^{-1}\phi_{1|0} \Leftrightarrow \phi_{1|0} = z_0 I_{1|0})$$

by:

$$I = z_0^{-1}\Phi \Leftrightarrow \{I_1, I_0\} = \{z_0^{-1}\phi_1, z_0^{-1}\phi_0\} \qquad (100)$$

Finally, substituting (183) into the last equation yields for the two source currents of the BIP eDAC driver of Tx #1, the following design $$I \equiv \{I_1, I_0\} = \left\{ \frac{z_0^{-1}}{2}(a\sin F_4 + a\sin F_3), \frac{z_0^{-1}}{2}(a\sin F_4 - a\sin F_3) \right\} \qquad (200)$$

It is apparent that optical field-domain 4-level constellation desired at the MZM output of Tx #1, as specified by the parameters $F_3, F_4$, may be synthesized using the pair of source currents given by (200).

In particular, consider the generation of an inherently 'perfect' optical field constellation $$F = \left\{ -1, -\frac{1}{3}, \frac{1}{3}, 1 \right\}.$$

Substituting $$F_3 = \frac{1}{3}, F_4 = 1$$

into (200) and simplifying, yields the current sources $$I \equiv \{I_1, I_0\} = \left\{ \frac{z_0^{-1}}{2}\left(a\sin1 + a\sin\frac{1}{3}\right), \frac{z_0^{-1}}{2}\left(a\sin1 - a\sin\frac{1}{3}\right) \right\} = \qquad (101)$$

$$\left\{ \frac{z_0^{-1}}{2}\left(\frac{\pi}{2} + a\sin\frac{1}{3}\right), \frac{z_0^{-1}}{2}\left(\frac{\pi}{2} - a\sin\frac{1}{3}\right) \right\} = z_0^{-1}\left\{ a\sin\sqrt{\frac{2}{3}}, a\sin\sqrt{\frac{1}{3}} \right\}$$

where in the last equality some trigonometric identities were used. The ratio, $I_1:I_0$ numerically equals $I_1$:

$$I_0 = a\sin\sqrt{\frac{2}{3}} / a\sin\sqrt{\frac{1}{3}} = 1.55.$$

1.9 the Serial-Parallel oDAC. PAM2l4-Driven 2segment 2-Parallel MPOoDAC

In subsection 1.8 we compared two options for BIP oPAM4 generation (or more flexibly BIP oPAM4l2 modulation, where oPAM4l2 is a four-levels or two-levels optical constellation:

1: The ePAM4+MZM module for oPAM4 generation (driven by an ePAM4 eDAC).

2: The 2Segment-SEMZM module for oPAM4 generation (driven by a pair of NRZs).

Either of the two options of oPAM4 BBs is capable of generally generating non-uniform antisymmetric (BIP) optical constellations. Either of these two BBs may have its parameters set, in particular, for generating ('perfect' (uniform max-full-scale) oPAM4 constellations. Option #1 was already used as the BB of a PAM4l2 driven MP-oDAC, parallelizing a pair of MZMs each driven by PAM4l2, as we disclosed in PCT patent application PCT/IB2021/060857 which is incorporated herein by reference and later disseminated in M. Nazarathy and I. Tomkos, "'Perfect' PAM4 Serial Digital-Optical Conversion," Phot. Technol. Lett. 33, 475-478, 2021. In this subsection we disclose adopting option #2 as an alternative BB to be parallelized to form a new MP-oDAC structural variant, which may functionally provide a functionally-equivalent alternative to PAM2l4 driven MP-oDAC structure taught in PCT patent application PCT/IB2021/060857 which is incorporated herein by reference and disseminated in the energy-efficient reference.

We recall that PCT patent application PCT/IB2021/060857 which is incorporated herein by reference claimed a family of MP-oDACs having the schematic top-level structure depicted here in FIG. 54A, namely splitting light in prescribed ratios to S parallel paths each comprising an oPAM4 modulation BB, and coherently recombining the light to generated a uniform BIP constellation at the output of the MP-oDAC, wherein the S parallel paths consisting of oPAM (meaning oPAM2 or 4) driven modulators. The top-level structure of FIG. 54A allows for any implementation of the oPAM4 BB, though most path-modulators embodiments described in PCT patent application PCT/IB2021/060857 which is incorporated herein by reference typically consisted of MZMs driven by either ePAM2 or ePAM4. This means that the embodiments described in PCT patent application PCT/IB2021/060857 which is incorporated herein by reference consisted of parallelizing BBs of the type #1 above, namely the ePAM4+MZM modules. The functional equivalence we derived in subsection 1.8 between BBs #1 and #2 above suggests that the abstract oPAM4 modulation BBs in the parallel path of the MP-oDAC of FIG. 54A be implemented according to option #2. Thus, we disclose a new structure parallelizing S modules of the #2 type. A preferred embodiment we disclose here in particular restricts the S parallel modules to just two modules of the #2 type. This opto-electronic structure is a novel alternative to the nominally 'perfect' oPAM16 optical constellation generation, to which we refer as the 'serial-parallel-oDAC'.

FIG. 54A is a top-level view of the S-parallel MP-oDAC introduced in PCT patent application PCT/IB2021/060857 which is incorporated herein by reference and the energy-efficient reference. Any modulating structure capable of imparting uniform oPAM4 upon its input optical field may be used as BB to be replicated in the S parallel paths.

Figure 54B:
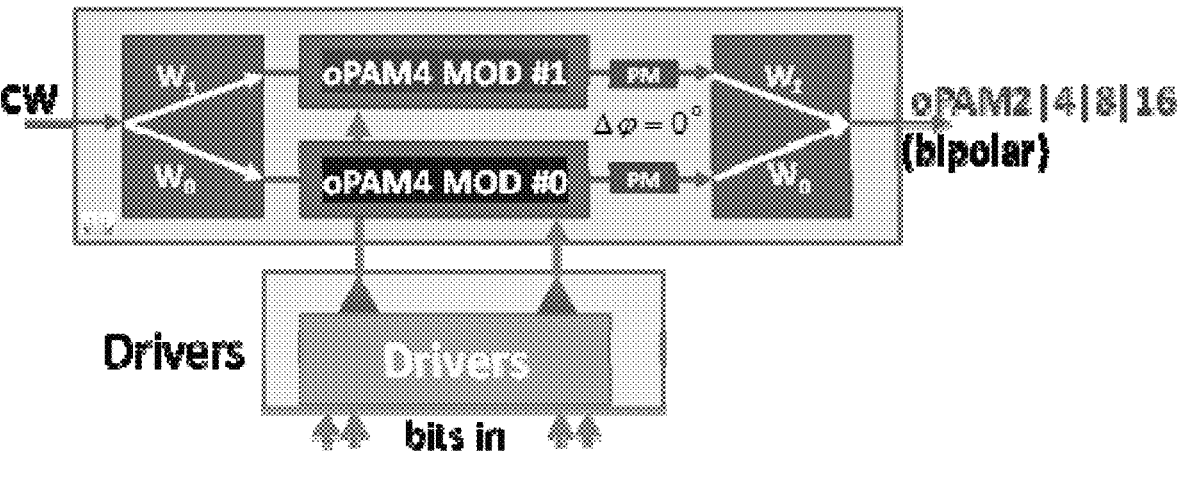

FIG. 54B is an embodiment of FIG. 54A with S=2 parallel paths: The 2-parallel MPoDAC disclosed in PCT patent application PCT/IB2021/060857 which is incorporated herein by reference and disseminated in the energy-efficient reference, comprising a pair of parallel modulating structures capable of imparting uniform oPAM4 upon its input optical field.

Figure 54C:
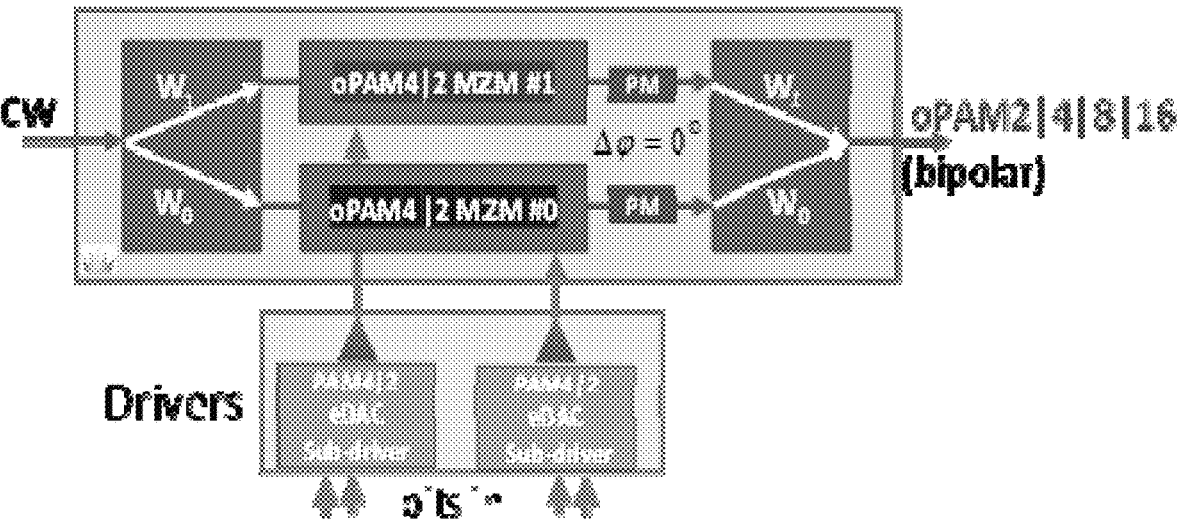

FIG. 54C illustrates a first concrete embodiment of FIG. 54B (Option #I) where each of the two oPAM4l2 BBs in the parallel paths is implemented as a PAM4l2-driven MZM. The PAM4l2-driven 2-parallel MPoDAC for oPAM16 generation is so constructed, as disclosed in PCT patent application PCT/IB2021/060857 which is incorporated herein by reference.

Figure 54D:
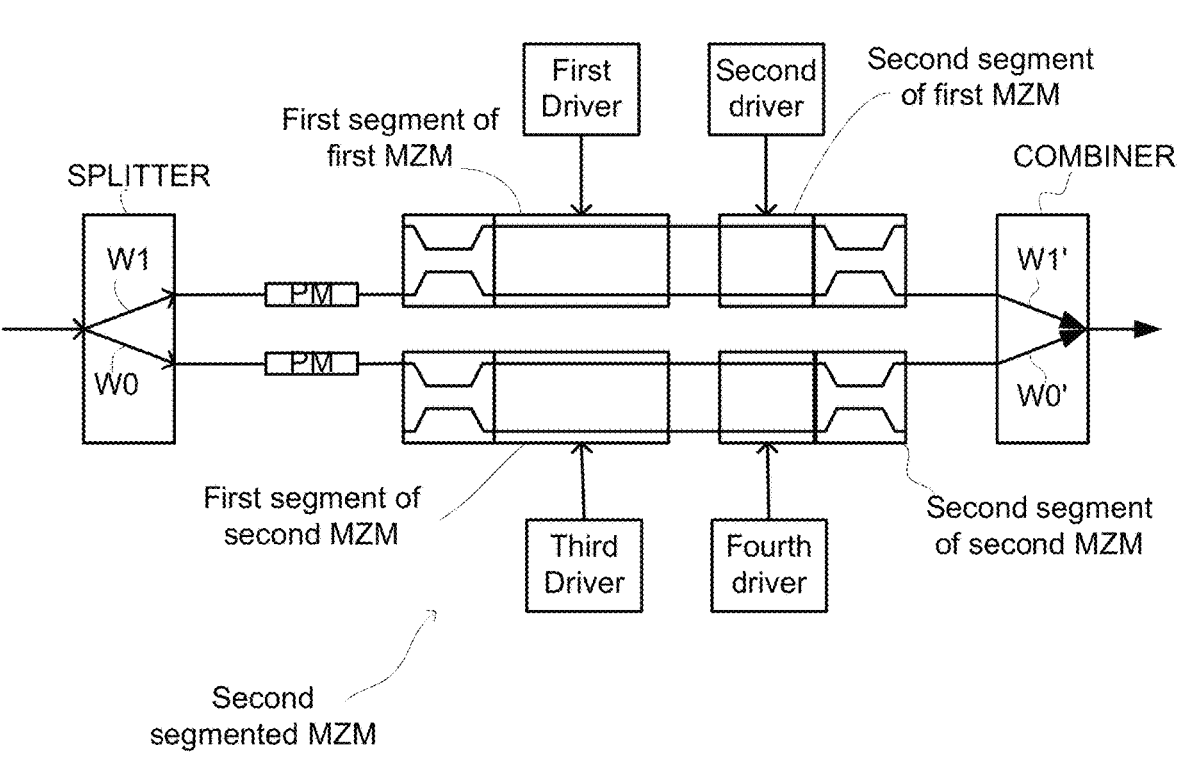

FIG. 54D illustrates an embodiment of FIG. 54B (Option #II) where each of the two oPAM4l2 BBs in the parallel paths is taken as an optimized 2-Segment SEMZM disclosed in PCT patent application PCT/IB2021/060857 which is incorporated herein by reference. The optimization ensures nominally perfect uniform max-full-scale 4-levels oPAM4 modulation in each of the two paths, yielding an oPAM16 generator overall, referred to in brief as the 'serial-parallel MPoDAC' (option #II). The paths may also be sub-optimized to generated non-max-full-scale (backed-off) constellations which are nevertheless nominally uniform.

We refer to our oDAC embodiment just two parallel paths each consisting of a two-segment SEMZM, optimized according to the teachings of PCT patent application PCT/IB2021/060857 which is incorporated herein by reference as 2-Parallel 2-Serial MP-oDAC. Compared to the PAM2|4 driven 2-parallel MP-oDAC (which has an MZM in each of the two parallel paths) as depicted in FIG. 54B, to conceptually obtain the new 2-Parallel 2-Serial MP-oDAC, the MZM in each path of the original PAM4|2 driven 2-parallel MP-oDAC is replaced by a 2-Segment SEMZM, yielding the new oPAM16 generation structure depicted in FIG. 54C The 2-Parallel 2-Serial (2P-2S) MP-oDAC. In terms of the electrical drive, this optical structure is fed by a pair of NRZs for each of the two 2-segment SEMZMs (one NRZ per segment), thus 4 NRZ electrical sources (sub-drives) are needed in the driver.

Thus, by now we have at our disposal two options for oPAM16 generation:

I: PAM4-driven 2P-MP-oDAC module for oPAM16 generation (two ePAM4 sub-drives).

II: NRZ-driven 2P-2S MP-oDAC for oPAM16 generation (four NRZ sub-drives).

Figure 55:
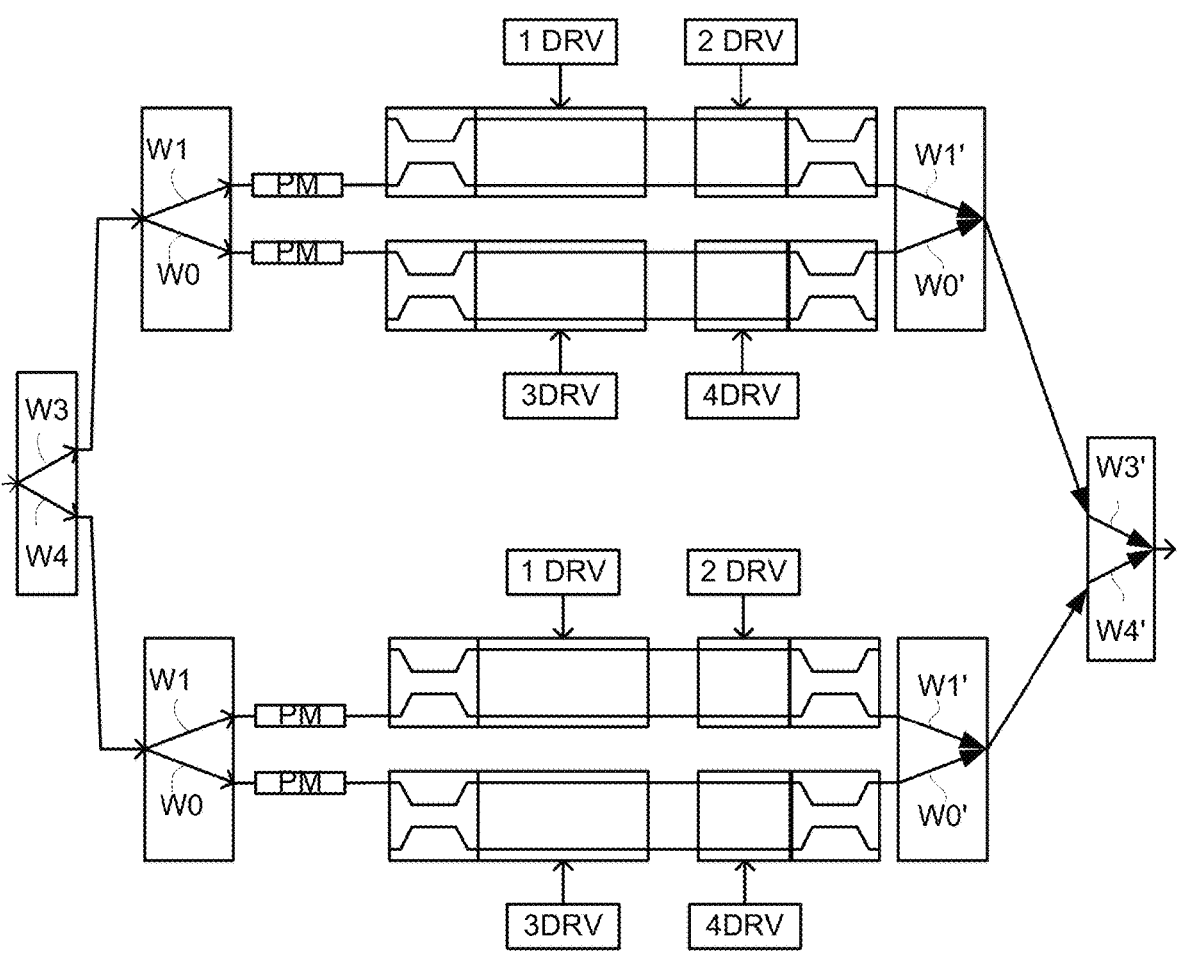
FIG. 55 illustrates an example of a QAM optical Transmitter.

Functionally, both MP-oDACs #I, #II of FIGS. 6(c),6(d) are able to generate COH-grade BIP-oPAM16, e.g., to serve as IQ tributaries in a 256QAM transmitter, as depicted in FIG. 55. Yet, electronically, these two BIP-oPAM16 modulated sources are not equivalent! The four independent NRZ drivers in the MP-oDAC of FIG. 54D are preferrable to the two BIP-ePAM4 drivers of the MP-oDAC, as NRZ drivers are simpler, lower-cost, more energy-efficient and more precise than the PAM4 drivers (which are in turn preferred to conventional BIP-16-PAM DACs).

Note: Another observation is that a ePAM4 driver internally comprises a pair of NRZs, plus additional switching circuitry thus a pair of ePAM4 drivers as need in oPAM16 generator #I internally comprise 4 NRZs anyway. Nevertheless, each ePAM4 driver consumes more power and is more complex than its constituent 2 NRZ drivers.

FIG. 55 illustrates a QAM optical Transmitter obtained by IQ-nesting (coherently combining with 900 phase-shift applied one of the two tributaries) a pair of serial-parallel oDACs (BIP oPAM option #II). Overall 8 NRZ sub-drivers are required (4 for the I-path, 4 for the Q-path), as compared with a pair of ePAM16 MZM drivers which are problematic to realize at ultra-high-speeds.

Thus, in terms of energy-efficiency and simplicity, the oPAM16 generator #II is preferred over #I. However, #II requires more somewhat complex optics (segmented MZMs vs. split MZMs in #I) and more complex RF drives. Thus, the choice of most appropriate MP-oDAC between the two options depends on multiple engineering characteristics, indicating that the selection of preferred MP-oDAC structure between #I and #II is context-dependent.

However, since ultra-high-speed optical transmission systems face an electronic drive bottleneck, either of the two new options for oPAM16 generation (leading to QAM256 by IQ nesting) are important additions to the toolbox optical communication systems.

Note, however, that in return for the ultra-high-speed electronic bottleneck mitigation, the investment to make in the proposed MP-oDAC subsystems is higher complexity of the PIC in order to relieve increasingly difficult up-scaling of electronic drive requirements.

As a use-case example, once the new structure #II is adopted, what we gain when implementing an optical QAM256 Tx (based on a pair of IQ BIP oPAM16 modules of the type #II, driven by 8=4×2 NRZs) is:

(i) Truly DAC-less direct-NRZ-drives at ultra-high baudrate: eliminate conventional ultra-high-speed DACs arrays, instead directly drive modulation optics from 8 (=$\log_2 256$) decoupled NRZ drivers (directly feed-in 8 data lanes carrying $\pm V_0$ voltages, in particular eliminate not just the D/A analog precision circuitry but also ultra-high-speed multibit digital encoder logic (this is what 'truly' DAC-less means), to significantly improve energy-efficiency.

(ii) Backoff-free ultra-linear modulation: No longer sacrifice photon efficiency in exchange for constellation linearity (precision). Operate backoff-free over the full-scale modulation output, gaining ~4 dB of precious optical link budget, without derailing the constellation points off the equi-spaced grids. In addition, the ability to tune the positions of the optical levels with high-precision provides high linearity of the generated optical constellation.

Impossible as requirements (i), (ii), each standalone and enforced together may seem, the conceptual advance of module #II, the 'serial-parallel-MP-oDAC' enables just that.

The considerations above re the interchangeability of the oPAM4 modulation BBs #1, #2 may suffice for establishing the principle of operation for a parallelized structure comprising two such modules of the #2 type, but the description above reiterates the principle of operation of the resulting oPAM16 modulation module is #II: The splitter and combiner are set at $$\sqrt{\frac{4}{5}} \ \text{to} \ \sqrt{\frac{1}{5}}$$

split-combine ratios in the optical field domain, equivalent to $$W_1 : W_0 = \frac{4}{5} : \frac{1}{5}$$

power-split-combine ratios specified in [1,4] for generating oPAM16 by MP-oDAC structure #I, which is also adopted in the MP-oDAC structure #II analyzed here. Thus, denoting the modulation Transfer Factor (TF) for optical fields in the top|bottom 2-segment SEMZM by $F^{(1|0)}$, the end-to-end modulation TF of the entire 2serial-2parallel-MPoDAC (option #II) is:

$$F = \sqrt{\frac{4}{5}} \cdot F^{(1)} \cdot \sqrt{\frac{4}{5}} \oplus \sqrt{\frac{1}{5}} \cdot F^{(0)} \cdot \sqrt{\frac{1}{5}} = \frac{4}{5} F^{(1)} \oplus \frac{1}{5} F^{(0)} \quad (202)$$

where $$\sqrt{\frac{4}{5}} \cdot F^{(1)} \cdot \sqrt{\frac{4}{5}}$$

describes optical field propagation from the input of the MP-oDAC via the upper path of splitter, then through the top SEMZM, then via the upper path of the combiner (which is matched to the splitter, functioning to linearly combine its top and bottom input optical fields with $$\sqrt{\frac{4}{5}}, \sqrt{\frac{1}{5}}$$

weights). It is the Kronecker sum that describes the coherent superposition of paths in the optical combiner since any optical field contribution to the optical output from the upper path is superposed to any optical field contribution to the optical output from the lower path, which is precisely what the Ksum is devised to do.

It remains to specify the constellations $F^{(1|0)}$ modulated by the top|bottom SEMZMs.

Using our optimization of the segment lengths and/or per-segment drive voltages as disclosed in subsection 1.8, we concluded in PCT patent application PCT/IB2021/060857 which is incorporated herein by reference and in the energy-efficient reference that (unlike prior-art embodiments of SEMZM, based on 2:1 MZM segment phases) our optimized SEMZM design is capable in principle of generating 'perfect' oPAM4 constellations.

Therefore, we may set our optimized SEMZM modulated constellations to be taken as uniform max-full-scale ones, $$F^{(1|0)} = \left\{ -1, -\frac{1}{3}, \frac{1}{3}, 1 \right\}, \tag{102}$$

to be plugged into (202), yielding $$F = \frac{4}{5} F^{(1)} \oplus \frac{1}{5} F^{(0)} = \tag{103}$$

$$\frac{4}{5}\left\{ -1, -\frac{1}{3}, \frac{1}{3}, 1 \right\} \oplus \frac{1}{5}\left\{ -1, -\frac{1}{3}, \frac{1}{3}, 1 \right\} = \left\{ -1, -\frac{13}{15}, -\frac{11}{14}, -\frac{9}{15}, \right.$$

$$\left. -\frac{7}{15}, -\frac{5}{15}, -\frac{3}{15}, -\frac{1}{15}, \frac{1}{15}, \frac{3}{15}, \frac{5}{15}, \frac{7}{15}, \frac{9}{15}, \frac{11}{14}, \frac{13}{15}, 1 \right\}$$

i.e., we have generated (under ideal conditions, barring practical imperfections deviating from the stated nominal assumptions) a 'perfect' oPAM16 optical constellation at the output of our serial-parallel-MPoDAC (option #II).

We reiterate that, functionally, both oPAM16 modules #I and #II generate COH-grade BIP-oPAM16 to serve as IQ tributaries in 256QAM transmitters. Yet, electronically, these two BBs are not equivalent! The four independent NRZ drivers in option #II seem preferrable, being simpler, lower-cost, more energy-efficient and more precise than the two PAM4 drivers in option #I (which are in turn better than driving MZMs by conventional BIP-16-PAM eDACs). In return for the ultra-high-speed electronic bottleneck mitigation enabled by the newly disclosed 'serial-parallel' MP-oDAC structure (option #II), the investment to make in this disclosed subsystem is higher complexity of the PIC.

1.10 Flexible Reconfiguration of the Constellation Size (oPAM2|4|8|16)

Referring to FIG. 6(c) (option #I: PAM4|2-driven 2-parallel MPoDAC) the description heretofore assumed that the two sub-drivers both generate ePAM4. But if one of the two sub-drivers is electrically reconfigured to generate ePAM2 (i.e., NRZ, which is readily attained digitally, by emitting neither the two inner symbols of the ePAM4 constellation, but emitting just one the two outer symbols), whereas the other sub-driver is configured to generate generate ePAM4, then oPAM8 is generated at the MP-oDAC output. If both sub-drivers are electrically reconfigured to generate ePAM2, then oPAM4 is generated at the MP-oDAC output. If light is steered to one of the two MZMs (by setting the split-combine ratios to 100%-0%_and the corresponding sub-driver for the path which got all the light is electrically reconfigured to emit ePAM2 then oPAM2 (i.e., BPSK) is generated. Note: All the aforemention ePAM and oPAM constellations are of the BIP type. These flexible reconfiguration capabilities were already disclosed in PCT patent application PCT/IB2021/060857 which is incorporated herein by reference and disseminated in the energy-efficient reference.

We now disclose that a similar reconfiguration capability is also available for the newly disclosed MP-oDAC structure depicted in FIG. 54D namely the '2-Serial-2-Parallel MPo-DAC'(option #II), by digitally manipulating the bit inputs to (some of) the four NRZ modulators as follows:

For oPAM16 feed all four NRZs by independent bits.

For oPAM8 feed the two NRZs driving one of the SEMZMs by independent bits, while feeding NRZs driving one of the other SEMZM by identical bits (such that the two segments behave like a single full-length segment and oPAM2, i.e. BPSK is generated in that SEMZM, which behavs as a single full-length MZM).

For oPAM4 feed the two NRZs driving one of the SEMZMs by identical bits, while also feeding the two NRZs driving the other SEMZMs by identical bits, albeit independent of the identical bits driving the other SEMZM. Thus, both SEMZMs behave as full-length MZMs.

For oPAM2 steer all the light to one of the two SEMZMs and feed that SEMZM by identical bits.

Note: The various options require retuning the split-combine ratios $W_1$: $W_0$ to be suitable for the size of generated constellation (PAM16|PAM8|PAM4) as disclosed in PCT patent application PCT/IB2021/060857 which is incorporated herein by reference. For PAM2 we saw that all the light is steered to one path, which requires setting $W_1$:$W_0$=1:0 (in principle, barring extinction ratio effects).

There may be provide a method for operating any of the DACs illustrated in the application.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, hovever, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality niay be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to comprising, including, comprises, comprise and having may be applied mutatis mutandis to consisting and/or may be applied mutatis mutandis to consisting essentially of.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. An optical digital to analog converter (oDAC), comprising:
multiple optical paths that are parallel to each other;
a combiner that comprises multiple combiner inputs and a combiner output;
a splitter that is configured to receive an optical signal at a splitter input and split the optical signal between multiple splitter outputs to provide multiple path input signals to the multiple optical paths; wherein the multiple optical paths are formed between the multiple splitter outputs and the multiple combiner inputs;
wherein the multiple optical paths are configured to optically process, in parallel, path input signals to provide path output signals; wherein each optical path is configured to apply an optical process that comprises applying optical modulation, by an optical gate of the optical path and under a control of an electrical digital-to-analog converter driver, to provide an optical signal having a value selected out of multiple constellation levels;
wherein the multiple optical paths are configured to output multiple path output signals to the multiple combiner inputs;
wherein the multiple optical paths comprise a first optical path and a second optical path;
wherein the multiple path input signals comprise a first path input signal and a second path input signal;
wherein the input optical power ratio between the power of the first path input signal and the power of the second path input signal differs from one;
wherein the first optical path comprises a first modulator that is driven by a first driver that comprises a first trans-impedance amplifier that has a first trans-impedance value and is configured to receive a first input current that exhibits a first peak input current value;
wherein the second optical path comprises a second modulator that is driven by a second driver that has a second trans-impedance amplifier that has a second trans-impedance value and is configured to receive a second input current that exhibits a second peak input current value; and
wherein the trans-impedance ratio between the first trans-impedance value and the second trans-impedance value is configured to compensate for the ratio between the first peak input current value and the second peak input current value and
wherein at least the combiner is configured to add the multiple path output signals to provide an oDAC output signal having a value selected out of values of a single quadrature constellation.

2. The oDAC according to claim 1 wherein the optical process applied by each optical path brings all paths to have prescribed pair-wise phase differences to their linear superposition in the combiner.

3. The oDAC according to claim 1 wherein the optical modulation is an optical pulse amplitude modulation (PAM).

4. The oDAC according to claim 1 wherein the optical gates are 1-bit modulated by the electrical drivers.

5. The oDAC according to claim 1 wherein the optical gates are multi-bit modulated by the electrical drivers.

6. The oDAC according to claim 1 wherein the optical gates are Mach-Zehnder-Modulators.

7. The oDAC according to claim 1 wherein the multiple optical paths are configured to introduce either (a) a zero phase difference or (b) one hundred eighty degree phase difference between pairs of output path output signals.

8. The oDAC according to claim 1 wherein the multiple optical paths are configured to introduce a zero phase difference between the optical path output signals.

9. The oDAC according to claim 1 wherein the optical gates are followed by phase shifters, wherein the modulation rates of the phase shifters are a fraction of a modulation rate of the optical gates.

10. The oDAC according to claim 1 wherein the optical gates are followed by slow phase modulators, wherein the modulation rates of the slow phase modulators are a fraction of a modulation rate of the optical gates.

11. The oDAC according to claim 1 wherein at least one of the optical paths comprises an optical amplifier.

12. The oDAC according to claim 1 wherein the optical gates are phase modulators.

13. The oDAC according to claim 12 wherein the multiple constellation levels belong to a coherent constellation with both positive and negative phase values.

14. The oDAC according to claim 12 wherein the multiple successive constellation levels are equally spaced.

15. The oDAC according to claim 14 wherein the multiple optical paths are multiple (S) optical paths, and wherein the multiple constellation levels, normalized to unity maximum level, equal s/(S−1), wherein s ranges from zero to S−1.

16. The oDAC according to claim 1, wherein the first driver also comprises first current sources that precede the first trans-impedance amplifier, wherein the second driver also comprises second current sources that precede the second trans-impedance amplifier; wherein a ratio between a mean input current inputted to the first trans-impedance amplifier and a mean input current inputted to the first trans-impedance amplifier is about 0.25.

17. The oDAC according to claim 1, wherein the first driver also comprises first current sources that precede the first trans-impedance amplifier, wherein the second driver also comprises second current sources that precede the second trans-impedance amplifier; wherein a ratio between the first trans-impedance value and the second trans-impedance value is about four.

18. The oDAC according to claim 1, wherein the second driver also comprises second current sources that precede the second trans-impedance amplifier, wherein a product of (i) a mean input current inputted to the second trans-impedance amplifier, multiplied by (ii) the second trans-impedance value, is constant.

19. The oDAC according to claim 1, wherein the first driver also comprises first current sources that precede the first trans-impedance amplifier, wherein a product of (i) a mean input current inputted to the first trans-impedance amplifier, multiplied by (ii) the first trans-impedance value, is constant.

20. The oDAC according to claim 1, wherein the input optical power ratio ranges between 4 and 6.

21. The oDAC according to claim 1, wherein the input optical power ratio ranges between 2 and 20.

22. The oDAC according to claim 1, wherein the first optical path is configured to output a first path output signal, wherein the second optical path is configured to output a second path output signal, wherein the combiner is configured to optically combine (i) a first product of a multiplication between the first path output signal and a first combiner weight, and (ii) a second product of a multiplication between the second path output signal and a second combiner weight; wherein an optical power combining ratio between the first combiner weight and the second combiner weight differs from one.

23. The oDAC according to claim 22, wherein the first modulator is a first Mach-Zehnder-Modulator (MZM) and wherein the second modulator is a second MZM, wherein each one of the first MZM modulator and the second MZM modulator is a segmented MZM modulator that consists essentially of a sequence of a first segment and a second segment.

24. The oDAC according to claim 23, wherein each segment is fed by an electrical two-level driver.

25. The oDAC according to claim 24, wherein the first segment of the first MZM modulator is fed by the first trans-impedance amplifier, wherein the second segment of the first MZM modulator is fed by a third trans-impedance amplifier, wherein a ratio between (i) a first product of a multiplication of a first segment length by a mean output voltage of the first trans-impedance amplifier, and (ii) a second product of a multiplication of a second segment length by a mean output voltage of the third trans-impedance amplifier substantially equals 1.552.

26. The oDAC according to claim 24, wherein a phase shift ratio between a phase shift introduced by the first segment and a phase shift introduced the second segment of a MZM modulator of the first and second MZM modulators ranges between 1.1 and 1.95.

27. An optical digital to analog converter (oDAC), comprising:

multiple optical paths that are parallel to each other;

a combiner that comprises multiple combiner inputs and a combiner output;

a splitter that is configured to receive an optical signal at a splitter input and split the optical signal between multiple splitter outputs to provide multiple path input signals to the multiple optical paths; wherein the multiple optical paths are formed between the multiple splitter outputs and the multiple combiner inputs;

wherein the multiple optical paths are configured to optically process, in parallel, path input signals to provide path output signals; wherein each optical path is configured to apply an optical process that comprises applying optical modulation, by an optical gate of the optical path and under a control of an electrical digital-to-analog converter driver, to provide an optical signal having a value selected out of multiple constellation levels;

wherein the multiple optical paths are configured to output multiple path output signals to the multiple combiner inputs;

wherein the multiple optical paths comprise a first optical path and a second optical path;

wherein the multiple path input signals comprise a first path input signal and a second path input signal;

wherein an input optical power ratio between a power of the first path input signal and a power of the second path input signal differs from one;

wherein the first optical path comprises a first modulator and a second modulator, the first modulator comprises a first segment that is followed by a second segment, the second modulator comprises a third segment that is followed by a fourth segment;

wherein the first segment is driven by a first driver that comprises a first trans-impedance amplifier;

wherein the second segment is driven by a third driver that comprises a third trans-impedance amplifier;

wherein the third segment is driven by a second driver that comprises a second trans-impedance amplifier;

wherein the fourth segment is driven by a fourth driver that comprises a fourth trans-impedance amplifier;

wherein a first modulator phase shift ratio between a phase shift introduced by the first segment to a phase shift introduced by the second segment substantially equals 1.552;

wherein a second modulator phase shift ratio between a phase shift introduced by the third segment to a phase shift introduced by the fourth segment ranges between 1.1 and 1.95.

28. A method for optical digital to analog conversion, the method comprises:

splitting, by a combiner, an input optical signal to multiple path input signals; optically processing, the multiple path input signals, by the multiple optical paths, in parallel to provide path output signals; wherein the optically processing comprises applying optical modulation by optical gates of the multiple optical paths and while driven by multiple electrical modulators, to provide optical signals; and combining, by a combiner, multiple path output signals that are outputted from the multiple optical paths to provide an oDAC output signal having a value selected out of values of a single quadrature constellation; and wherein the multiple optical paths comprise a first optical path and a second optical path;

wherein the multiple path input signals comprise a first path input signal and a second path input signal;

wherein the input optical power ratio between the power of the first path input signal and the power of the second path input signal differs from one;

wherein the first optical path comprises a first modulator that is driven by a first driver that comprises a first trans-impedance amplifier that has a first trans-impedance value and the method comprises receiving by the first trans-impedance amplifier a first input current that exhibits a first peak input current value;

wherein the second optical path comprises a second modulator that is driven by a second driver that has a second trans-impedance amplifier that has a second trans-impedance value and the method comprises receiving by the second trans-impedance amplifier, a second input current that exhibits a second peak input current value; and wherein the trans-impedance ratio between the first trans-impedance value and the second trans-impedance value is configured to compensate for the ratio between the first peak input current value and the second peak input current value.

\* \* \* \* \*